US009553860B2

(12) United States Patent
Meyer

(10) Patent No.: US 9,553,860 B2
(45) Date of Patent: *Jan. 24, 2017

(54) EMAIL EFFECTIVITY FACILITY IN A NETWORKED SECURE COLLABORATIVE EXCHANGE ENVIRONMENT

(71) Applicant: Intralinks, Inc., New York, NY (US)

(72) Inventor: Jerry Lee Meyer, Charlestown, MA (US)

(73) Assignee: Intralinks, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/207,988

(22) Filed: Mar. 13, 2014

(65) Prior Publication Data

US 2014/0189818 A1    Jul. 3, 2014

Related U.S. Application Data

(63) Continuation-in-part of application No. 14/057,541, filed on Oct. 18, 2013, now Pat. No. 9,251,360, which
(Continued)

(51) Int. Cl.
*H04L 29/06* (2006.01)
*G06F 21/62* (2013.01)
*H04L 12/58* (2006.01)

(52) U.S. Cl.
CPC ............. *H04L 63/08* (2013.01); *G06F 21/62* (2013.01); *H04L 63/10* (2013.01); *H04L 51/08* (2013.01)

(58) Field of Classification Search
None
See application file for complete search history.

(56) References Cited

U.S. PATENT DOCUMENTS 5,537,618 A   7/1996 Boulton et al.
5,630,159 A   5/1997 Zancho
(Continued)

FOREIGN PATENT DOCUMENTS

EP    2842070    3/2015
JP    2002318802 A   10/2002
(Continued)

OTHER PUBLICATIONS

"Secure Documents", https://web.archive.org/web/20140413184245/http://www.doctrackr.com/secure-documents/ [retrieved on Jul. 29, 2015], 46 Pages.
(Continued)

*Primary Examiner* — Kaveh Abrishamkar
(74) *Attorney, Agent, or Firm* — GTC Law Group PC & Affiliates

(57) ABSTRACT

In embodiments of the present invention improved capabilities are described for managing access to a secure exchange environment managed by an intermediate business entity through a user email identity, the method comprising establishing a secure exchange server hosted by an intermediate business entity, wherein communications and access to a collection of files established by a first business entity are managed for a second business entity; and establishing an email effectivity facility that allows a user of the first business entity to specify a condition for email-based access to at least one resource in the collection of files, wherein the condition expresses (a) an effective period for using an email providing access to the resource and (b) a condition of email access to the resource by a designated individual of the second business entity, wherein the access permission was assigned using a specific email address of the designated individual.

18 Claims, 99 Drawing Sheets

Related U.S. Application Data is a continuation-in-part of application No. 13/960,324, filed on Aug. 6, 2013, now Pat. No. 9,253,176, which is a continuation-in-part of application No. 13/871,593, filed on Apr. 26, 2013, now Pat. No. 9,148,417.

(60) Provisional application No. 61/904,122, filed on Nov. 14, 2013, provisional application No. 61/914,682, filed on Dec. 11, 2013, provisional application No. 61/944,756, filed on Feb. 26, 2014, provisional application No. 61/715,989, filed on Oct. 19, 2012, provisional application No. 61/734,890, filed on Dec. 7, 2012, provisional application No. 61/783,868, filed on Mar. 14, 2013, provisional application No. 61/680,115, filed on Aug. 6, 2012, provisional application No. 61/702,587, filed on Sep. 18, 2012, provisional application No. 61/639,576, filed on Apr. 27, 2012.

(56) References Cited

U.S. PATENT DOCUMENTS

| | | |
|---|---|---|
| 5,630,169 A | 5/1997 | Jackson |
| 5,694,596 A | 12/1997 | Campbell |
| 5,721,827 A | 2/1998 | Logan et al. |
| 5,764,906 A * | 6/1998 | Edelstein et al. ............. 709/219 |
| 5,771,355 A | 6/1998 | Kuzma |
| 5,781,901 A | 7/1998 | Kuzma |
| 5,790,790 A | 8/1998 | Smith et al. |
| 5,815,665 A | 9/1998 | Teper et al. |
| 5,898,780 A | 4/1999 | Liu et al. |
| 5,903,723 A | 5/1999 | Beck et al. |
| 5,923,756 A | 7/1999 | Shambroom |
| 5,937,405 A | 8/1999 | Campbell |
| 5,961,590 A | 10/1999 | Mendez et al. |
| 6,029,146 A | 2/2000 | Hawkins et al. |
| 6,088,722 A | 7/2000 | Herz et al. |
| 6,092,114 A | 7/2000 | Shaffer et al. |
| 6,112,181 A | 8/2000 | Shear et al. |
| 6,148,342 A | 11/2000 | Ho |
| 6,192,407 B1 | 2/2001 | Smith et al. |
| 6,223,177 B1 | 4/2001 | Tatham et al. |
| 6,233,608 B1 | 5/2001 | Laursen et al. |
| 6,253,326 B1 | 6/2001 | Lincke et al. |
| 6,266,692 B1 | 7/2001 | Greenstein |
| 6,370,575 B1 | 4/2002 | Dougherty et al. |
| 6,385,644 B1 | 5/2002 | Devine et al. |
| 6,385,655 B1 | 5/2002 | Smith et al. |
| 6,397,261 B1 | 5/2002 | Eldridge et al. |
| 6,421,678 B2 | 7/2002 | Smiga et al. |
| 6,430,601 B1 | 8/2002 | Eldridge et al. |
| 6,442,571 B1 | 8/2002 | Haff et al. |
| 6,453,348 B1 | 9/2002 | Barnier et al. |
| 6,487,557 B1 * | 11/2002 | Nagatomo |
| 6,493,760 B1 | 12/2002 | Pendlebury et al. |
| 6,515,988 B1 | 2/2003 | Eldridge et al. |
| 6,529,956 B1 | 3/2003 | Smith et al. |
| 6,591,291 B1 | 7/2003 | Gabber et al. |
| 6,678,698 B2 | 1/2004 | Fredell et al. |
| 6,718,367 B1 | 4/2004 | Ayyadurai |
| 6,738,981 B1 | 5/2004 | Tönnby et al. |
| 6,816,906 B1 | 11/2004 | Icken et al. |
| 6,889,208 B1 | 5/2005 | Okabe et al. |
| 6,898,636 B1 | 5/2005 | Adams et al. |
| 6,904,449 B1 | 6/2005 | Quinones |
| 6,941,285 B2 | 9/2005 | Sarcanin |
| 7,140,035 B1 | 11/2006 | Karch |
| 7,143,175 B2 | 11/2006 | Adams et al. |
| 7,146,367 B2 | 12/2006 | Shutt |
| 7,168,094 B1 | 1/2007 | Fredell |
| 7,225,157 B2 | 5/2007 | Howard et al. |
| 7,231,426 B1 * | 6/2007 | Hall et al. ............. 709/206 |
| 7,233,992 B1 | 6/2007 | Muldoon et al. |
| 7,275,158 B2 | 9/2007 | Akama |
| 7,296,058 B2 * | 11/2007 | Throop ............. 709/206 |
| 7,302,634 B2 | 11/2007 | Lucovsky et al. |
| 7,328,276 B2 | 2/2008 | Alisuag et al. |
| 7,496,353 B2 | 2/2009 | Odinak |
| 7,509,490 B1 | 3/2009 | Hsu et al. |
| 7,536,439 B1 * | 5/2009 | Jaladanki ............. H04L 51/28 709/206 |
| 7,552,470 B2 | 6/2009 | Dominic |
| 7,580,988 B2 | 8/2009 | Rudd |
| 7,587,504 B2 | 9/2009 | Adams et al. |
| 7,752,269 B2 | 7/2010 | Schreuder et al. |
| 7,761,507 B2 | 7/2010 | Herf et al. |
| 7,814,537 B2 | 10/2010 | Fredell |
| 7,966,388 B1 | 6/2011 | Pugaczewski et al. |
| 8,307,119 B2 | 11/2012 | Danaher et al. |
| 8,311,946 B1 | 11/2012 | Warnock et al. |
| 8,325,625 B2 | 12/2012 | Nair et al. |
| 8,549,300 B1 * | 10/2013 | Kumar et al. ............. 713/175 |
| 8,571,971 B1 * | 10/2013 | Brown et al. ............. 705/38 |
| 8,639,625 B1 | 1/2014 | Ginter et al. |
| 8,751,793 B2 | 6/2014 | Ginter et al. |
| 8,787,579 B2 | 7/2014 | Roberts et al. |
| 9,069,436 B1 | 6/2015 | Fieweger et al. |
| 9,070,112 B2 | 6/2015 | Glover |
| 9,148,417 B2 * | 9/2015 | Fieweger ............. H04L 9/3231 |
| 9,251,360 B2 | 2/2016 | Meyer et al. |
| 9,253,176 B2 | 2/2016 | Ford et al. |
| 2001/0020274 A1 | 9/2001 | Shambroom |
| 2001/0027477 A1 | 10/2001 | Nakamura et al. |
| 2001/0028364 A1 | 10/2001 | Fredell et al. |
| 2002/0016910 A1 | 2/2002 | Wright et al. |
| 2002/0026592 A1 | 2/2002 | Gavrila et al. |
| 2002/0035697 A1 | 3/2002 | McCurdy et al. |
| 2002/0095499 A1 | 7/2002 | Barnett et al. |
| 2002/0099837 A1 | 7/2002 | Oe et al. |
| 2002/0112240 A1 | 8/2002 | Bacso et al. |
| 2002/0123924 A1 | 9/2002 | Cruz |
| 2002/0138744 A1 | 9/2002 | Schleicher et al. |
| 2002/0156695 A1 | 10/2002 | Edwards |
| 2002/0162005 A1 | 10/2002 | Ueda et al. |
| 2002/0162027 A1 | 10/2002 | Itwaru |
| 2002/0184191 A1 | 12/2002 | Marpe et al. |
| 2003/0014270 A1 | 1/2003 | Qureshi et al. |
| 2003/0046313 A1 | 3/2003 | Leung et al. |
| 2003/0074580 A1 | 4/2003 | Knouse et al. |
| 2003/0097410 A1 | 5/2003 | Atkins et al. |
| 2003/0105734 A1 | 6/2003 | Hitchen et al. |
| 2003/0105764 A1 | 6/2003 | Kageyama et al. |
| 2003/0105978 A1 | 6/2003 | Byrne |
| 2003/0115481 A1 | 6/2003 | Baird et al. |
| 2003/0126215 A1 | 7/2003 | Udell et al. |
| 2003/0172296 A1 | 9/2003 | Gunter |
| 2003/0189592 A1 | 10/2003 | Boresjo |
| 2003/0221102 A1 | 11/2003 | Jakobsson et al. |
| 2003/0221124 A1 | 11/2003 | Curran et al. |
| 2003/0225763 A1 | 12/2003 | Guilak et al. |
| 2003/0225796 A1 | 12/2003 | Matsubara |
| 2003/0226105 A1 | 12/2003 | Waldau |
| 2003/0229900 A1 | 12/2003 | Reisman |
| 2004/0006594 A1 | 1/2004 | Boyer et al. |
| 2004/0034646 A1 | 2/2004 | Kimball et al. |
| 2004/0049730 A1 | 3/2004 | Ishizaka et al. |
| 2004/0054790 A1 | 3/2004 | Himmel et al. |
| 2004/0103202 A1 | 5/2004 | Hildebrand et al. |
| 2004/0133775 A1 | 7/2004 | Callas et al. |
| 2004/0210772 A1 | 10/2004 | Hooker et al. |
| 2004/0221118 A1 | 11/2004 | Slater et al. |
| 2004/0230820 A1 | 11/2004 | Hui Hsu et al. |
| 2004/0255137 A1 | 12/2004 | Ying et al. |
| 2004/0267762 A1 | 12/2004 | Tunning et al. |
| 2004/0268451 A1 * | 12/2004 | Robbin et al. ......... 999/999.999 |
| 2005/0060643 A1 | 3/2005 | Glass et al. |
| 2005/0091077 A1 | 4/2005 | Reynolds |
| 2005/0102534 A1 | 5/2005 | Wong |
| 2005/0114661 A1 | 5/2005 | Cheng et al. |
| 2005/0138110 A1 | 6/2005 | Redlich et al. |
| 2005/0193009 A1 | 9/2005 | Reinhardt et al. |
| 2005/0193043 A1 | 9/2005 | Hoover |

(56) References Cited

U.S. PATENT DOCUMENTS

| | | |
|---|---|---|
| 2005/0231738 A1 | 10/2005 | Huff et al. |
| 2005/0240572 A1 | 10/2005 | Sung et al. |
| 2006/0031412 A1 | 2/2006 | Adams et al. |
| 2006/0047752 A1 | 3/2006 | Hornby |
| 2006/0048099 A1 | 3/2006 | Templin et al. |
| 2006/0053280 A1 | 3/2006 | Kittle et al. |
| 2006/0075028 A1 | 4/2006 | Zager et al. |
| 2006/0136417 A1 | 6/2006 | Avinash et al. |
| 2007/0056046 A1 | 3/2007 | Claudatos et al. |
| 2007/0079137 A1 | 4/2007 | Tu |
| 2007/0088846 A1 | 4/2007 | Adams et al. |
| 2007/0118889 A1 | 5/2007 | Fredell |
| 2007/0136814 A1 | 6/2007 | Lee et al. |
| 2007/0185875 A1 | 8/2007 | Chang et al. |
| 2007/0266104 A1 | 11/2007 | Bolf et al. |
| 2008/0120196 A1 | 5/2008 | Reed et al. |
| 2008/0134175 A1 | 6/2008 | Fitzgerald et al. |
| 2008/0178278 A1 | 7/2008 | Grinstein et al. |
| 2008/0196092 A1 | 8/2008 | Benschop et al. |
| 2008/0201299 A1 | 8/2008 | Lehikoinen et al. |
| 2008/0294899 A1 | 11/2008 | Gazzetta et al. |
| 2009/0012869 A1 | 1/2009 | Henkin et al. |
| 2009/0100060 A1 | 4/2009 | Livnat et al. |
| 2009/0172795 A1 | 7/2009 | Ritari et al. |
| 2009/0204580 A1 | 8/2009 | Seamon et al. |
| 2009/0222535 A1 | 9/2009 | Ni et al. |
| 2009/0259838 A1 | 10/2009 | Lin |
| 2009/0319781 A1 | 12/2009 | Byrum et al. |
| 2009/0327729 A1 | 12/2009 | Rhodes et al. |
| 2009/0327739 A1 | 12/2009 | Relyea et al. |
| 2009/0328171 A1 | 12/2009 | Bayus et al. |
| 2010/0005520 A1 | 1/2010 | Abbot et al. |
| 2010/0042846 A1 | 2/2010 | Trotter et al. |
| 2010/0064354 A1 | 3/2010 | Irvine et al. |
| 2010/0138797 A1 | 6/2010 | Thorn |
| 2010/0161424 A1 | 6/2010 | Sylvain |
| 2010/0161961 A1 | 6/2010 | Beigelman et al. |
| 2010/0306670 A1 | 12/2010 | Quinn et al. |
| 2010/0325710 A1 | 12/2010 | Etchegoyen |
| 2010/0333116 A1 | 12/2010 | Prahlad et al. |
| 2011/0029666 A1 | 2/2011 | Lopatecki et al. |
| 2011/0047080 A1 | 2/2011 | Im et al. |
| 2011/0093471 A1 | 4/2011 | Brockway et al. |
| 2011/0154506 A1* | 6/2011 | O'Sullivan et al. ............ 726/28 |
| 2011/0173443 A1 | 7/2011 | Osterwalder et al. |
| 2011/0184998 A1 | 7/2011 | Palahnuk et al. |
| 2011/0202756 A1 | 8/2011 | West et al. |
| 2011/0289574 A1 | 11/2011 | Hull et al. |
| 2011/0296440 A1 | 12/2011 | Laurich et al. |
| 2011/0307947 A1 | 12/2011 | Kariv et al. |
| 2012/0084544 A1 | 4/2012 | Farina et al. |
| 2012/0084566 A1 | 4/2012 | Chin et al. |
| 2012/0204032 A1 | 8/2012 | Wilkins et al. |
| 2012/0226462 A1 | 9/2012 | Rucker |
| 2012/0297468 A1 | 11/2012 | Bharadwaj et al. |
| 2012/0317414 A1 | 12/2012 | Glover et al. |
| 2012/0317613 A1 | 12/2012 | Kim et al. |
| 2013/0007298 A1 | 1/2013 | Ramaswamy et al. |
| 2013/0013912 A1 | 1/2013 | Rung et al. |
| 2013/0031155 A1 | 1/2013 | Terrano et al. |
| 2013/0036302 A1 | 2/2013 | Lord et al. |
| 2013/0054514 A1 | 2/2013 | Barrett-Kahn |
| 2013/0054917 A1 | 2/2013 | Ludwig et al. |
| 2013/0060661 A1 | 3/2013 | Block et al. |
| 2013/0117218 A1 | 5/2013 | Fan et al. |
| 2013/0268677 A1* | 10/2013 | Marshall et al. ............ 709/226 |
| 2013/0311769 A1 | 11/2013 | Hayes |
| 2013/0318589 A1 | 11/2013 | Ford et al. |
| 2013/0332811 A1 | 12/2013 | Chang et al. |
| 2013/0346491 A1 | 12/2013 | Margolin et al. |
| 2014/0047560 A1 | 2/2014 | Meyer et al. |
| 2014/0143831 A1 | 5/2014 | Fieweger |
| 2014/0165148 A1* | 6/2014 | Dabbiere et al. ................ 726/4 |
| 2014/0165213 A1* | 6/2014 | Stuntebeck ................ 726/29 |
| 2014/0189483 A1 | 7/2014 | Awan et al. |
| 2014/0235179 A1 | 8/2014 | George et al. |
| 2014/0245015 A1 | 8/2014 | Velamoor et al. |
| 2014/0245381 A1* | 8/2014 | Stuntebeck et al. ............ 726/1 |
| 2014/0304836 A1 | 10/2014 | Velamoor et al. |
| 2015/0135300 A1 | 5/2015 | Ford |
| 2015/0163206 A1 | 6/2015 | McCarthy et al. |
| 2015/0222625 A1 | 8/2015 | Ford et al. |
| 2015/0254360 A1 | 9/2015 | Fieweger et al. |
| 2015/0310188 A1 | 10/2015 | Ford et al. |
| 2015/0358308 A1 | 12/2015 | Huang et al. |
| 2015/0381599 A1 | 12/2015 | Porzio et al. |
| 2016/0085978 A1 | 3/2016 | Meyer et al. |

FOREIGN PATENT DOCUMENTS

| | | |
|---|---|---|
| JP | 2007156800 A | 6/2007 |
| JP | 2011186849 A | 9/2011 |
| JP | 2012221274 A | 11/2012 |
| KR | 1020110031428 A | 3/2011 |
| KR | 1020120108942 A | 10/2012 |
| WO | 2007086015 A2 | 8/2007 |
| WO | 2009143286 A1 | 11/2009 |
| WO | 2009158531 A2 | 12/2009 |
| WO | 2011160855 A1 | 12/2011 |
| WO | 2012070935 A1 | 5/2012 |
| WO | 2012134682 A1 | 10/2012 |
| WO | 2013103959 A2 | 7/2013 |
| WO | 2013163625 A1 | 10/2013 |
| WO | 2014025809 A1 | 2/2014 |
| WO | 2014063030 A1 | 4/2014 |
| WO | 2014063030 A9 | 9/2014 |
| WO | 2014152025 A2 | 9/2014 |
| WO | 2014152025 A3 | 11/2014 |
| WO | 2015073708 A1 | 5/2015 |
| WO | 2015089171 A1 | 6/2015 |
| WO | 2015164521 A1 | 10/2015 |

OTHER PUBLICATIONS 13782582.4, "European Application Serial No. 13782582.4, European Search Report mailed Nov. 11, 2015", Intralinks, Inc., 9 Pages.

PCT/US2013/065646, "International Application Serial No. PCT/US2013/065646, International Preliminary Report on Patentability and Written Opinion mailed Apr. 30, 2015", Intralinks, Inc., 10 Pages.

PCT/US2014/026830, "International Application Serial No. PCT/US2014/026830, International Preliminary Report on Patentability and Written Opinion mailed Sep. 24, 2015", Intralinks, Inc., 14 Pages.

PCT/US2015/027131, "International Application Serial No. PCT/US2015/027131, International Search Report and Written Opinion mailed Sep. 1, 2015", Intralinks, Inc., 11 pages.

13827968.2, "European Application Serial No. 13827968.2, European Search Report mailed Mar. 18, 2016", Intralinks, Inc., 9 Pages.

13847778.1, "European Application Serial No. 13847778.1, European Search Report mailed Mar. 18, 2016", Intralinks, Inc., 9 Pages.

U.S. Appl. No. 14/975,728, filed Dec. 19, 2015.

"Cimage Content Lifecycle Management", available at: http://web.archive.org/web/20010205074400/www.cimage.com/products/e31index.html, retrieved on Sep. 23, 2001, 1 page.

"Doculogic Press Release", available at: www.archivesystems.com/pressroom/press_doculogic.asp, retrieved on Apr. 11, 2000, 2 pages.

"DocuTouch Features", available at: http://web.archive.org/web/20011218003617/www.docutouch.com/dt_productfeatures.html, retrieved on Dec. 17, 2001, 2 pages.

"FilesOnTheNet.com Product Specifications", available at: http://webarchive.org/web/20000914181459/www.filesonthenet.com/FOTNProdSoecs.PDF, retrieved on Sep. 14, 2000, 4 pages.

"Net Documents Overview", available at: http://web.archive.org/web/20010822083155/www.netdocuments.com/main.asp?l1 = 5&12=1&13=510, retrieved on Jul. 6, 2001, 1 page.

"Screen Shot of Page of Intralinks Web Site; www.intralinks.com", 1 page.

(56) References Cited

OTHER PUBLICATIONS

Backer, et al., "DocMan: A Document Management System for Cooperation Support", Proceedings of the Twenty-Ninth Hawaii International Conference on System Science, vol. 3, Jan. 3-6, 1996, pp. 82-91.

Barker, "How the Internet Will Revolutionize M&A", M&A Today, vol. 8, No. 9, Sep. 1999, 4 pages.

Braun, et al., "Virtual Private Network Architecture", Apr. 1999, pp. 1-31.

Chan, et al., "Customer Management and Control of Broadband VPN Services", Integrated Network Management, 1997, 14 pages.

Netscape Extranet Standards, "Overview of Extranet Standards: Extending the Networked Enterprise", http://web.archive.org/web/19990218194752/http://sitesearch.netscape.com/products/whitepaper/extranetstds.html, 1999, 5 pages.

PCT/US2013/038533, "International Application Serial No. PCT/US2013/038533, International Preliminary Report on Patentability With Written Opinion mailed Nov. 6, 2014", Intralinks, Inc., 19 Pages.

PCT/US2013/038533, "International Application Serial No. PCT/US2013/038533, International Search Report and Written Opinion mailed Aug. 23, 2013", Interest Intralinks, Inc., 23 pages.

PCT/US2013/053835, "International Application Serial No. PCT/US2013/053835, International Preliminary Report on Patentability With Written Opinion mailed Feb. 19, 2015", Intralinks, Inc, 10 Pages.

PCT/US2013/053835, "International Application Serial No. PCT/US2013/053835, International Search Report and Written Opinion mailed Nov. 27, 2013", Intralinks, Inc., 13 Pages.

PCT/US2013/065646, "International Application Serial No. PCT/US2013/065646, International Search Report and Written Opinion mailed Feb. 10, 2014", Intralinks, Inc., 14 Pages.

PCT/US2014/026830, "International Application Serial No. PCT/US2014/026830, International Search Report and Written Opinion mailed Sep. 17, 2014", Intralinks, Inc., 18 Pages.

PCT/US2014/065521, "International Application Serial No. PCT/US2014/065521, International Search Report and Written Opinion mailed Feb. 25, 2015", Intralinks, Inc., 17 Pages.

PCT/US2014/069519, "International Application Serial No. PCT/US2014/069519, International Search Report and Written Opinion mailed Feb. 24, 2015", Intralinks, Inc., 9 Pages.

\* cited by examiner

HRN 2013 - AGENCY ◆ PRIVATE | CHANGE
OPEN | AG
MATERIAL UPDATE - 04-04-2013 - CUSTOMER2SHORTNAME

VIEW DE... ☐ SEARCH

☑ VOTE DISTRIBUTION
ⓘ COMPLETE THE FORM BELOW, THEN CLICK THE SAVE BUTTON. A
SIGNATURE PAGE DOCUMENT WILL BE CREATED FOR YOU TO
DOWNLOAD

☑ ELECTION OPTIONS

NAME: ▽ FILTERED
INSTRUCTIONS FOR COMPLETING THE CONSENT FORM:
ELECTION OPTIONS INSTRUCTIONS FROM CONFIGURATION
[UPDATE]

STATUS:
INDICATE CONSENT ⓘ
[CONSENT ▽]

UPDATED ON

ABC
CURRENT COMMITMENT ⓘ
30,000,000 USD
◉ AGREE   ○ DISAGREE

ACTIONS ▽
ACTIONS ▽
ACTIONS ▽
ACTIONS ▽
ACTIONS ▽
ACTIONS ▽
ACTIONS ▽        CANCEL  [BACK] [NEXT]  [SAVE]

FIG. 4E

| HRN 2013 - AGENCY ▽ | ◆ PRIVATE | CHANGE | | | |
|---|---|---|---|---|---|
| OPEN | AGENT BG | DOCUMENTS | TASKS | USERS & GROUPS | | |
| VIEW DETAILS | EXPORT THIS VIEW | | SEARCH TASKS LIST | | ○ ▽ FILTERED | SEARCH |

NAME:
04-04
STATUS:

DUE DATE:
FROM: MM/DD/YYYY 🔲
TO: MM/DD/YYYY 🔲

ASSIGNED ON:
FROM: MM/DD/YYYY 🔲
TO: MM/DD/YYYY 🔲

[RESET] [UPDATE]

| ACTIONS | NAME | STATUS | DUE DATE | ASSIGNED ON | ASSIGNED BY | UPDATED ON |
|---|---|---|---|---|---|---|
| ACTIONS ▽ | MATERIAL UPDATE - 04-04-2... | ○ PENDING SUBMISSION | 4/18/13 5:00 PM | 4/4/13 7:09 PM | NAME, EMAIL, PHONE# | |
| ACTIONS ▽ | MATERIAL UPDATE - 04-04-2... | ○ COMPLETED | 4/18/13 5:00 PM | 4/4/13 7:04 PM | NAME, EMAIL, PHONE# | |
| ACTIONS ▽ | MATERIAL UPDATE - 04-04-2... | ○ COMPLETED | 4/18/13 5:00 PM | 4/4/13 9:32 AM | NAME, EMAIL, PHONE# | |
| ACTIONS ▽ | MATERIAL UPDATE - 04-04-2... | ○ COMPLETED | 4/18/13 5:00 PM | 4/4/13 9:32 AM | NAME, EMAIL, PHONE# | |

| HRN 2013 - AGENCY | ◆ PRIVATE | CHANGE | | | | |
|---|---|---|---|---|---|---|
| OPEN | AGENT BG ▽ | DOCUMENTS | TASKS | USERS & GROUPS | | | |

| EXPORT THIS VIEW | | | SEARCH TASKS LIST | | [ ] SEARCH |
|---|---|---|---|---|---|
| | | | | ○ ▽ FILTERED | |
| ACTIONS | NAME | STATUS | DUE DATE | ASSIGNED ON | ASSIGNED BY | UPDATED ON |
| ACTIONS ▽ | MATERIAL UPDATE - 04-04-2... | ○ COMPLETED | 4/18/13 5:00 PM | 4/4/13 7:09 PM | NAME, EMAIL, PHONE# | |
| ACTIONS ▽ | MATERIAL UPDATE - 04-04-2... | ○ COMPLETED | 4/18/13 5:00 PM | 4/4/13 7:04 PM | NAME, EMAIL, PHONE# | |
| ACTIONS ▽ | MATERIAL UPDATE - 04-04-2... | ○ COMPLETED | 4/18/13 5:00 PM | 4/4/13 9:32 AM | NAME, EMAIL, PHONE# | |
| ACTIONS ▽ | MATERIAL UPDATE - 04-04-2... | ○ COMPLETED | 4/18/13 5:00 PM | 4/4/13 9:32 AM | NAME, EMAIL, PHONE# | |

*FIG. 4H*

THERE ARE 2 USER TASKS:

1. TURN ON E-SIGNATURE FOR AN EXCHANGE
2. E-SIGN A DOCUMENT

TURN ON E-SIGNATURE FOR AN EXCHANGE

| COLLABIO EXCHANGE | | | |
|---|---|---|---|
| DETAILS | VIEWER SETTINGS | MOBILE | COLLABORATION SETTINGS |

USING ADOBE ACROBAT TO VIEW PROTECTED DOCUMENTS

TO VIEW SPECIFIC PROPERTIES THAT CAN BE USED IN ADOBE ACROBAT .....
☐ MS WORD
☐ MS POWERPOINT
☐ MS EXCEL

ENABLING E-SIGNATURE
☐ ENABLE E-SIGNATURE FOR THIS EXCHANGE. NOTE, E-SIGNATURE IS ONLY AVAILABLE FOR DOCUMENT VIEWED IN ILVIEWER THAT WERE CONVERTED FROM PDF FILES

THE ENABLE E-SIGNATURE FOR A DOCUMENT CHECKBOX IN VIEWER EXCHANGE SETTINGS TURNS ON E-SIGNATURE FOR THE EXCHANGE AND MAKES IT POSSIBLE TO HAVE E-SIGNATURE TO BE OFF IF NECESSARY

*FIG. 5A*

E-SIGN A DOCUMENT (1 OF 4)

1. THE TOOLBAR APPEARS WITH THE E-SIGNATURE ICON IF E-SIGNATURE HAS BEEN TURNED ON IN FILE PROPERTIES. OTHERWISE IT DOES NOT APPEAR NOTE THAT A SAVE BUTTON HAS ALSO BEEN ADDED. SAVE IS DISABLED UNTIL AT LEAST ONE E-SIGNATURE HAS BEEN APPLIED

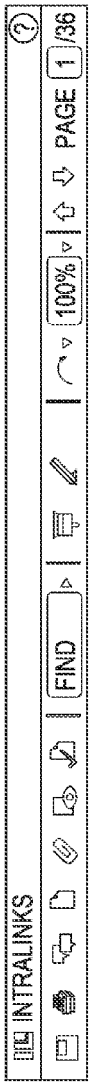

2. THE USER CLICKS THE E-SIGNATURE ICON. THE ICON GOES TO AN ON STATE AND THE BEGIN E-SIGNATURE POPUP APPEARS. USERS CAN CLICK THE ICON AGAIN TO TURN E-SIGNATURE OFF AND CANCEL THE CURRENT SIGNATURE PROCEDURE. NOTE: ROTATE AND ZOOM CONTROLS ARE DISABLED. THESE FUNCTIONS, WHEN ON, DO NOT ACCURATELY SHOW THE USER WHAT THE SIGNATURE WILL LOOK LIKE WHEN APPLIED

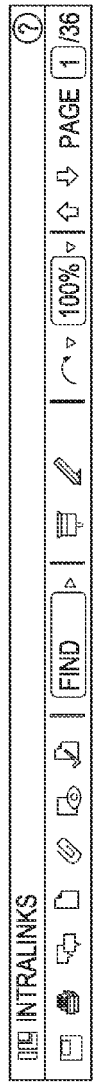

3. THE USER READS THE INSTRUCTIONS AND CLICKS OK

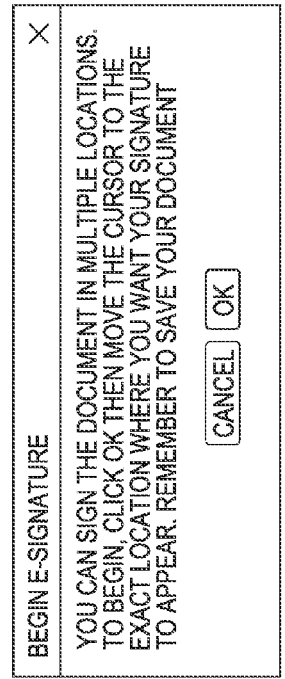

FIG. 5B

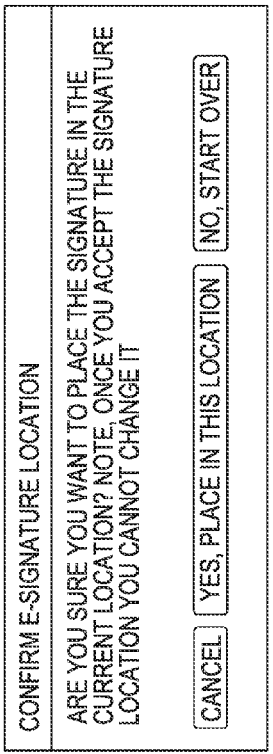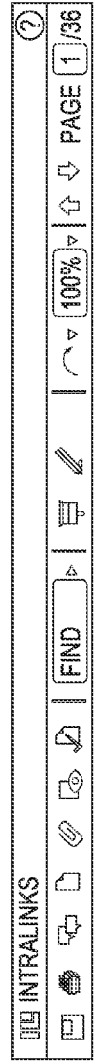
FIG. 5D

CANCELLING E-SIGNATURE

IF THE USER ATTEMPTS TO CANCEL E-SIGNATURE, THE FOLLOWING POPUP WILL APPEAR:

BY CLICKING THE E-SIGNATURE BUTTON AGAIN (WHEN IT IS IN AN "ON" STATE)

BY CLICKING ANY OF THE FOLLOWING TOOLBAR ICONS: PRINT, COMMENT, BOOKMARK, ACCESS REPORT, PROPERTIES. ROTATE AND ZOOM WILL BE DISABLED

AVAILABLE FUNDS

[ADD NEW FUND]

| COLUMN 1 | COLUMN 2 | COLUMN 3 | COLUMN 4 | COLUMN 5 | ACTIONS |
|---|---|---|---|---|---|
| IL FUND | TEXT | TEXT | TEXT | TEXT | EDIT DELETE |
| PROJECT B | TEXT | TEXT | TEXT | TEXT | EDIT DELETE |
| PROJECT C | TEXT | TEXT | TEXT | TEXT | EDIT DELETE |
| PROJECT D | TEXT | TEXT | TEXT | TEXT | EDIT DELETE |
| PROJECT E | TEXT | TEXT | TEXT | TEXT | EDIT DELETE |
| PROJECT F | TEXT | TEXT | TEXT | TEXT | EDIT DELETE |
| PROJECT G | TEXT | TEXT | TEXT | TEXT | EDIT DELETE |

FUND INFORMATION FOR IL FUND

[ADD FUND INFORMATION]

| COLUMN A | COLUMN B | COLUMN C | COLUMN D | COLUMN E | ACTIONS |
|---|---|---|---|---|---|
| TEXT | TEXT | TEXT | TEXT | TEXT | EDIT DELETE |
| TEXT | TEXT | TEXT | TEXT | TEXT | EDIT DELETE |
| TEXT | TEXT | TEXT | TEXT | TEXT | EDIT DELETE |
| TEXT | TEXT | TEXT | TEXT | TEXT | EDIT DELETE |
| TEXT | TEXT | TEXT | TEXT | TEXT | EDIT DELETE |
| TEXT | TEXT | TEXT | TEXT | TEXT | EDIT DELETE |
| TEXT | TEXT | TEXT | TEXT | TEXT | EDIT DELETE |

EDITING IL FUND - EDITED

YOU HA| DASHBOARD EDITS CANNOT BE SAVED

THE DASHBOARD CHANGES YOU HAVE MADE CANNOT BE SAVED BECAUSE YOU NO LONGER HAVE THE LATEST VERSION OF THE DATA.

IT IS LIKELY THAT NEW DATA WAS UPLOADED, OR ANOTHER USER EDITED THE SAME DATA, WHILE YOU WERE MAKING YOUR CHANGES

[REFRESH DASHBOARD DATA]

COLUMN 6
COLUMN 7
COLUMN 8
COLUMN 9
COLUMN 10
COLUMN 11
COLUMN 12

CANCEL [SAVE]

| ACTIONS |
|---|
| EDIT DELETE |
| EDIT DELETE |
| EDIT DELETE |
| EDIT DELETE |
| EDIT DELETE |
| EDIT DELETE |

| ACTIONS |
|---|
| EDIT DELETE |
| EDIT DELETE |
| EDIT DELETE |
| EDIT DELETE |
| EDIT DELETE |

TEXT  TEXT  TEXT  TEXT

FIG. 6F

CREATE A NEW FUND

ENTER THE REQUIRED INFORMATION FOR THIS NEW FUND AND SAVE IT

*REQUIRED

COLUMN 1
COLUMN 2  CHOOSE ITEM
COLUMN 3
COLUMN 4
COLUMN 5
COLUMN 6
COLUMN 7
COLUMN 8
COLUMN 9
COLUMN 10
COLUMN 11
COLUMN 12

CANCEL  SAVE

| ACTIONS |
|---|
| EDIT DELETE |
| EDIT DELETE |
| EDIT DELETE |
| EDIT DELETE |
| EDIT DELETE |
| EDIT DELETE |

| ACTIONS |
|---|
| EDIT DELETE |
| EDIT DELETE |
| EDIT DELETE |
| EDIT DELETE |
| EDIT DELETE |
| EDIT DELETE |

TEXT  TEXT  TEXT  TEXT  TEXT

| MANAGE PERMISSIONS | | | | | |
|---|---|---|---|---|---|
| COLUMN 1 | COLUMN 2 | COLUMN 3 | COLUMN 4 | COLUMN 5 | |
| IL FUND | TEXT | TEXT | TEXT | TEXT | |
| PROJECT B | TEXT | TEXT | TEXT | TEXT | |
| PROJECT C | TEXT | TEXT | TEXT | TEXT | |
| PROJECT D | TEXT | TEXT | TEXT | TEXT | |
| PROJECT E | TEXT | TEXT | TEXT | TEXT | |
| PROJECT F | TEXT | TEXT | TEXT | TEXT | |
| PROJECT G | TEXT | TEXT | TEXT | TEXT | |

USERS PERMISSIONED FOR IL FUND

PERMISSION NEW USER

| EMAIL ID | | ACTIONS |
|---|---|---|
| NAME | @INTRALINKS.COM | EDIT DELETE |
| NAME | NTRALINKS.COM | EDIT DELETE |

*FIG. 6I*

| MANAGE PERMISSIONS | | | | | |
|---|---|---|---|---|---|
| COLUMN 1 | COLUMN 2 | COLUMN 3 | COLUMN 4 | COLUMN 5 | |
| IL FUND | TEXT | TEXT | TEXT | TEXT | |
| PROJECT B | TEXT | TEXT | TEXT | TEXT | |
| PERMISSION A NEW USER TO IL FUND | | | | | |
| ENTER THE EMAIL ID OF THE USER TO WANT TO PERMISSION | | | | | |
| *REQUIRED | | | | | |
| EMAIL ID | NAME | ALINKS.COM | | | |
| | | CANCEL SAVE | | | |

| EMAIL ID | | | ACTIONS |
|---|---|---|---|
| NAME | | | EDIT DELETE |
| NAME | | | EDIT DELETE |

*FIG. 6J*

| MANAGE PERMISSIONS | | | | | |
|---|---|---|---|---|---|
| COLUMN 1 | COLUMN 2 | COLUMN 3 | COLUMN 4 | COLUMN 5 | |
| IL FUND | TEXT | TEXT | TEXT | TEXT | |
| PROJECT B | TEXT | TEXT | TEXT | TEXT | |
| EDIT PERMISSIONED USER TO IL FUND | | | | | |
| ENTER THE EMAIL ID OF THE USER TO WANT TO PERMISSION | | | | | |
| *REQUIRED | | | | | |
| EMAIL ID [NAME] [M] ◁THE EMAIL ID IS NOT FORMATTED CORRECTLY | | | | | |
| CANCEL [SAVE] | | | | | |
| EMAIL ID | | | | | ACTIONS |
| NAME | | | | | EDIT DELETE |
| NAME | | | | | EDIT DELETE |

INTRALINKS — DOCUMENT NAME GOES HERE.DOC

[1/34] %NATURE ▷◁ SPOTLIGHT ⓘ LEARN MORE

SEARCH RESULTS ⓘ

PAGE NO. 1
- LOREUM IPSUM — MORT...
- LOREUM IPSUM — MORT...
- LOREUM IPSUM — MORT...
- LOREUM IPSUM — MORT...

PAGE NO. 2
- LOREUM IPSUM — ZULLA...
- LOREUM IPSUM — CORN...

---

SOFTWARE CONFIGURATION MANAGEMENT: INTEGRATED ARC 1.2 DEPLOYMENT INSTRUCTIONS FOR EXTERNAL OPS

THIS PAGE LAST CHANGED ON SEP 24, 2008 BY EMILY

DEPLOYING INTEGRATED ARC PRODUCT

THESE INSTRUCTIONS ASSUME THAT AN INITIAL SETUP OF ALL SYSTEMS HAS BEEN DONE. EXTERNAL OPERATIONS IS RESPONSIBLE FOR ALL INITIAL CONFIGURATION SETTINGS. ANY NEW CONFIGURATION CHANGES WILL BE DOCUMENTED SEPARATELY IN THE RELEASE RECORD. ANY CONFIGURATION CHANGES SHOULD BE MADE PRIOR TO STARTING A SERVER

DEPLOYING INTEGRATED ARC

1. STOP LOCAL MANAGED SERVER
2. CLEAN CACHE AND TEMP DIRECTORIES
3. COPY THE FILE "FLEX-SERVER-WEB.WAC" TO HOME/WEBLOGIN/BEA/APPROOT/DOMAIN/INTRALINKS, OR ANY SUITABLE LOCATION FOR HOLDING THE APPLICATION
4. START LOCAL MANAGED SERVER

DEPLOYING WEB-BASED ARC

1. COPY THE SX_US_WEB.ZIP FILE TO A TEMPORARY DIRECTORY ON THE TARGET SERVER
2. UNZIP THE SX_US_WEB.ZIP FILE
3. COPY THE UNZIPPED CONTENTS FROM STEP 2 TO THE DIRECTORY TO WHICH YOUR WEB SERVER POINTS
4. COPY THE ARC_WEB.JAR FILE TO A TEMPORARY DIRECTORY ON THE TARGET SERVER
5. UNZIP THE ARC_WEB.JAR FILE
6. COPY THE UNZIPPED CONTENTS FROM STEP 6 TO THE 'INTRALINKS'

---

COMMENTS
1. SEARCH RESULTS AREA

VIEWER_USABILITY_WIREFRAME_3-20.GRAFFLE
VIEWER-WORD-SEARCH
PAGE 7 OF 9

FIG. 9A

UPLOAD FILE FORM: SINGLE TIER CUSTOM FIELD HIERARCHY

| CANCEL | INTRALINKS | UPLOAD |

SOMEFILENAME.PDF
PREVIEW THIS FILE

SELECT WHERE YOU WANT TO UPLOAD THE FILE TO

EXCHANGE    DEE CIX WS1

FOLDER    FOLDER 1/FOLDER APPLES/FOLDER
          MACINTOSH/FOLDER SEATTLE
          WASHINGTON

APPROPRIATE FOR    PRIVATE SIDE

AMOUNT
BUSINESS UNIT    REQUIRED
OWNER
EXPIRATION DATE
REGION
SITE
LANGUAGE
COUNTRY
DUE DATE

*FIG. 9K*

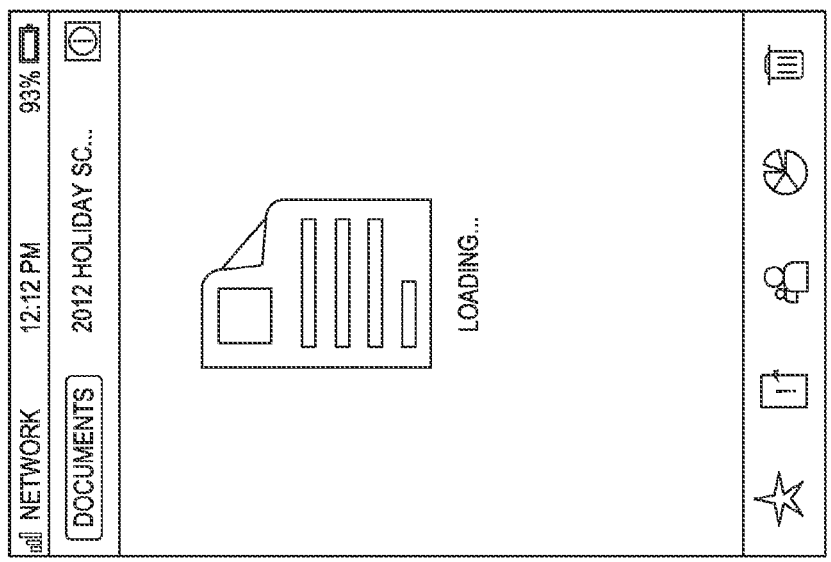

EMAIL EFFECTIVITY FACILITY IN A NETWORKED SECURE COLLABORATIVE EXCHANGE ENVIRONMENT

CROSS-REFERENCE TO RELATED APPLICATIONS

This application claims the benefit of the following provisional applications, each of which is hereby incorporated by reference in its entirety: U.S. Patent Application No. 61/783,868 filed Mar. 14, 2013, U.S. Patent Application No. 61/904,122 filed Nov. 14, 2013, U.S. Patent Application No. 61/914,682 filed Dec. 11, 2013, and U.S. Patent Application No. 61/944,756 filed Feb. 26, 2014.

This application is a continuation-in-part of the following non-provisional application, which is hereby incorporated by reference in its entirety: Ser. No. 14/057,541 filed Oct. 18, 2013, which claims the benefit of the following provisional applications, each of which is incorporated by reference in its entirety: U.S. Patent Application No. 61/715,989 filed Oct. 19, 2012; U.S. Patent Application No. 61/734,890 filed Dec. 7, 2012, and U.S. Patent Application No. 61/783, 868 filed Mar. 14, 2013.

The application Ser. No. 14/057,541 is a continuation-in-part of the following non-provisional application, which is hereby incorporated by reference in its entirety: Ser. No. 13/960,324 filed Aug. 6, 2013, which claims the benefit of the following provisional applications, each of which is incorporated by reference in its entirety: U.S. Patent Application No. 61/680,115 filed Aug. 6, 2012; U.S. Patent Application No. 61/702,587 filed Sep. 18, 2012; U.S. Patent Application No. 61/715,989 filed Oct. 19, 2012; U.S. Patent Application No. 61/734,890 filed Dec. 7, 2012, and U.S. Patent Application No. 61/783,868 filed Mar. 14, 2013.

The application Ser. No. 13/960,324 is a continuation-in-part of the following non-provisional application, which is hereby incorporated by reference in its entirety: Ser. No. 13/871,593 filed Apr. 26, 2013, which claims the benefit of the following provisional applications, each of which is incorporated by reference in its entirety: U.S. Patent Application No. 61/639,576 filed Apr. 27, 2012, U.S. Patent Application No. 61/680,115 filed Aug. 6, 2012; U.S. Patent Application No. 61/702,587 filed Sep. 18, 2012; U.S. Patent Application No. 61/715,989 filed Oct. 19, 2012; U.S. Patent Application No. 61/734,890 filed Dec. 7, 2012, and U.S. Patent Application No. 61/783,868 filed Mar. 14, 2013.

FIELD OF THE INVENTION

The present invention relates to networked secure content, and more particularly to networked secure content sharing, viewing, and collaboration on mobile devices.

BACKGROUND

Despite the availability of the Internet, there is still no entirely satisfactory way for people at different companies or other entities to have the benefits of private network security, such as for collaborative work between enterprises on a daily basis and for ad hoc alliances, i.e., different sets of entities coming together to function as one mega or meta entity, for the duration of some particular project. In such cases, the time and expense of actually wiring a network between two or more companies or other entities and agreeing on one common software package or standard presents a barrier to conventional network solutions. In addition, any new process for the sharing of content has in the past generally required the user to adopt new workflow components, applications, and habits that tend to be disruptive to the user's normal day-to-day workflow routine, e.g. when working internal to their enterprise and with personal use. Simply using the Internet remains imperfectly secure for the sharing of confidential information without some pre-arranged secure encryption processes has been cumbersome and unproductive, especially in today's increasing use of personal devices being incorporated into the workflow. There is a need for such systems and for users to utilize the systems in such a way that does not force them to adopt new infrastructure, software, and business and personal processes in their daily workflow in order to achieve a shared and potentially secure extended work environment.

Thus, there are still yet-unsolved problems associated with different groups of companies or other entities to sharing securely over an expanding global network environment.

SUMMARY

The present disclosure describes methods and systems contributing to secure collaborative facilities, including an offline file access facility, a spreadsheet viewer facility, a virtual container DRM facility, an email effectivity facility, and combinations thereof.

In embodiments, a method may be provided for secure offline computer content access, comprising at a server-based file access facility connected to a network and to a secure database, storing a data file as an encrypted data file along with a plurality of encryption keys in the secure database, each of the plurality of encryption keys providing access to the encrypted data file, the encrypted data file accessible as downloaded to a mobile computing device that is not connected to the network only through use of at least one of the plurality of encryption keys and presentation of a user secure identifier from a user of the mobile computing device, wherein the at least one of the plurality of encryption keys allows the user of the mobile computing device to access the encrypted data file a limited number of times; receiving, at the file access facility, a request from the user of a mobile computing device for offline access to the data file when the mobile computing device is disconnected from the network, the access request using the user secure identifier; authenticating, at the file access facility, the user's permission for offline access to the data file while the mobile computing device is disconnected from the network; and downloading, upon authentication, to the mobile computing device, the encrypted data file along with the at least one of the plurality of encryption keys while the mobile computing device is connected to the file access facility through the network. In embodiments, the encrypted data file stored on the mobile computing device may be assessed through the use of the at least one encryption key and the presentation of the user secure identifier by the user on the mobile computing device while the mobile computing device is disconnected from the network. The encrypted data file may be access-controlled through digital rights management. The file access facility may be connected to the secure database across the network. The secure database may be a cloud-computing storage facility. The mobile computing device may be a laptop computer, a tablet-computing device, a mobile phone enabled computing device, and the like. The secure identifier may be a password. Authenticating may be performed by utilizing the user secure identifier to check the user's permission profile for permission to access the data file offline. The permission profile may identify a number of offline accesses the user is permitted while disconnected from the network. The file access facility, upon authentication and identifying the number of offline accesses the user may be permitted when disconnected from the network, to download the encrypted file to the mobile computing facility along with at least one of a number of encryption keys equal to the number of accesses the user is permitted while disconnected from the network and an encryption key that can be used the number of times. A number N encryption keys may be downloaded to the mobile computing device, such as where one of the number N encryption keys enables one access to the encrypted data file, and after the one access, the one of the number N encryption keys cannot be used for a subsequent access to the encrypted data file. The limited number of times the user is allowed to access the encrypted data file with the at least one of the plurality of encryption keys may be limited to one time. The plurality of encryption keys may be only valid for a certain time period.

In embodiments, a method for rendering a spreadsheet document may be provided, comprising providing, on a server-based computing device, a spreadsheet viewer facility configured to render a spreadsheet document created by a spreadsheet application as an actively rendered spreadsheet document in a client spreadsheet viewer running on a client computing device without the use of the spreadsheet application running on the client computing device; rendering the spreadsheet document as an actively rendered spreadsheet document from the spreadsheet viewer facility to the client spreadsheet viewer; transmitting at least one keyboard and mouse action on the client computing device to the spreadsheet viewer facility, wherein the at least one keyboard and mouse action is associated with a selection of a cell in the actively rendered spreadsheet document subsequent to the rendering of the spreadsheet document; and transmitting a spreadsheet data content for the selection of the cell of the actively rendered spreadsheet document from the spreadsheet viewer facility to the client spreadsheet viewer. In embodiments, the spreadsheet document may be received at the client computing device from a second client computing device, where the second client computing device sends the spreadsheet document to the spreadsheet viewer facility for rendering. The spreadsheet document may be received at the server-based computing device for rendering to the client-computing device. The spreadsheet document may be disabled from being opened by the spreadsheet application running on the computing device. The spreadsheet viewer facility may provide permission for access to the spreadsheet document as an actively rendered spreadsheet document. The spreadsheet document may be disabled from being opened by the spreadsheet application of a software-as-a-service application. The spreadsheet viewer facility may provide permission for access to the spreadsheet document as an actively rendered spreadsheet document. The spreadsheet application may be run directly on the server-based computing device, run remotely as a software-as-a-service from a remote networked location, and the like. The spreadsheet data content may be numeric data from the cell, text data from the cell, a formula associated with the cell, and the like. The rendering of the spreadsheet document may transform a plurality of spreadsheet data comprising with the spreadsheet document into the actively rendered spreadsheet document. The transformation may be on a cell-by-cell basis, and dependencies among cells may be maintained in the transformation. The client spreadsheet viewer may be adapted to provide permission to copy the spreadsheet data content. The client spreadsheet viewer may be adapted to enable editing of the spreadsheet data content in the cell within the client spreadsheet viewer. The client spreadsheet viewer may be adapted to provide permission to take screen-shots of the actively rendered spreadsheet document. The client spreadsheet viewer may run through a browser running on the client computer device.

In embodiments, a method for securely sharing documents among users within separate business entities may comprise providing a virtual container control facility, on a computing device with an operating system, and at least one virtual container where commands from the operating system for saving, copying, and printing of computer files are restricted for users other than unrestricted users; storing by a first unrestricted user of a first business entity a computer file in the virtual container; granting access permission by the first unrestricted user to view and edit the computer file by a restricted user of a second business entity; and receiving editing of the computer file by the restricted user, the editing creating an edited computer file within the virtual container that is accessible by the unrestricted user. In embodiments, the first unrestricted user may save, copy, print, print screen, and the like, the edited computer file by the first unrestricted user, including any portion of the edited computer file. Access permission may be removed for the first unrestricted user to the computer file and the edited computer file. The data file may be encrypted with digital rights management protection. The virtual container may be a file location within a virtual machine configured to restrict the commands from the operating system. The virtual container may be a file location within a computer drive configured to restrict the commands from the operating system. Editing the computer file may be through a source application for the computer file, where the source application is permitted to edit the computer file. The granted access permission may be for a limited time period. The granted access permission may be for a limited number of accesses to the data file. The granted access permission may be based on a role of the restricted user within a transaction process involving the first and second business entities.

In embodiments, a method for securely sharing documents among users may comprise providing a virtual container control facility, on a computing device with an operating system, and at least one virtual container where commands from the operating system for saving, copying, and printing of computer files are restricted for users other than unrestricted users; storing by a first unrestricted user a computer file in the virtual container; granting access permission by the first unrestricted user to view and edit the computer file by a restricted user; and receiving editing of the computer file by the restricted user, the editing creating an edited computer file within the virtual container that is accessible by the unrestricted user. In embodiments, the first unrestricted user may save, copy, print, print screen, and the like, the edited computer file by the first unrestricted user, including any portion of the edited computer file. Access permission may be removed for the first unrestricted user to the computer file and the edited computer file. The data file may be encrypted with digital rights management protection. The virtual container may be a file location within a virtual machine configured to restrict the commands from the operating system. The virtual container may be a file location within a computer drive configured to restrict the commands from the operating system. Editing the computer file may be through a source application for the computer file, where the source application is permitted to edit the computer file. The granted access permission may be for a limited time period. The granted access permission may be for a limited number of accesses to the data file. The granted access permission may be based on a role of the restricted user within a transaction process.

In embodiments, a method for secure viewing of a document may comprising rendering, from a networked server-based computing device to a client computing device when the client computing device maintains an online connection to the networked server-based computing device, a document created by an application as an actively rendered document in a client document viewer running on the client computing device without the use of the application running on the client computing device; and upon a request from the client computing device for offline viewing of the document, storing, on the networked server-based computing device, the document as an encrypted document along with a plurality of limited-use encryption keys, each of the plurality of limited-use encryption keys providing access to the encrypted document a limited number of times, the encrypted document accessible as downloaded to the client computing device that is not connected to the network only through use of at least one of the plurality of encryption keys within the limited number of permitted uses, wherein when the encrypted document is downloaded to the client computing device, the encrypted document is stored in a virtual container where commands from an operating system of the client computing device for saving, copying, and printing of computer files are restricted. Further, a user of the client computing device may access the encrypted document stored in the virtual container through the use of the at least one of the plurality of encryption keys, while the client computing device is disconnected from the network.

In embodiments, a method for managing access to a secure exchange environment managed by an intermediate business entity through a user email identity may comprise establishing a secure exchange server hosted by an intermediate business entity, wherein communications and access to a collection of files established by a first business entity are managed for a second business entity; and establishing an email effectivity facility that allows a user of the first business entity to specify a condition for email-based access to at least one resource in the collection of files, wherein the condition expresses (a) an effective period for using an email providing access to the resource and (b) a condition of email access to the resource by a designated individual of the second business entity, wherein the access permission was assigned using a specific email address of the designated individual. In embodiments, multiple email addresses may be associated with the identity of the designated individual of the second business entity. The designated individual may be permitted access to the resource during the effective period of the email that provided access from any current email account that is associated with the identity of the designated individual. Separate access conditions may be managed for each of the multiple email addresses of the designated individual. The first and second business entities may validate the designated individual's permissions associated with the multiple email addresses. Permission to access information on the secure exchange server may be identified by an embedded link in an email from the user of the first business entity to an email address of the designated individual. The first business entity may provide updates to the access conditions as an association of the user of the second business entity with the first business entity changes. The effective period may be a period of employment, a stage of a transaction, and the like. The email effectivity facility may utilize a graphical user interface to manage the access conditions, such as where the graphical user interface indicates the status of the access conditions, where the graphical user interface is integrated into a third-party application as an application program interface (API), and the like. The effectivity condition may be a status of an email account of the second business entity, and the status of the email account is still monitored when the designated individual is no longer employed by the second business entity.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures:

FIGS. 4B-4H depict embodiments of the amendment voting facility user interface.

FIGS. 5A-5G depict embodiments of the e-signing process user interface.

FIGS. 6A-6K depict embodiments of the dashboard facility user interface.

FIGS. 7A-7M depict embodiments of the email-in facility user interface.

FIGS. 8A-8G depict embodiments of the viewer facility.

Figure 1:
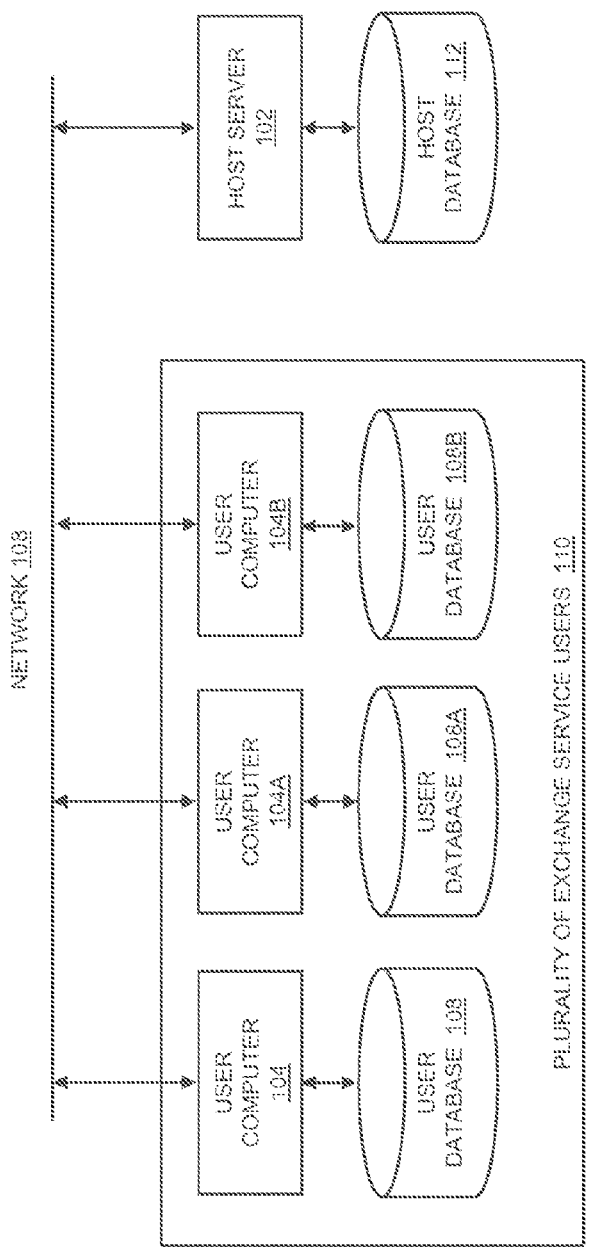
FIG. 1 depicts a top-level block diagram of the present invention.

While the invention has been described in connection with certain preferred embodiments, other embodiments would be understood by one of ordinary skill in the art and are encompassed herein.

All documents referenced herein are hereby incorporated by reference.

DETAILED DESCRIPTION

The present invention may be used for a secure exchange service (alternatively referred to as an 'exchange' or 'exchange service' throughout this disclosure) where many types of communications are required between different parties that are associating for a temporary transaction or project, but as competitors or for other reasons are not suitable for a permanent communication network (such as an intranet or enterprise network, such as a LAN or WAN) as might be used for a single government agency, single corporation, or other single enterprise or institution. Transaction projects involving financial transactions and projects involving complex legal agreements (such as mergers, acquisitions, and the like) are situations in the which the methods and systems described herein are particularly suitable; however, these are not necessarily the only sort of projects appropriate, as any project in which parties need to share confidential information across entities, outside the boundaries of the network of a single entity, may benefit from the methods and systems described herein.

In an example, transactions within the banking industry may provide a situation where a secure exchange service may be particularly applicable, where ad hoc syndicates are formed under the leadership of one or more lead banks to permit a number of agent or associate banks to participate in a major loan to a borrower. Such loans have become more common and may involve loans in excess of one billion dollars. Syndication of such large loans is used since any one bank is not prepared to lend such a large amount to a single customer. Conventionally, proposed terms of a loan are negotiated between the borrower and the lead banks, each in consultation with its advisors such as legal counsel, public-relations consultants, accountants and insurance carriers. In some instances, some advisors may be in-house advisors as employees of a given entity and thus constitute an internal team. However, the advisors in many instances may be independently associated with external entities such as law firms or major accounting firms and thus constitute either external teams or combinations of the above. The lead bank(s) negotiates with the borrower to arrive at terms and conditions for the loan, such as the interest rate, repayment schedule, security and the bank's fee for processing and syndicating the loan. The lead bank may agree to underwrite the entire loan in which case the lead bank uses syndication to create sub-loans between it and other banks to raise the funds for the loan. All of these transactions require management of voluminous amounts of documentation, most of which is confidential and whose disclosure could result in huge damages to the borrower or lenders. Thus, it would be desirable to provide an exchange as described here which enables secure document transmission between users over a global communication network without requiring the users to communicate in advance to establish an encryption method. In this example, the exchange service may provide a suitable level of security with respect to each of the shared transactions, among companies that commonly may be vigorous competitors, with numerous confidential documents that the companies do not want uncontrollably shared among other members of the loan-project group or accessible by outsiders generally. Substantially secure communications is particularly of the utmost concern to all parties to a syndicated loan transaction: the borrower, the lead bank, and the associate banks. A virtual network system provided through the exchange may readily provide substantial security to ensure that information and communications among all the various parties are secure.

In embodiments, the exchange may enable electronic transmission and reception of confidential documents over a global communication network such as the Internet for distributing electronic documents containing sensitive information or data to selected entities, for notifying intended recipients of the availability of such documents, for tracking access, downloading and uploading of such documents, and the like.

In embodiments, the exchange may only be accessed by authorized computers using an acceptable log-in procedure, including user name and password. Communications within the exchange may establish a communication session based upon a selected security protocol, and thereafter messages are transmitted between using such secure encryption. Communications may be exchanged via a secure encrypted communication session using a selected encryption protocol, and may deny access if a secure session cannot be established at a desired secure level.

In embodiments, the exchange may provide a fully provisioned, turnkey service for users, where once the user's enterprise has established an account through the exchange, documents in electronic form may be uploaded to the secure site maintained through the exchange host server, where a variety of secure collaborative communications options may be chosen including document storage, e-mail, video broadcasting, video conferencing, white boarding, and the like, to augment and manage interactive access to the documents, including a user graphical interface for managing user interactions with one or more exchanges.

In embodiments, the exchange may provide a secure site for placing documents and messages to be transmitted over a secure virtual network and allows authorized users to read or edit messages according to their level of authorization. Any documents that are edited may be immediately available on the system so that other persons involved in the exchange has access to the edited or modified documents immediately. In addition, the exchange may provide tracking of each document to allow selected users to see who has had access to the messages and documents and who has modified or edited any of the documents.

In embodiments, the exchange may provide a centralized firewall that may be employed to protect confidential information so that no unauthorized access to such information occurs. A firewall, such as may be effectively used for corporate intranets, may be applied in each exchange. Groups of users, such as on a virtual network, may be treated like a remote corporate office and restricted by firewall protocols from uncontrollable access to the information from other users. In addition, if needed, respective inter-user firewalls may be established to prevent one user from accessing information in the host site of another user. The exchange may be particularly suitable for communication among multiple unrelated groups of users, since a centralized firewall simplifies the logistics of each user having to separately provide access through their own respective local firewalls. In such a centralized architecture, the host server, as opposed to being processed at each respective user, may conveniently process server access security data. Similarly, system backup and recovery may be better handled by a centralized backup and recovery system, as opposed to such recovery tasks being separately handled at a multiplicity of local sites.

As depicted in FIG. 1, a plurality of exchange service users 110 of the exchange service may exchange data, such as documents, messages, data, and the like, between a secure host server 102 and a plurality of user computers 104, 104A, 104B across a network 108 (e.g. the Internet) in a secure manner such as only accessed by authorized user computers using an acceptable log-in procedure. In embodiments, the user computers may interface with the network through a network server, a mail server, and the like, and in association with an enterprise intranet, where a firewall is present between the user computer and the network, and where the exchange is conducted between the user computers and the host computer through a secure exchange across the network and through the network server, mail server, and the like. In another embodiment, the user computers may interact in the exchange with the host server across the network while away from or in the absence of the enterprise intranet and enterprise firewall. For instance, the user may be able to access the exchange while at home, such as using a mobile enterprise computer, a personally owned computer, a mobile device, and the like.

In embodiments, the exchange host server 102 may be distributed over a plurality of server computers, and therefore host server 102 should be viewed as an illustrative example of one of such multiple servers. In this way, the server computers may work together to provide essentially seamless access to a large number of users on various platforms with varying communications speeds. The server computers may run under server management software which in turn may be responsible for coordination of services, maintaining state and system status, monitoring, security, and other administrative functions. In embodiments, a user computer having a suitable Web browser may directly access the host server, where the exchange may not need to provide each user with subscriber application software, such as including software modules for access, activation, viewing, communications, and the like, relative to the exchange service.

In embodiments, whenever an exchange of data is initiated, such as by a document being received at the host server 102 connected to a host database 112, the host server may extract the address of the intended recipient and create a notification to the recipient(s) of the existence of the data at the host server. The notification may contain the URL for the host server. However, the recipient may not be able to access the message unless the recipient is authorized to use the system, such as the recipient needing to be a registered user and have an assigned password to access the data, or other repository at the host server where data is stored, such as on a user database 108, 108A, or 108B. If the intended recipient is granted access to the host server, the recipient may then locate the message intended for them by browsing through all messages to which the recipient has been granted access.

While the notification sent to the intended recipient may be sent using standard Internet protocol without encryption, once the user computer contacts the host server, the server may establish a secure encrypted communication session using a selected encryption protocol. The host server may deny access if a secure session cannot be established at a desired secure level, such as 128-bit encryption.

In embodiments, exchange services for different users may utilize separate software structured server databases 108, 108A, 108B. For example, company 'A' and company 'B' may use the same secure host server 102, but each company's data may be maintained in separate databases 108A and 108B, although perhaps in the same physical data storage facility. This feature offers the advantage of allowing the host server to be customized for each company. For example, when the external user accesses the host server, the host server may recognize the user and associate the user with a particular one of the companies A and B. Using this recognition, the host server may present a customized browser interface which makes the host server look like the selected company. To the external user, it may appear that they have been connected directly to the company server rather than the host server. Thus, the present invention may allow a user to securely send data such that the network connection is substantially transparent to the user. Further, the system may provide customization of the remote host server for each of a plurality of different users such that an external user accessing the remote server may appear to be connected to an internal client server.

Figure 2:
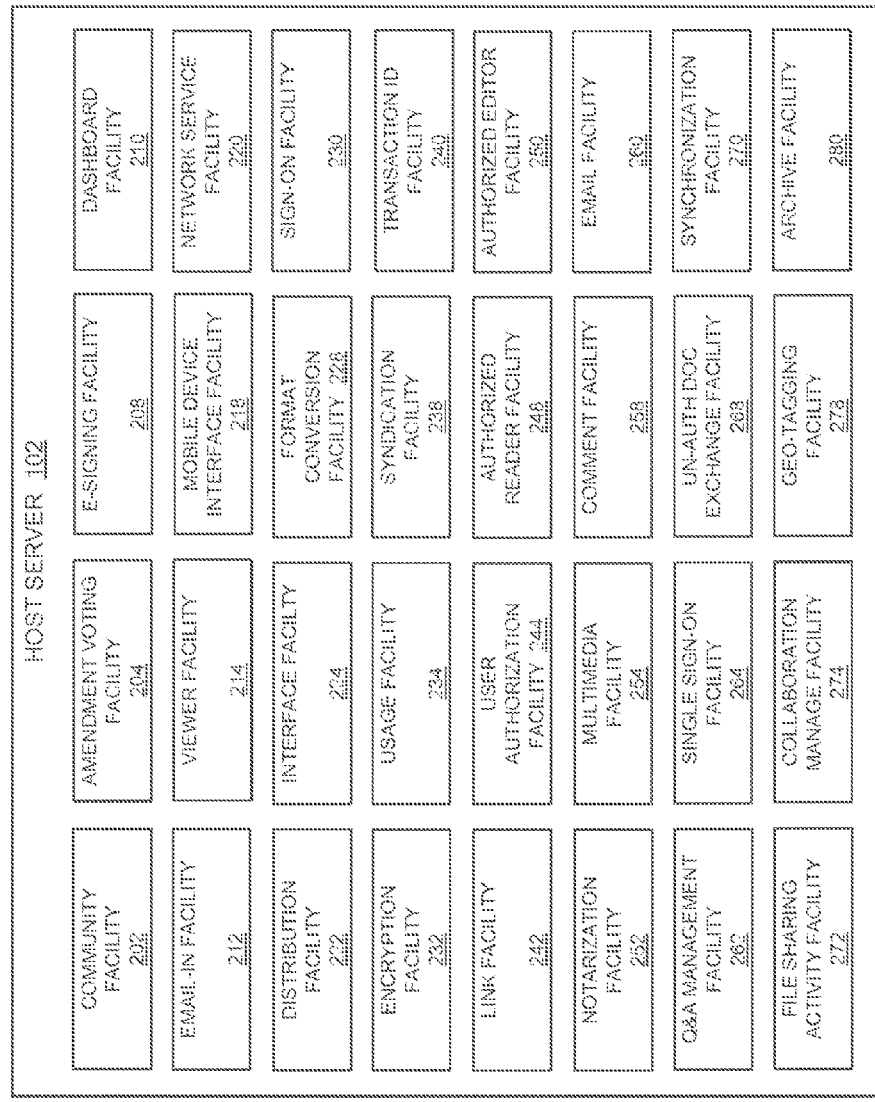
FIG. 2 depicts functions of a host in an embodiment of the present invention.
Figure 2A:
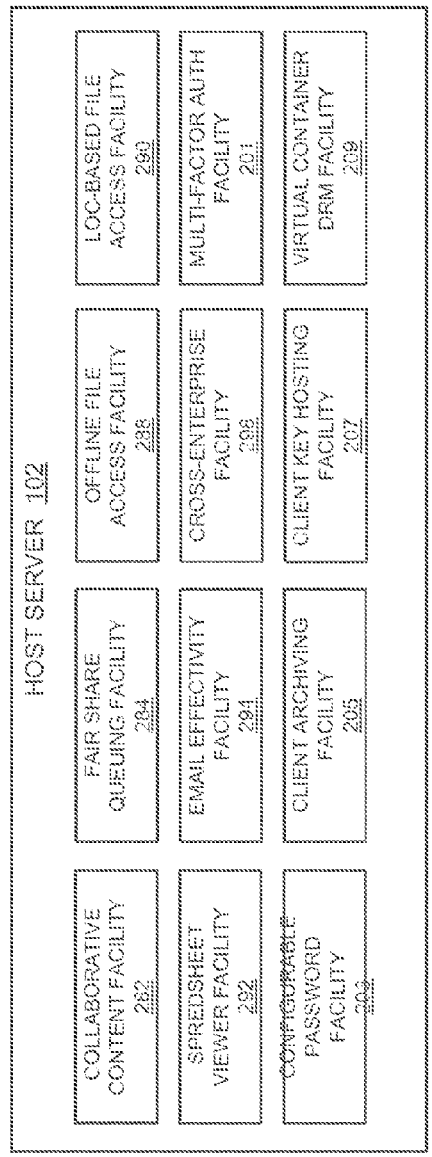
FIG. 2A depicts additional functions of a host in an embodiment of the present invention.

FIGS. 2 and 2A shows further details in connection with the server software that may be readily incorporated in the host server 102, including a community facility 202, amendment voting facility 204, e-signing facility 208, dashboard facility 210, email-in facility 212, viewer facility 214, mobile device interface facility 218, network service facility 220, distribution facility 222, interface facility 224, format conversion facility 228, sign-on facility 230, encryption facility 232, usage facility 234, syndication facility 238, transaction identification facility 240, link facility 242, user authorization facility 244, authorized reader facility 248, authorized editor facility 250, notarization facility 252, multimedia facility 254, comment facility 258, email facility 260, question and answer management facility 262, single sign-on facility 264, un-authorized document exchange facility 268, synchronization facility 270, file sharing activity facility 272, collaboration management facility 274, geo-tagging facility 278, archive facility 280, collaborative content facility 282, fair share queuing facility 284, offline file access facility 288, location-based file access facility 290, spreadsheet viewer facility 292, email effectivity facility 294, cross-enterprise facility 298, multi-factor authentication facility 201, configurable password facility 203, client archiving facility 205, client key hosting facility 207, and a virtual container DRM facility 209.

For example, the distribution facility 222 may allow the host server to electronically distribute data using secure communications among the plurality of users. The usage facility 234 may allow the host server to monitor the usage of the network to permit the users to be billed for the network service. The host server may be set up to manage a plurality of separate virtual networks concurrently, with each such virtual network representing a different client, such as company A and company B. Further, a community facility 202 may provide for users of different companies to be exposed to one other even if the different companies have not had any previous contacts (e.g. through a shared exchange), and a dashboard facility 210 may provide companies to manage exchanges, documents, contacts, communications, preferences, and the like.

The host server may offer a high level of security for all data by employing substantially secure network connections, and by means of security and encryption technologies developed for networks such as may be readily incorporated in the encryption facility 232. Additionally, the host server may provide highly secure access control by way of the user authorization facility 244 that may allow only authorized personnel to access individual messages and related documents and communications. The viewer facility 214 may be able to protect documents from unauthorized viewing, printing, saving, and the like, and a mobile device interface facility 218 may enable secure viewing on a mobile device, such as a personal tablet being used away from an enterprise network. The Email-in facility 212 may provide for the ability to add content to an exchange using regular email, such as that is sent to a designated secure email address.

The host server may give each user the ability to electronically link or be interconnected via a link facility 242 with any number of other users. Although data may be preferably formatted in a particular form, such as may be readily implemented with a commercially available document exchange program, other formats could be optionally accommodated using a suitable format conversion facility 228. The multimedia facility 254 may also be used to process data into a format suitable for presentation to the user in forms other than text, such as audio, still or moving images, and the like.

The virtual-network viewer may also include a multimedia viewer facility configured to, for example, provide: viewing of interactive multimedia or mixed media memoranda through suitable decoders, such as audio decoders, Joint Photographic Experts Group (JPEG) still image decoders, and Moving Pictures Experts Group (MPEG) moving image decoders. The virtual-network viewer may also support various collaborative communications options such as e-mail, video conferencing and white boarding which are enabled for a given transaction pursuant to instructions from the appropriate user. Of course, the range of multimedia capability and the collaborative communications options may vary depending on the various groupware facilities available to the user.

The notarization facility 252 may be provided to electronically certify any electronic data forwarded to users, such as incorporating electronic signature technology, and the like. The network service facility 220 may conveniently be used to display various data in connection with the network service such as additional services that may be available by the network service to the users. The above facilities may work jointly with the email facility 260, the interface facility 224, and the like, to send notices of data for exchange and interface with to securely pass data.

A virtual-network viewer or browser may conveniently provide the end user with an easy-to-use graphical interface to data and other particularly confidential information on the network service's virtual-network service. The virtual-network service may provide identification of services available over the virtual network as well as a variety of options for accessing and retrieving data. The virtual-network viewer may include the transaction identification facility 240 that, for example, may enable a user to quickly find and access information. The virtual-network viewer may automatically provide a suitable connection to the user to the virtual-network service through the sign-on facility 230. The viewer may also prompt the user to input one or more passwords or identifications which should be recognized by either the authorized editor facility 250 or the authorized reader facility 248 in order to access information on a database.

For the convenience of the users, some data offered through the virtual-network service may be designed as interactive multimedia documents that will include video, graphics, audio, and other multimedia elements. Multimedia communications may provide the user with a wide variety of information in addition to that provided by more standard text data.

By way of an example, a syndication desk, i.e., one or more individuals authorized to be responsible for the management of a syndicated transaction, of a lead user may be able to broadcast and/or selectively send e-mail messages processed by the syndication facility 238 to associate users and vice-versa. For example, amendment data processed by the amendment voting facility 204 may be used to vote on changes to a transaction document amongst authorized users. The amended document may be conveniently distributed via email using the e-mail facility 260 for providing associate users with up-to-the-minute information about the transaction. Amendments or messages may be appended to the document at the host site of the network service where they may be ordinarily viewed by accessing the virtual-network service that is authorized to access the document. E-mail messages or amendments may also be downloaded for printing or for attachment to local documents. Similarly, comment data in connection with a transaction may be processed through the comment facility 258 for appropriate distribution to authorized users. Transaction documents may also be signed by authorized users through the e-signing facility 208.

Figure 3:
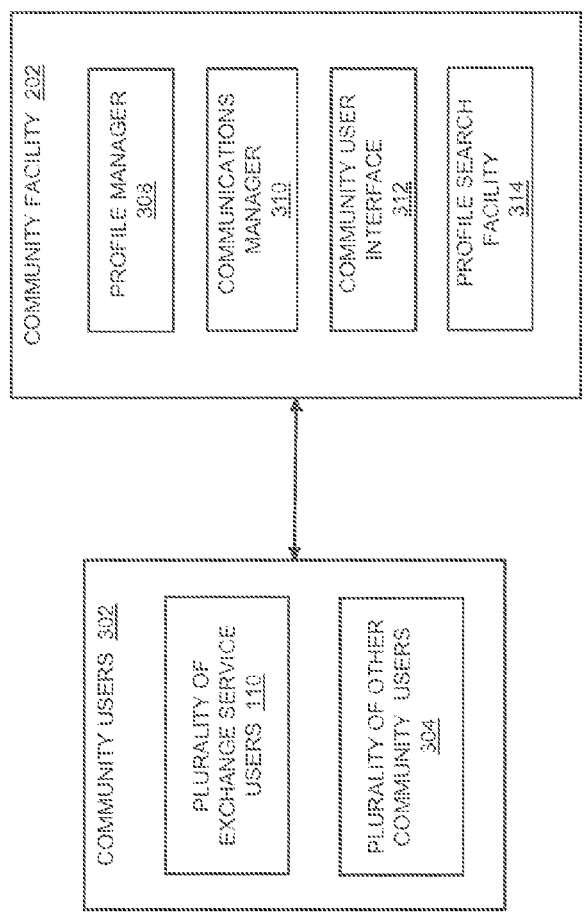
FIG. 3 depicts a functional block diagram for the community facility in an embodiment of the present invention.

Referring to FIG. 3, the community facility 202 may provide community, social, and the like facilities, as part of the system, such as to be able to expand a user's contacts list through exposure to other users who use or are otherwise associated with the facilities and more generally to make it easier for users to find and connect with other users who may have mutual interests. The community facility 202 may allow community users 302, such as the plurality of exchange service users 110 and plurality of other community users 304, to find one another using industry-specific profiles, such as provided by a profile manager 308, to find other community users, invite users to communicate by sending invitations through a communications manager 310, see status of invitation that have been sent or received, and the like. Through a community user interface 312 and associated profile manager 308, communications manager 310, and profile search facility 314, the community facility 202 may provide the user with a larger visibility to the plurality of users in the system, allow them to declare how they want to be viewed, control whether they want to be viewed, determine whether they can participate or not, enable them to be anonymous (e.g. profile only), allow them to be fully visible to other users, allow them to be available to users within just a particular industry, and the like. If a user is in a particular industry, they may be able to view a basic description of that community, as well as to other industries that the user determines to be beneficial. The system may be provided a profile window in the community user interface 312 that is set up based on industry or technical specifications, such as for private equity, M&A, finance, legal, and the like. There may be a variety of different types of user profiles available, such as, in connection with transactions, a buyer side, an investor side, an advisor side, an expert side, a seller side, and the like. The community user interface 312 may provide a user set up through a step-through process wizard, where the user selects industries, subsets of industries, and the like. Users may be as specific or as general as they wish, and position themselves in the community as seeking opportunities, presenting opportunities, presenting themselves as an expert to be called on to facilitate, and the like. The system may provide for location information, specify a deal type, specify a deal size, and the like, to help people who are searching for these profiles. The user may be able to upload attachments, examples, and the like. A visibility setting may be provided, such as available to community members, where the user is optionally able to remain anonymous. If the user chooses to not be anonymous then they may be visible to users immediately, but still protected in the system. In an example, a user may be a "buyer" and an "advisor", where they can see their own profile or sub-profile, edit the sub-profile, add another profile, and the like.

In embodiments, the community facility 202 may provide for search capabilities through the profile search facility 314, such as starting a new search, saving searches, saving the history of a search, and the like, to begin interacting with the profiles of users. The searcher may be able to search by a particular industry, investors, deal size, deal type, geography, type of profile and the like. The user may begin a search and generate results including the sub-profiles in the system that matched the search criteria. In addition, there may be a variety of visibility levels associated with the searches. For example, a search may return three matches but where one match is a user that is an anonymous user. In this instance, information may be withheld as to specifics, but with the ability to see more general profile attributes, such as a user's title. There may also be search indicators associated with previous searches, matches, contacts, and the like, such as with an icon to indicate past communication, and the like. In embodiments, the user may use a filter set to find a group the user wants to multi-select, grab, and move into another list.

Another feature of the community facility may be an 'activity index', or similar measure, such as for judging how active a user is on the system. For instance, a user performing M&A activities on the system may provide a qualified view indicating whether they are a current M&A buyer or not, such as showing how active they are. The system may also find information that indicates activity from other sources, and import that information to the system, thus providing a fuller indication of the user's activity level within the system, such as how many deals they might be working on.

Another feature of the community facility may enable a user to entice other users who are anonymous to be visible in order to initiate an interaction with them. For instance, a user may contact an anonymous user and add them to an exchange after the invitation to connect has been accepted. The user may 'click on' an anonymous user and send an invitation to them. In this instance, the sending user may become more visible to the anonymous user who is being invited. A subject line and a note regarding why the user is interested in contact them may be provided. An 'invitations list' may show what invitations have been sent, and the system may provide for a historical thread for the user's activity.

In embodiments, the system may keep a user's information anonymous until the user accepts an invitation from the inviting user, but where the anonymous user can still interact with the inviting user while still staying anonymous. The system may therefore provide a robust interaction facility at the profile level (email, etc.) without requiring actual acceptance of the invitation, and enable a continued dialog without revealing who they were (e.g., to get additional information, clarification, etc.). As the interaction goes back and forth, the goal may be to wind up in an acceptance state, but the system may also provide a means of blocking communications, such as after the user 'accepts' or 'declines'. The system may support an interaction until the user provides an acceptance, at which time the user's contact information may become visible, be provided a download of profile information, include the user in a contacts list, be recommended to an exchange, and the like. Once the user accepts, both parties may become visible to one another, including providing a history of the interaction.

Figure 3A:
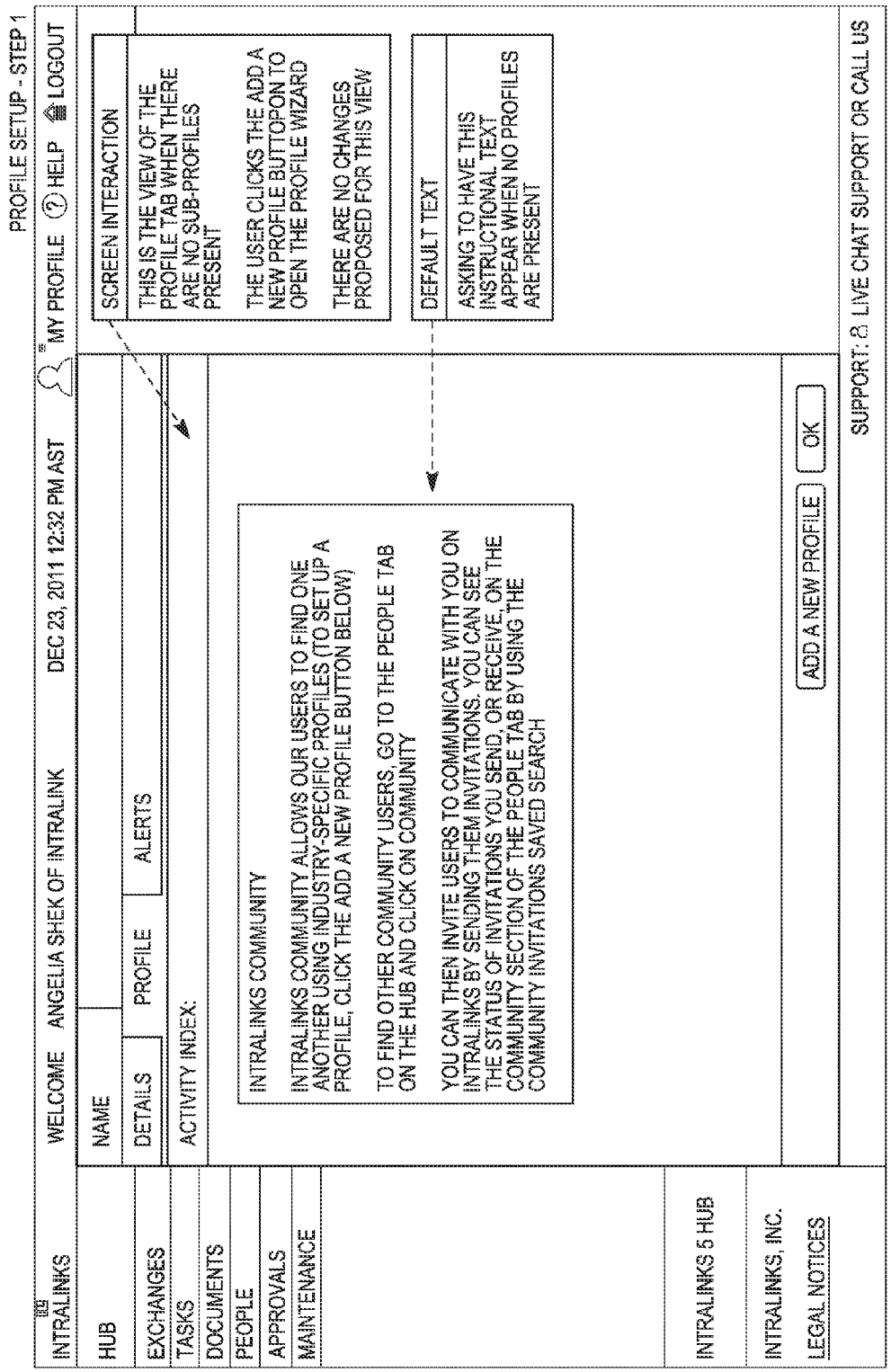
FIGS. 3A-3R depict embodiments of the community facility user interface.
Figure 3B:
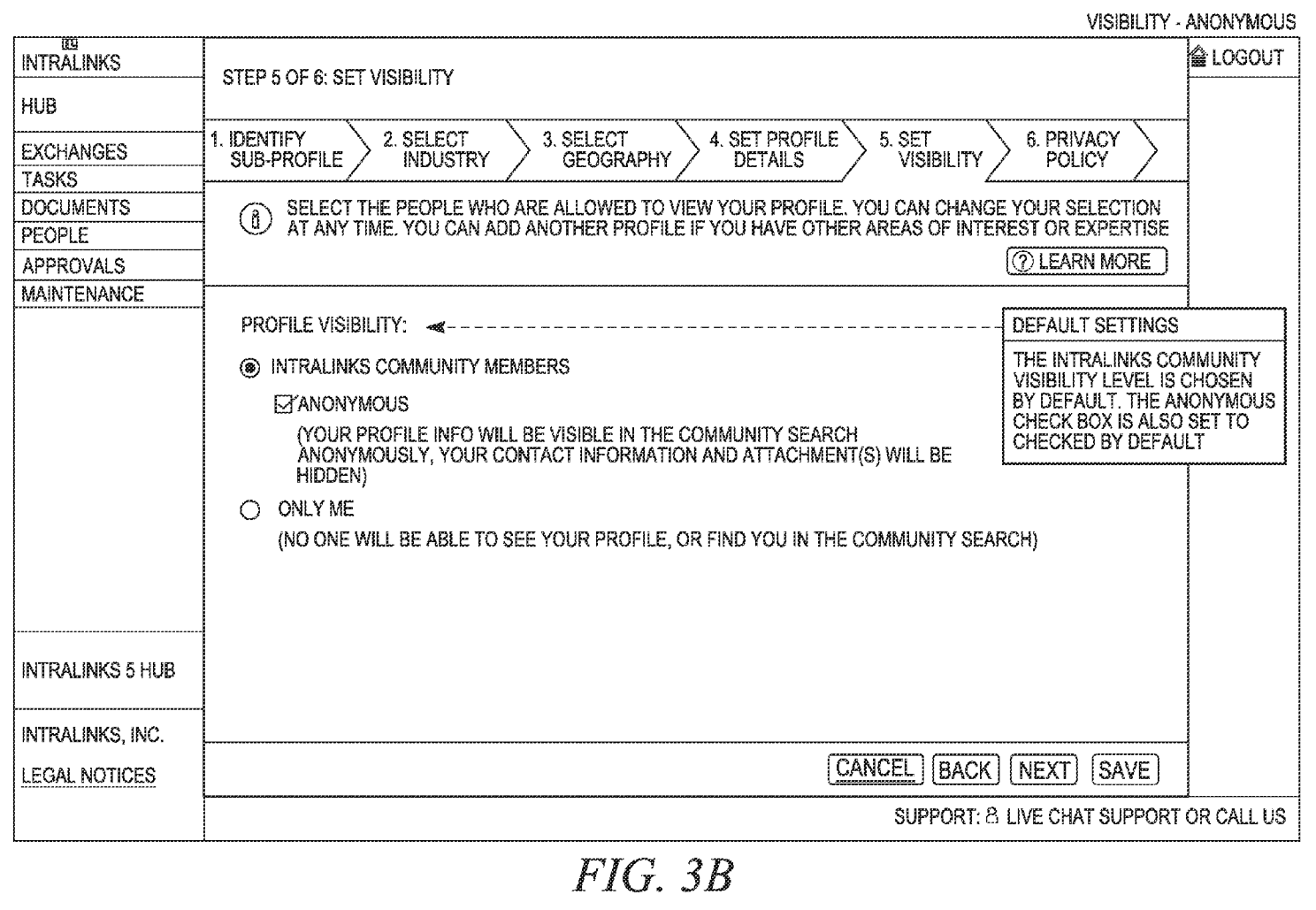
Figure 3C:
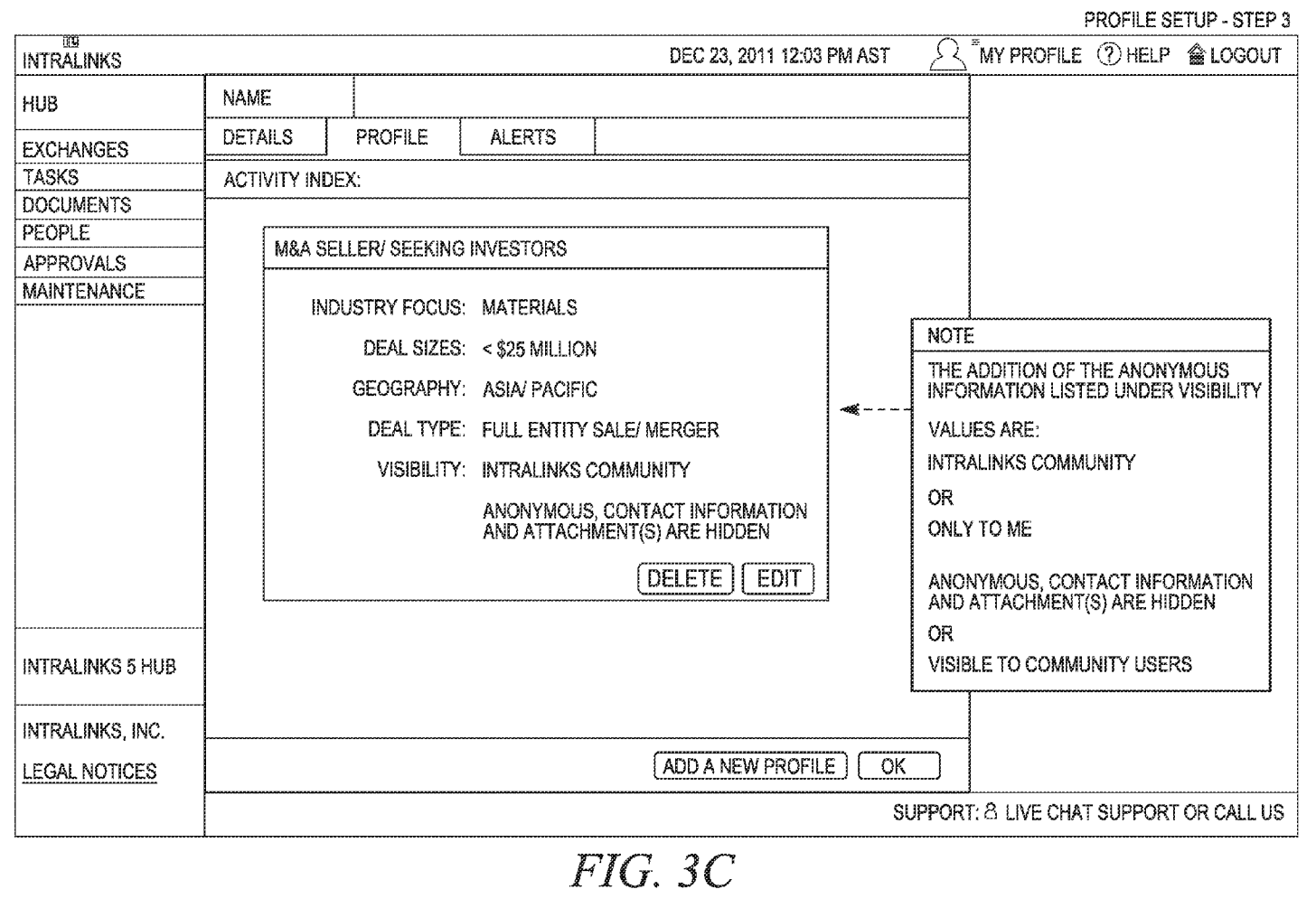

Referring to FIG. 3A, the community facility may provide a user interface for user interaction with the community facility, such as a with a profile tab for a user. In embodiments, a new profile may be added through the user interface. Referring to FIG. 3B, the user interface may provide for identification of a sub-file, selection of an industry, selection of a geography, setting profile details, setting visibility, adjusting a privacy policy, and the like. In embodiments, a view for setting visibility may be provided, where the user may specify visibility to community members, such as being visible to community members, visible but anonymous to community members (e.g. contact information and attachment(s) are hidden), visible only the user, and the like. Referring to FIG. 3C, an example profile is provided for an M&A seller seeking investors, the profile including an industry focus (materials), deal sizes (<$25 Million), geography (Asia/Pacific), deal type (full entity sale/merger), visibility (anonymous), and the like.

Figure 3D:
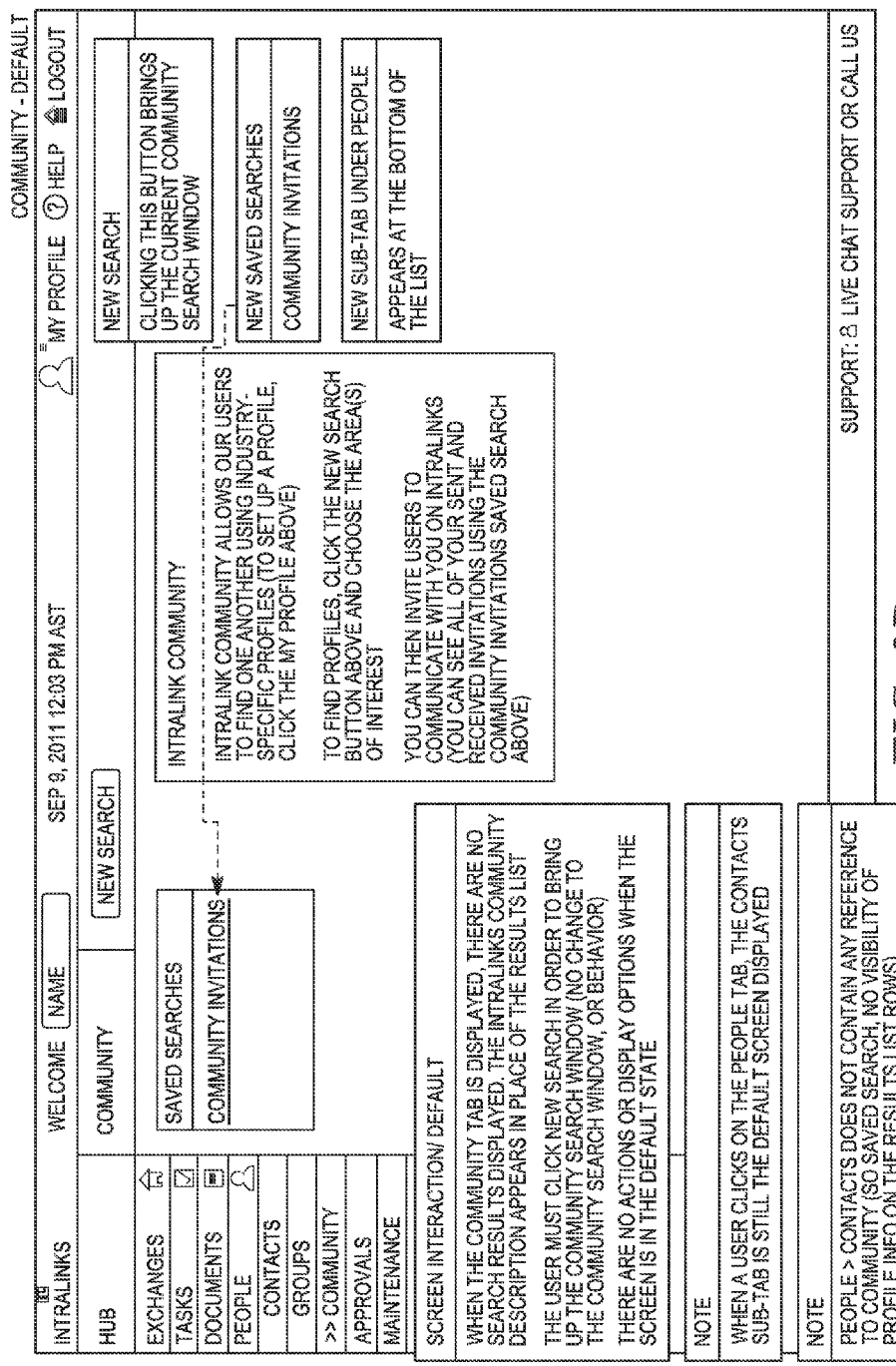
Figure 3E:
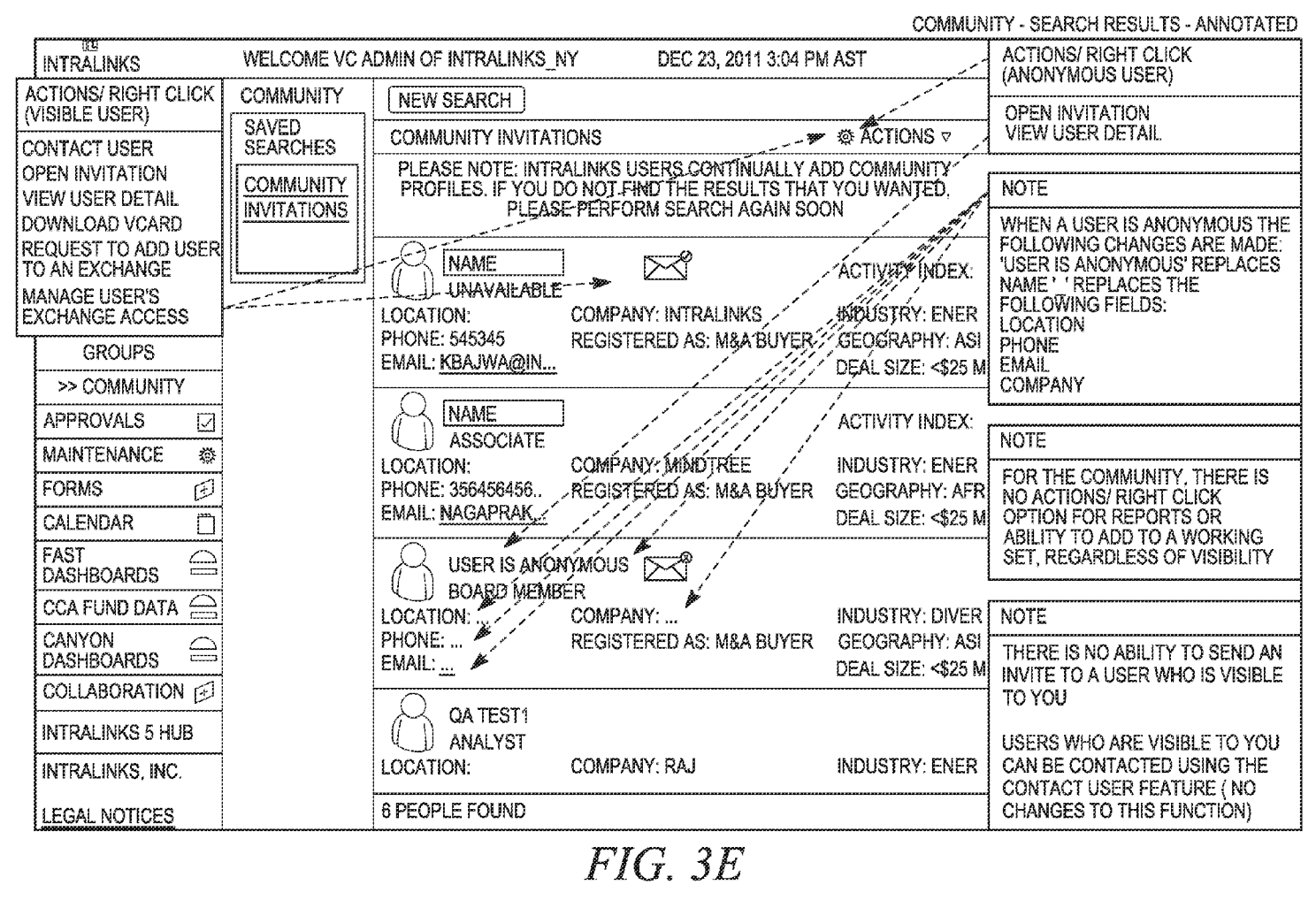

The community facility user interface may provide for a plurality of tabs, such as a hub, exchanges, tasks, documents, people, approvals, maintenance, forms, calendar, dashboards, fund data, collaboration, and the like. Referring to FIG. 3D, a people tab may include contacts, groups, community, and the like, and a community tab may show community invitations. When the community tab is displayed, there may be search results displayed, no search results displayed, a button for starting a new search, and the like. FIG. 3E shows an example search result, including two visible users, an anonymous user, and the like.

Figure 3F:
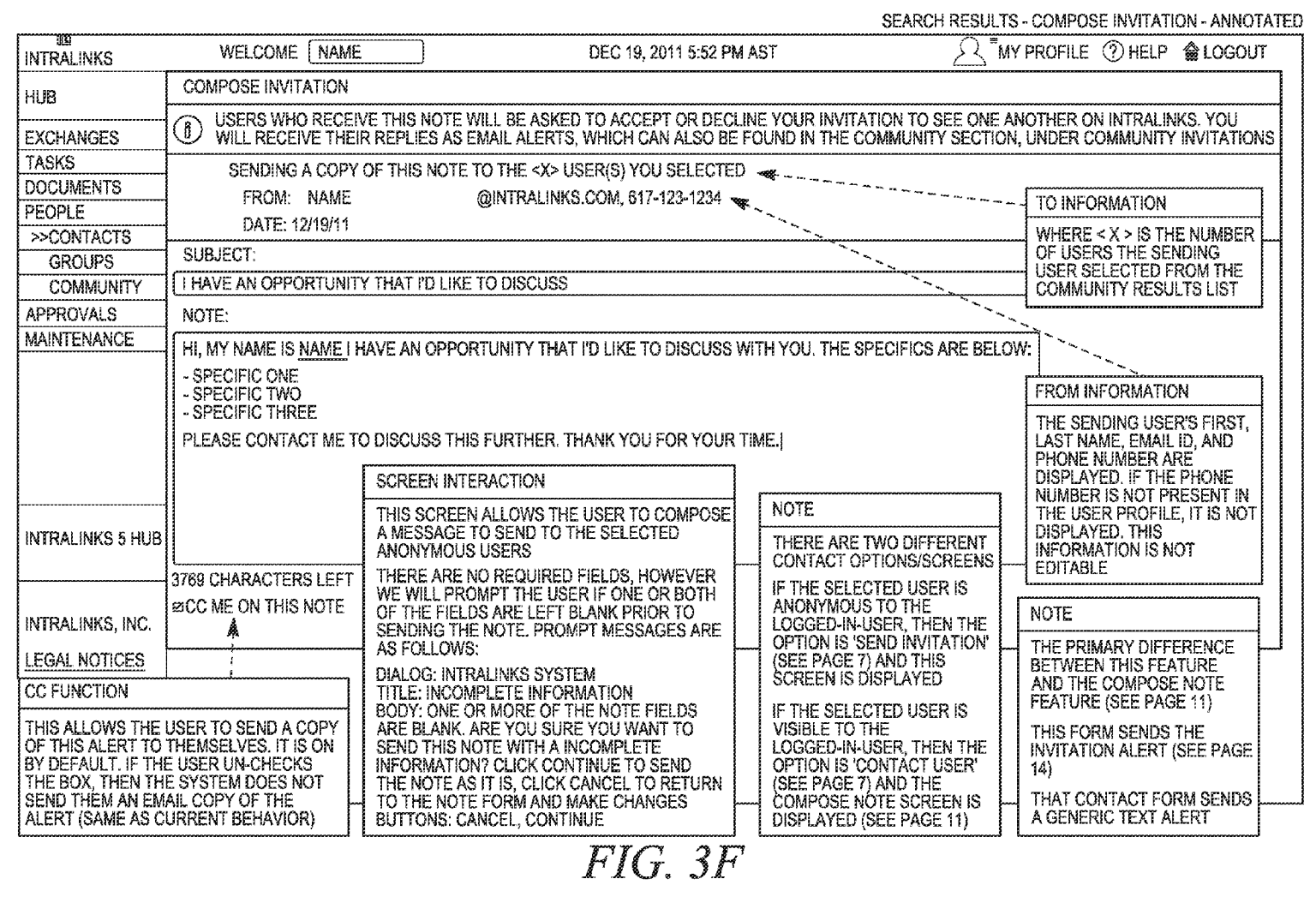
Figure 3G:
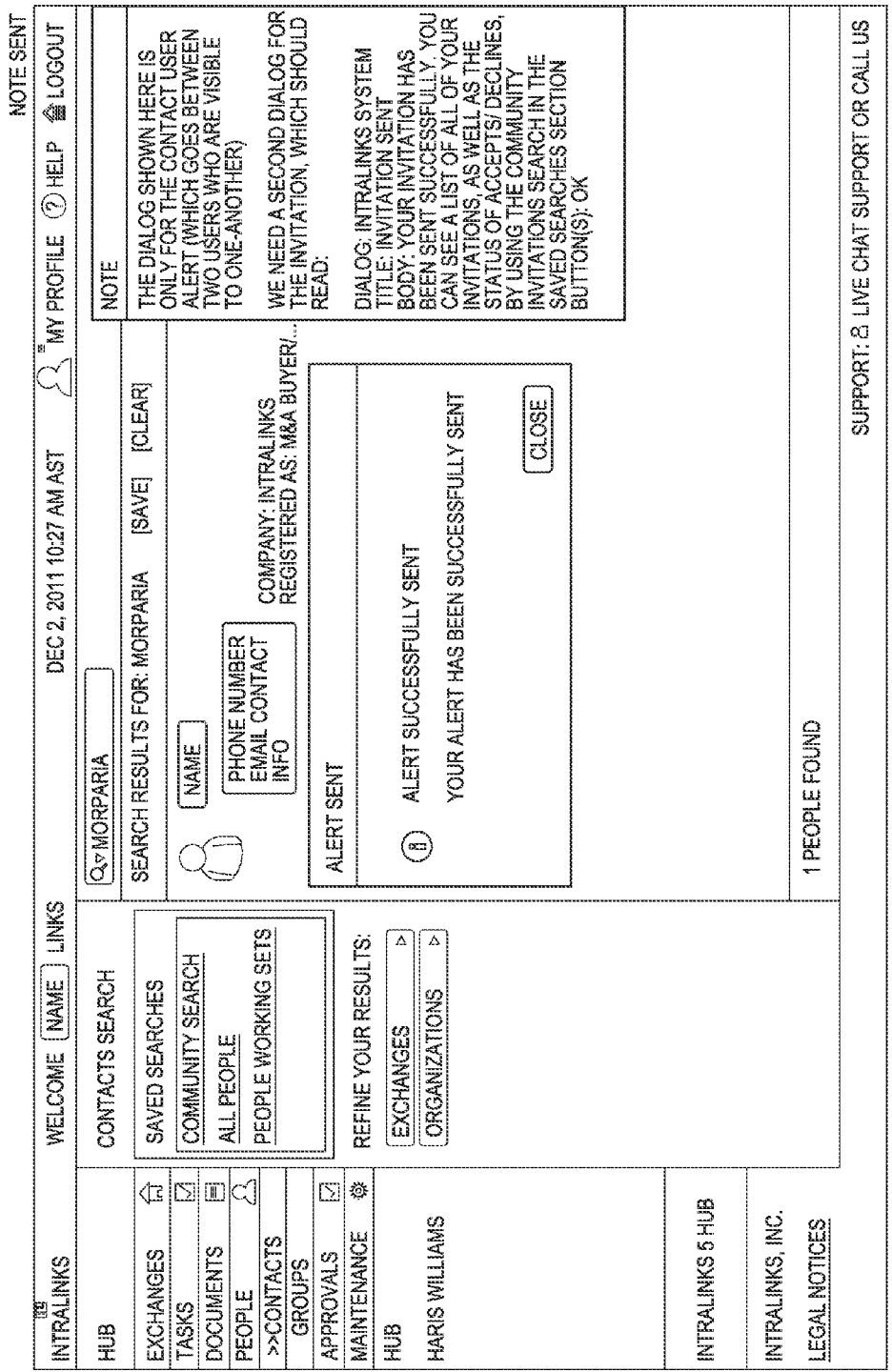
Figure 3H:
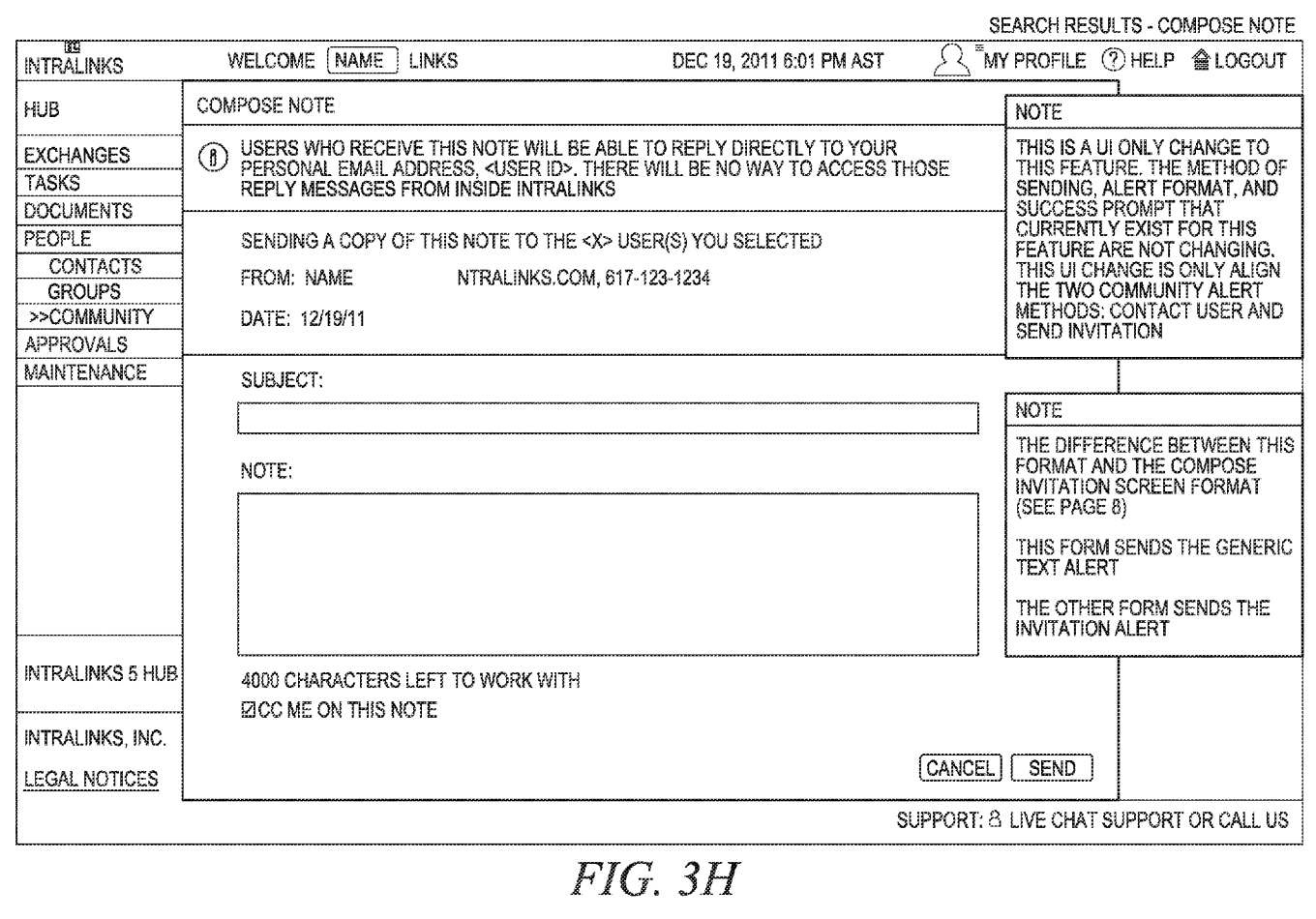
Figure 3J:
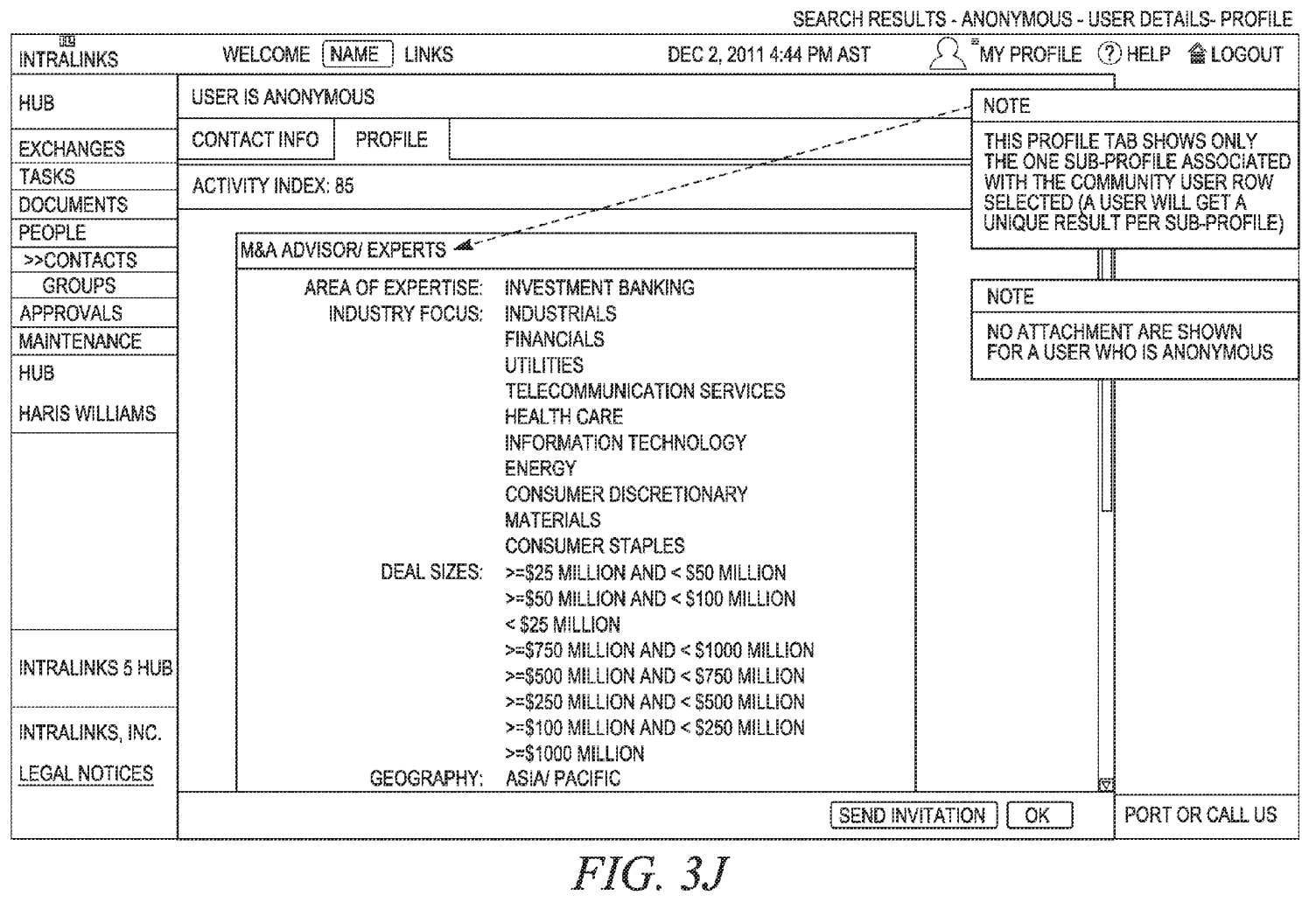
Figure 3K:
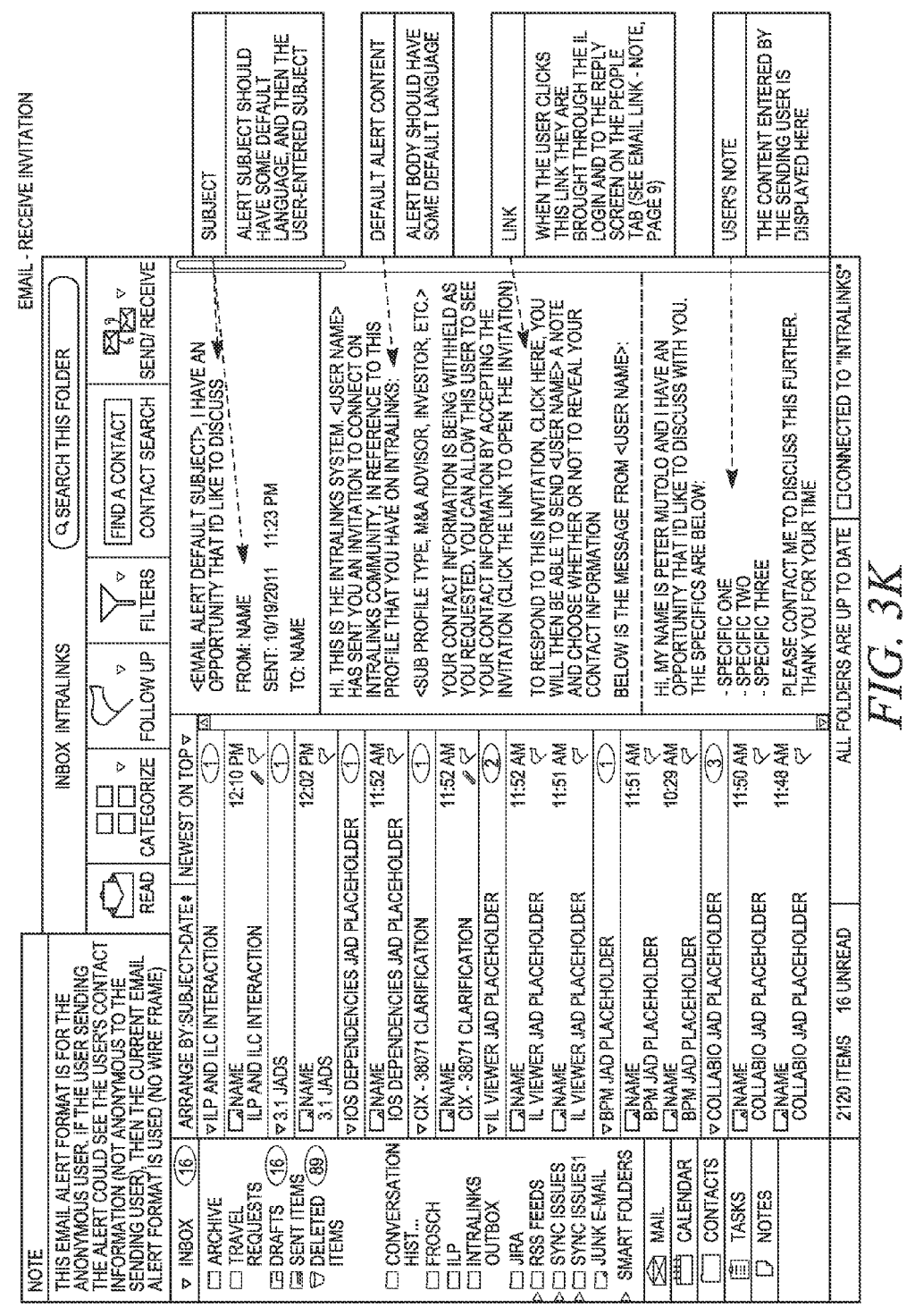
Figure 3L:
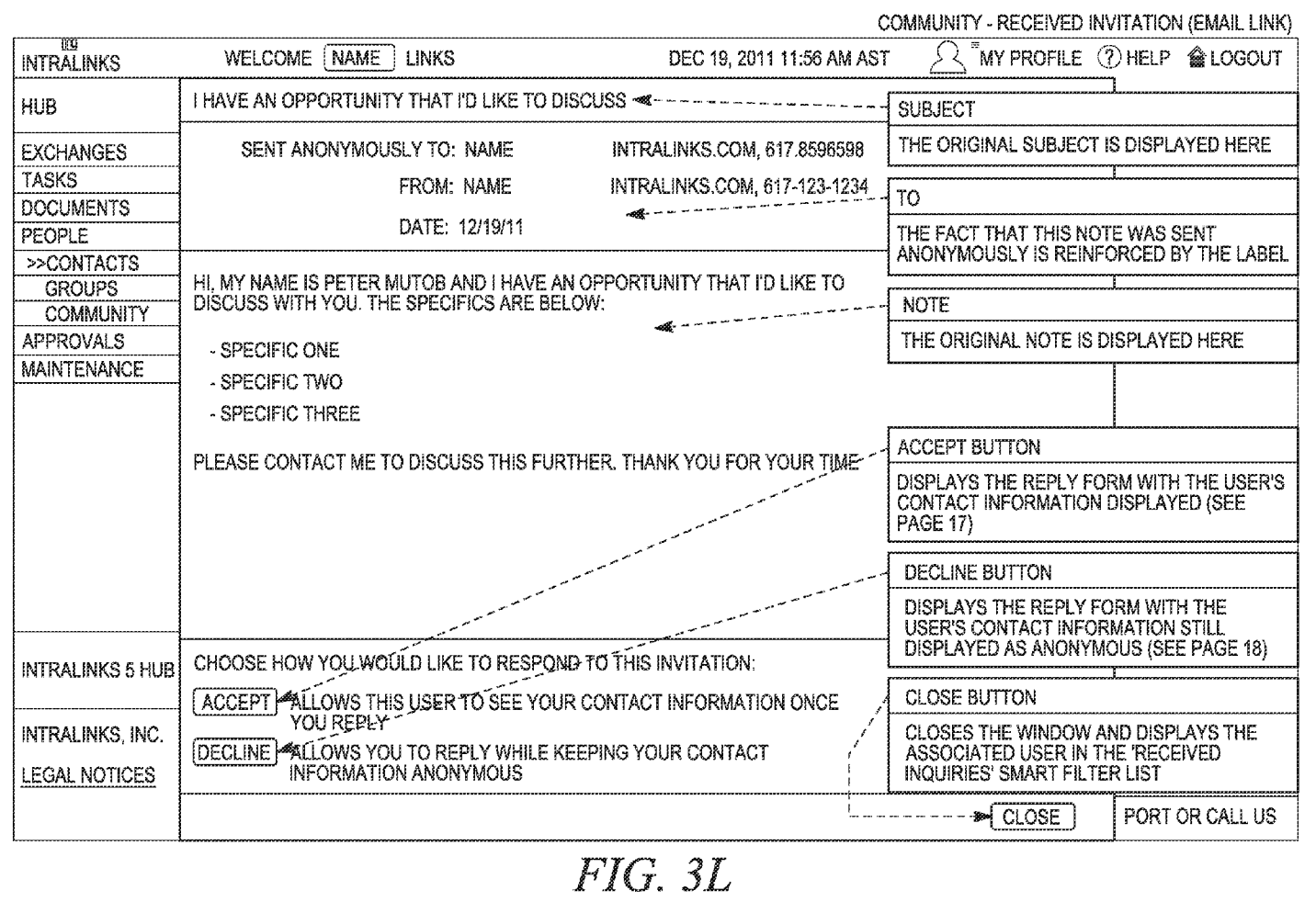
Figure 3M:
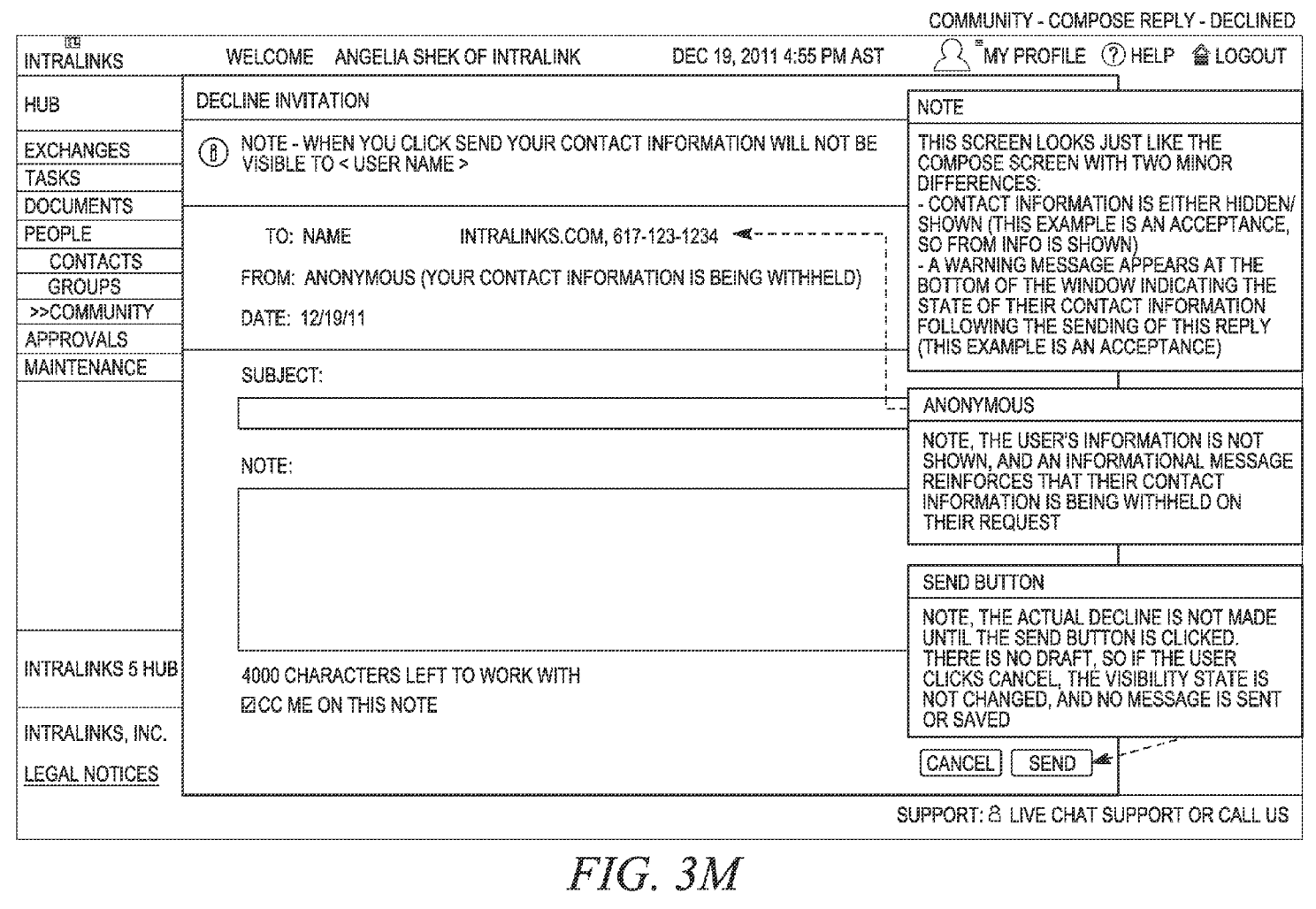
Figure 3N:
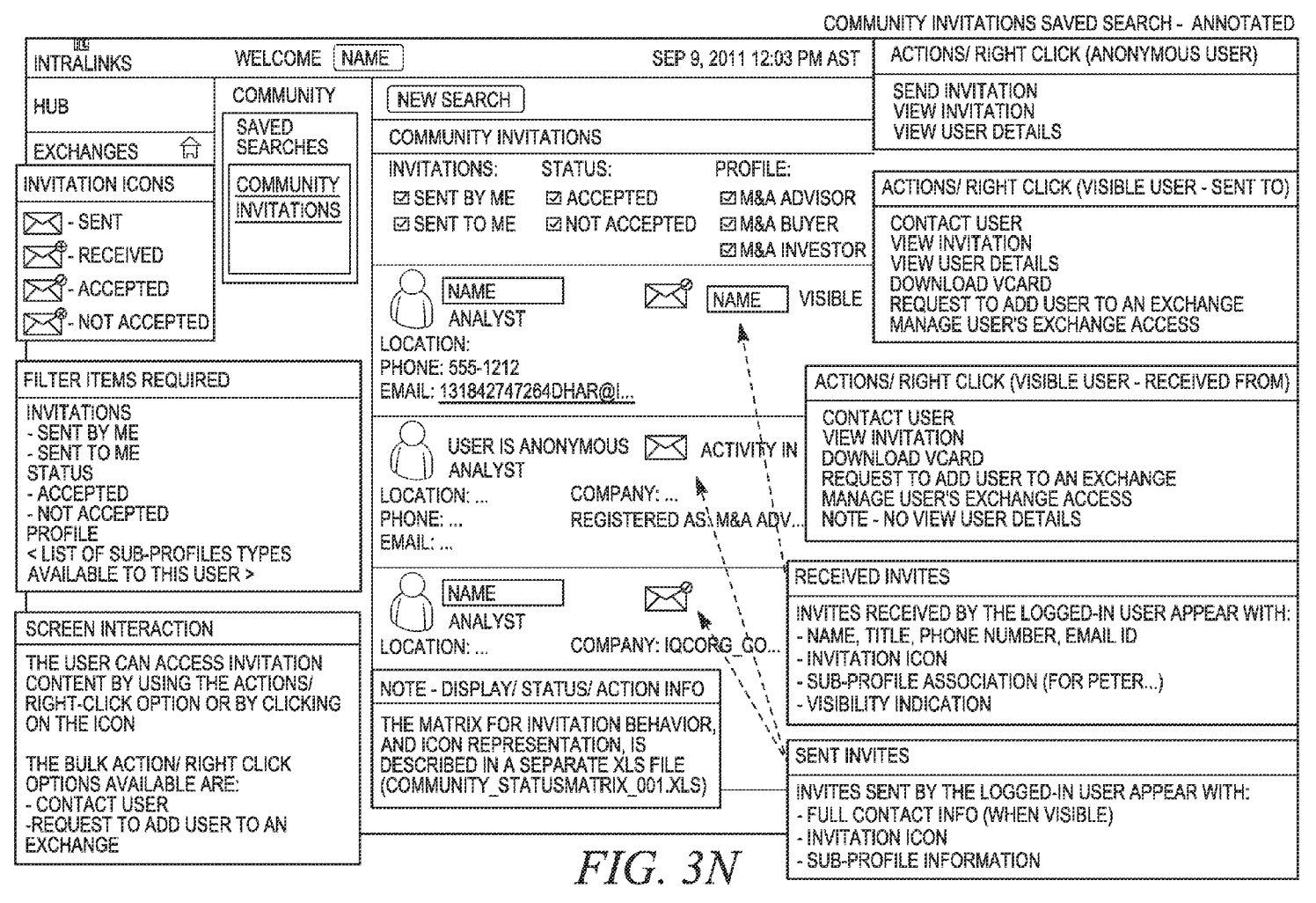
Figure 3P:
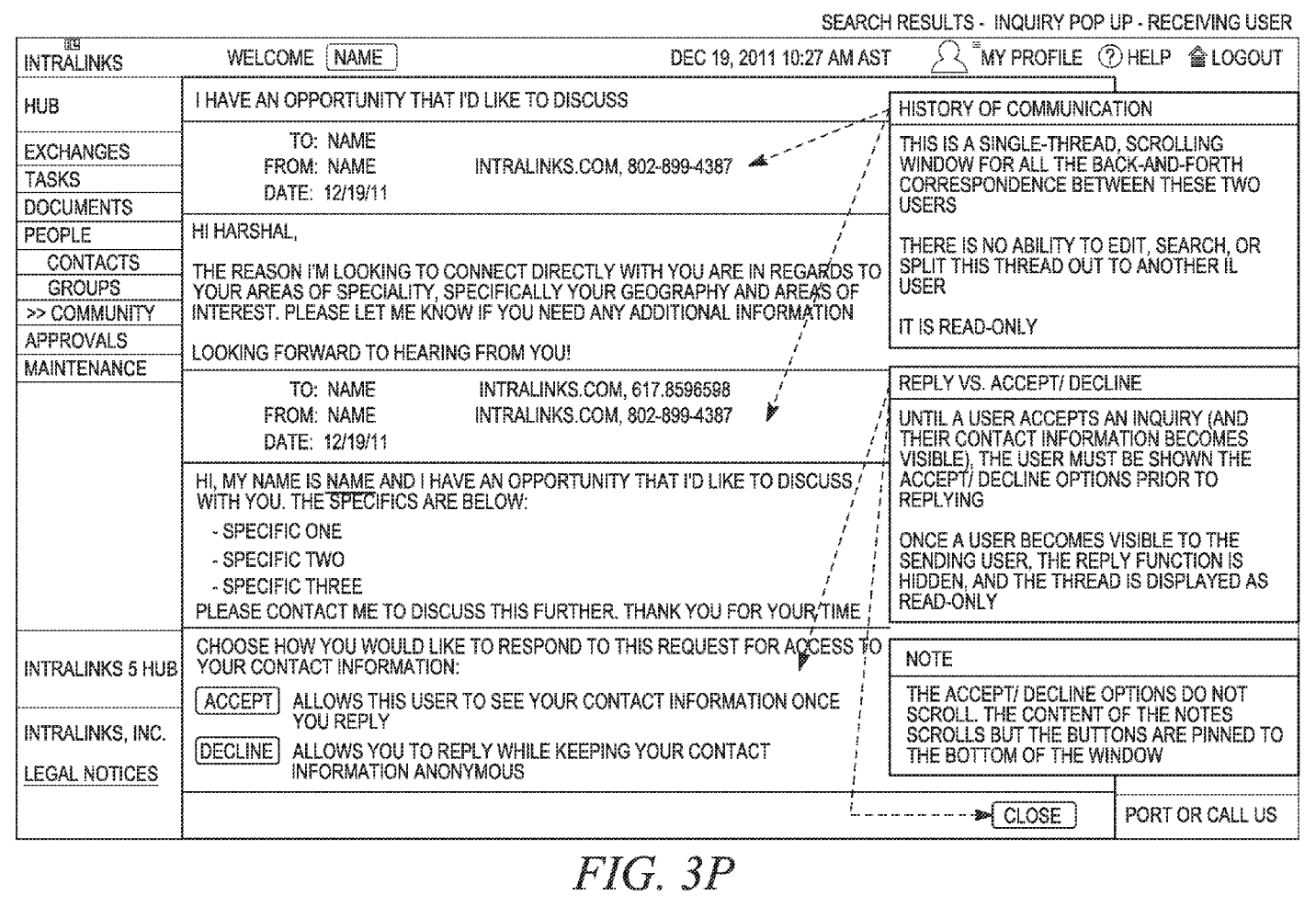
Figure 3Q:
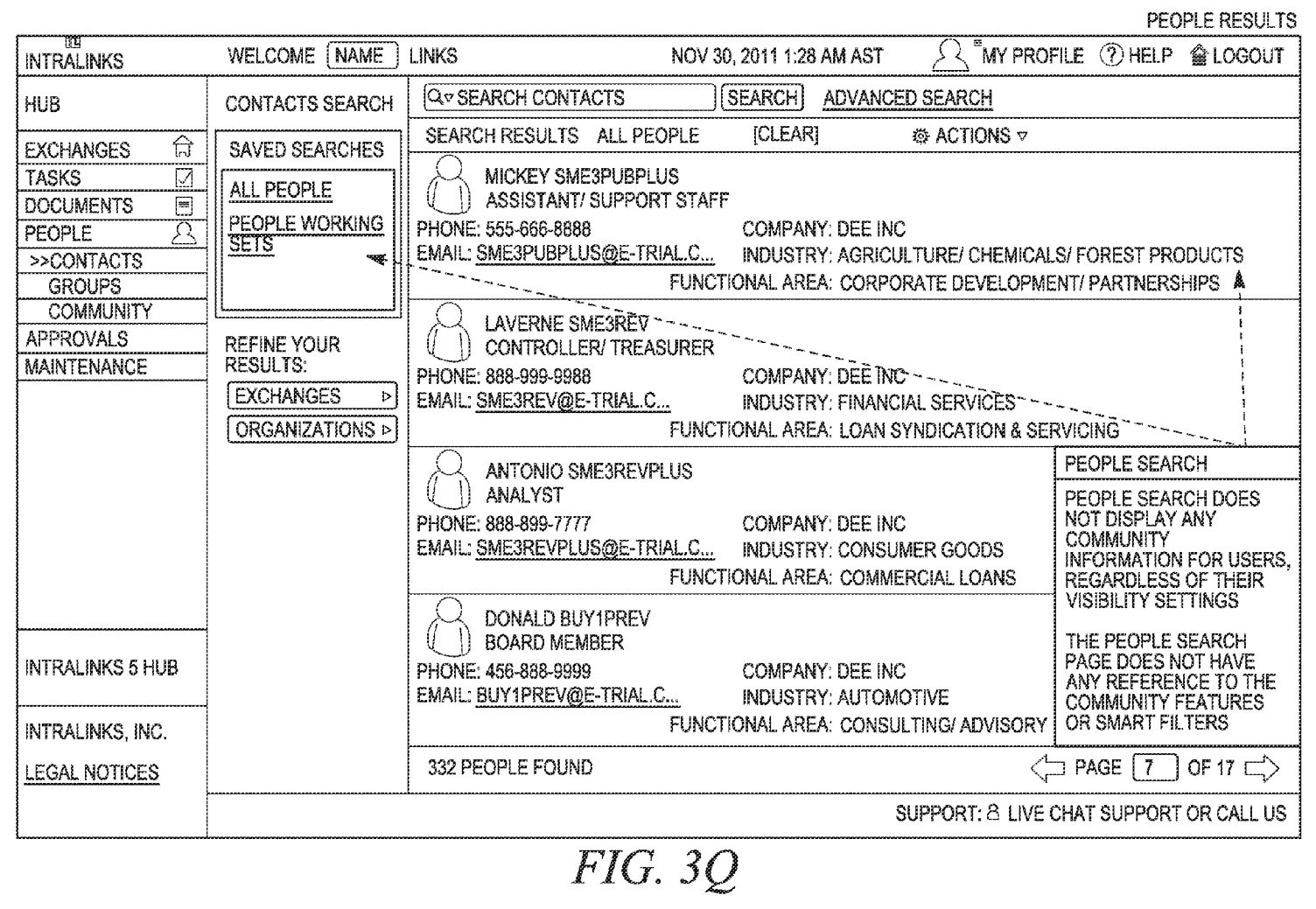

There may be actions the user may take with regard to a search result, such as to make contact, open an invitation, view detail, download a vCard, request to add a user to an exchange, manage a user exchange access, and the like. When a user is anonymous, an indication of such may be provided in place of their name, such as 'User is Anonymous', blanks in place of location, phone number, email contact information, company, and the like. FIG. 3F provides an example for an interface for composing an invitation. Users that receive an invitation may be asked to accept or decline the invitation, and the sending user may receive replies as email alerts (e.g., such as available under the community invitations section of the user interface). The invitation may include a subject, note, number of users the invitation is being sent to, information about the sending user (e.g. name, email ID, phone number), a cc function, and the like. An invitation may be provide to a visible user, an anonymous user, logged-in users, logged-out users, and the like. Successfully sending an invitation may result in an acknowledgement, such as an invitation alert, a text alert, and the like. FIG. 3G shows an example of an 'alert sent' indication. An indication of a successful alert sent may also include a dialog indication, a title of the invitation, the body of the invitation, and the like. Users that receive a note may be able to reply directly to the sending user's email address, as shown in an example in FIG. 3H. FIG. 3I, shows an example of what user information may be left blank when the user is an anonymous user, such as email contact information, organization, position, industry, functional area, address information, phone number(s), fax number, and the like. FIG. 3J shows at least a portion of the information that may be hidden, such as in this example that the user is an M&A advisor/expert, area of expertise is investment banking, industry focus areas (e.g. industrials, financials, utilities, telecommunication services, health care, information technology, energy, consumer discretionary, materials, consumer staples), deal sizes, geography, and the like. FIG. 3K shows an example of a user inbox showing the invitation alert. FIG. 3L shows an example of options available to the recipient of an invitation, such as to accept or decline the invitation, where FIG. 3M shows an embodiment 'decline invitation' screen, and FIGS. 3N and 3O shows an embodiment overview for invitations sent, received, accepted, declined, and the like. FIG. 3P shows a running communications thread between two users in association with an invitation, where as shown, the accept-decline options may continue to be presented to the recipient of the invitation until they accept or decline the invitation. FIG. 3Q shows an embodiment contacts search.

Figure 3R:
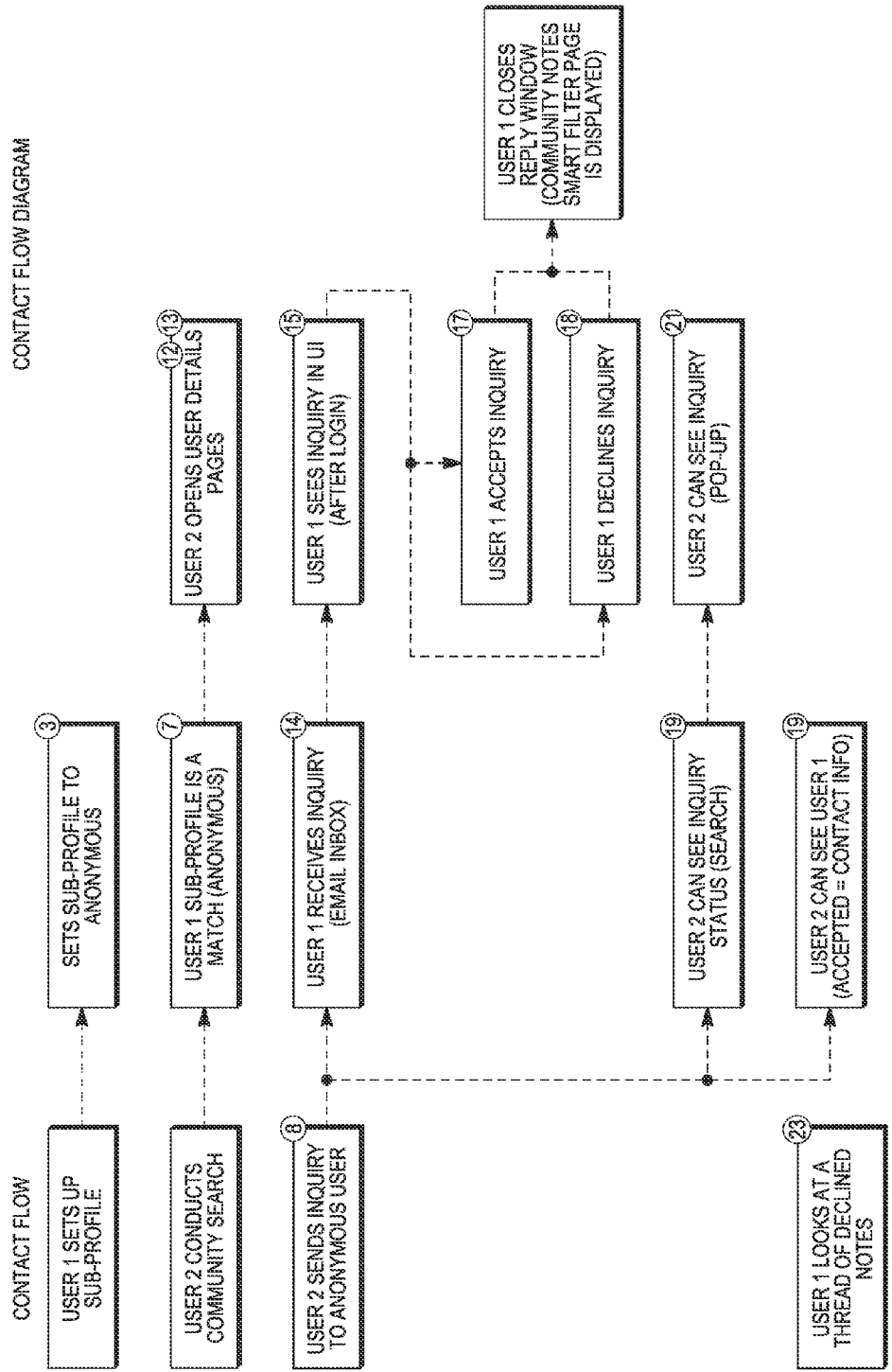

FIG. 3R depicts an example contact flow between two users. As shown, user 1 has set up a sub-profile that includes setting their visibility to anonymous. User 2 conducts a community search and finds user 1, where user 2 opens a user details page(s). User 2 then sends an inquiry to the anonymous user 1, where user 1 receives the inquiry (such as in their email inbox) and views the invitation in the community user interface. User 1 then has the option to accept or decline the invitation, where user 1 then closes the reply window. User 2 is able to see the inquiry status, such as through searching, where user 2 sees the inquiry, sees the status of accept or decline. User 1 is able to view the thread of the accepted/declined notes.

In embodiments, a method for managing a networked secure collaborative computer data exchange environment may be provided, the method including establishing, by a secure exchange server controlled by an intermediate business entity, a client login data authentication procedure that allows at least one client computing device of a plurality of client computing devices operated by users of a plurality of business entities to access the secure exchange server, wherein communications between the secure exchange server and the plurality of client computing devices is through a communications network; storing, by the secure exchange server, at least one client login authentication data for each of the plurality of client computing devices; receiving content from a first of the plurality of client computing devices; by the secure exchange server, permitting access to the content for a subset of the plurality of computing devices through an exchange content access facility, wherein the exchange content access facility is managed by at least one business entity of the plurality of business entities; granting, by the exchange server, access to the content to a second of the plurality of client computing devices when the secure exchange server receives from the second of the plurality of client computing devices its client login authentication data provided that the second of the plurality of client computing devices is one of the subset of the plurality of computing devices; and providing an exchange community facility where the users of the plurality of client computing devices establish an informational profile that is made accessible to other users of the plurality of client computers and are enabled to interact with one another based on the content of the informational profile.

In embodiments, access to the exchange server by client processors may be through a host server controlled by the business entity that controls the client processor. The client computing devices may be at least one of owned and managed by at least one of the plurality of business entities. The client computing devices may be owned by individual users. The secure exchange server may be at least one of a plurality of exchange servers. The content may be at least one of a document, a spreadsheet, a message, data, an image, audio content, video content, multimedia content, and the like. The content may be transferred to the secure exchange server via encrypted data transmission.

In embodiments, the content of the informational profile may include contact information, business association, and the like. The exchange community facility may provide users with facilities for sending an invitation to another user for communication. After the invitation is sent the exchange community facility may provide a status of the invitation related to the invitation being at least one of being sent, received, and read. The informational profile for the sending user may be restricted as anonymous until the receiving user accepts the invitation for communication. The exchange community facility may provide for informational profile viewing control, where the viewing control allows the informational profile to be viewed by other users, by a selected group of users, and the like. The exchange community facility may provide a graphical user interface through which a user manages their informational profile and interactions with other users, where the graphical user interface includes a search engine interface, provides an activity index measure of how active a user is on the exchange community facility, and the like. An informational profile may be categorized by professional activity, such as including a buyer, seller, investor, expert, and the like. The informational profile may include credentials for an individual, an indication of an area of interest (e.g. a type of project in which an individual is interested in participating), and the like.

In embodiments, a method for managing a networked secure collaborative computer data exchange environment may be provided, establishing, by a secure exchange server controlled by an intermediate business entity, an authentication procedure for a client login authentication data that allows at least one of a plurality of user client computing devices operated by users of at least two business entities to access the at least one secure exchange server, wherein communications between the secure exchange server and the plurality of user client computing devices is through a communications network; storing, by the secure exchange server, the at least one client login authentication data for each of the plurality of client computing devices; receiving, from a first of the plurality of user client computing devices, content; associating access, by the secure exchange server, to the content to a subset of the plurality of user computing devices through an exchange content access facility, the exchange content access facility managed by at least one of the plurality of business entities; granting, by the exchange server, access to the content of the secure exchange server to a second of the plurality of user client computing devices when the secure exchange server receives a client login authentication data from the second of the plurality of user client computing devices and dependent upon the second of the plurality of user client computing devices being one of the subset of the plurality of user client computing devices;

and providing an exchange community facility where the users of the plurality of client computing devices establish an informational profile that is made accessible to other users of the plurality of client computers and are enabled to interact with one another based on the content of the informational profile, wherein the interaction is executed as an anonymous interaction, where the anonymous interaction provides a subset of content from the informational profile.

Figure 4:
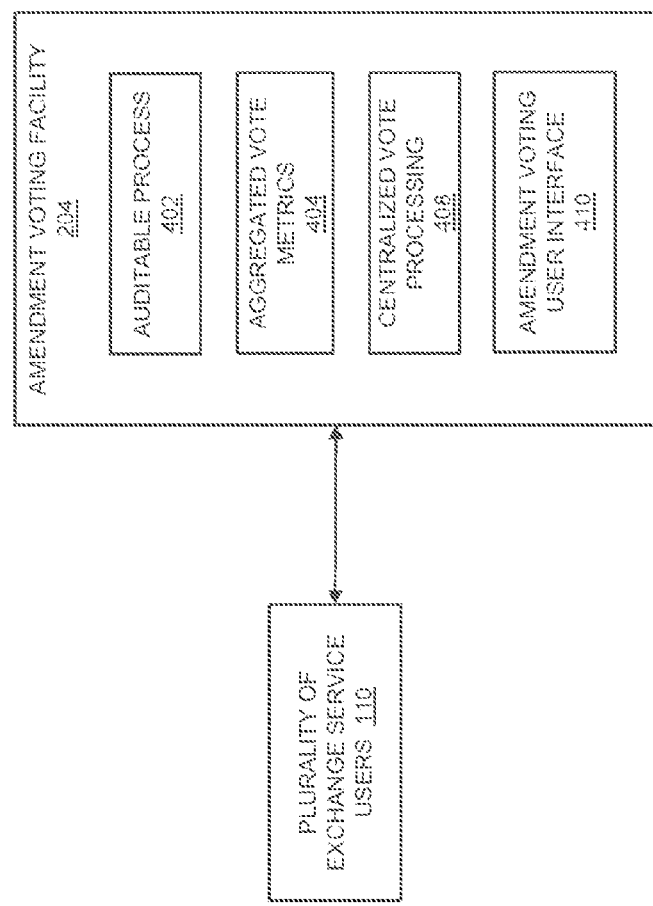
FIG. 4 depicts a functional block diagram for the amendment voting facility in an embodiment of the present invention.

Referring to FIG. 4, the amendment voting facility 204 may provide for managing, integrating, and facilitating a process where agency clients executing a transaction (e.g. a syndicated loan) may vote on modifications or amendments to a transaction or transaction content, including an auditable process 402, aggregated vote metrics 404, centralized vote processing 408, and the like. The auditing process 402 may utilize vote documentation, consent forms, signature page tracking, digital distribution, vote collection, and signature page submission, and the like, where the these documents may be fully traceable. The distribution, vote collection and signature page submission may all occur online, speeding the process and better ensuring transparency. Aggregating vote metrics 404 may utilize weighted voting calculations for consent percentage, visualization of responses (e.g. which lenders have done what), and the like, where vote calculations may be weighted by commitment percentage, and where a visual display of user responses may make it easy to see which users have taken action, and what those actions are. Centralized vote processing 408 may include sending reminder alerts, completion of approval tasks, completion of a vote, and the like. Features of the amendment voting facility 404 may include amendment templates for quick configuration and launch, lender voting that includes signature pate collection (e.g. with electronic submission of signature pages), task lists for consent, an amendment voting user interface 410 to track progress and statistics (e.g. group tracking, simplified reminders, export for vote tally and reporting), amendments within existing exchanges, and the like.

Figure 4A:
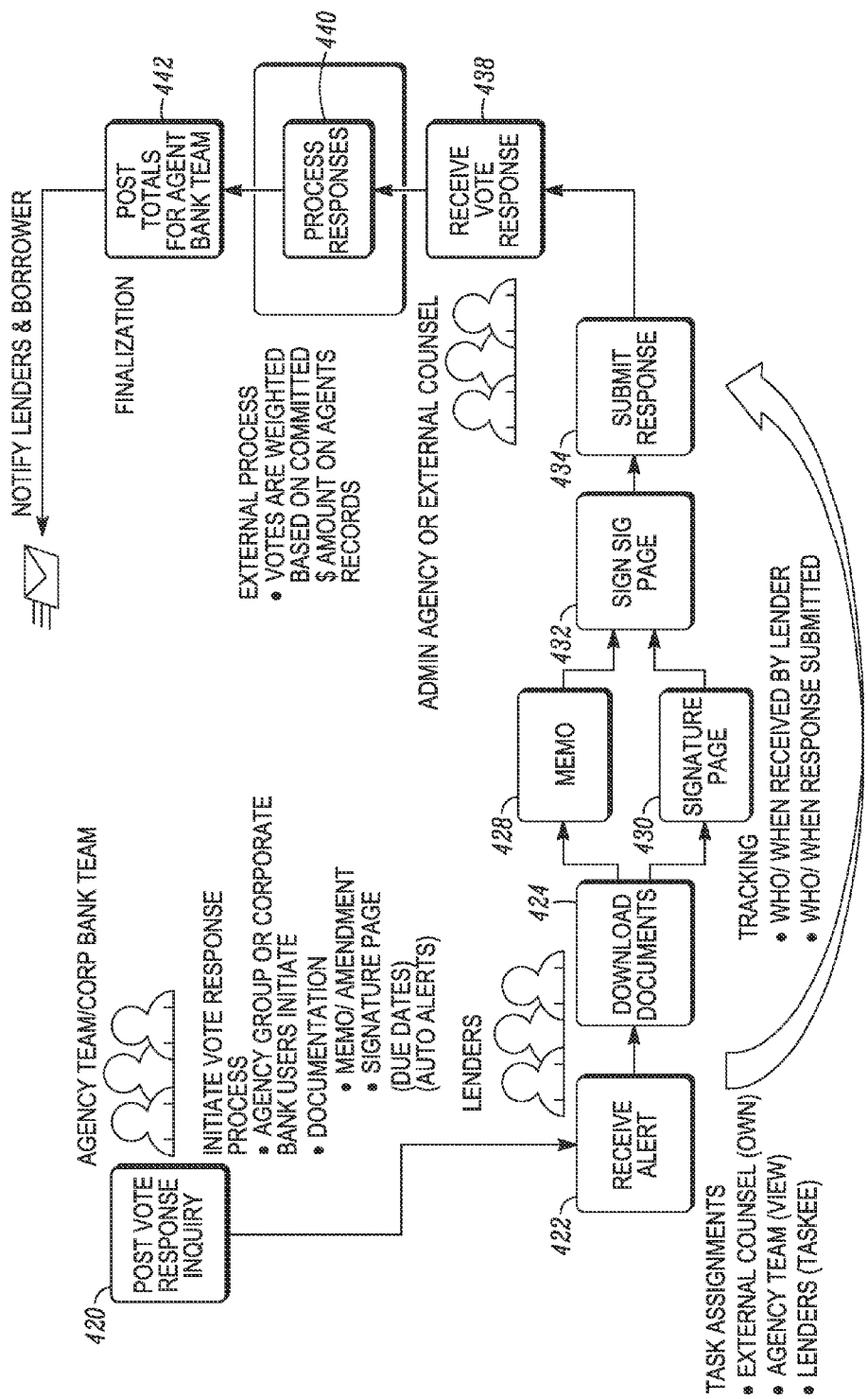
FIG. 4A depicts a flow diagram for an embodiment process flow of the amendment voting facility.

Referring to FIG. 4A depicts an embodiment flow process diagram for the amendment voting facility, where an agency team initiates a vote response inquiry 420, such as including documents, amendments, signature pages, due dates, automatic alerts, and the like. Lenders may then receive an alert 422, including task assignments, such as for external counsel, the agency team, participants (e.g. lenders), and the like. Documents (e.g., memos, signature pages) may be downloaded and tracked 424. Signature pages, such as a memo 428 with a signature page 430, may be signed 432 and submitted 434 as a response. Participants (e.g., administrator agency, external counsel) may receive the vote response 438. In an external process votes may be weighted 440, such as based on committed dollar amounts on an agent's records. The process may be finalized 442, such as with posting totals (e.g., for an agent back team), where members of the process (e.g. lenders and borrowers in a loan process) are notified. In embodiments, the amendment voting facility may reduce or eliminate the manual process surrounding a vote collection and consent process, such as associated with a load process, and helps the user efficiently prioritize a vote collection strategy.

In an example, on a syndicated loan, one agency bank may be in charge and have a number of lenders supporting that loan, often hundreds or even in excess of a thousand such lenders. As proposed modifications or amendments are made, each may need to be disseminated, have users react to it (such as providing information, making selections, and the like), be returned with appropriate documentation to the agency bank, and the like. A typical process is conventionally performed offline, where banks are required to have signing authorities pen-ink sign and re-submit to the agency bank. Further to the example, when a new amendment comes up, the agency bank may create a new transaction exchange environment for the amendment process. Through a data link the lender groups of members of those groups may be pushed into the new exchange environment, such that each of them appears as a participant in the exchange. Data relating to all current positions of the lenders (the amounts of their financial positions with respect to the particular loan or loans) may also be pushed into the exchange, so that it is available for further processing. In embodiments, the current position of a user with respect to the transaction structure may have a bearing on the voting, such as the weight given to a user's vote, minimum amounts related to the amendment, and the like. Such amounts may be stored and retrieved for processing by the exchange. For instance, an agency bank may ask lenders to confirm their understanding of their positions in the process, some or all of the data with respect to positions may be pre-populated into the system and carried through into the transaction, and the like.

In embodiments, the amendment voting facility may allow for the naming of an amendment vote, a date for the vote, a vote distribution, inclusion of associated documents, facility for signature providing page submissions, inclusion of instructions to voters, a process of approval, a step for outside counsel to review, and the like. Once the announcement for the vote is sent out, an administrator agent may be able to view the tasks that have gone out, to what individuals and groups, and the status of the voting. Features of the amendment voting facility may include import and export of commitment data, support of amendment vote collection workflow, creation of vote template configurations, configuration of election forms, display of an amendment voting graphical user interface dashboard, configuration of signature pages, access for an administrator to complete tasks, facility for client-specific amendment vote definition, and the like. Import and export may include users ability to populate a deal structure automatically (e.g., from a source file), create a list of lenders groups and tranches commitment information on a new deal exchange, reconcile an existing deal structure, generate reports (e.g. listing commitment amounts for each participant, updating commitments, and the like. Support of amendment vote collection workflow may include support of a plurality of different amendment types and allow users to create process definitions available for run-time execution, and the like, where the different amendment types may include a simple yes-no, a yes-no with signature, consent-no consent, amend and extend, and the like. Amendment vote collection workflow may include specification of due dates and time, collection of election options, distribution of documentation, the ability to edit voting parameters, and the like. Creation of vote template configurations may include support of vote template configuration creation, such as to encapsulate the amendment vote process for document control management, including users setting up owners, monitors, and vote elements once, and reusing for subsequent votes; providing consistent language and instructions and documentation across transactions and votes; setting up vote types that may be adjusted as-needed, and the like. The election form may be configured to allow users to dynamically generate election forms based on group participant relationships (e.g. lenders only having visibility to cases they have access to). Display of an amendment voting dashboard may include view of a list of multiple amendments initiated for a particular transaction, view of details of the process (e.g., list of lenders and their related status such s progress against a task), view of participant contact and additional information, and the like. Configuration of the signature page may include custom text, a logo, and the like, where users may update and maintain their own custom signature pages, such as for all transactions, per transaction, per vote, and the like.

Continuing with the syndicated loan example, a lender may receive an email alert that they are invited into a new amendment task process. They may then be asked to login, where they are brought into the task flow that came from the alert. Tasks may include instructions, document review, election options, and the like. Pre-populated information may also be provided in association with the task. The user may record their vote and save any amendments associated with their elections. Their election and amendments may be printable, where the user may then take that document to the signatory to have it signed. In this instance, all of the information, including instructions may be included in the hard copy for the lender, and where the signing indicates legal consent. In this way, there may be one single entry point of information, where the lender receives the document to be signed, has it signed, and is provided a facility for loading the document back into the system. In embodiments, an e-signature and described herein may also be utilized for signing the document and entry into the system.

In embodiments, a user may be provided the user interface 410 to view the exchanges that are running amendments, to see tasks generated and what state they are in, to view individual tasks for a particular lender, to view signature pages (e.g., where all of the election option information is carried), and the like. Custom fields may also be provided, such as to allow users to change commitments. In embodiments, users may see information as the data is populated, even before signatures are applied. A user may need to perform a calculation, such as to weight each vote to see how close they are to carrying the amendment. The system may enable the user to export data to a document (e.g., a spreadsheet) for performing the calculation separate from the system, and to monitor the amendment process and changes thereto. For instance, and continuing with the loan syndication example, an administrator agent may be most interested in monitoring response levels and challenges to the current commitment levels. For instance, if only three users are seen to have any challenge on their commitment amounts, then the administrator may need to handle those first, which may be a priority if there is a discrepancy. The user may also be interested in those who are planning to take action (e.g., increase their commitment, reduce their commitment, by how much their commitment may change, and the like). Ultimately, the agency bank may have the final say, and so the system may provide them with priority, and so enable them to decide on whether to allow the changes or not.

Figure 4B:
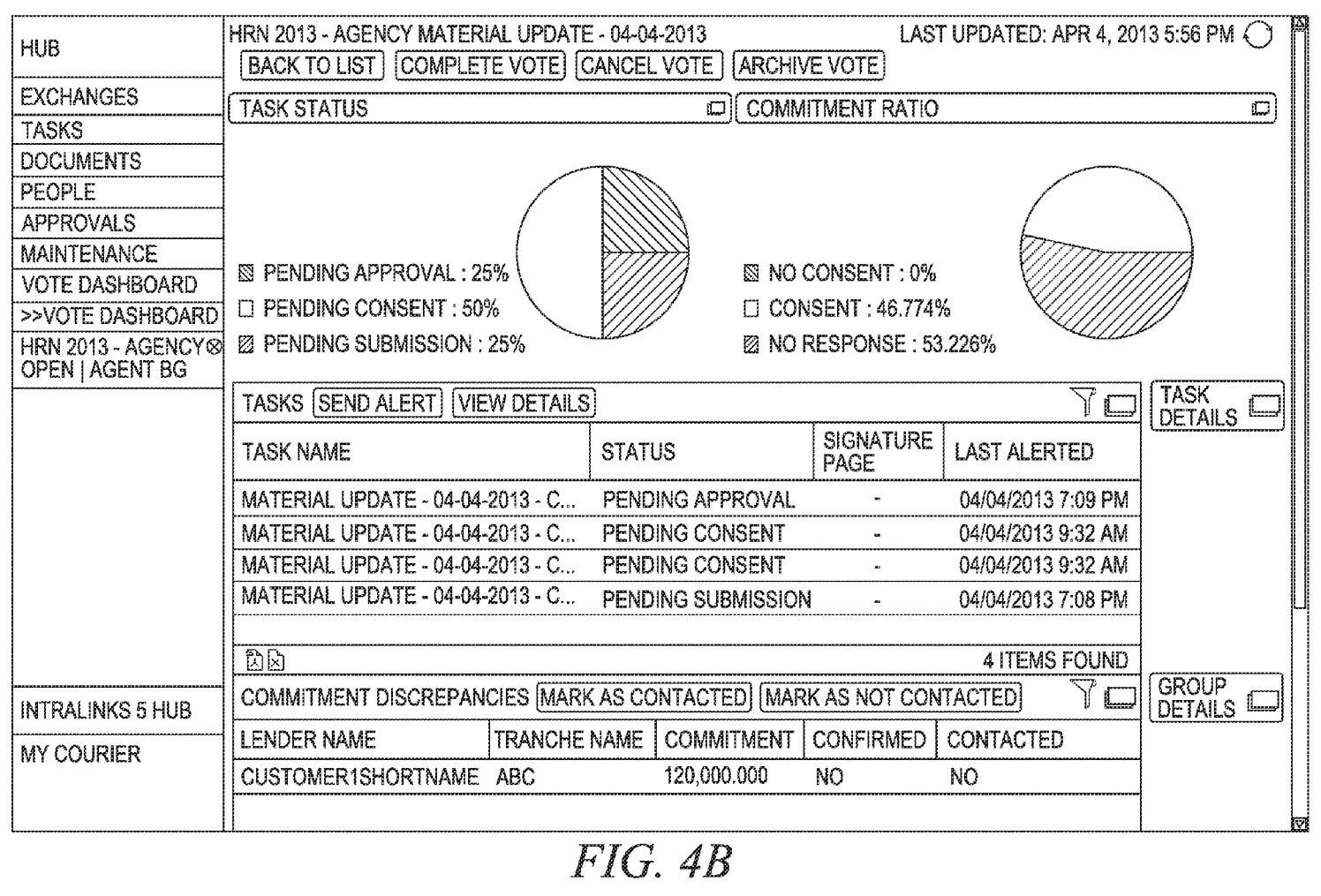
Figure 4C:
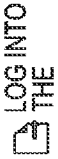
Figure 4D:
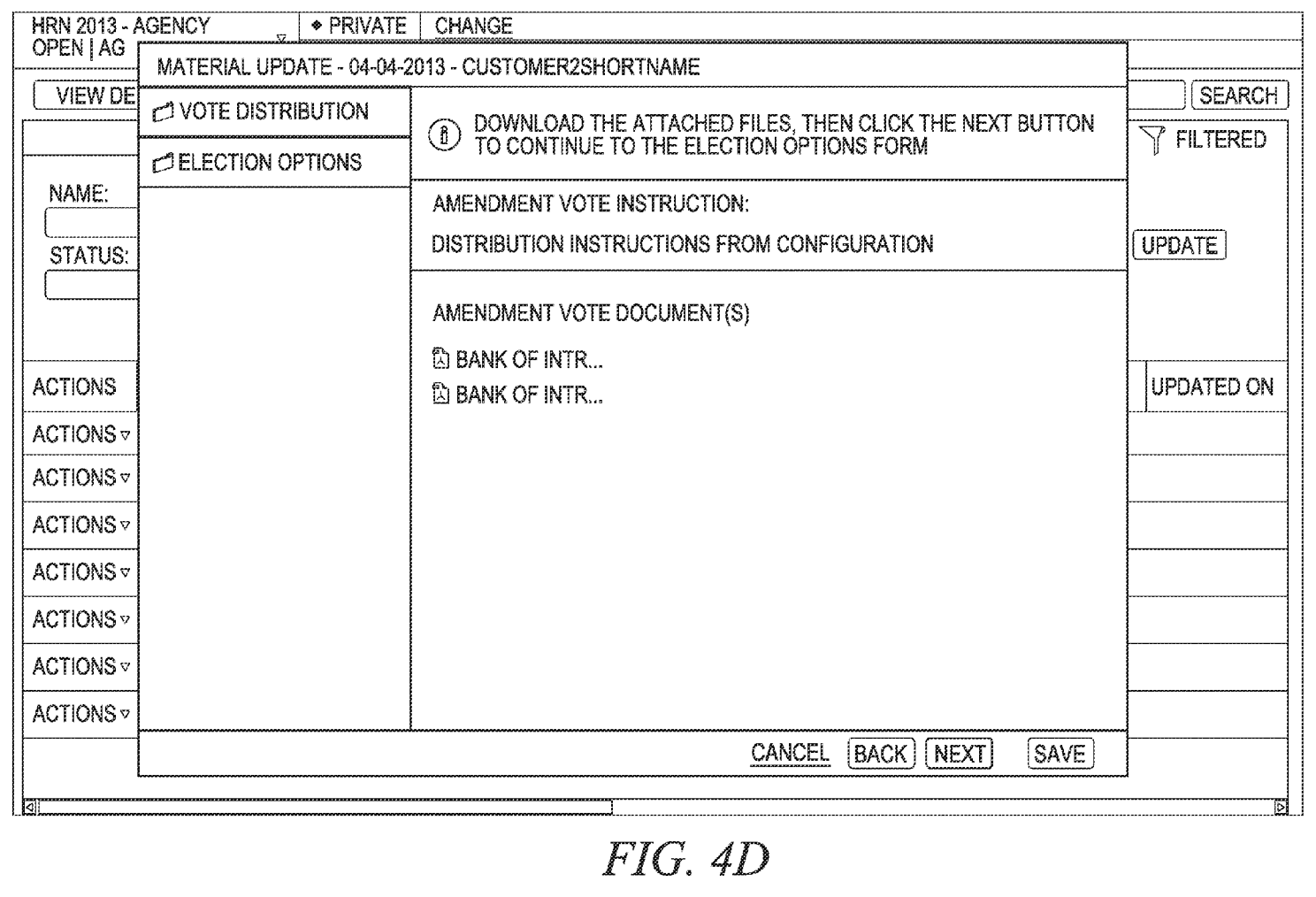
Figure 4G:
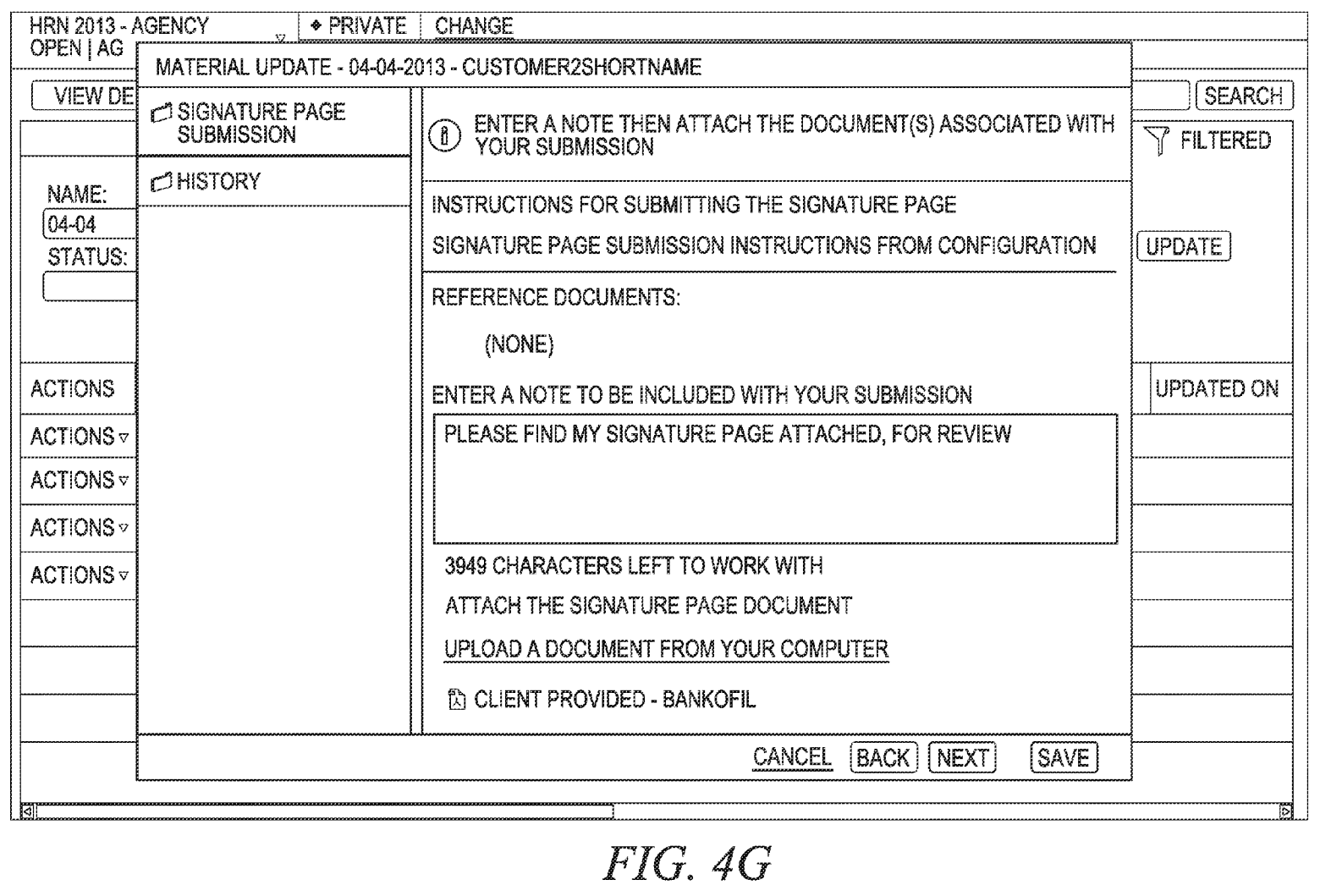

FIGS. 4B-4H depict embodiments of the amendment voting facility user interface. FIG. 4B illustrates an embodiment dashboard listing and graphic showing the status of a user's amendment voting, where the graphic shown displays a pie graph of 'no consent', 'consent', and 'no response', as well as a listing of specific amendment voting statuses. FIG. 4C shows a user notification of being assigned an amendment vote task. FIG. 4D shows a user interface for distribution of an amendment vote. FIG. 4E shows options available to the user for making the amendment vote, including to 'agree' or to 'disagree' with the '30,000,000 USD' commitment. FIG. 4F shows a listing of an amendment voting task status for a user. FIG. 4G shows a signature page being submitted by a user, including a note stating, "Please find my signature page attached, for review". FIG. 4H shows an updated listing and status for the user's amendment voting tasks.

In embodiments, a method for managing a networked secure collaborative computer data exchange environment, the method including establishing, by a secure exchange server controlled by an intermediate business entity, a client login data authentication procedure that allows at least one client computing device of a plurality of client computing devices operated by users of a plurality of business entities to access the secure exchange server, wherein communications between the secure exchange server and the plurality of client computing devices is through a communications network; storing, by the secure exchange server, at least one client login authentication data for each of the plurality of client computing devices; receiving content from a first of the plurality of client computing devices; by the secure exchange server, permitting access to the content for a subset of the plurality of computing devices through an exchange content access facility, wherein the exchange content access facility is managed by at least one business entity of the plurality of business entities; granting, by the exchange server, access to the content to a second of the plurality of client computing devices when the secure exchange server receives from the second of the plurality of client computing devices its client login authentication data provided that the second of the plurality of client computing devices is one of the subset of the plurality of computing devices; and providing an amendment voting facility for conducting a process of voting when the content relates to a proposed amendment to an agreement wherein the amendment voting facility enables users of the subset of the plurality of computing devices to vote on the proposed amendment.

In embodiments, access to the exchange server by client processors may be through a host server controlled by the business entity that controls the client processor. The client computing devices may be at least one of owned and managed by at least one of the plurality of business entities. The client computing devices may be owned by individual users. The secure exchange server may be at least one of a plurality of exchange servers. The content may be at least one of a document, a spreadsheet, a message, data, an image, audio content, video content, multimedia content, and the like. The content may be transferred to the secure exchange server via encrypted data transmission.

In embodiments, the process of voting on the proposed amendment may be traceable, such as traceability including tracing vote documentation, consent forms, signature pages, digital distribution, vote collection, signature page submission, and the like. The amendment voting facility may provide for the aggregating of vote metrics for tracking the process of voting amongst the users of the subset of the plurality of computing devices, such as aggregating vote metrics utilizing weighted voting calculations for consent percentage and visualization of responses. The amendment voting facility may provide for a vote graphical user interface dashboard to track progress and statistics, such as where the tracking of progress and statistics includes group tracking, reminders, export for vote tally and reporting, and the like. The amendment voting facility may provide for relative weighting of votes amongst the voting users. The amendment voting facility may provide for management of the voting process including a date for the vote, a vote distribution list, inclusion of associated documents, facility for signature-providing page submissions, inclusion of instructions to voters, a process of approval, a step for outside counsel to review, and the like. A vote may be cast as a yes-no vote, a yes-no vote with signature, a consent, and the like. A voting form may be provided, where the voting form is configured to allow users to dynamically generate voting forms, such as where the dynamically generated voting forms are based on user participant relationships. The voting form may include a user customizable text or logo.

Figure 5:
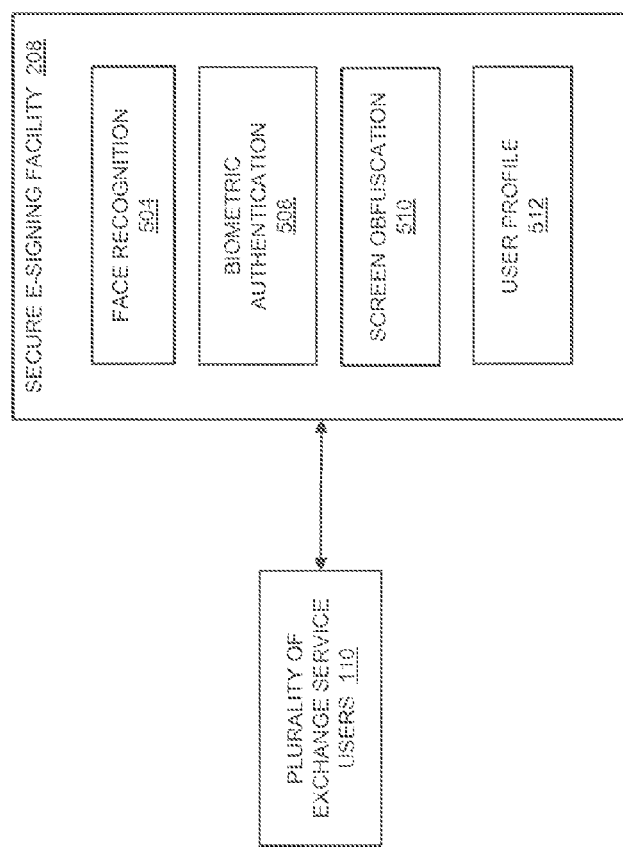
FIG. 5 depicts a functional block diagram for the secure e-signing facility in an embodiment of the present invention.

Referring to FIG. 5, the secure electronic signature facility 208 (also referred to herein as 'e-signature facility' or 'e-signing' herein) may support the process of providing documents for signature and for a user e-signing and sending the e-signed documents back to the sender. In embodiments, the electronic signature facility 208 may provide for secure viewing of the document signing, such as through face recognition 504 to determine the number of people viewing the monitor on which the signing is being executed and/or utilizing a digital photo of a user to verify the user is who they say they are, utilizing biometric authentication 508, utilizing screen obfuscation 510 to ensure only authorized users are viewing the document for signing, and the like. For instance, a computing device being used for e-signature may have a camera that views and detects the surrounding environment to determine how many people are currently viewing the screen, and if a condition exists where there is not only one person viewing the screen, the screen may obfuscate the document being e-signed, such as blurring, blanking, screening, and the like. For example, if the computer device detects that no one is viewing or multiple people are viewing the screen, the screen may blank out the document. In another instance, the computing device may utilize a camera to match the face of the person viewing the screen with a stored image of the person that is authorized to e-sign, and if the match is made, permitting the process of e-signing to proceed. In another instance, a biometric match may be required to permit the process of e-signing to proceed, such as through the use of a match to an iris as viewed through a camera, an e-fingerprint through a fingerprint pad for input to the computing device, or any other biometric verification method known to the art. In embodiments, conditions for enabling an e-signature process to proceed may be stored in a user profile 512, where if the conditions (e.g. number of people viewing, authorization matching though images and/or biometrics) are not met, the document may be obfuscated.

Figure 5C:
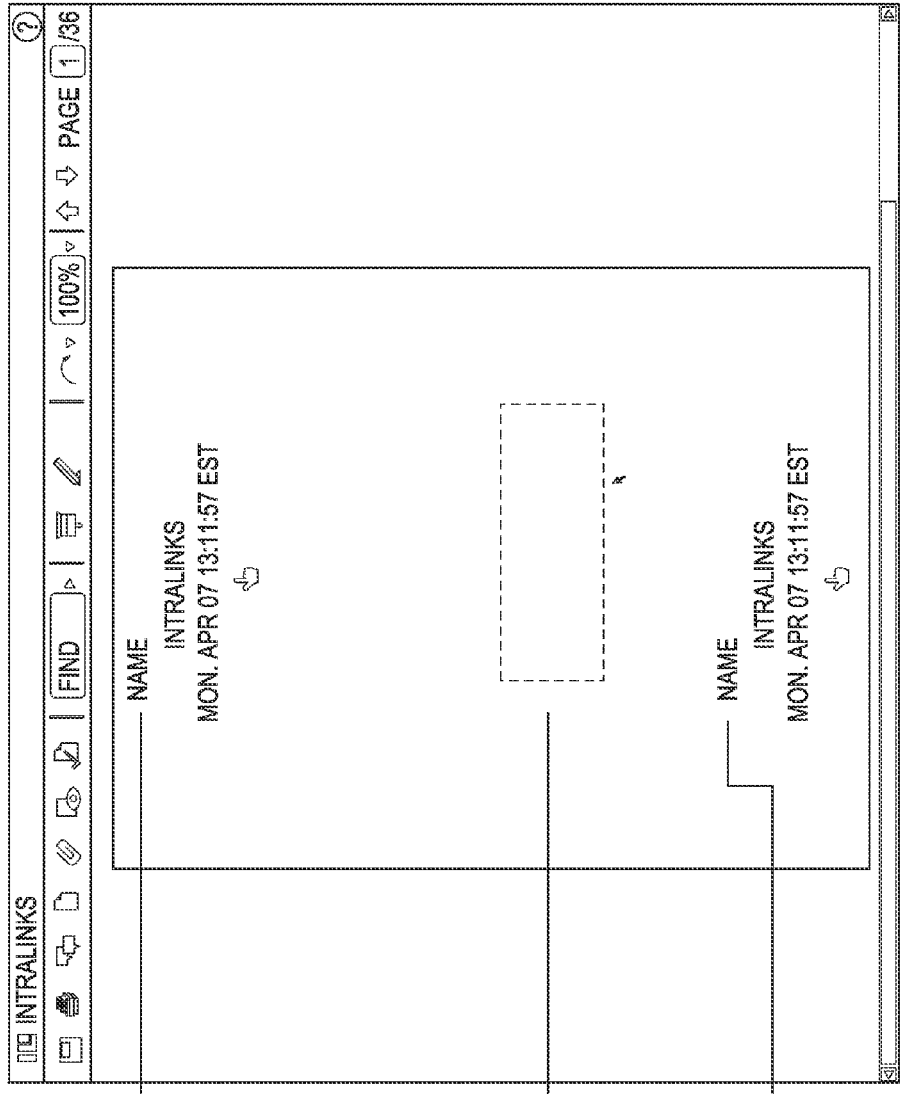
Figure 5E:
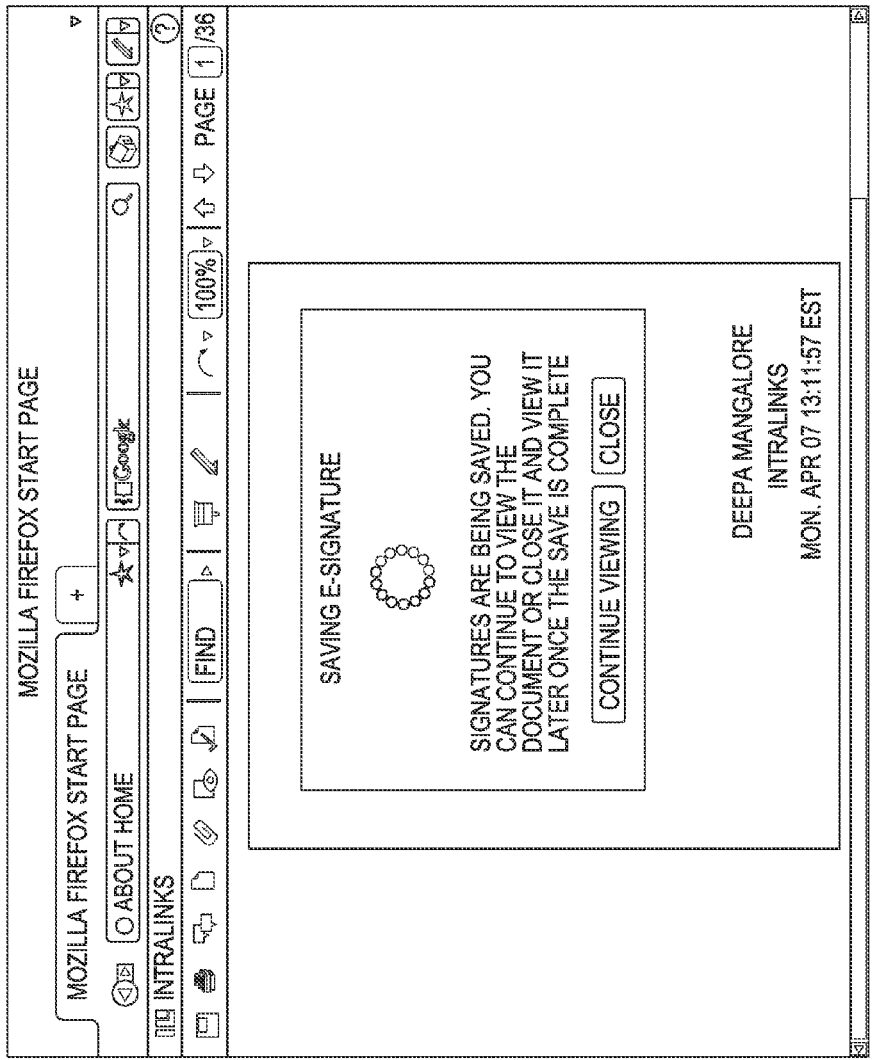
Figure 5F:
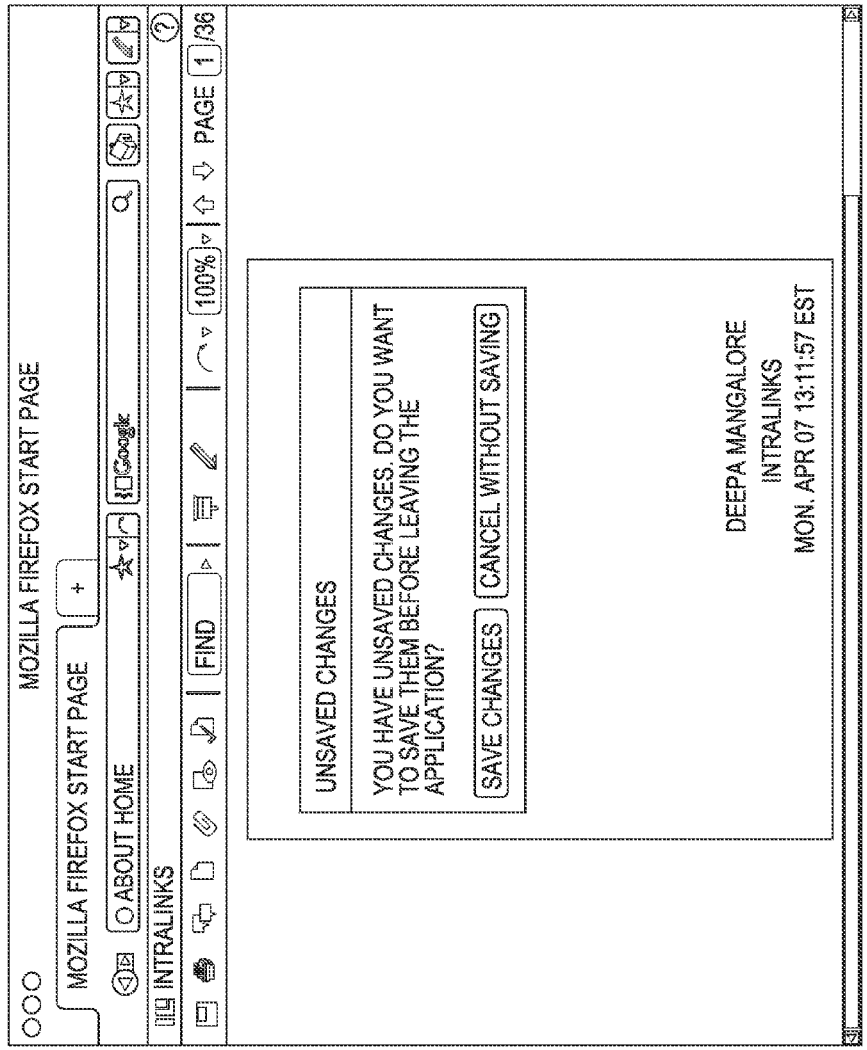
Figure 5G:
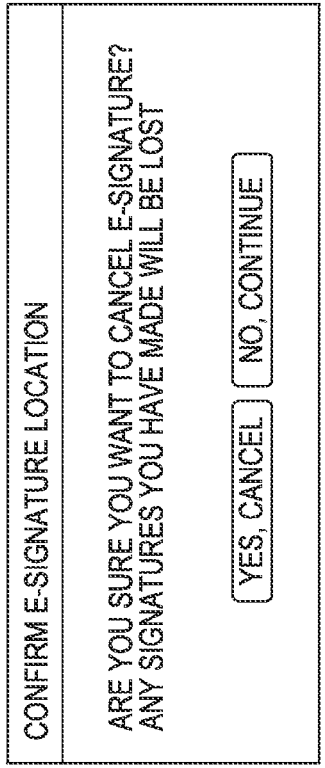

FIG. 5A shows a user interface embodiment for turning on an e-signature process for an exchange. Note that a user may only be able to view the document, or portion of the document, for which the e-signature applies. For instance, through the viewer facility, non-applicable portions of the document may be blocked out in some way as described herein. FIG. 5B shows a toolbar for e-signature, where the user may click on an e-signature icon to initiate (or terminate) an e-signature process. FIG. 5C shows an embodiment of how a user may move around an e-signature by dragging the e-signature with the mouse. The user may be able to perform a number of document functions, such as find, zoom, rotate, page up-down, and the like. In embodiments, if any portion of the e-signature is moved by the user to a position that places it off the page, the signature function may be disabled (e.g. e-signature disappears) to avoid placement of the e-signature in a position that won't show the entire e-signature on the document once the process is complete. Once the user has placed the e-signature, they may apply the signature and complete the process. FIG. 5D shows an example confirmation dialog box for completion of the e-signature process, including a confirmation note to the user about the final placement of the e-signature, where the user may be allowed to return to placement of the e-signature if they are not satisfied. The user, once satisfied, may save the e-signature application and placement, such as illustrated in FIG. 5E. As shown in FIG. 5F, if there are unsaved changes at a time when the user attempt to close the application a prompt may appear notifying the user that there are unsaved changes and asking them if they want to save or close without saving. FIG. 5G shows an embodiment dialog box for cancelling an e-signature, showing control buttons for confirming whether to cancel or to continue.

In embodiments, a method for managing a networked secure collaborative computer data exchange environment may be provided, the method including establishing, by a secure exchange server controlled by an intermediate business entity, a client login data authentication procedure that allows at least one client computing device of a plurality of client computing devices operated by users of a plurality of business entities to access the secure exchange server, wherein communications between the secure exchange server and the plurality of client computing devices is through a communications network; storing, by the secure exchange server, at least one client login authentication data for each of the plurality of client computing devices; receiving content from a first of the plurality of client computing devices; by the secure exchange server, permitting access to the content for a subset of the plurality of computing devices through an exchange content access facility, wherein the exchange content access facility is managed by at least one business entity of the plurality of business entities; granting, by the exchange server, access to the content to a second of the plurality of client computing devices when the secure exchange server receives from the second of the plurality of client computing devices its client login authentication data provided that the second of the plurality of client computing devices is one of the subset of the plurality of computing devices; and providing an electronic signature facility for managing a process of signing the received content by at least one of the subset of the plurality of computing devices, wherein the electronic signature facility includes a signature viewer interface that restricts viewing of the content for signing.

In embodiments, access to the exchange server by client processors may be through a host server controlled by the business entity that controls the client processor. The client computing devices may be at least one of owned and managed by at least one of the plurality of business entities. The client computing devices may be owned by individual users. The secure exchange server may be at least one of a plurality of exchange servers. The content may be at least one of a document, a spreadsheet, a message, data, an image, audio content, video content, multimedia content, and the like. The content may be transferred to the secure exchange server via encrypted data transmission.

In embodiments, the electronic signature facility may include an electronic signature graphical user interface for presenting the content for signing. The restricted viewing may be a signing user being restricted to only those portions of the content that the signing user is authorized to view. The restricted viewing may be a signing user being restricted to only those portions of the content for which the signing applies.

In embodiments, a method for managing a networked secure collaborative computer data exchange environment may be provided, establishing, by a secure exchange server controlled by an intermediate business entity, an authentication procedure for a client login authentication data that allows at least one of a plurality of user client computing devices operated by users of at least two business entities to access the at least one secure exchange server, wherein communications between the secure exchange server and the plurality of user client computing devices is through a communications network; storing, by the secure exchange server, the at least one client login authentication data for each of the plurality of client computing devices; receiving, from a first of the plurality of user client computing devices, content; associating access, by the secure exchange server, to the content to a subset of the plurality of user computing devices through an exchange content access facility, the exchange content access facility managed by at least one of the plurality of business entities; granting, by the exchange server, access to the content of the secure exchange server to a second of the plurality of user client computing devices when the secure exchange server receives a client login authentication data from the second of the plurality of user client computing devices and dependent upon the second of the plurality of user client computing devices being one of the subset of the plurality of user client computing devices; and providing an electronic signature facility for managing a process of signing the received content by at least one of the subset of the plurality of computing devices, wherein the electronic signature facility verifies the identity of the signing user through biometric profiling utilizing previously stored biometric data from the signing user.

In embodiments, a method for managing a networked secure collaborative computer data exchange environment may be provided, establishing, by a secure exchange server controlled by an intermediate business entity, an authentication procedure for a client login authentication data that allows at least one of a plurality of user client computing devices operated by users of at least two business entities to access the at least one secure exchange server, wherein communications between the secure exchange server and the plurality of user client computing devices is through a communications network; storing, by the secure exchange server, the at least one client login authentication data for each of the plurality of client computing devices; receiving, from a first of the plurality of user client computing devices, content; associating access, by the secure exchange server, to the content to a subset of the plurality of user computing devices through an exchange content access facility, the exchange content access facility managed by at least one of the plurality of business entities; granting, by the exchange server, access to the content of the secure exchange server to a second of the plurality of user client computing devices when the secure exchange server receives a client login authentication data from the second of the plurality of user client computing devices and dependent upon the second of the plurality of user client computing devices being one of the subset of the plurality of user client computing devices; and providing an electronic signature facility for managing a process of signing the received content by at least one of the subset of the plurality of computing devices, the electronic signature facility assembling an electronically signed document including signatures from a plurality of users, each of which has had access to only a subset of the content for which they were the signatory.

In embodiments, a method for managing a networked secure collaborative computer data exchange environment may be provided, establishing, by a secure exchange server controlled by an intermediate business entity, an authentication procedure for a client login authentication data that allows at least one of a plurality of user client computing devices operated by users of at least two business entities to access the at least one secure exchange server, wherein communications between the secure exchange server and the plurality of user client computing devices is through a communications network; storing, by the secure exchange server, the at least one client login authentication data for each of the plurality of client computing devices; receiving, from a first of the plurality of user client computing devices, content; associating access, by the secure exchange server, to the content to a subset of the plurality of user computing devices through an exchange content access facility, the exchange content access facility managed by at least one of the plurality of business entities; granting, by the exchange server, access to the content of the secure exchange server to a second of the plurality of user client computing devices when the secure exchange server receives a client login authentication data from the second of the plurality of user client computing devices and dependent upon the second of the plurality of user client computing devices being one of the subset of the plurality of user client computing devices; and providing an electronic signature facility for managing a process of signing the received content by at least one of the subset of the plurality of computing devices, wherein the electronic signature facility provides for secure viewing of the content as presented to a signing user through a computer display of the signing user's client computing device, wherein the user's client computing device includes an integrated camera for viewing the environment around the signing user and a face detection facility for recognizing the signing user, detecting if the signing user is the only individual present in the viewed environment, and if not, obfuscates the viewing of the content. The obfuscation may be blanking the screen, distorting the viewing of the content, and the like. The detection of the signing user by the face detection facility may be accomplished by comparing an image of a previously stored facial image of the signing user to the face detected in the viewed environment.

Figure 6:
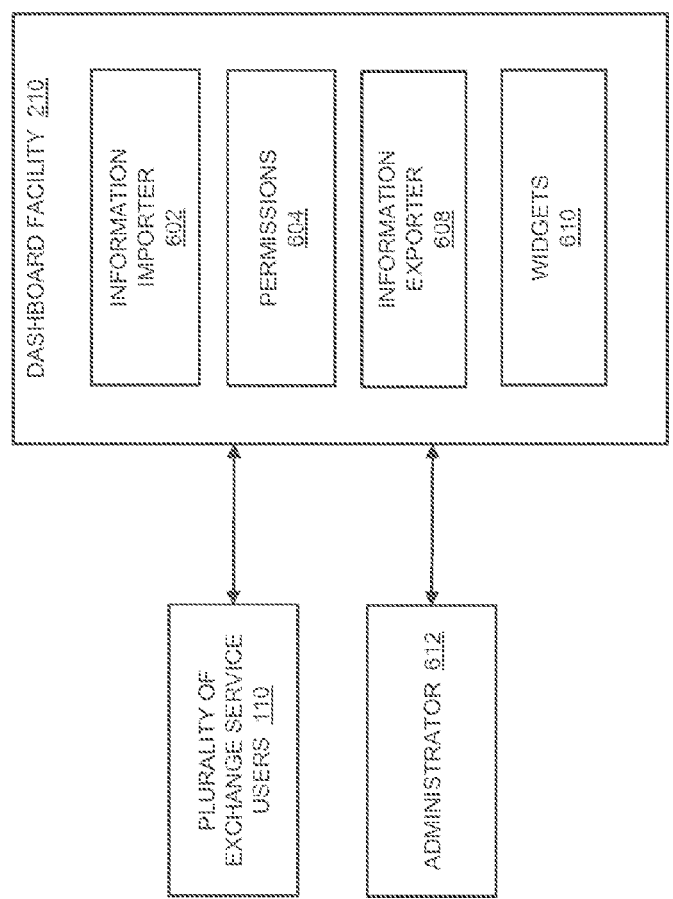
FIG. 6 depicts a functional block diagram for the dashboard facility in an embodiment of the present invention.

Referring to FIG. 6, the dashboard facility 210 may provide organized facilities for managing exchanges amongst the plurality of exchange service users 110, disseminate to users of multiple groups of users, separating exchange environments, and the like. For example, for a corporate M&A or private equity group, the dashboard may provide users with the ability to take their information, create a profile and expose the information to other parties (e.g., to private equity investors showing performance of their individual funds). The dashboard may present information in an organized manner, allow for loading of information through an information importer 602, provide permissions 604 to view information, allow for the exporting of information through an information exporter 608, and the like. The dashboard facility may provide for user access and display of both structured and unstructured data, access to views that provide a custom format or familiar terms to a particular category of transaction client (e.g., fund, investment documents, capital account statement, investment team), and the like, which also may restrict a user's view to content applicable to them or to the targeted category of transaction. In a private equity example, the user may configure the dashboard to their specific needs, such as including useful widgets 610 to display, information relating to the market (e.g. available funds). A funds widget may provide for selection of a fund, providing overview and performance information, and the like. There may also be sub-widgets that provide further functionality to a widget. The user may also have multiple dashboards, such as for different exchanges, different markets, different deals, and the like. One dashboard may handle information that is available to other users, and another dashboard may handle all personal files that are both available and unavailable to other users. The dashboard facility may also provide a compliance feature, such as to track changes made in each dashboard.

In an example of setting up a file exchange, an administrator 612 user may place files within an input file directory, where the files may have a nomenclature that tells what widget they will populate. The system may create a configuration, run a process to populate it, ensure it is correct before allowing access, and the like. In this way, data may be considered 'stage data' prior to allowing access, and 'production data' once approved. Once the user is comfortable with a view, they can proceed and publish the staged data into 'production'. The system may be able to upload data as CSV file, create permissions files, and the like. In embodiments, a specific user might be provided a view within a dashboard but be given only access to one or more records within the dashboard. For example, the user might only see a particular fund, rather than all funds. If they select that fund, they may be able to see child data associated with that fund. But without permission, the other funds (or child data) would not be displayed. A permissions model may give users access to specific records within the dashboard. In an M&A example, a user may be able to see all the live deals an organization is managing, a certain human resources team might be allowed to see the dashboard, and the like, where specific entities are provided permissions.

The dashboard may have both optional and standard functionality, such as standard filtering options, converting documents to a PDF format, and the like. There may be a widget catalog provided, such as for textual displays, graphs and charts, document tracking, and the like.

The dashboard may enable management of files at a document level, at a record level, and the like, such as to allow a user to add records and manage information. A user may be able to add new content, put in the required information, refresh the screen (e.g., on a per-deal basis), and the like. The user may be able to edit and delete existing records, show a parent-child relationship, and the like. The user might want to choose the parent and find the document within the exchange and link it up to the parent document. The system may have the ability to manage individual records, such as for dashboard data, but also to permissions. The user may be able to take a parent record and provide permission to one of the many users to enable access to those parents. In embodiments, the system may provide for an auditing facility, such as for tracking who is adding records and permissions.

Figure 6B:
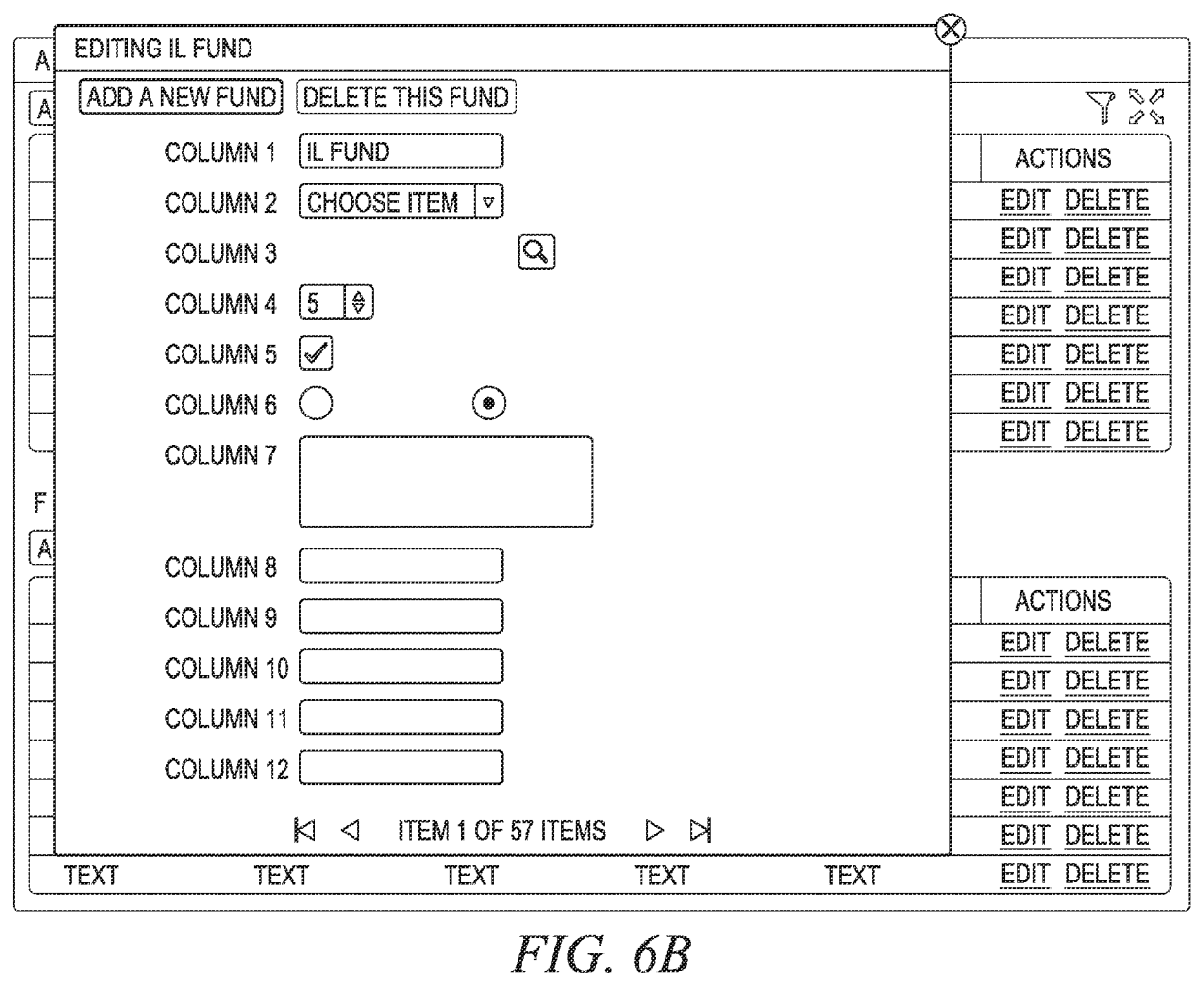
Figure 6C:
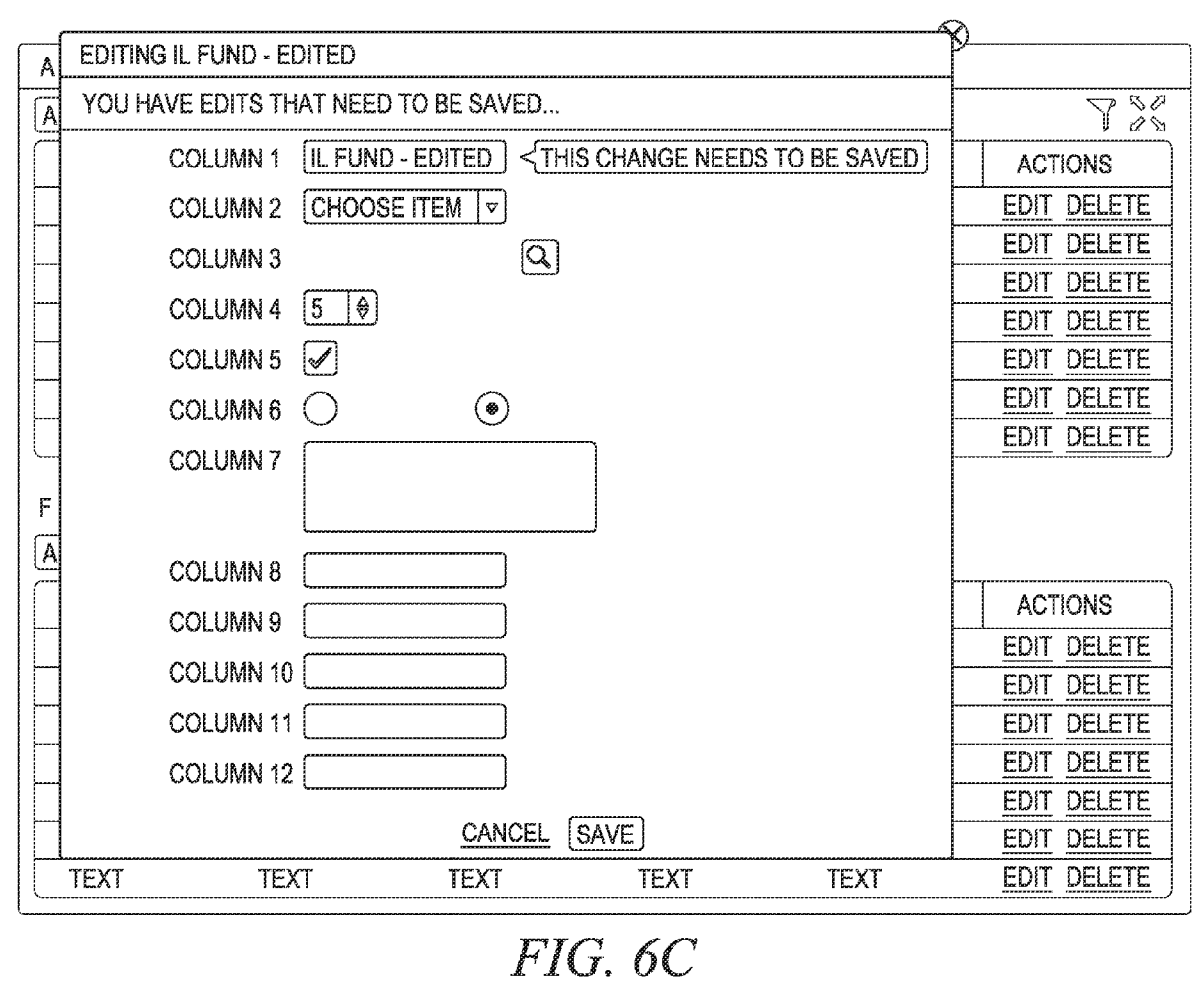
Figure 6D:
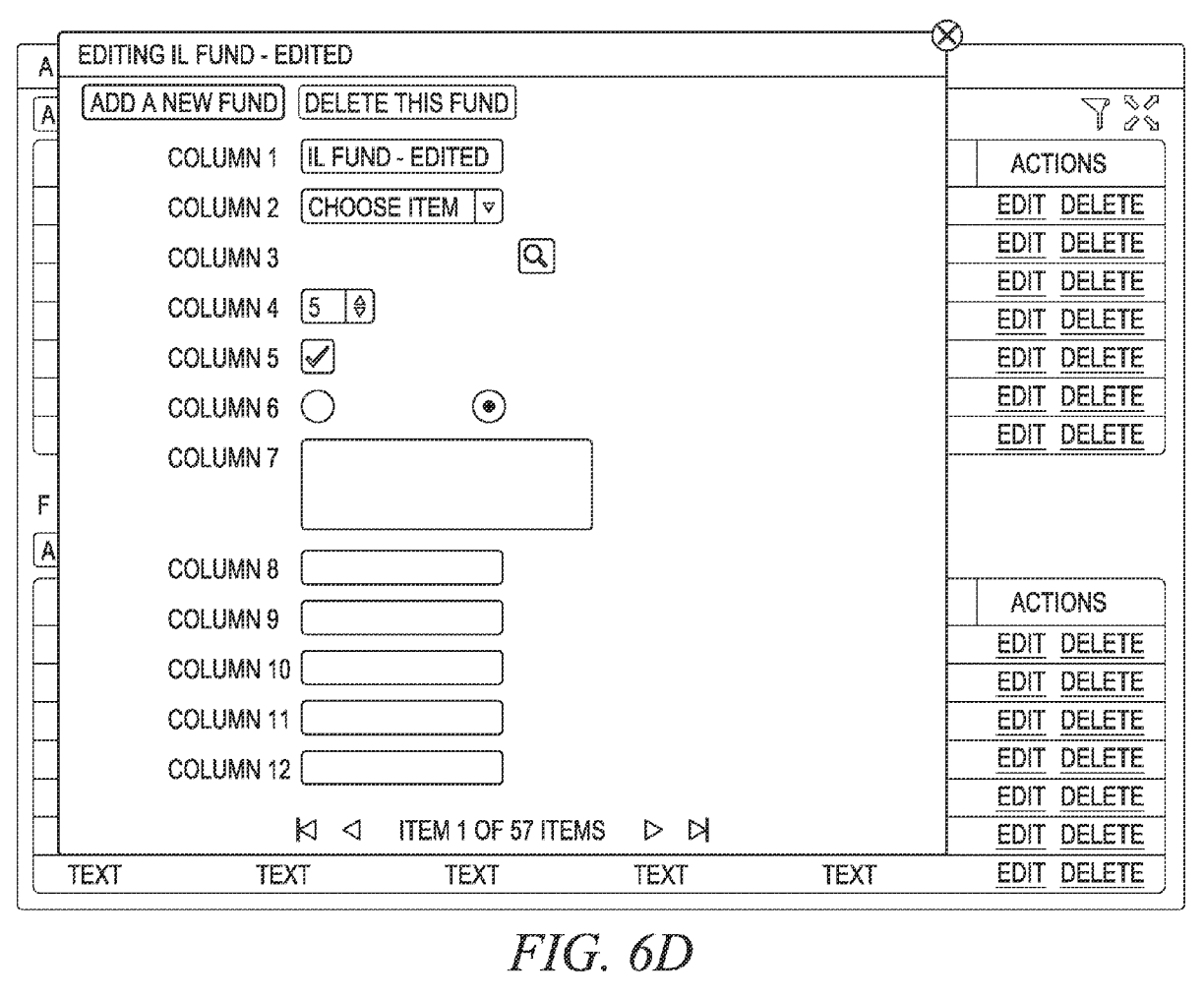
Figure 6G:
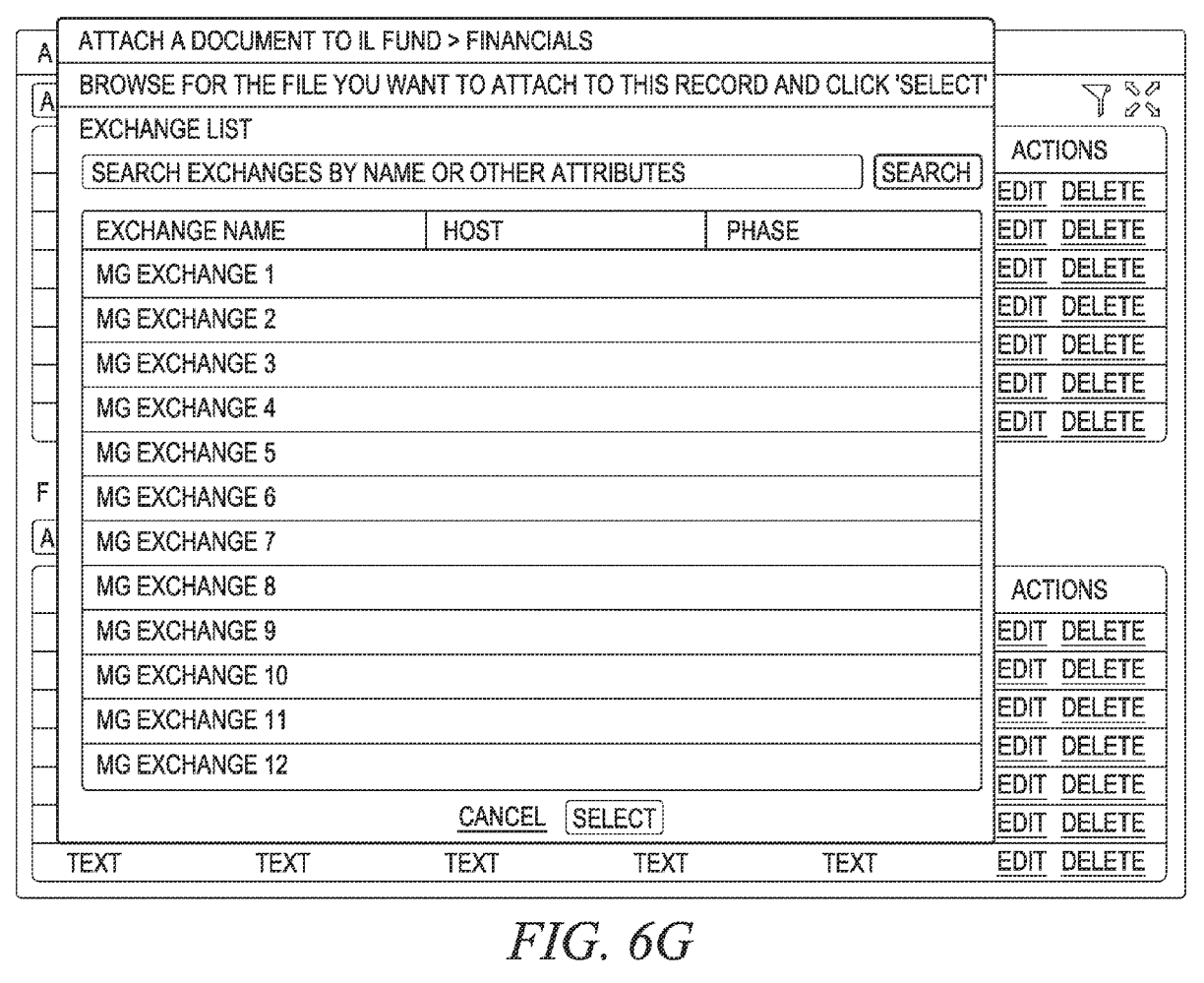
Figure 6H:
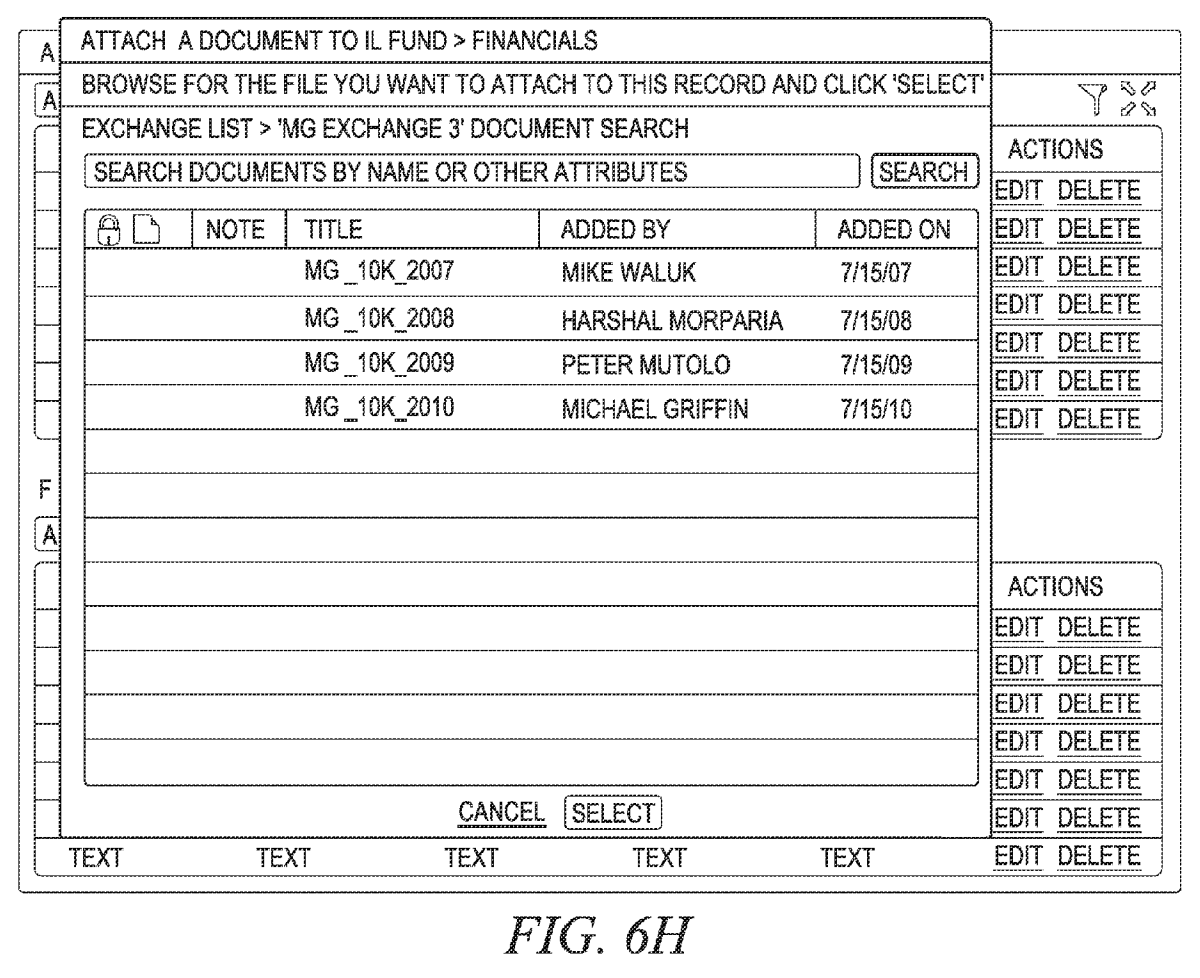

Referring to FIG. 6A, an example layout for listing available funds and fund information is shown, providing a plurality of columns for content. FIGS. 6B-6D illustrate editing the example fund, such as editing specific column content. FIG. 6E shows an alert for a condition under which the user cannot save edits, such because the user no longer has the latest version of the data (e.g. with new data was uploaded or another user edited the content since the time the dashboard was opened). In this instance, a control button may be provided to update the dashboard data. FIG. 6F shows an example dialog box for creating a new fund in the example layout. FIGS. 6G-6H shows dialog boxes for attaching a document. FIGS. 6I-6K show a user interface for providing permissions in association with the example fund, including providing an ID of the user wanting to change permissions.

Figure 7:
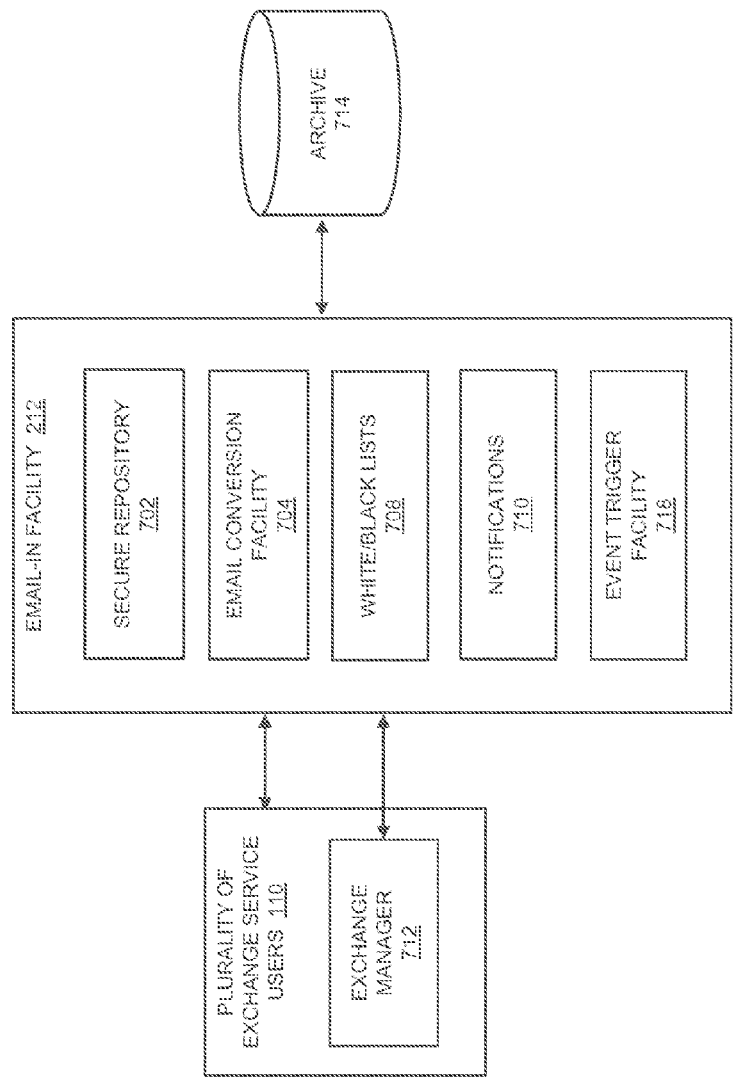
FIG. 7 depicts a functional block diagram for the email-in facility in an embodiment of the present invention.

Referring to FIG. 7, the Email-in facility 212 may provide for the ability to add content to an exchange using regular email, such as sent to a designated email address. This facility may be especially important with respect to users that circulate critical information and documents via email, and where there is a tendency to lose track of it at some point. Users may use the system's email-in facility to store email in a secure repository 702, and to be able to tell people to send email to this repository as part of a regular business process. The exchange manager 712 may then review and process the information further. This may simplify the learning curve of using any web application. If the manager is very knowledgeable, he may not need all of the counterparties to spend time learning the application. They simply send the content into an exchange. Other features may include an email address being associated with a folder in an exchange, a maximum number of allowed emails in an exchange (e.g. a user may define a cap), an email conversion facility 704, a white-list and black-list 708 of users, notifications 710 of success and/or error, and the like. In embodiments, email-in may be limited to authorized users only, such as already in the exchange, listed on a white list, and the like.

Use cases for email-in may include submission of analysis documents for review, a method for having a third party review applications (e.g. in order to create accounts while ensuring the third party does not gain control over attachments that contain private information), and the like. In addition, the system may provide for folder permissions in the email folder that can be used to prevent misuse. For compliance, the user may be able to store communications in an archive 714 and track what was done in association with the communications.

In embodiments, any exchange may be set up with email-in as a feature. An administrator or client may go through the process, such as defining where the sender's email address is stored in the system, using custom fields for the 'from' field, storing the message as an email, cap the maximum emails it can accept, choosing the folder it will be associated with, and the like. A folder location may thus be mapped to an email address (e.g., with the domain predefined but the pre-fix available for end user definition). The user may select users to be included for the feature, set alert settings and notification settings (e.g. problem alerts, that something was added), and the like. A white list may be included, such as for who should be able to send emails into the exchange (e.g. could be domains or even addresses). If a user is not on the white list, they may not be able to send emails to the exchange. A black list may be included, where a user may choose users to refuse acceptance onto the exchange.

The email-in facility may create a folder structure within a pre-defined mapped folder, and create a sub-folder for each email that is sent into the exchange, such as with the subject as the title of that folder. Contents of the folders may then include any attached documents. The email-in content may be organized like any exchange, where new emails are added as they come in. The system may be configured to send to a group, or to only one. For instance, a user may send the folder to one person to review but not give the recipient the right to do resend, print, or save the document. Permission may be applied to the documents like any other document as described herein, such as who can review the correspondence, who can modify it, save it, print it, and the like. In embodiments, an event trigger facility 718 may be provided where received email may trigger an event, such as a task, a process, and the like. For instance, if a contract comes in it may trigger a renewal process. In another instance, an amendment process may be triggered with the reception of an email.

Figure 7A:
Figure 7B:
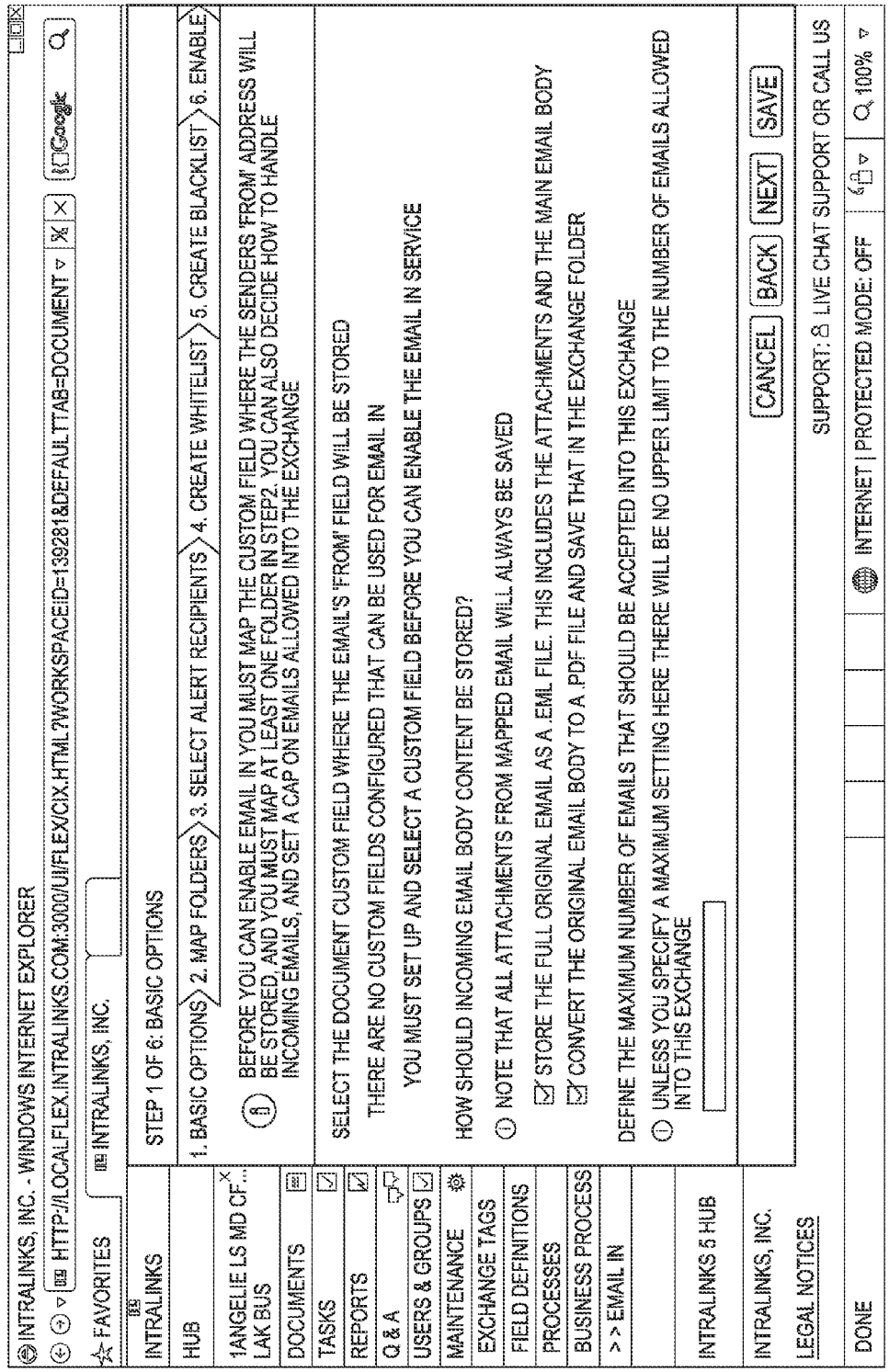
Figure 7C:
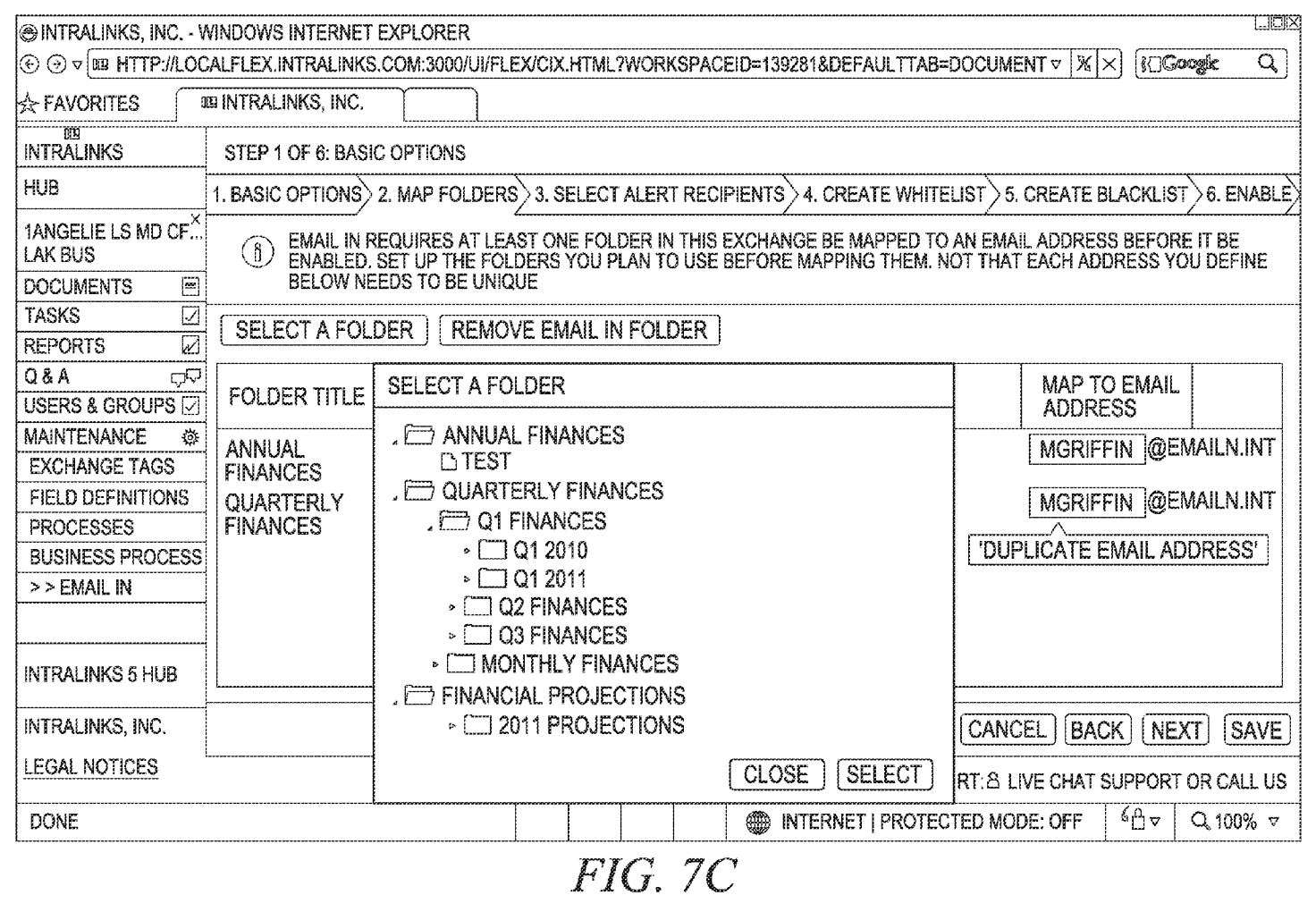
Figure 7D:
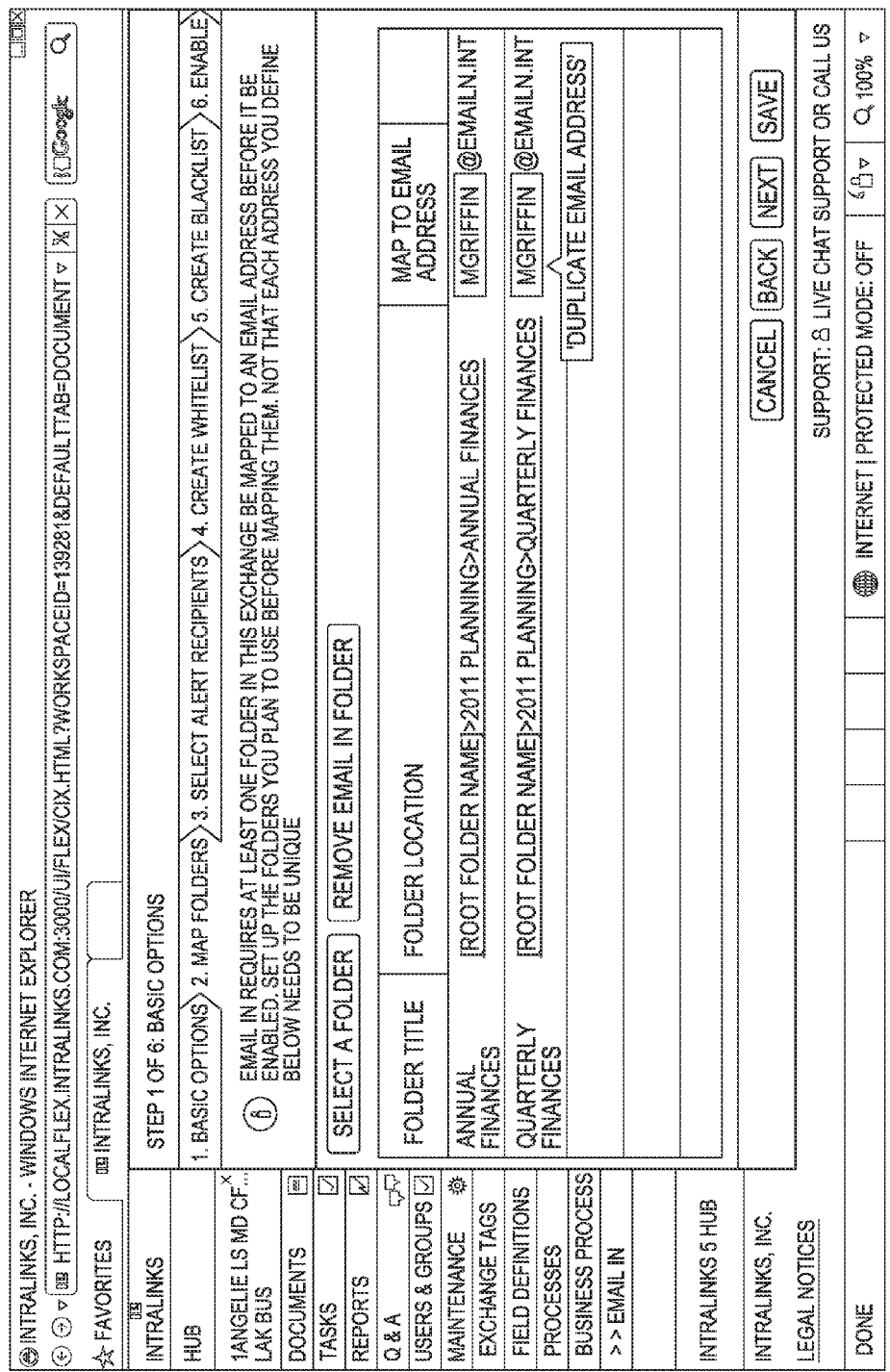
Figure 7E:
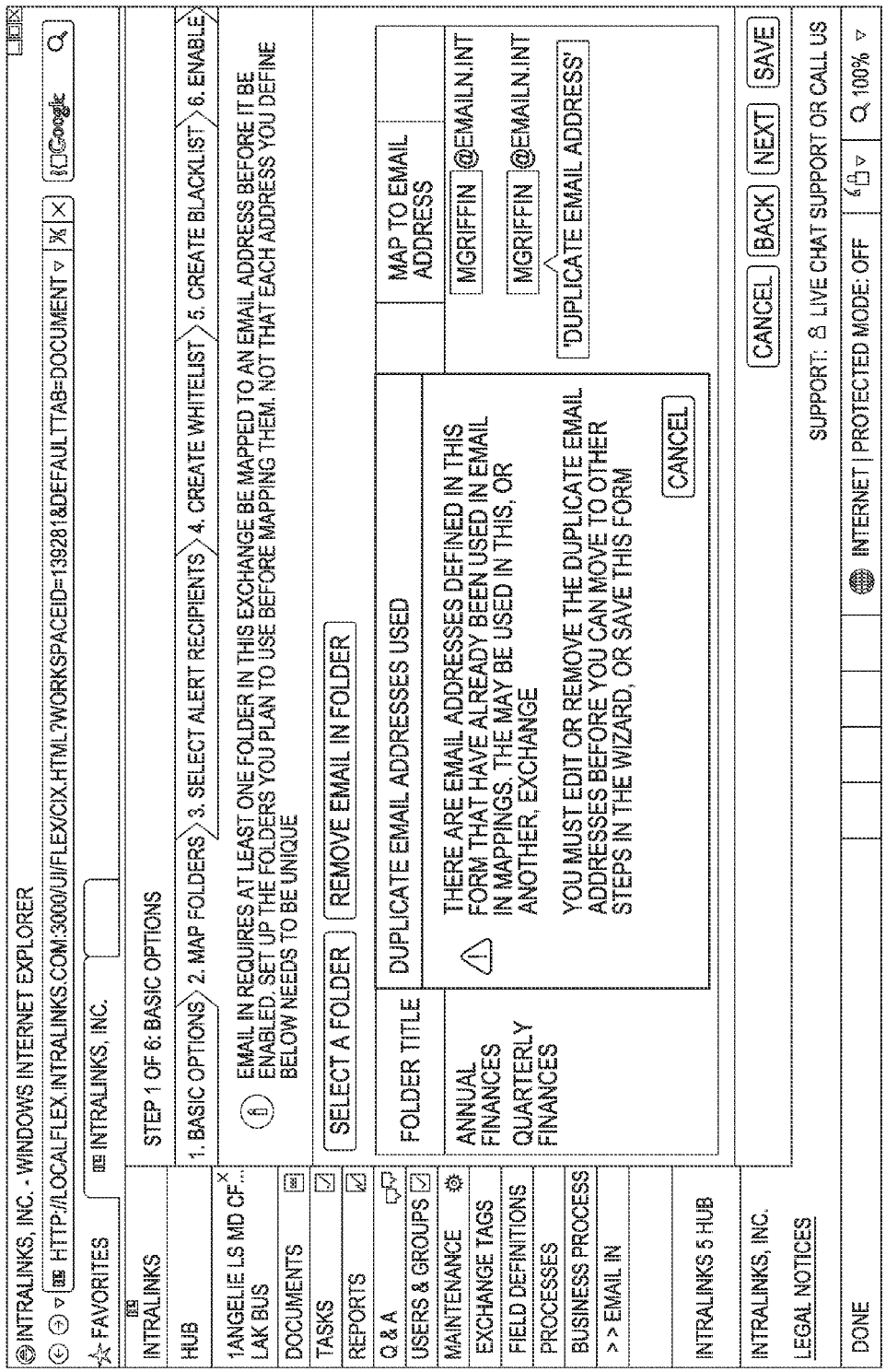
Figure 7F:
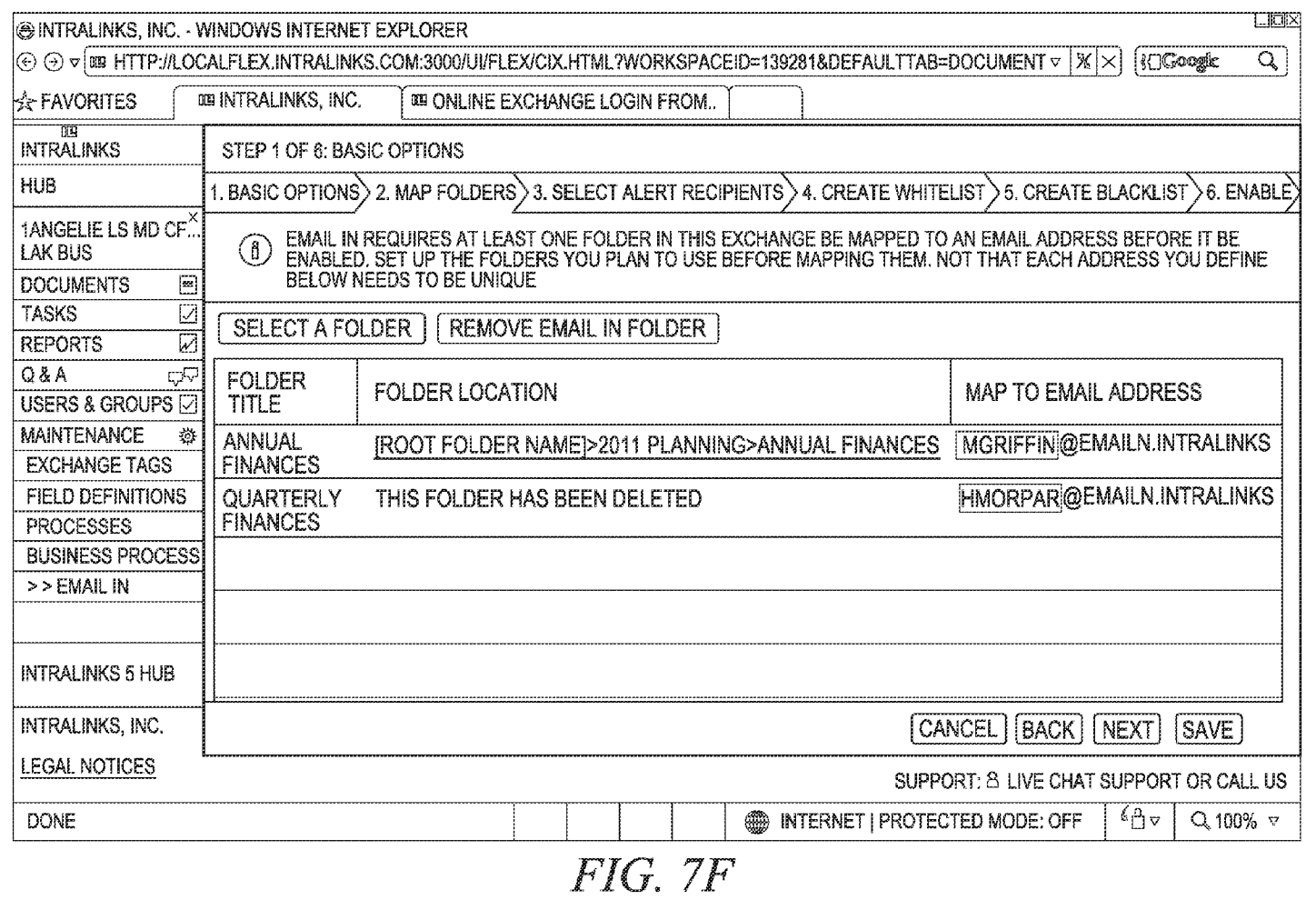
Figure 7G:
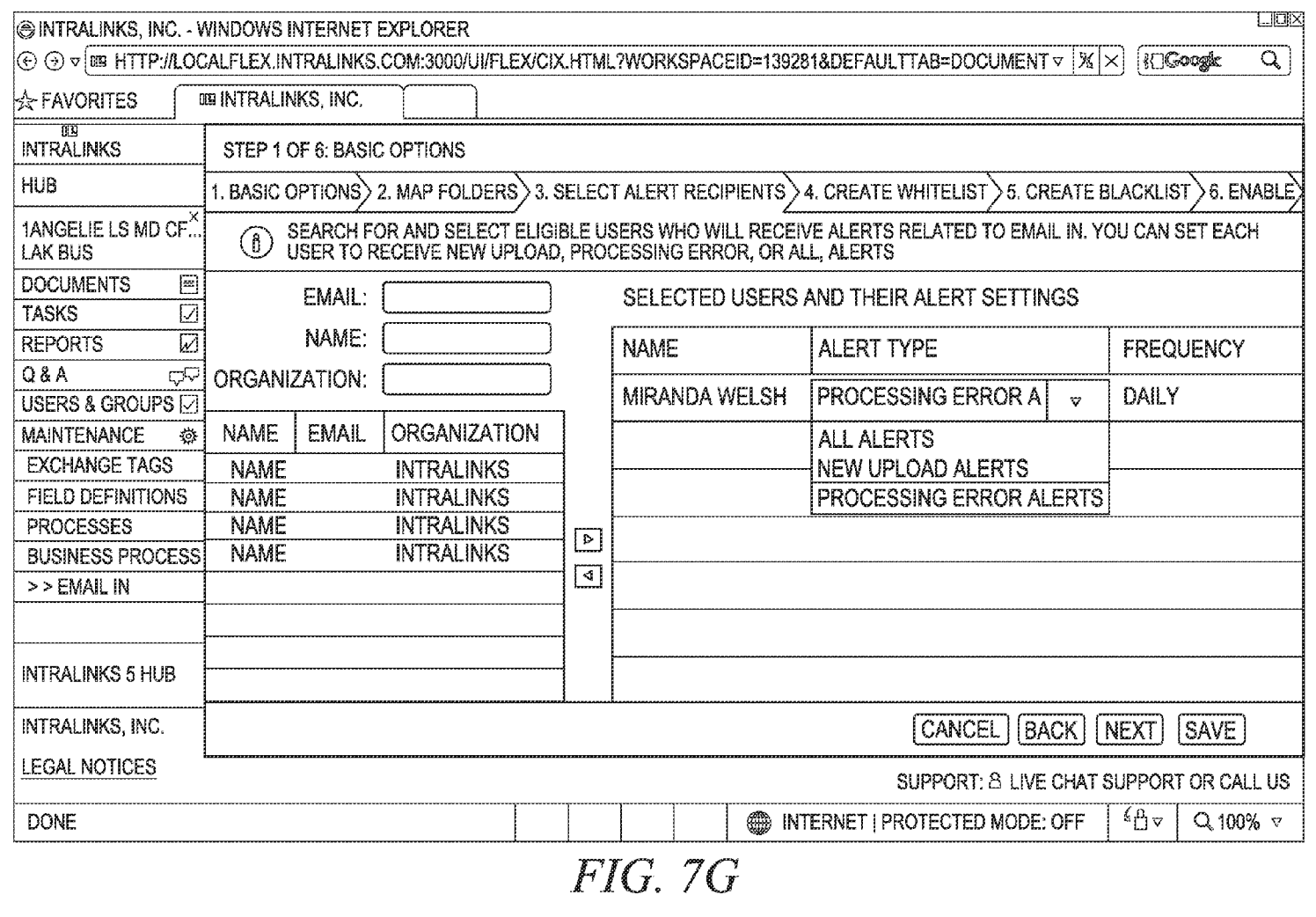
Figure 7H:
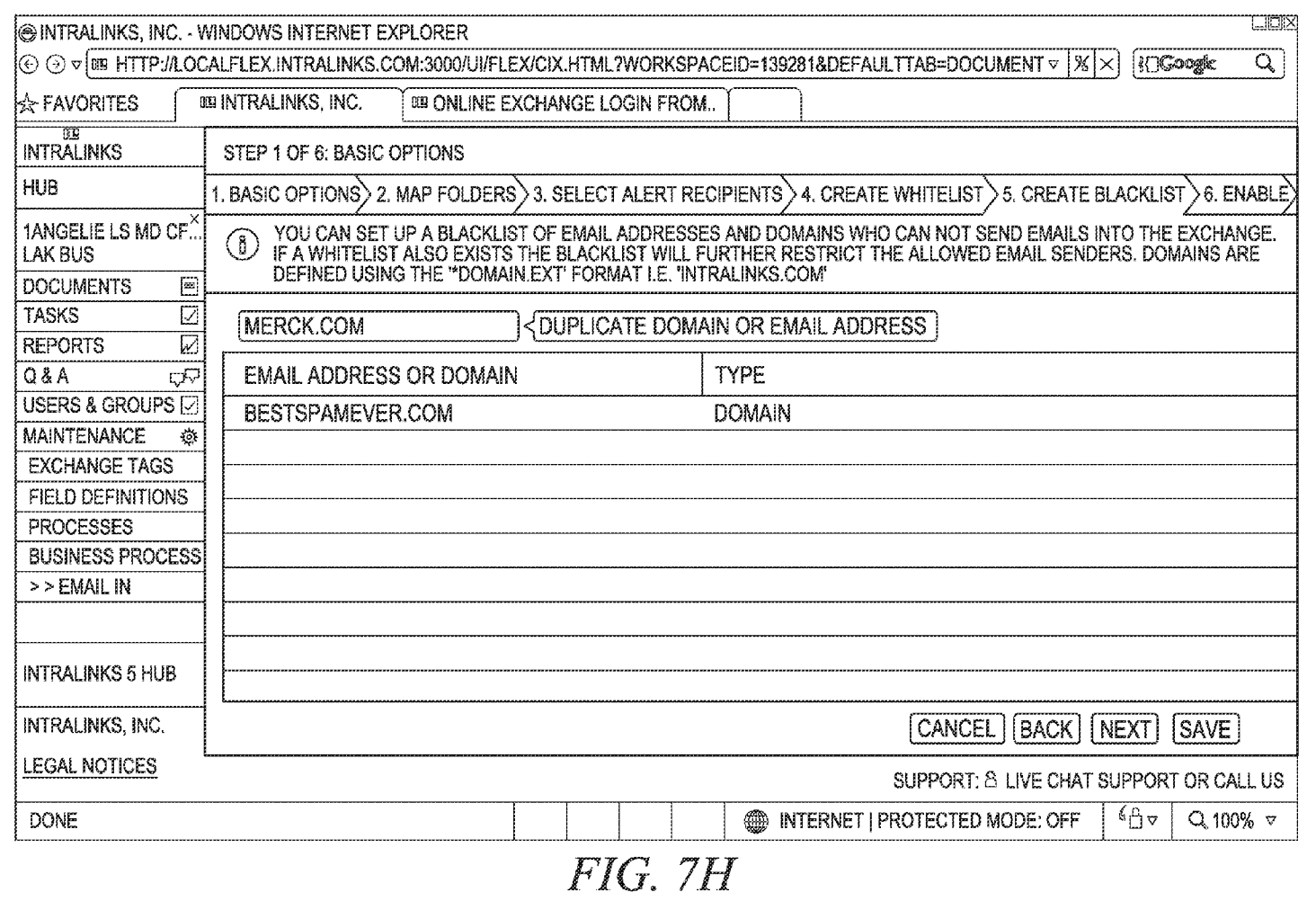
Figure 7I:
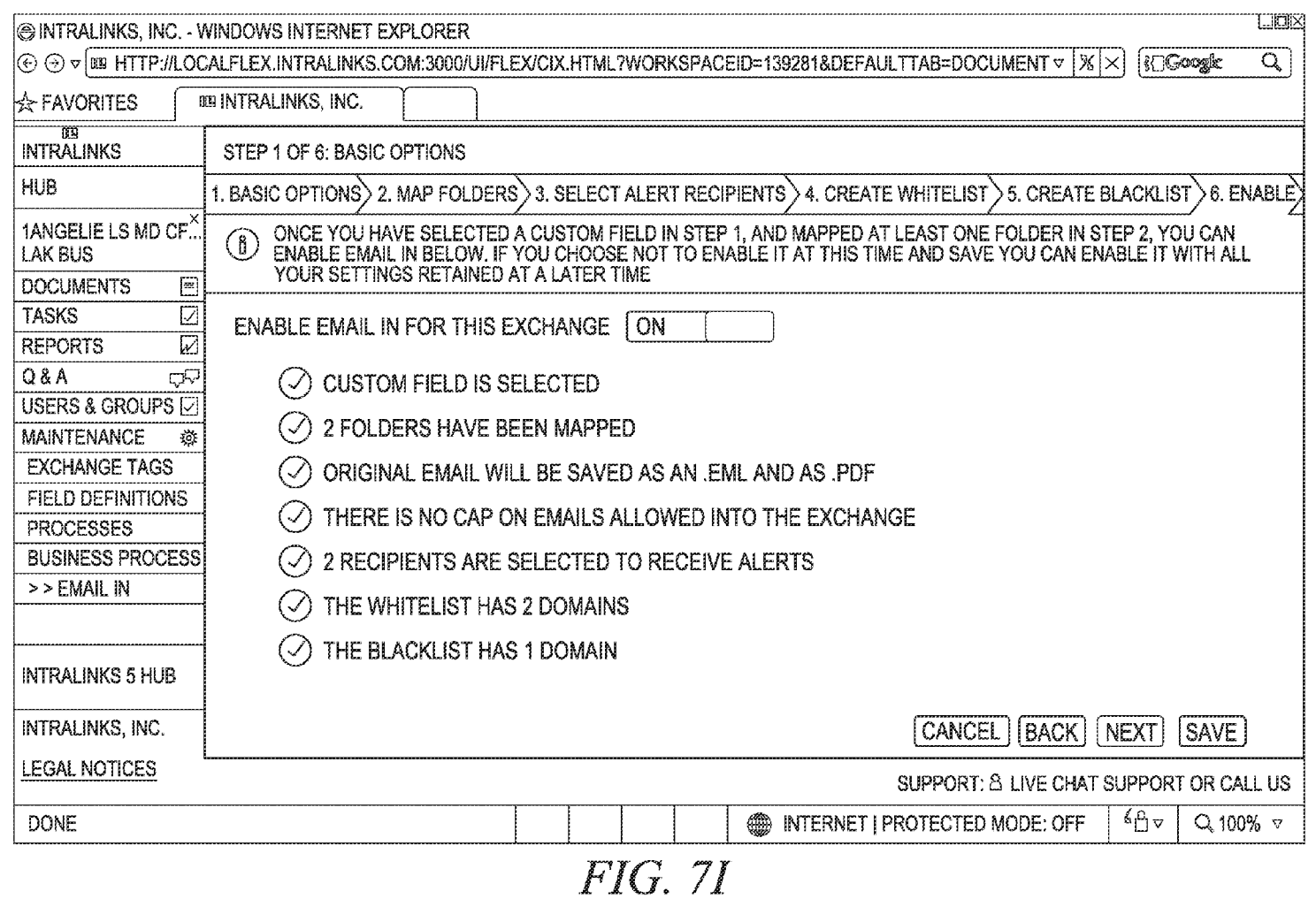
Figure 7J:
Figure 7K:
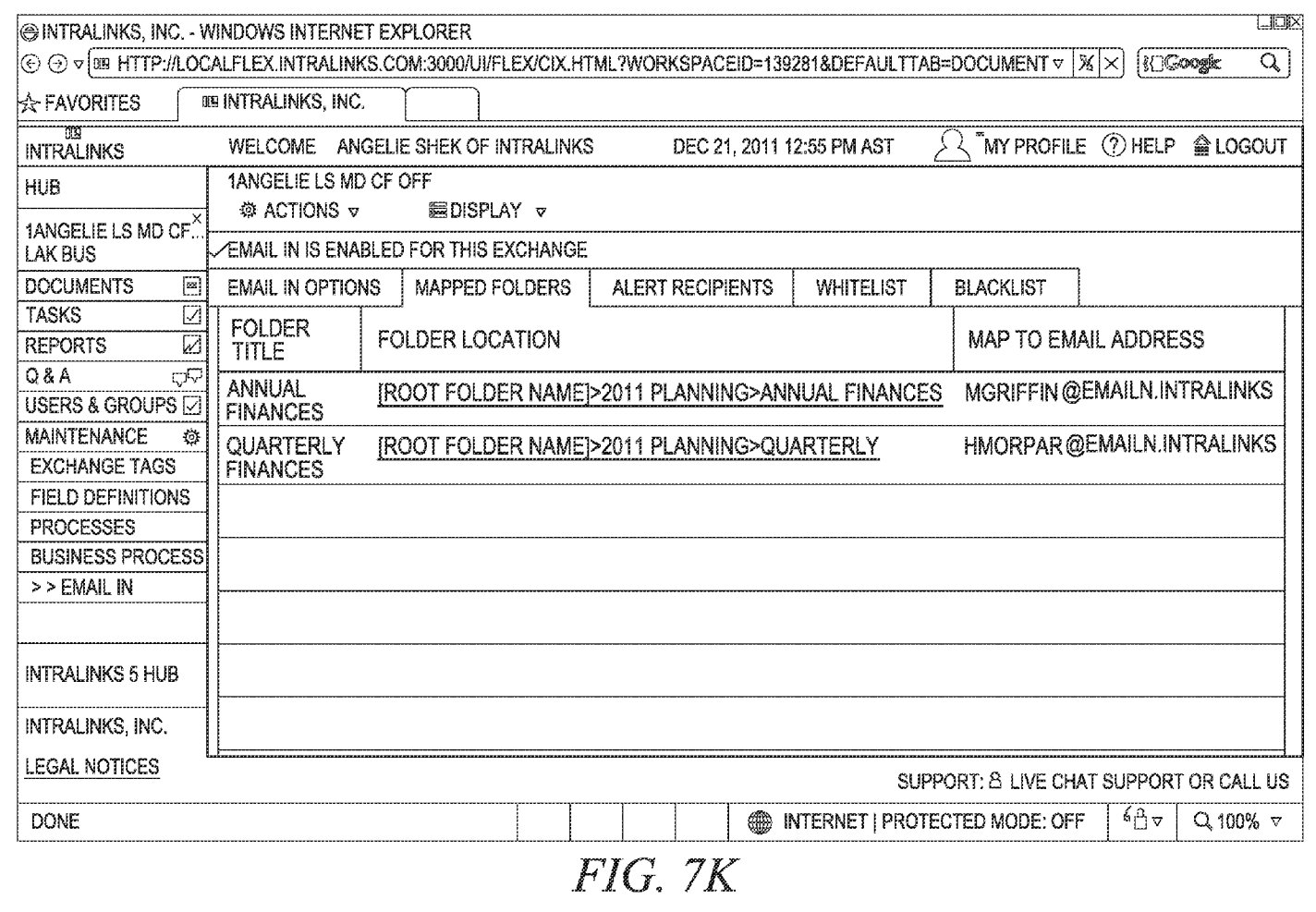
Figure 7L:
Figure 7M:
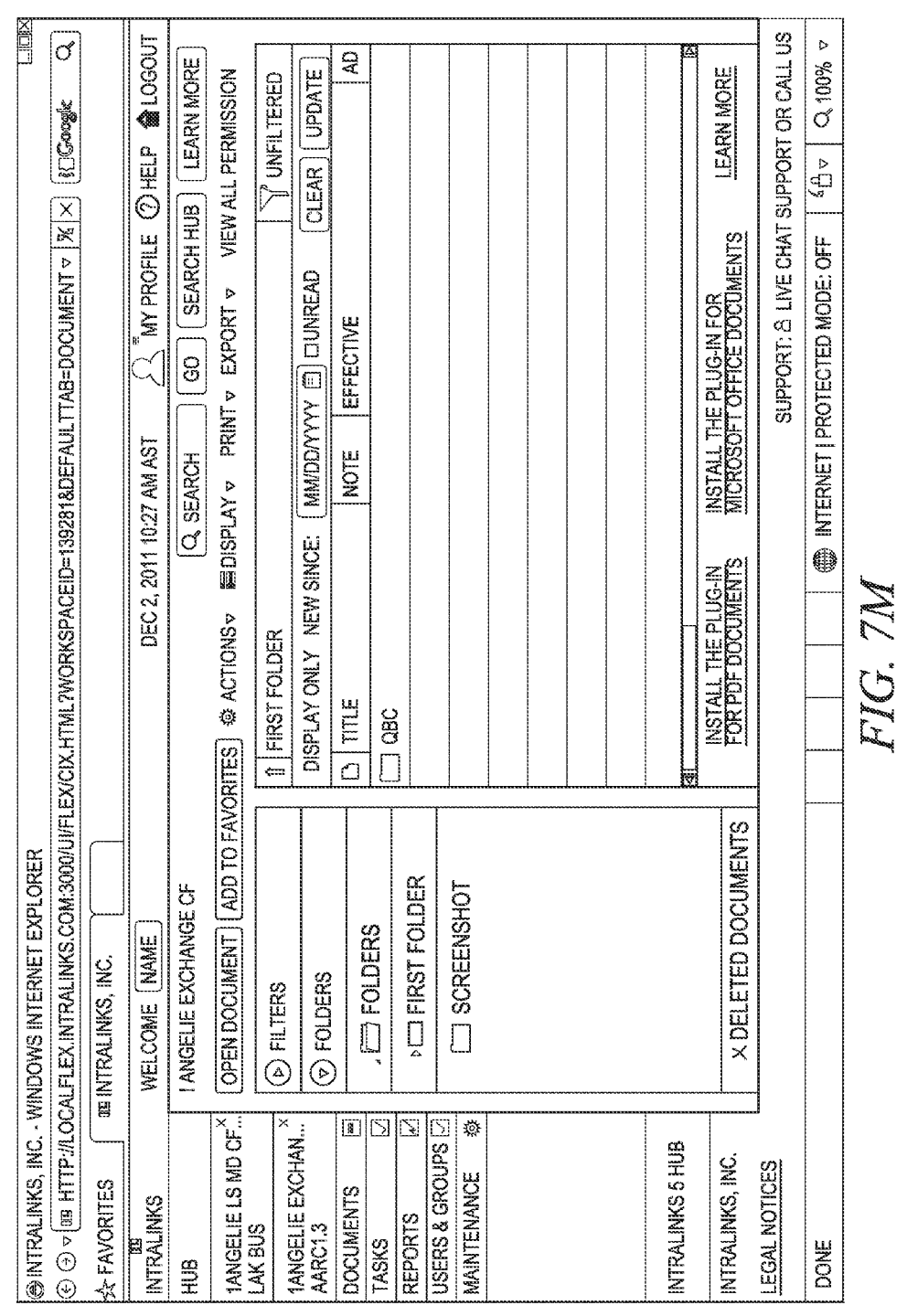

In embodiments, the email-in facility may include the collection of emails from various parties into a structured database for later management and processing by a critical information exchange manager, eliminate the learning curve of using a web application to upload document to the cloud, allow specific internal-external parties to post documents into a web folder that may be shared with predefined individuals at various control levels, and the like. Components may include an email address associated with a folder in an exchange, a maximum number of allowed emails in an exchange, a definition of email conversion options, a white list, a black list, notifications on success and/or error, and the like. In an example, client or prospect requests may be processed, such as for an investment firm with a need to submit documents for analysis, a bank looking for a way to have a third part review applications to create new accounts while ensuring that the third party does not gain control over the attachments that contain private information, a bank having compliance needs such as needing to archive all communications they have (e.g. cc'ing and replying to the system on all correspondences), and the like. FIG. 7A shows an introduction to email-in to the user, and a control button to begin the process. In embodiments, there may be a number of steps/options in the execution of email-in, such as choosing basic options, mapping folders, selecting alert recipients, creation of a white list, creation of a black list, enabling-disabling of the system, and the like. FIG. 7B shows an example dialog box for selection of basic options, including a custom field selection for the 'from' of an email, how incoming email body content be stored, definitions for the maximum number of emails that should be accepted into the exchange, and the like. FIGS. 7C-7F shows a dialog boxes for selection of a folder in association with mapping folders, with FIG. 7E showing an alert for when a duplicate email address is used. FIG. 7G illustrates the selection of users and their alert settings. FIG. 7H shows an embodiment warning for a duplicate domain or email address associated with the creation of a blacklist. FIG. 7I shows a possible checklist in association with the enabling of the system, such as shown in the figure for selection of a custom field, mapping to two folders, folders for mapping email into, no maximum specified for number of emails, two domains listed on a white list, and one domain listed on a black list. FIG. 7J shows a user interface presented to the user once email-in is enabled, showing tabs for listing options, mapped folders, alert recipients, white lists, black lists, and the like, and showing specifically the email-in options. FIGS. 7K-7M show examples of the content and dialog boxes provided in association with the mapped folders tab.

In embodiments, a method for managing a networked secure collaborative computer data exchange environment may be provided, the method including establishing, by a secure exchange server controlled by an intermediate business entity, a client login data authentication procedure that allows at least one client computing device of a plurality of client computing devices operated by users of a plurality of business entities to access the secure exchange server, wherein communications between the secure exchange server and the plurality of client computing devices is through a communications network; storing, by the secure exchange server, at least one client login authentication data for each of the plurality of client computing devices; receiving content from a first of the plurality of client computing devices; by the secure exchange server, permitting access to the content for a subset of the plurality of computing devices through an exchange content access facility, wherein the exchange content access facility is managed by at least one business entity of the plurality of business entities; granting, by the exchange server, access to the content to a second of the plurality of client computing devices when the secure exchange server receives from the second of the plurality of client computing devices its client login authentication data provided that the second of the plurality of client computing devices is one of the subset of the plurality of computing devices; and providing a secure email input facility for accepting non-secure email from outside the exchange into the secure collaborative computer data exchange environment, wherein the non-secure email is received and stored as secure email in the secure exchange server.

In embodiments, access to the exchange server by client processors may be through a host server controlled by the business entity that controls the client processor. The client computing devices may be at least one of owned and managed by at least one of the plurality of business entities. The client computing devices may be owned by individual users. The secure exchange server may be at least one of a plurality of exchange servers. The content may be at least one of a document, a spreadsheet, a message, data, an image, audio content, video content, multimedia content, and the like. The content may be transferred to the secure exchange server via encrypted data transmission.

In embodiments, the acceptance of the non-secure email may be dependent upon a controlled listing stored in the secure exchange server, where the listing is a white listing specifying emails that are allowed, a black listing specifying email that are not allowed, and the like. The reception of a non-secure email may trigger an event, where the triggered event is the initiation of a content amendment process, the initiation of a new exchange, the distribution of the email within the exchange, storage of the email in a secure archive facility, and the like. The email may be automatically associated with an area of content on the exchange based on the sender of the email, the subject line of the email, the destination address of the email within the exchange and the content of the email, and the like.

Figure 8:
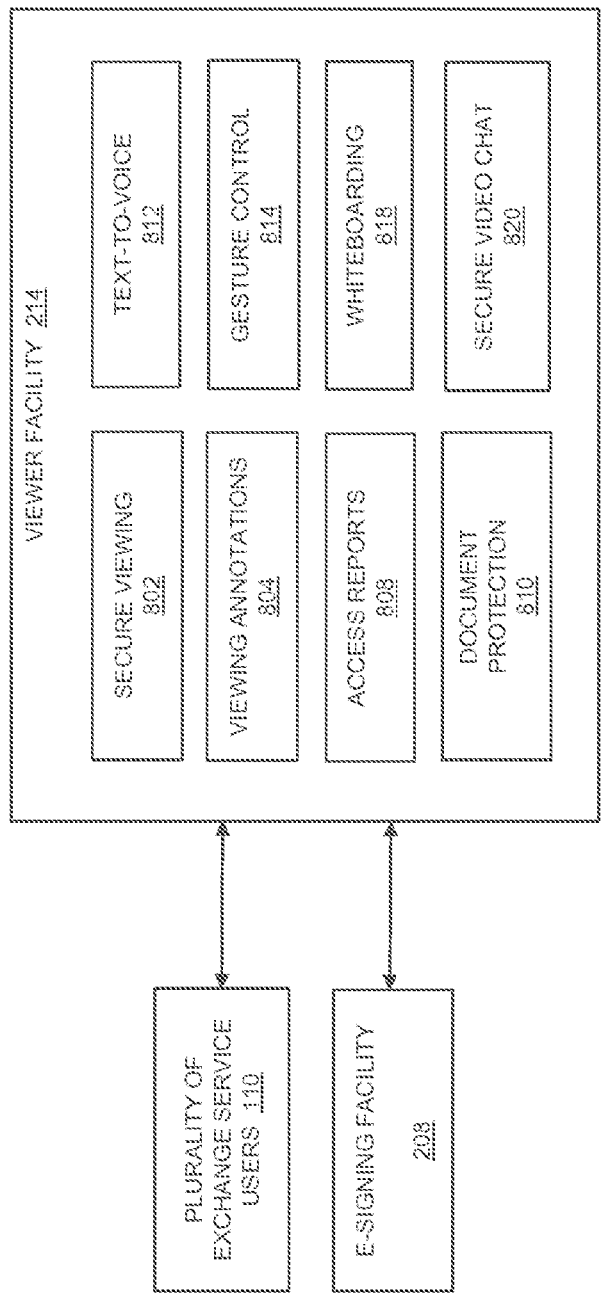
FIG. 8 depicts a functional block diagram for the viewer facility in an embodiment of the present invention.

Referring to FIG. 8, the viewer facility 214 may provide for a secure viewing 802 protection of documents from unauthorized viewing, printing, saving, and the like, such as without having to install custom client software (e.g. without installing anything beyond Adobe Flash). Documents in certain formats, such as Microsoft Office products, PDF documents, and the like, may be supported for protection. For example, for a PDF document a security warning may appear that a user is only allowed to view the document. However, if the user tries to print the screen, the screen may distort, such as transitioning to a fuzzy state. In embodiments, the user may need to hold the enter key down to make the document viewable. The user may be able to page up and down, rotate, zoom, and the like. The system may provide for watermarking the document so that if a user is permitted to print screen, the document will print with the watermarking. The viewer facility may also include functions such as viewing annotations 804 in the viewer, connectivity with the e-signing facility 208 (e.g. with a 'stamping' tool), document visibility based on face detection, document protection from eavesdroppers (e.g. automatic limitation of document viewing, also referred herein as spotlighting, based on detection of a second face), granular/page level document access reports 808, document protection 810 using facial recognition based encryption, text to voice feature 812 (e.g. such as in Apple® Siri), hand gesture based controls 814 (e.g.

scrolling control based on hand-fist movement), real-time white-boarding 818, secure video chat 820 (e.g. one-on-one, group), and the like. In embodiments, the viewer facility may include an audio comment component, such as to allow a user to input comments into the document through audio dictation, to have the viewer facility play back the comments in audio, to provide audio output for various aspects of the document, and the like.

In embodiments, the viewer may be able to detect faces and enhance security based on face detection, such as through utilization of a camera connected to or integrated with the computing device being used to view content. The viewer may also utilize a 'secure view', such as where only a portion of a document is made viewable by the person viewing the document. Secure view may implement security measures (e g blanking the screen, distorting the screen, putting up a screen) based on eye motion, movement of the face, the presence of a second face, and the like. Viewing time may be monitored and reported, audited, and the like, based on how long the user's face has looked at the document, where the monitoring, reporting, auditing, and the like may be provided automatically. Document encryption and decryption may be provided based on document permissions. For instance, if the document can only be opened by a specific number of people, face detection may use the author, or any other permissioned user's face to encrypt the document and require the same face to be detected to allow 'un-locking' of the document. Encryption of the face may then be 'recorded' and used as an electronic signature, thereby tying the face to the user's profile. Recording of viewing time may be on a document level, on a per page basis, and the like. For instance, a computing device being used for viewing a document may have a camera that views and detects the surrounding environment to determine how many people are currently viewing the screen, and if a condition exists where there is not only one person viewing the screen, the screen may obfuscate the document being viewed, such as blurring, blanking, screening, and the like. For example, if the computer device detects that no one is viewing or multiple people are viewing the screen, the screen may blank out the document. In another instance, the computing device may utilize a camera to match the face of the person viewing the screen with a stored image of the person that is authorized to access and view, and if the match is made, permitting the process of access and viewing to proceed. In another instance, a biometric match may be required to permit the process of viewing to proceed, such as through the use of a match to an iris as viewed through a camera, an e-fingerprint through a fingerprint pad for input to the computing device, or any other biometric verification method known to the art. In embodiments, conditions for enabling an access and viewing process to proceed may be stored in a user profile, where if the conditions (e.g. number of people viewing, authorization matching though images and/or biometrics) are not met, the document may be obfuscated, or access denied.

In embodiments, viewing statistics may be mined for business intelligence by sellers in a strategic transaction, such as through a CIO with an enterprise, a marketing analyst, or any such user who may benefit from knowing with content is being read and what content is not being read.

In embodiments, the viewer may provide a search facility to search within a document. The system may allow for highlighting a search result, highlighting a selected portion of the document, and the like. The system may provide facilities for annotating, marking, commenting, and the like, to a document, such as a private annotation for the user, a shared annotation for other users, and the like. The system may provide for a secure document view, where only some portions of the document are viewable. For instance, a user may only want to show another user a selected portion of a document. The secure document view may also allow a user to increase the size of the document view window, which may better ensure that people proximate to you only see the relevant portions of the document. Another feature of the secure document view may include distorting those portions of the document that are not selected for viewing, such as making those sections fuzzy. The secure document view may react to the eye movement of the user, such as scrolling the document as the user's eye gaze direction shifts, distorting or blocking the document from view if the user looks away from the viewer, and the like.

The viewing facility may have capabilities for dealing with certain document formats in a standard way. For instance, the system may automatically convert Microsoft Word and PowerPoint documents to a PDF format, open spreadsheets (e.g. Microsoft Excel) in a spreadsheet viewer, and the like. For instance, when an Excel document is opened, it may be rendered on the fly, decrypted on the fly as a user scrolls down, retrieved from the server and encrypted on the fly, and the like.

Figure 8A:
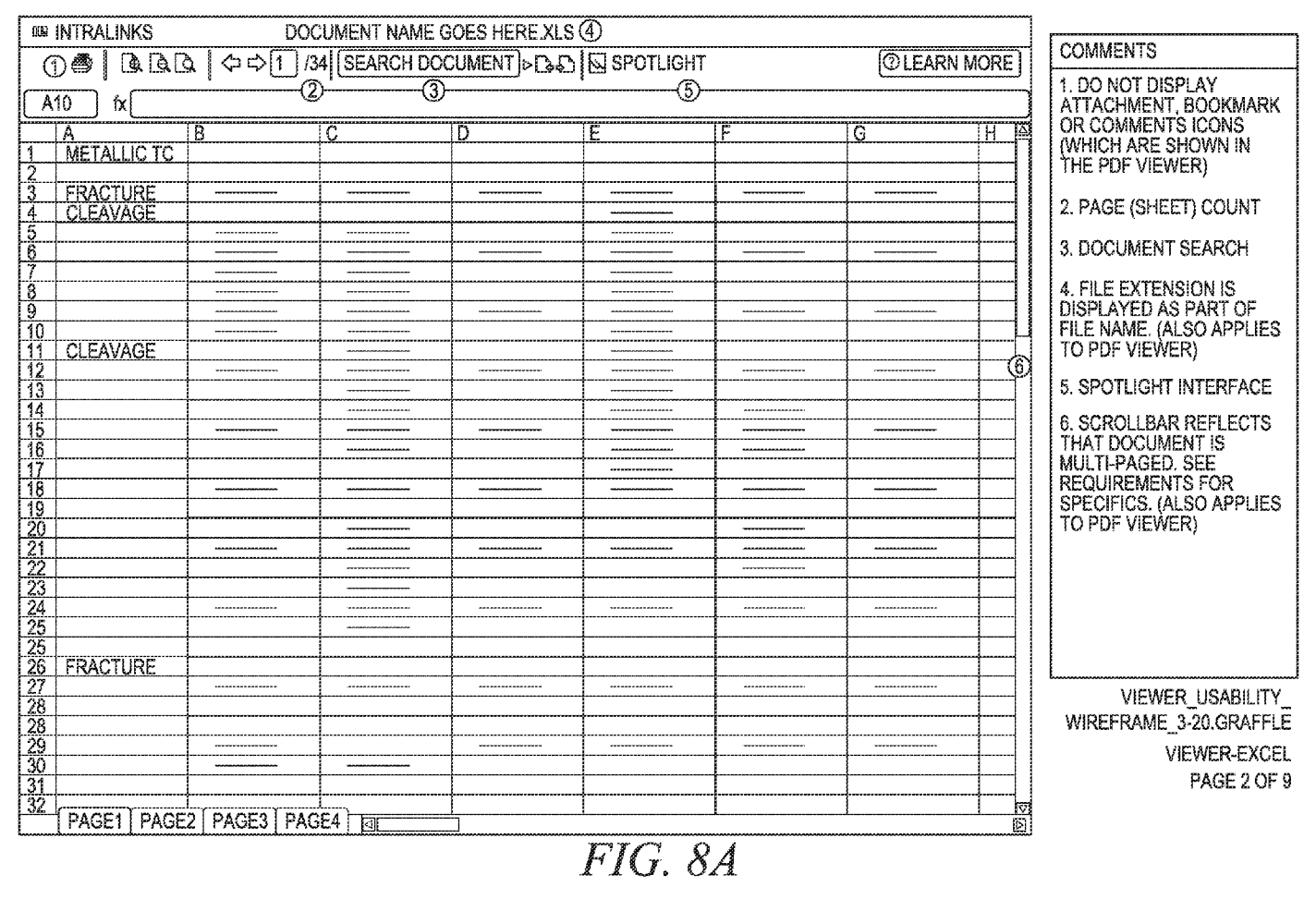
Figure 8B:
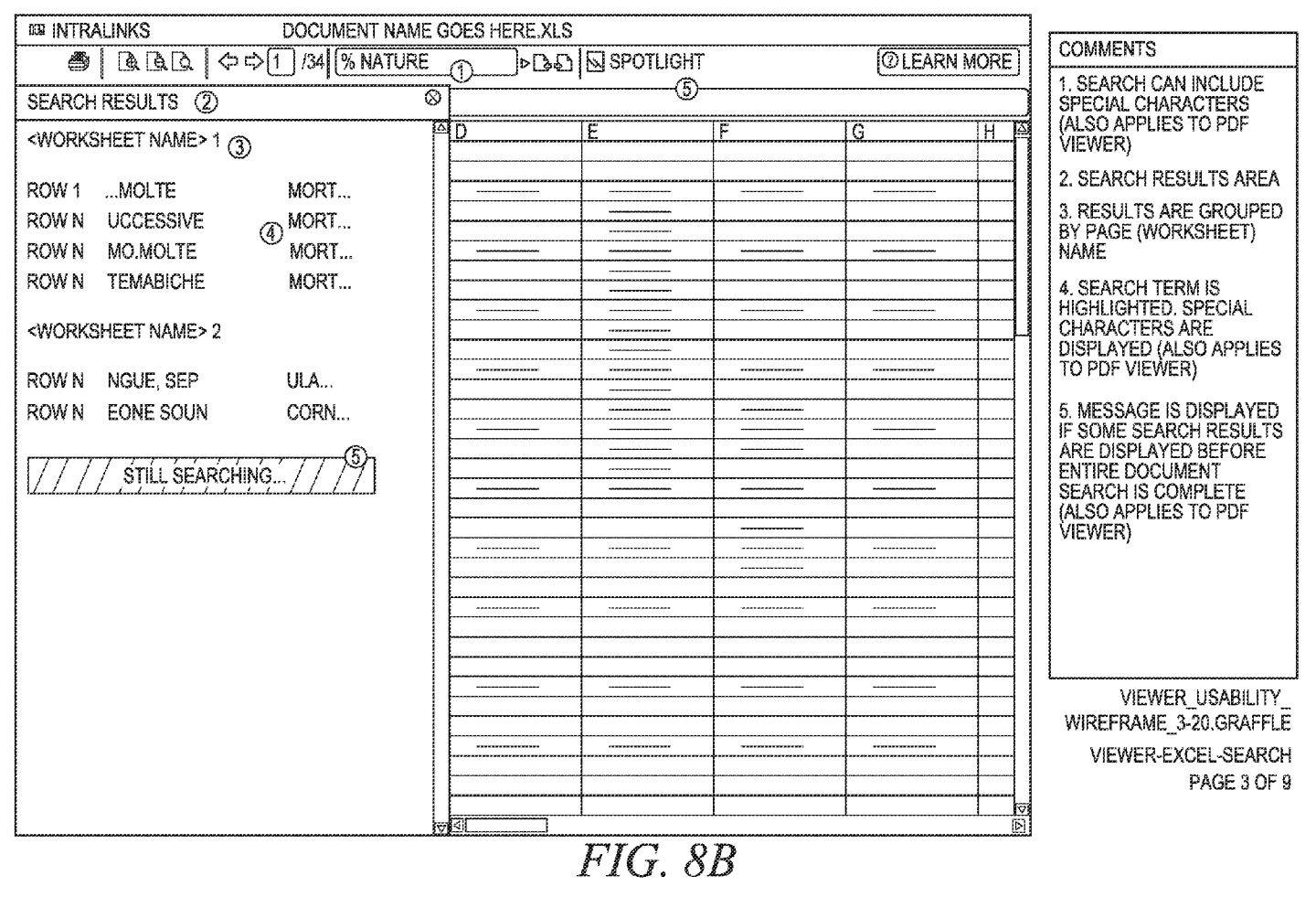
Figure 8C:
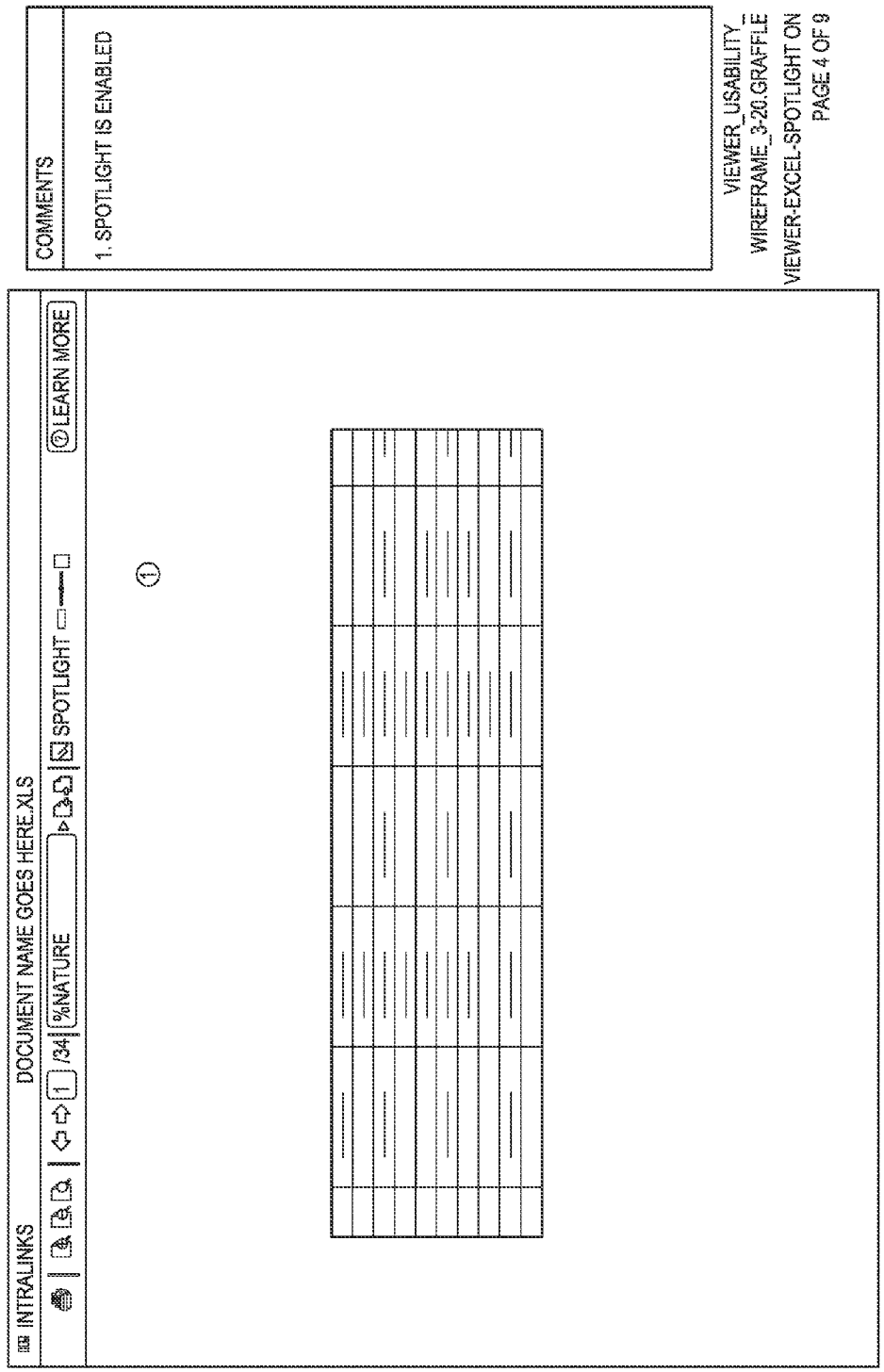
Figure 8D:
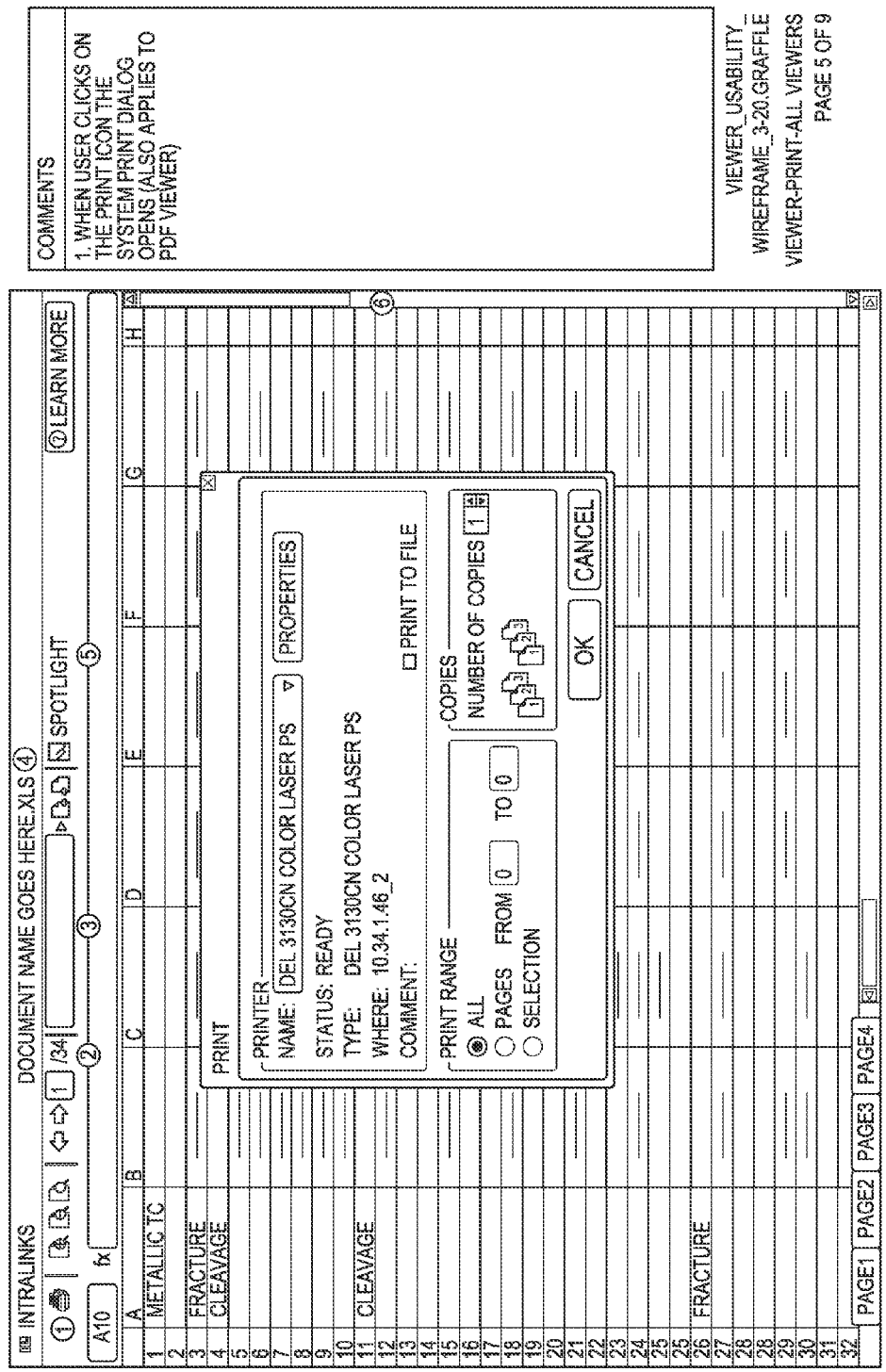
Figure 8E:
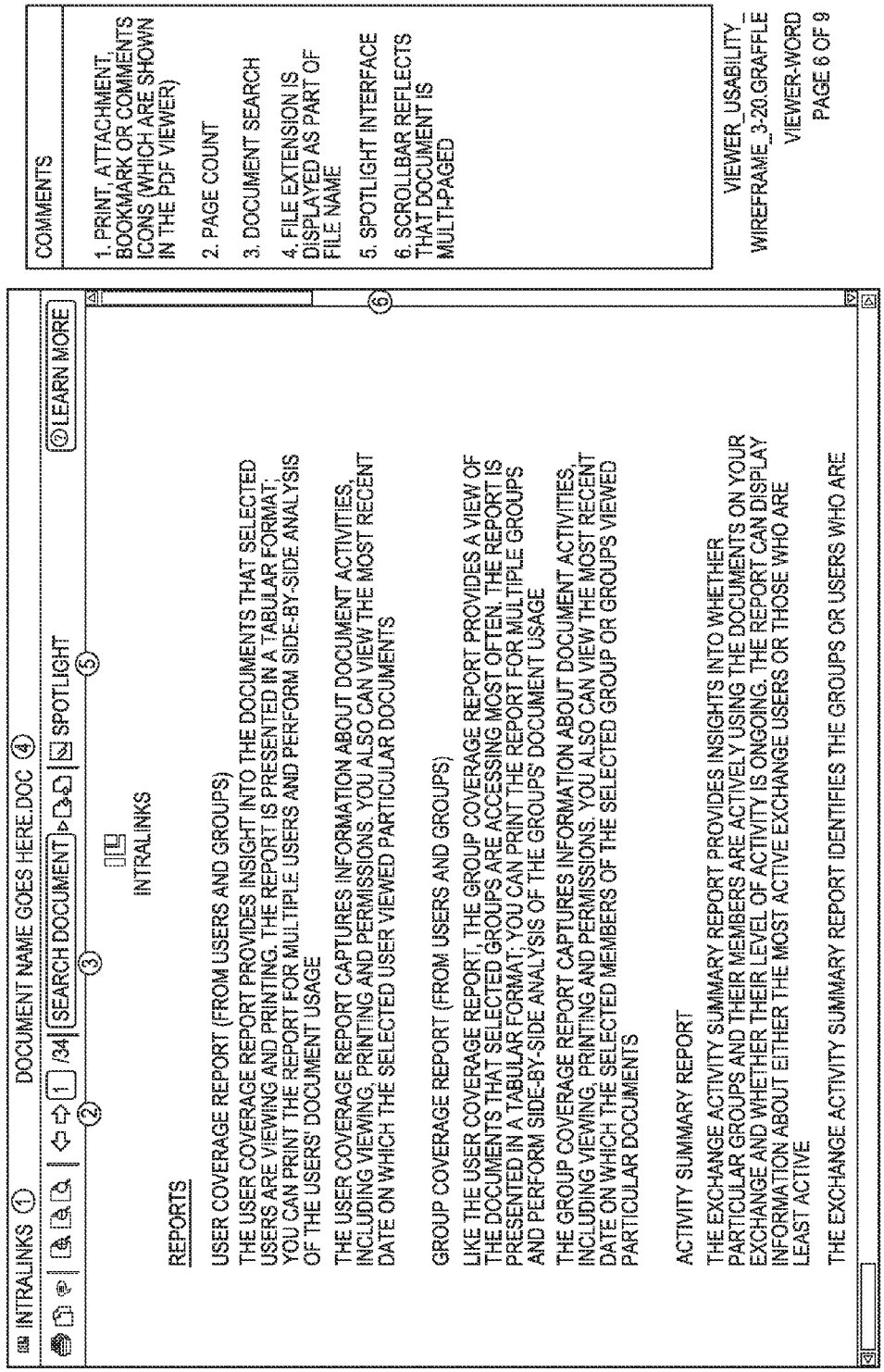
Figure 8G:
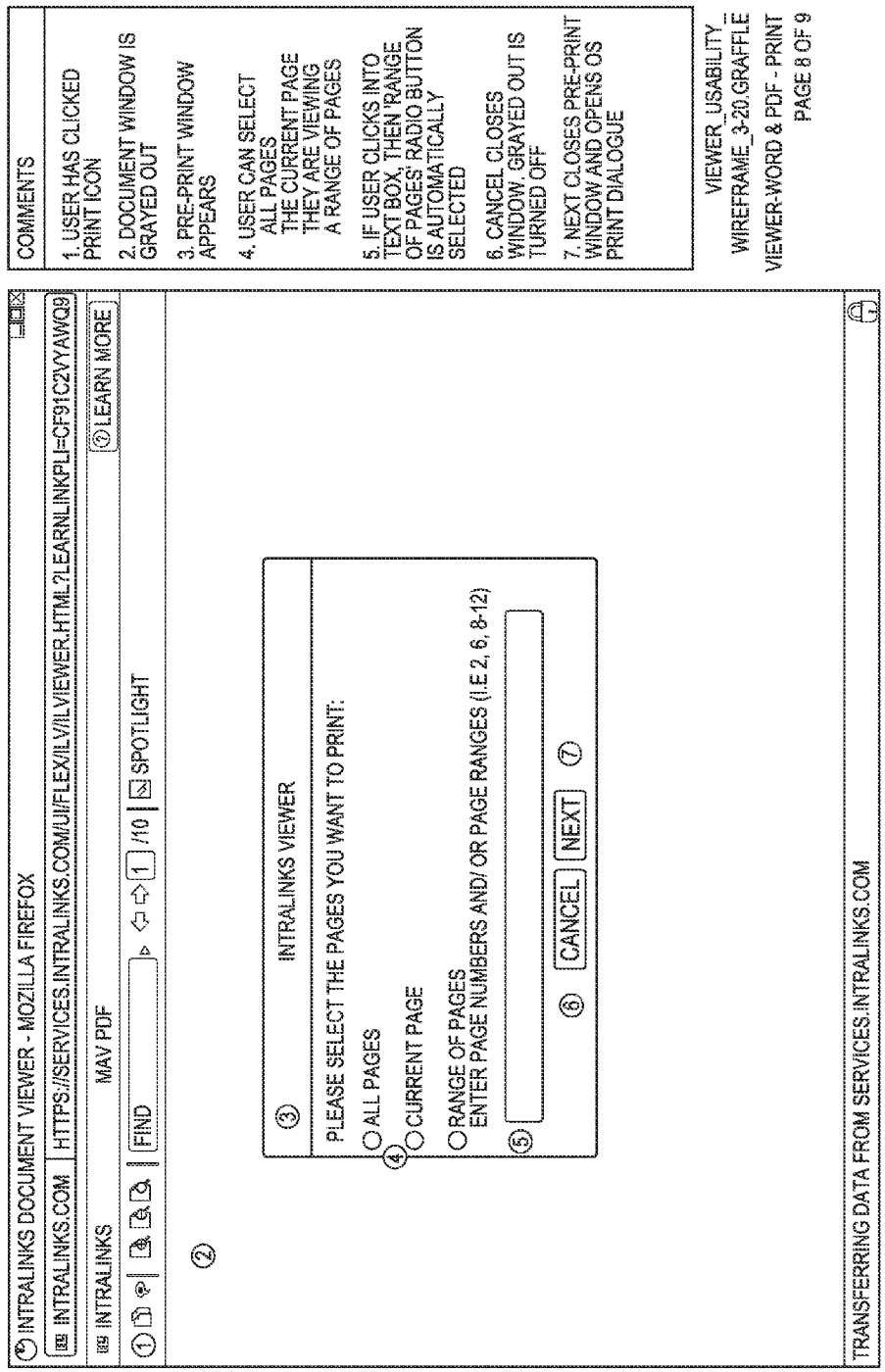

FIGS. 8A-8G depict embodiments of the viewing facility, such as for use in a spreadsheet, word processor, and the like, where FIGS. 8B-8D depict embodiments of the viewing facility as applied to a spreadsheet, and FIGS. 8E-8G depict embodiments of the viewing facility as applied to word processors. FIG. 8A illustrates functions of the viewing facility with respect to a sample spreadsheet document, where (1) shows a toolbar, (2) shows a page/sheet count, (3) shows a document search box, (4) shows the spotlight interface, and (6) shows a scrollbar. FIG. 8B shows a search function and sample results, where (1) shows the search window, (2) shows a search results window, (3) shows how the results may be grouped by page/worksheet name, (4) shows a search term highlighted, and (5) shows a message displayed, such as if some search results are displayed before the entire document search is complete. FIG. 8C illustrates an embodiment of the spotlight function, where only a portion of the document is viewable. FIG. 8D shows a dialog box responding to a user clicking on the print icon. Note that printing may be restricted as described herein, where the dialog box may send an alert to the user identifying the restrictions. FIG. 8E illustrates functions of the viewing facility with respect to a sample word processing document, where (1) shows a toolbar, (2) shows a page/sheet count, (3) shows a document search box, (4) shows the spotlight interface, and (6) shows a scrollbar. FIG. 8F shows a sample search results set. FIG. 8G illustrates a number of viewer facility functions related to a print command, including (1) a print icon, (2) a document window grayed out, (3) a print window, (4) printer options, (5) range of pages for print, (6) a cancel control button where if the user cancels the print the gray-out function may be turned off and again revel the document, (7) a 'next' control button to close the pre-print window and open an operating system print dialog.

In embodiments, a method for managing a networked secure collaborative computer data exchange environment may be provided, the method including establishing, by a secure exchange server controlled by an intermediate business entity, a client login data authentication procedure that allows at least one client computing device of a plurality of client computing devices operated by users of a plurality of business entities to access the secure exchange server, wherein communications between the secure exchange server and the plurality of client computing devices is through a communications network; storing, by the secure exchange server, at least one client login authentication data for each of the plurality of client computing devices; receiving content from a first of the plurality of client computing devices; by the secure exchange server, permitting access to the content for a subset of the plurality of computing devices through an exchange content access facility, wherein the exchange content access facility is managed by at least one business entity of the plurality of business entities; granting, by the exchange server, access to the content to a second of the plurality of client computing devices when the secure exchange server receives from the second of the plurality of client computing devices its client login authentication data provided that the second of the plurality of client computing devices is one of the subset of the plurality of computing devices; and providing a secure content viewer facility for the user to securely view the content on the user's client computing device, wherein the secure view is provided through a viewing restriction based on a user action.

In embodiments, access to the exchange server by client processors may be through a host server controlled by the business entity that controls the client processor. The client computing devices may be at least one of owned and managed by at least one of the plurality of business entities. The client computing devices may be owned by individual users. The secure exchange server may be at least one of a plurality of exchange servers. The content may be at least one of a document, a spreadsheet, a message, data, an image, audio content, video content, multimedia content, and the like. The content may be transferred to the secure exchange server via encrypted data transmission.

In embodiments, the viewing restriction may be obfuscating the content view when the user action is an attempt to print screen, a security warning when the user action is an attempt to view the document, a water mark being inserted on the content when the action is a user printing the content, and the like. The client computing device may be a mobile client computing device, such as personally owned by the user, and configured for secure content viewing through the business entity.

In embodiments, a method for managing a networked secure collaborative computer data exchange environment may be provided, establishing, by a secure exchange server controlled by an intermediate business entity, an authentication procedure for a client login authentication data that allows at least one of a plurality of user client computing devices operated by users of at least two business entities to access the at least one secure exchange server, wherein communications between the secure exchange server and the plurality of user client computing devices is through a communications network; storing, by the secure exchange server, the at least one client login authentication data for each of the plurality of client computing devices; receiving, from a first of the plurality of user client computing devices, content; associating access, by the secure exchange server, to the content to a subset of the plurality of user computing devices through an exchange content access facility, the exchange content access facility managed by at least one of the plurality of business entities; granting, by the exchange server, access to the content of the secure exchange server to a second of the plurality of user client computing devices when the secure exchange server receives a client login authentication data from the second of the plurality of user client computing devices and dependent upon the second of the plurality of user client computing devices being one of the subset of the plurality of user client computing devices; and providing a secure content viewer facility for the user to securely view the content on the user's client computing device, wherein a secure view is provided through a viewing restriction based on a user action, the user action detected through an integrated camera operating in conjunction with face recognition facility on the client computing device and the viewing restriction being an obfuscation of the content view when the user is observed such that viewing of the content by others is at risk. The user may be observed with other people in view of the camera, with an eye-gaze that is away from the client computing device, and the like.

In embodiments, a method for managing a networked secure collaborative computer data exchange environment may be provided, establishing, by a secure exchange server controlled by an intermediate business entity, an authentication procedure for a client login authentication data that allows at least one of a plurality of user client computing devices operated by users of at least two business entities to access the at least one secure exchange server, wherein communications between the secure exchange server and the plurality of user client computing devices is through a communications network; storing, by the secure exchange server, the at least one client login authentication data for each of the plurality of client computing devices; receiving, from a first of the plurality of user client computing devices, content; associating access, by the secure exchange server, to the content to a subset of the plurality of user computing devices through an exchange content access facility, the exchange content access facility managed by at least one of the plurality of business entities; granting, by the exchange server, access to the content of the secure exchange server to a second of the plurality of user client computing devices when the secure exchange server receives a client login authentication data from the second of the plurality of user client computing devices and dependent upon the second of the plurality of user client computing devices being one of the subset of the plurality of user client computing devices; and providing a content viewer monitoring facility for monitoring the user viewing the content on their client computing device, wherein the monitoring is provided through an integrated camera operating in conjunction with a face recognition facility on the client computing device.

In embodiments, a method for managing a networked secure collaborative computer data exchange environment may be provided, establishing, by a secure exchange server controlled by an intermediate business entity, an authentication procedure for a client login authentication data that allows at least one of a plurality of user client computing devices operated by users of at least two business entities to access the at least one secure exchange server, wherein communications between the secure exchange server and the plurality of user client computing devices is through a communications network; storing, by the secure exchange server, the at least one client login authentication data for each of the plurality of client computing devices; receiving, from a first of the plurality of user client computing devices, content; associating access, by the secure exchange server, to the content to a subset of the plurality of user computing devices through an exchange content access facility, the exchange content access facility managed by at least one of the plurality of business entities; granting, by the exchange server, access to the content of the secure exchange server to a second of the plurality of user client computing devices when the secure exchange server receives a client login authentication data from the second of the plurality of user client computing devices and dependent upon the second of the plurality of user client computing devices being one of the subset of the plurality of user client computing devices; and providing a content viewer monitoring facility for monitoring the user viewing the content on their client computing device, wherein a content viewing access report is generated that provides statistics related to the time the user spends viewing portions of the content. The portion of the content may be at a granular level of a page of the content, at a granular level of the entire document, and the like. The content viewing access report may provide for tracking and audit reporting for the user viewing the content. The statistics may be used to develop business intelligence.

In embodiments, a method for managing a networked secure collaborative computer data exchange environment may be provided, establishing, by a secure exchange server controlled by an intermediate business entity, an authentication procedure for a client login authentication data that allows at least one of a plurality of user client computing devices operated by users of at least two business entities to access the at least one secure exchange server, wherein communications between the secure exchange server and the plurality of user client computing devices is through a communications network; storing, by the secure exchange server, the at least one client login authentication data for each of the plurality of client computing devices; receiving, from a first of the plurality of user client computing devices, content; associating access, by the secure exchange server, to the content to a subset of the plurality of user computing devices through an exchange content access facility, the exchange content access facility managed by at least one of the plurality of business entities; granting, by the exchange server, access to the content of the secure exchange server to a second of the plurality of user client computing devices when the secure exchange server receives a client login authentication data from the second of the plurality of user client computing devices and dependent upon the second of the plurality of user client computing devices being one of the subset of the plurality of user client computing devices; and providing a content viewer control facility for user-controlled viewing of the content on their client computing device, wherein the control is at least in part enabled through an integrated camera operating in conjunction with a motion recognition facility on the client computing device. The control may be actualized through monitoring user hand gestures, monitoring user eye movements, through monitoring user head movements, and the like. The control may be enabling the viewing of the content, tuning a page in viewing the content, inserting a signature into the content, closing a viewing session for the content, and the like.

Figure 9:
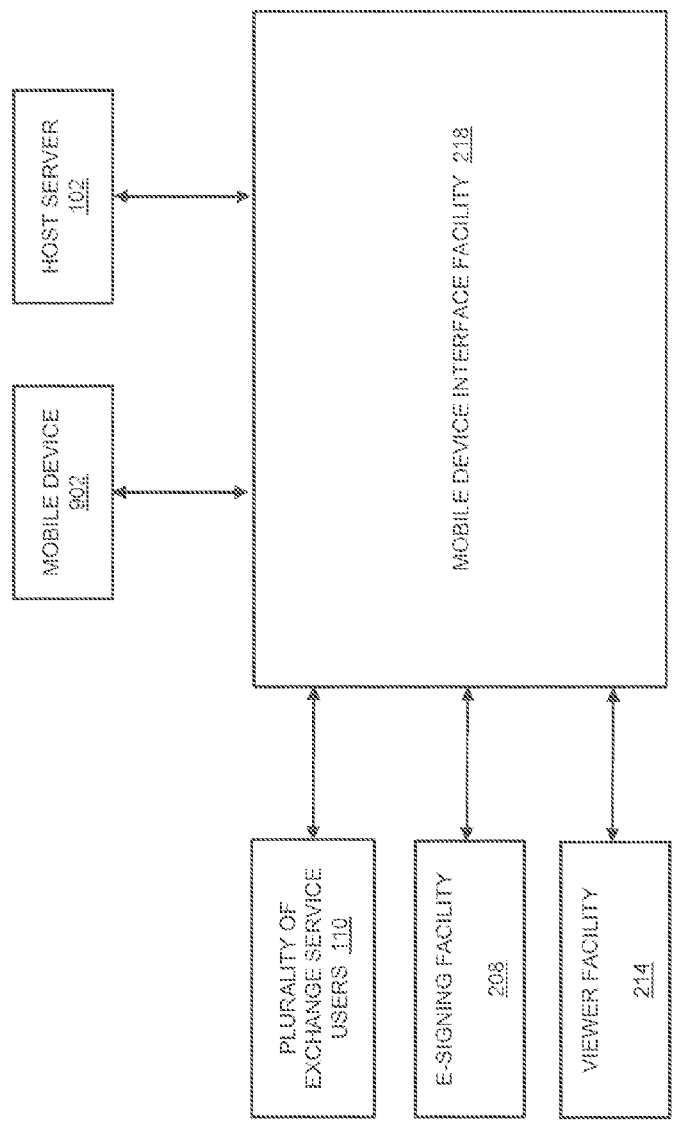
FIG. 9 depicts a functional block diagram for the mobile device interface facility in an embodiment of the present invention.

Referring to FIG. 9, the mobile device interface facility 218 may provide for facilities such that a mobile device 902 can be used while maintaining the secure exchange environment provided by the host server 102 as described herein, such as for a tablet (e.g. an iPad), a smart phone, and the like, where for instance the mobile device is provided functionality provided through the e-signing facility 208, the viewer facility 214, and the like. Facilities normally provided through the host server 102 as shown in FIG. 2 may be provided in part or whole on the mobile device, such that the mobile device may be utilized when the mobile device does not have connectivity with the host server 102. For instance, the user may be able to login to the same interface as when they are working through a non-mobile computer, such as on their personal computer, and see their list of exchanges, all of their documents, all of their contacts, and the like. Using an iPad as an example, all of the user's documents may be encrypted when sent to the iPad and decrypted for viewing, such that none of the information is decrypted and stored on the iPad. A user may not be able to print or save from the mobile device, and be provided with a secure document viewer, as described herein, such as partial viewing, eye gaze motion control, watermarking, and the like.

Figure 9A:
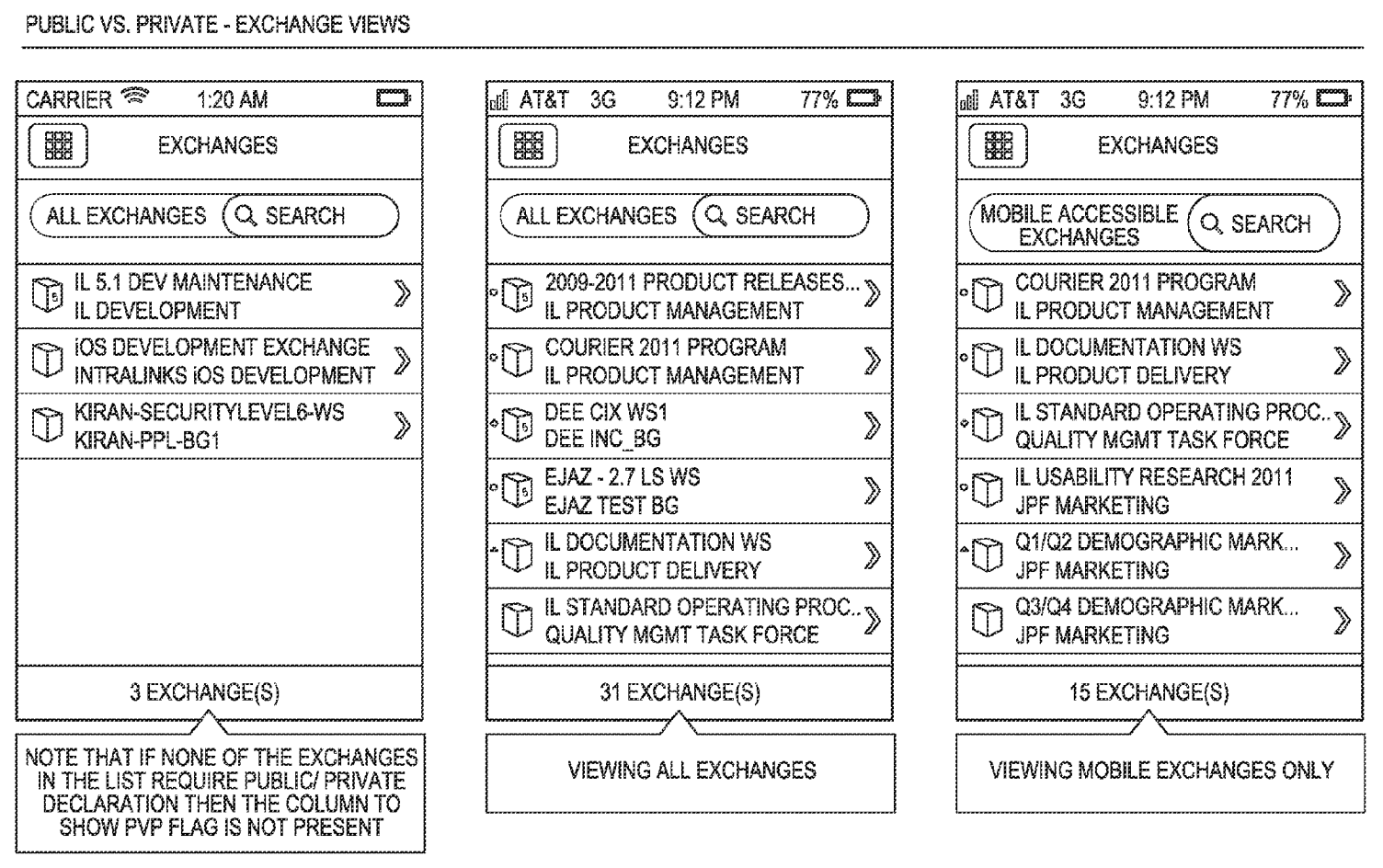
Figure 9B:
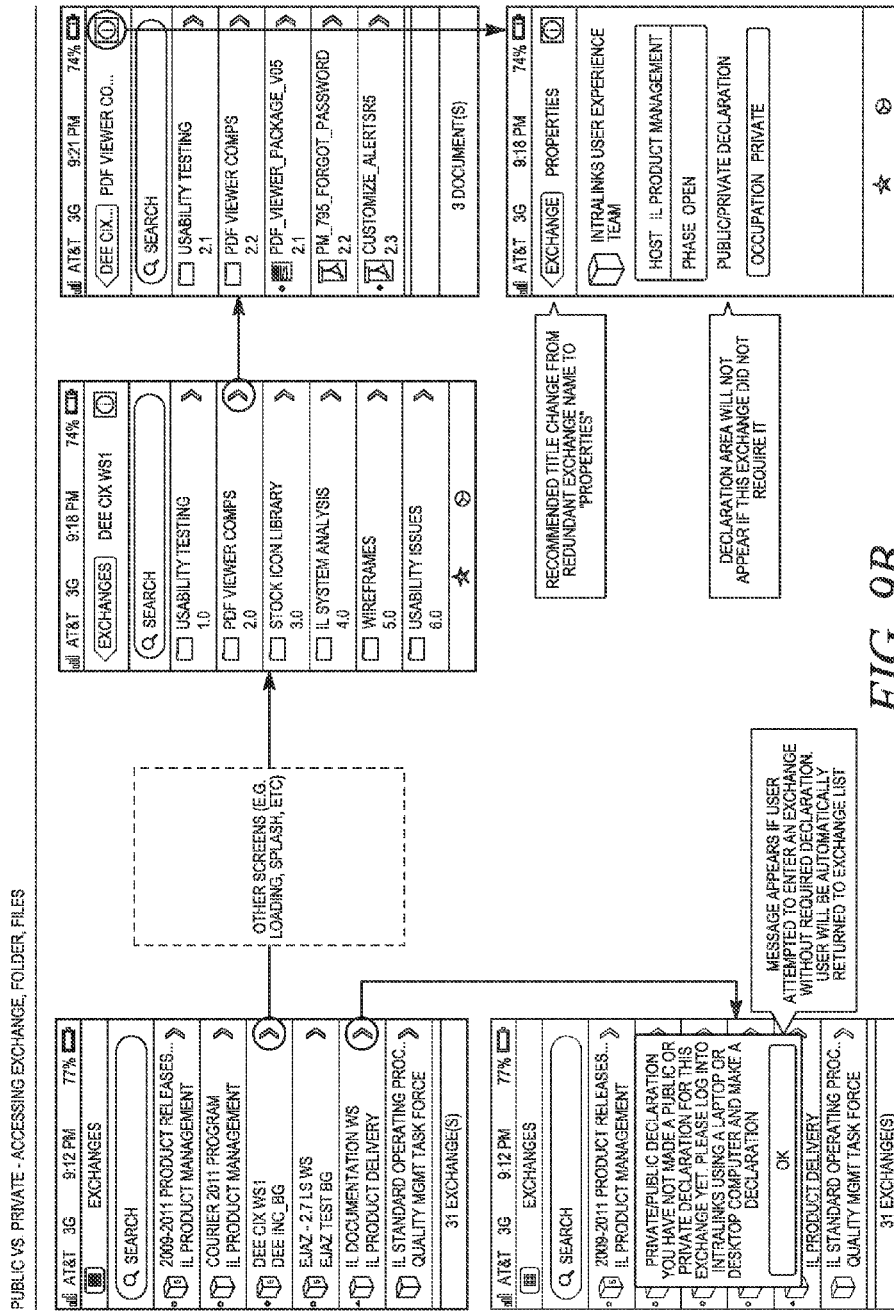
FIGS. 9A-9S depict embodiments of the mobile device viewing interface.
Figure 9C:
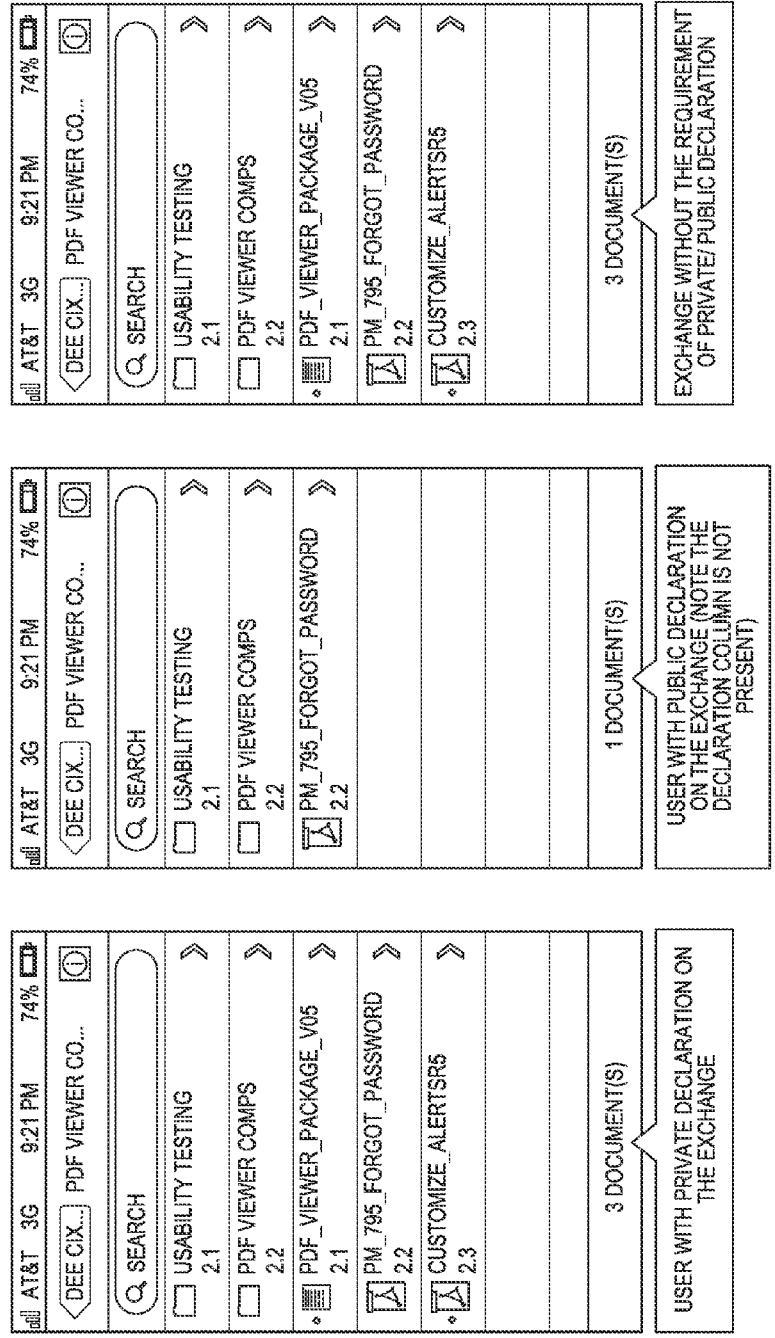
Figure 9D:
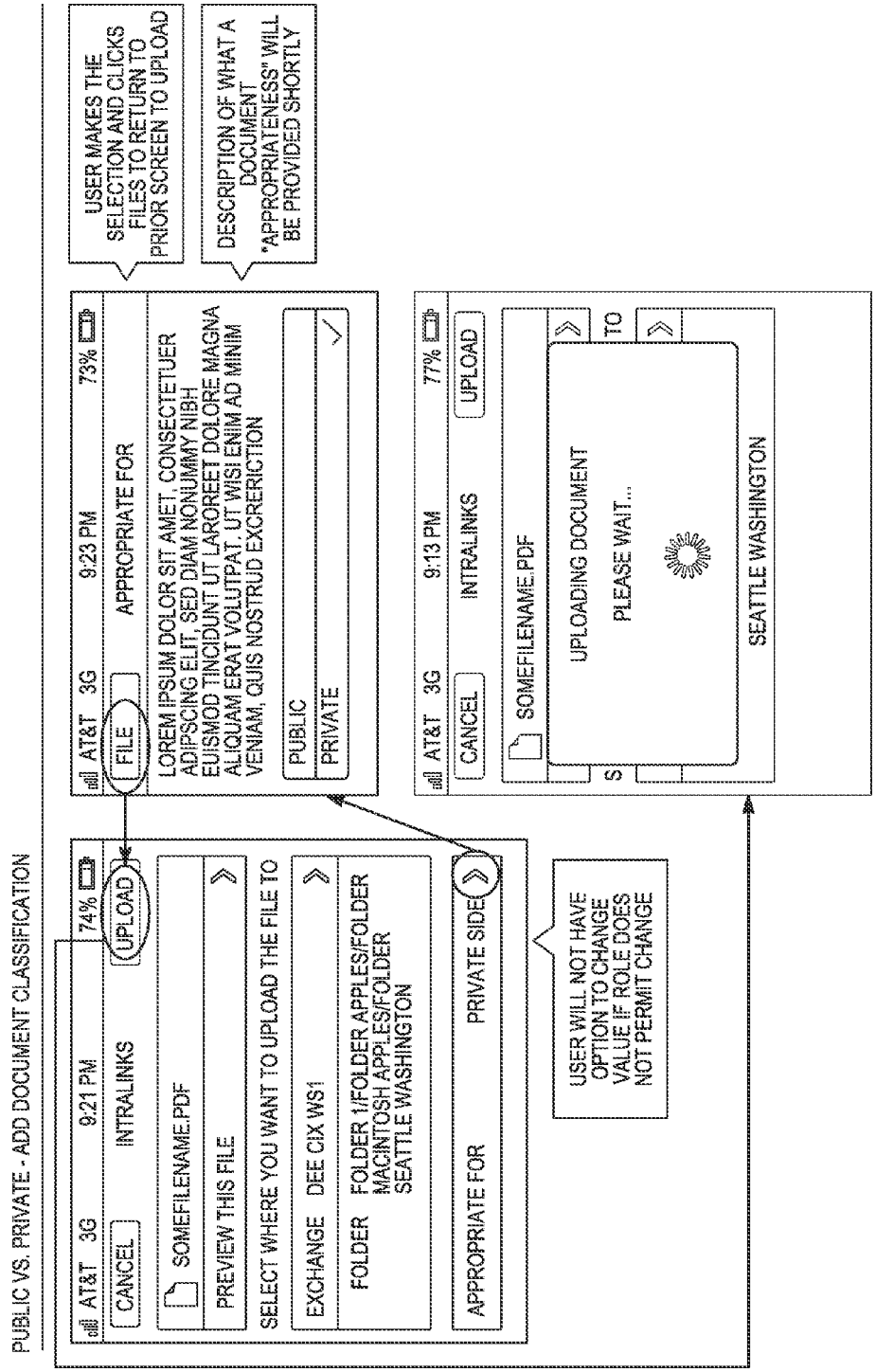
Figure 9E:
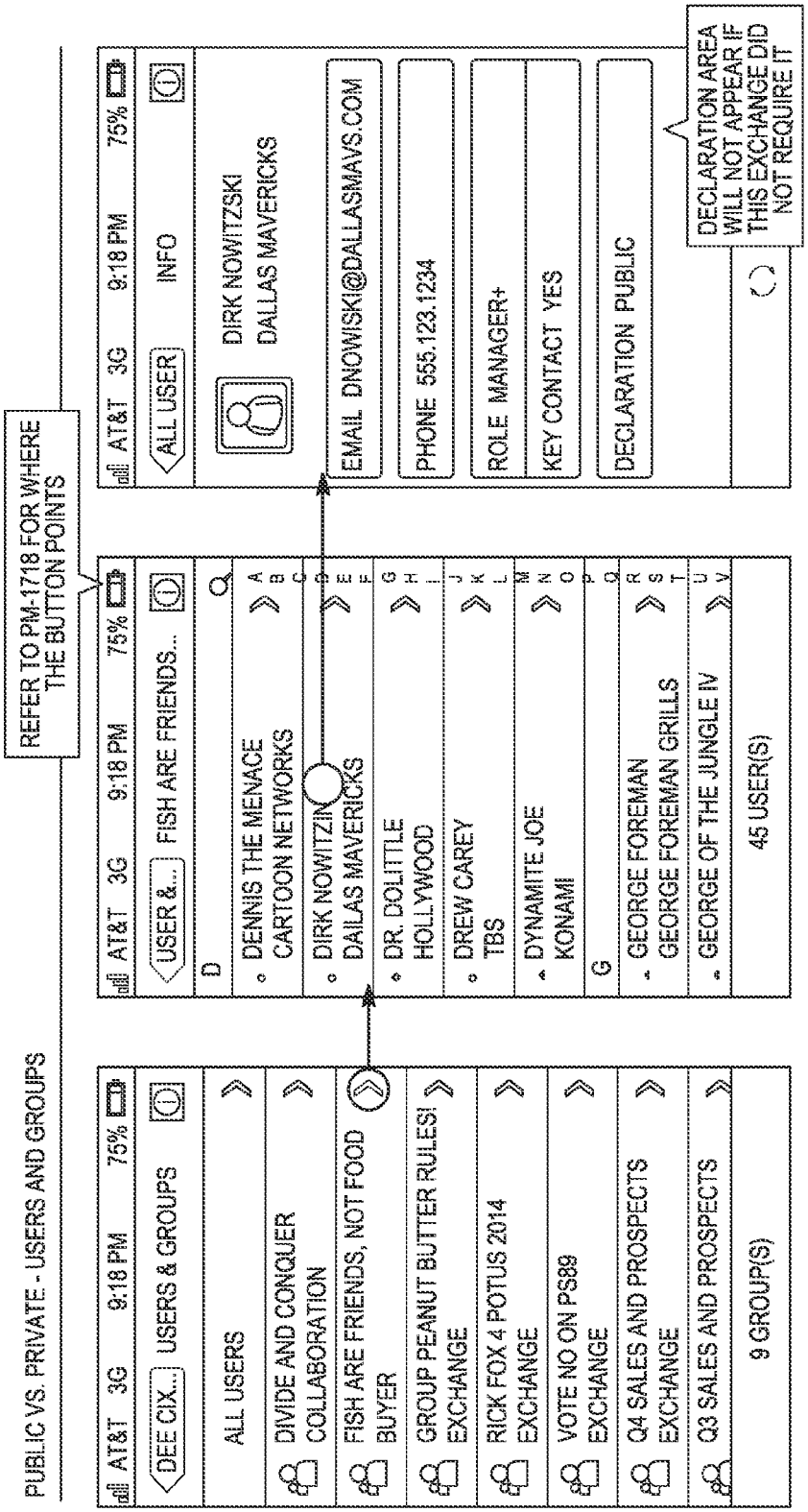
Figure 9F:
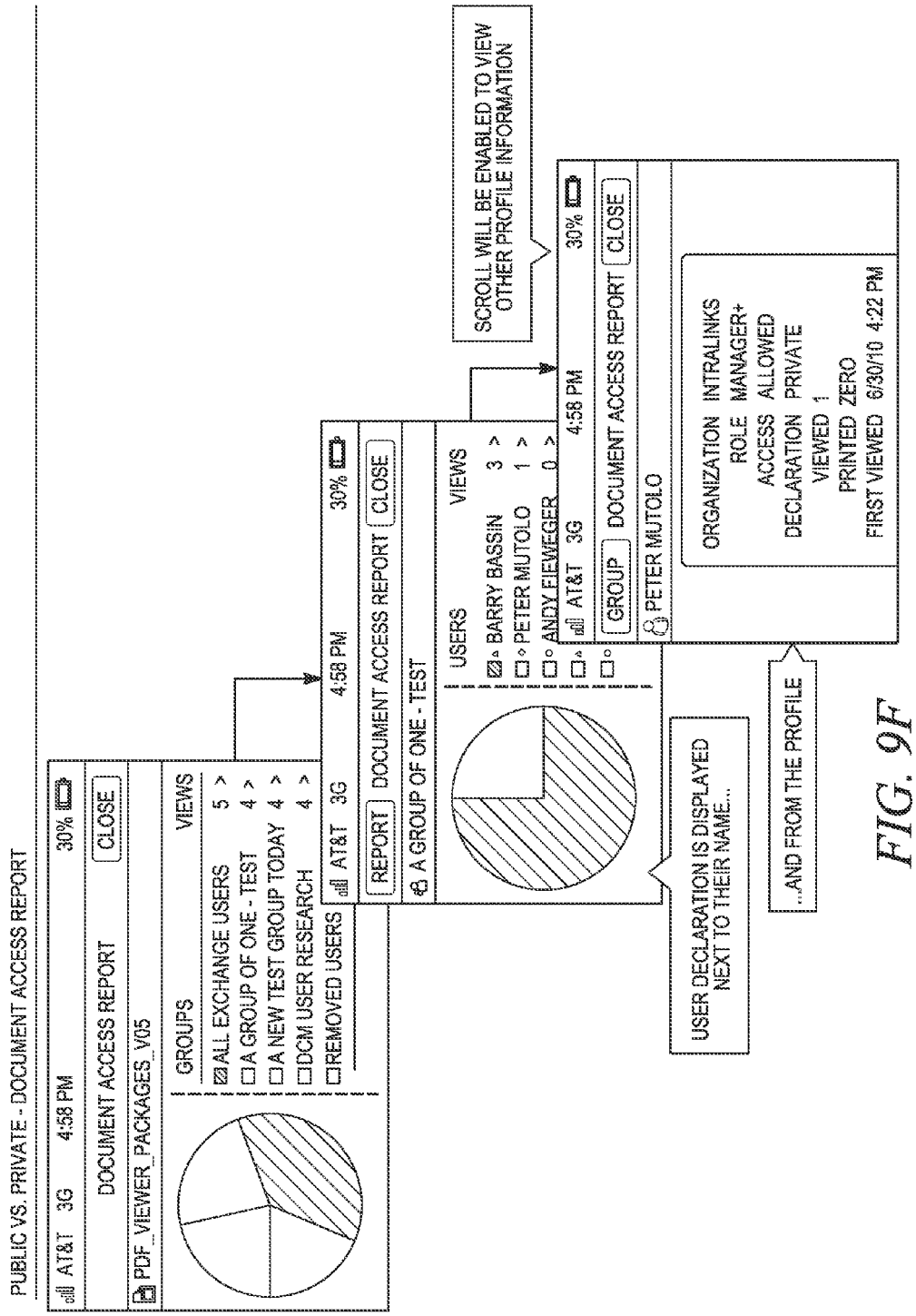
Figure 9G:
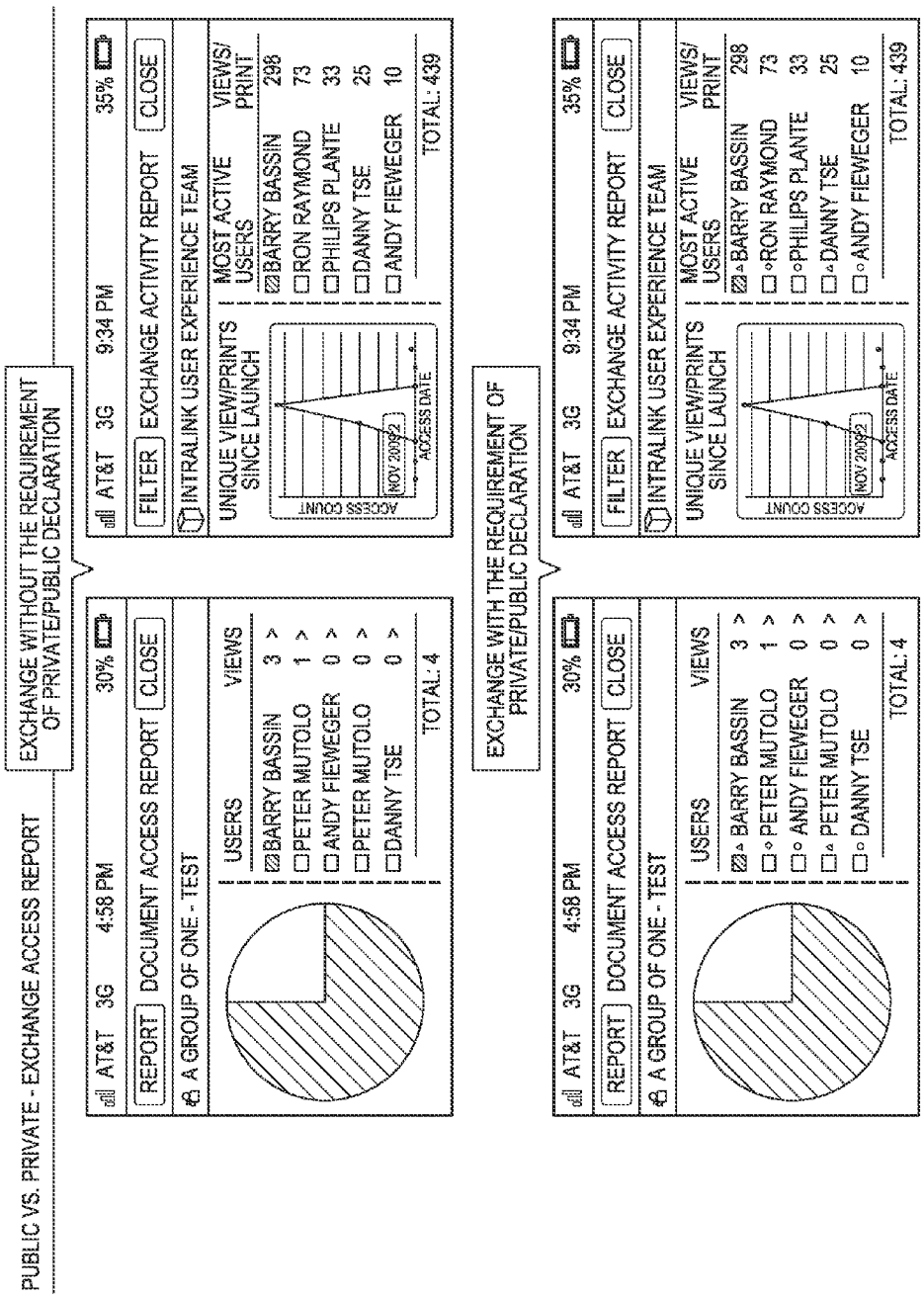
Figure 9H:
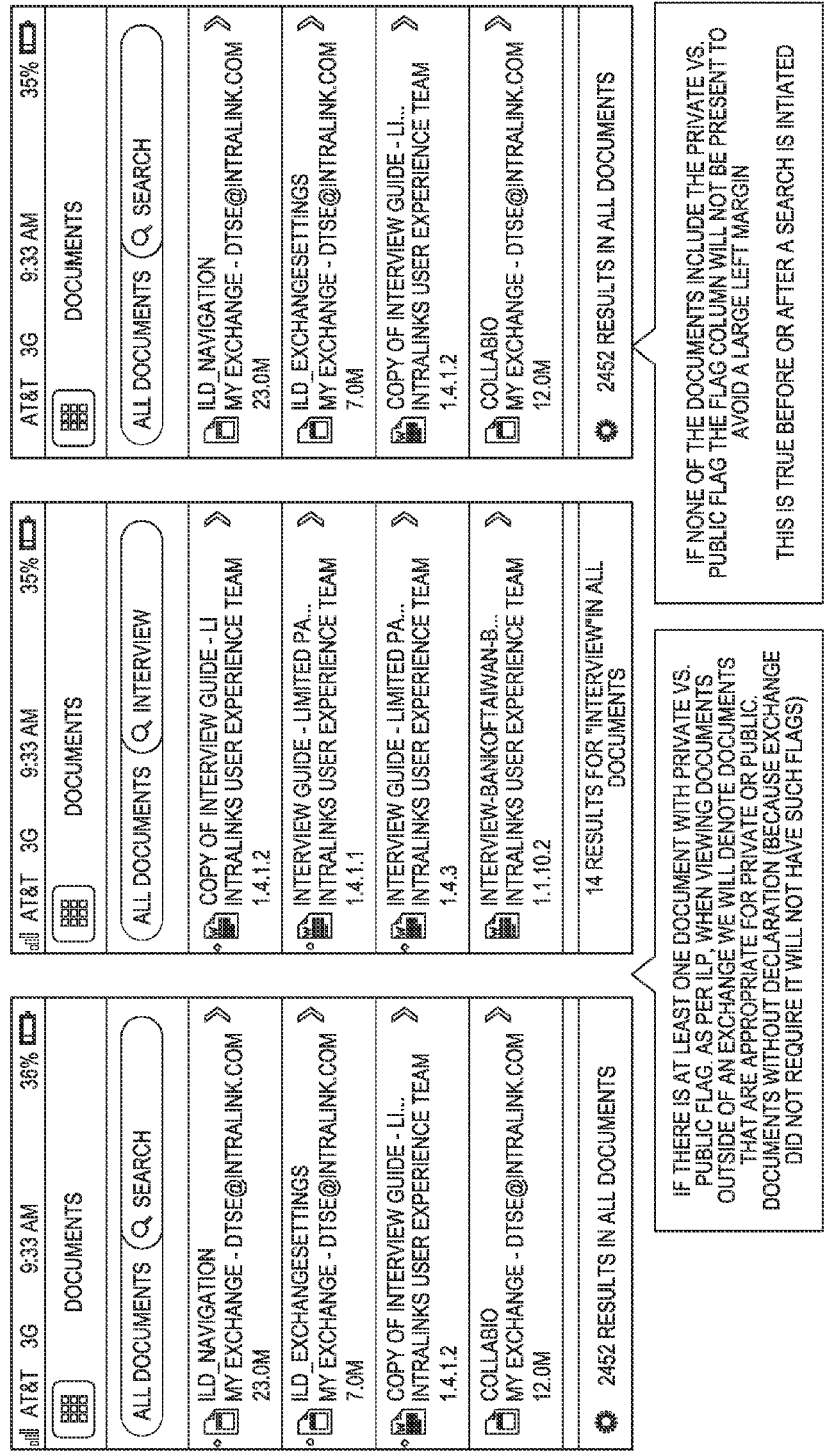
Figure 9I:
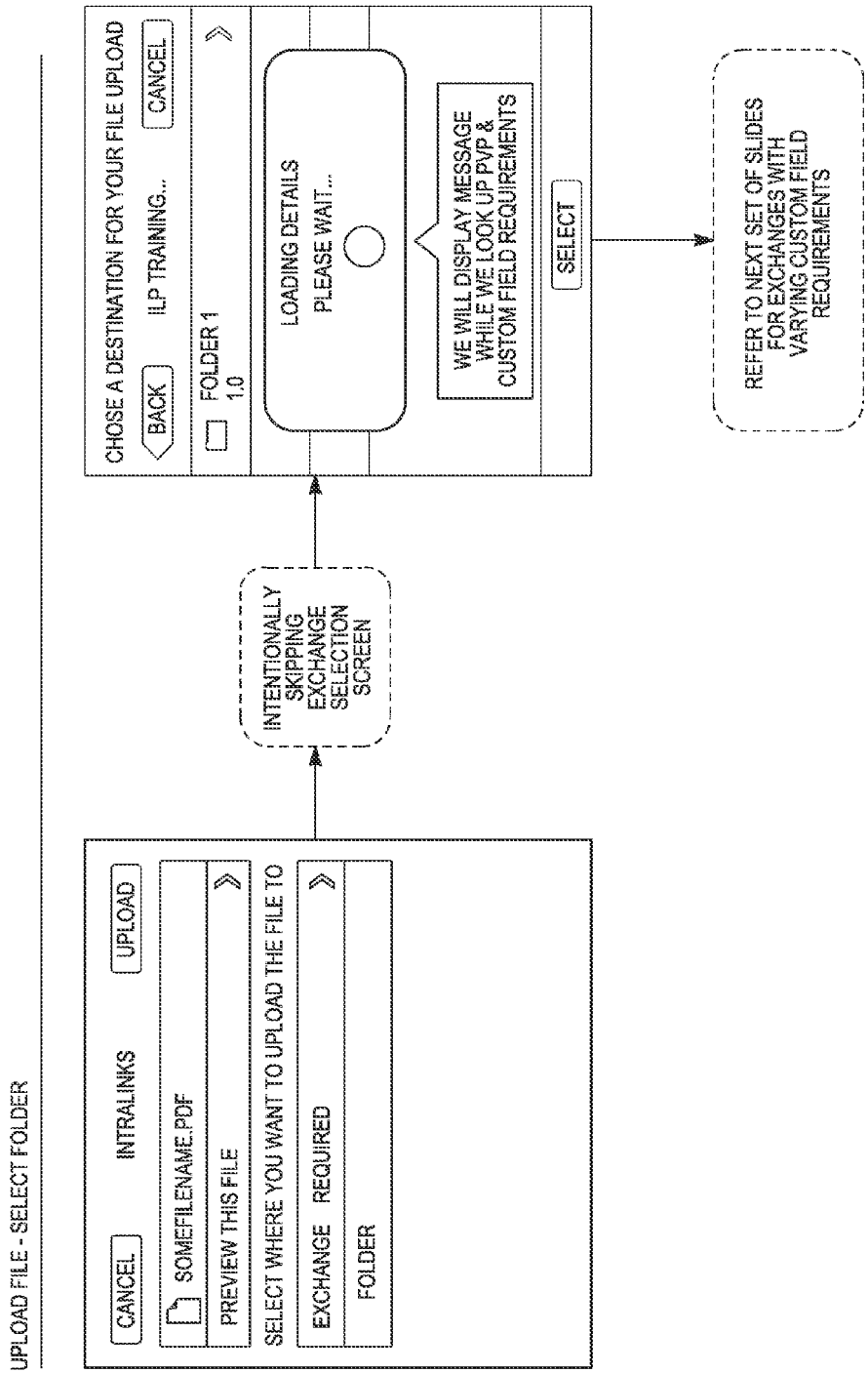
Figure 9J:
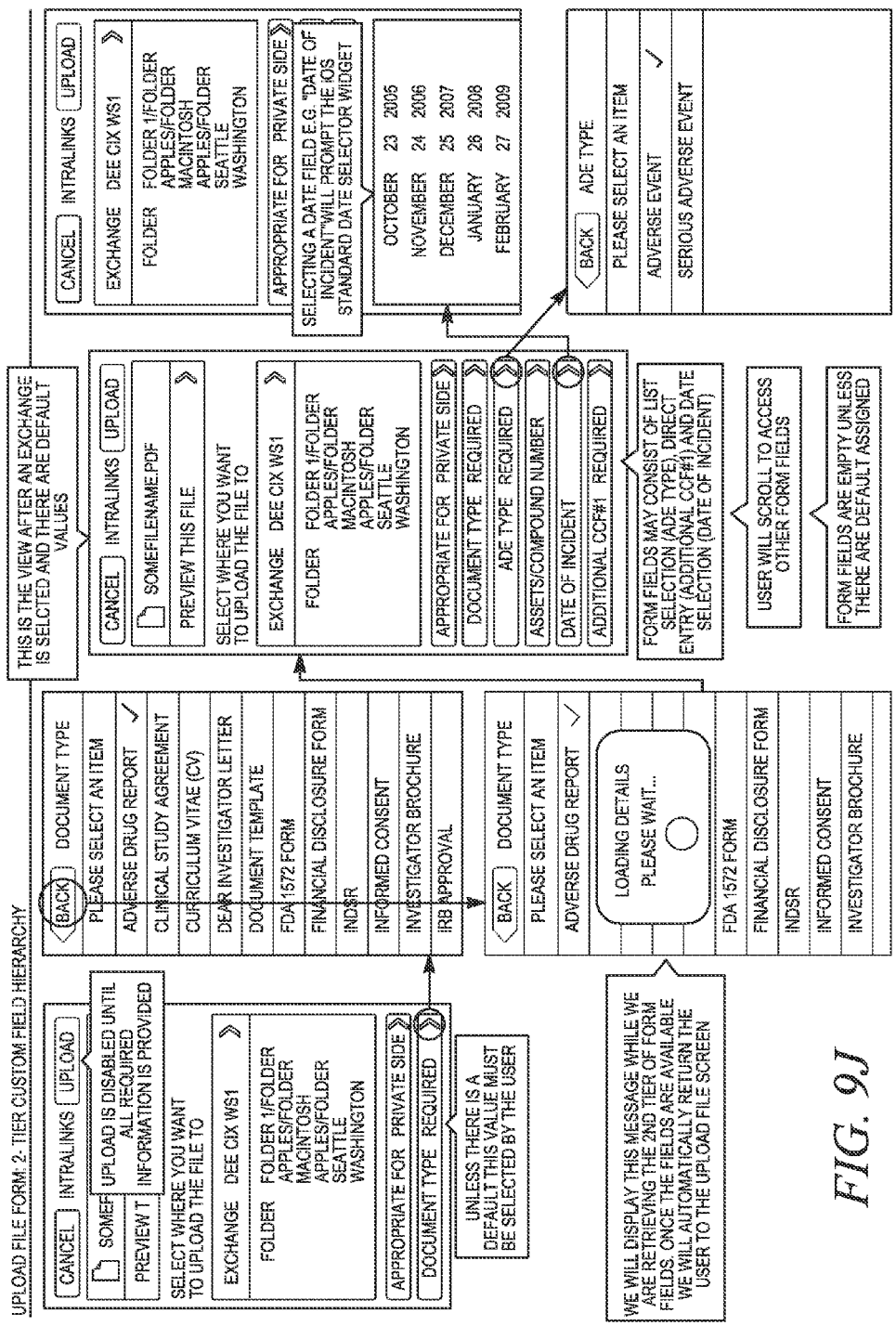

FIGS. 9A-9K depict embodiments of the mobile device viewing interface. FIG. 9A shows public vs. private exchange views, where 3 exchanges are visible as restricted by public-private declarations, 31 exchanges are viewed when all exchanges are able to be viewed, and 15 exchanges are viewable with viewing only mobile exchanges. FIG. 9B shows functions for accessing exchanges, folders, files, and the like. Note that a message may be displayed if a user attempts to access an exchange or entity without the required declaration. FIG. 9C shows examples of public vs. private document views. FIG. 9D shows examples of adding a document classification, where a document control button may be provided for uploading, an appropriation may be specified, and the like. FIG. 9E shows examples of public and private users and groups. FIGS. 9F-9G show examples of document access reports. FIG. 9H shows public vs. private views of documents. FIGS. 9I-9K show examples of file uploads to exchanges.

In embodiments, a secure viewing application for a mobile device may be provided to provide secure viewing 802, such as for a tablet (e.g. an iPad), a smart phone, or a mobile computer. In various embodiments disclosed herein, the user of a mobile device may be an employee or other individual associated with a business entity. In embodiments, users may include employees or individuals associated with business entities that place documents on secure data exchanges as well as employees or individuals associated with separate business entities that retrieve documents from secure data exchanges or view or consume documents on data exchanges. The entities in each case may further be separate from an intermediate business entity that hosts one or more secure data exchanges. The user of the mobile device may be able to login to the secure viewing application, such as when the user is working through a mobile device to see a list of exchanges, all of the user's exchange-related documents, all of the user's exchange-related contacts, or other information, where the application may be resident on the mobile device. In embodiments, the user may be able to login to the secure viewing application whether or not the mobile device is connected to an exchange, while in other embodiments some or all features of the application may be limited to situations where a connection to an exchange is maintained, or to situations in which the application has been connected to an exchange within a certain time period prior to using the secure viewing application. The secure viewing application may require the user to enter a personal identification number (PIN), password, or other indication of authentication (optionally including biometric authentication indicators) in order to access the application.

A user may be able to mark a document as a favorite by accessing the document from a mobile device, a personal computer, a web portal, an exchange or the like. The secure viewing application may allow a user to view a list of documents that have been marked as favorites. The user may be able to select an individual document from the list and view the document on the mobile device. The secure viewing application may track which documents and versions thereof have been selected and when the documents, or versions thereof, have been viewed by users. The secure viewing application may track versions of documents, including when each document version has been viewed by a user, whether or not the secure viewing application is connected to an exchange during viewing, such as by storing relevant data on viewing on the mobile device for delivery to or retrieval by an exchange when the mobile device is connected, or by sending viewing information at the time of viewing from the mobile device to the relevant exchange. The secure viewing application may communicate the tracked information to an exchange. The tracked information may be communicated to an exchange immediately if the mobile device is connected to an exchange. If the device is not currently connected to an exchange, the tracked information may be communicated to an exchange when the secure viewing application later becomes connected to an exchange. A document may be made available by an exchange to be marked as a favorite by a user. A document may be protected by an exchange to prevent a user from marking it as a favorite for downloading, and the like. A protected document may be restricted from off-line viewing, may be restricted from being screen printed, may be restricted to viewing only by authorized personnel, and the like.

Authorization for viewing may be provided by various methods, such as via face recognition using an integrated camera or some other type of biometric sensing, location-based services, network connectivity, and the like. As described herein, an integrated camera may be used to detect the authorized user's face, the authorized user's iris, the presence of other people in the camera's field-of-view, and the like, and when detecting the presence of an unauthorized individual, place restrictions on viewing, such as described herein. An integrated camera may be used in conjunction with a view-restricting layer, such as a physical sheet over the display of the mobile device, such as privacy screen (e.g., a polarizing filter preventing viewing outside a restricted angle of view) or by manipulation of the display to make off-angle viewing more difficult. In this way, the integrated camera is preconfigured to see any individual that is able to view the device screen within the restricted angle of view of the privacy screen. Location-based services may be used to restrict viewing by enabling or disabling a user's authorization for viewing based on the user's geographic location. For instance, the user may not be authorized to view a particular document in certain counties, outside their home country, outside a small geographic area around an office of an enterprise, around the user's home, on a known transportation route (e.g., a plane flight on which the user has a reservation), and the like. A user's authorization for viewing may be determined at least in part on the network connectivity of the mobile device, such as with the enterprise network, a trusted network, a WiFi network, and the like. For instance, a user may not be authorized to download a secure document through a cellular network, such as when they are not connected to a WiFi or wired network connection. The authorization for viewing may be a combination of these and other related parameters, where the restriction-based parameters and settings are controlled through a system administrator, such as stored in a user profile, determined by a policy, and the like.

If a user is connected to an exchange through an authorized network connection, a user may mark the document as a favorite and the document may then be downloaded to and stored securely on the mobile device of the user, such as being encrypted and/or provided with an unconventional, dedicated file format that is accessible only by the secure mobile application. If a mobile device is not connected to an exchange, or if the connection from the mobile device does not have sufficient bandwidth to download the document from an exchange, a document that has been marked as a favorite by the user may be tagged as a favorite by the user and then later downloaded to and stored securely on the mobile device of the user when the user becomes connected to the exchange and the connection has sufficient bandwidth. The postponed download may happen automatically or it may happen after the user later initiates the download or confirms that the download is still desired. The secure viewing application may alert the user that the download is taking place, provide the user with a download progress indicator, or download the file in the background without alerting the user.

The document may be downloaded over a secure connection between the exchange and the secure viewing application. The document may be stored in a secure location that may be accessed only by the secure viewing application, an encrypted memory location, or an otherwise secured memory location. The encryption used may be any encryption scheme known to one skilled in the art, such as AES 128 encryption, AES 192 encryption, AES 256 encryption, and the like.

A document may be constrained on an exchange such that it may only be accessed through the secure viewing application, or access may be allowed through any application that is compatible with the format of the document. In embodiments the document may be accessed by the secure viewing application whether or not the user is connected to an exchange. A setting may be provided, which may be selected by an administrator, to allow the administrator to restrict how or when a document can be accessed. For example, a setting may allow a document only to be accessed by the secure viewing application. Another setting may allow a document to be accessed by both the secure viewing application and any other application that is compatible with the format of the document. In embodiments the setting may be configured by the administrator of an exchange, such as working within an intermediate business entity or working for an entity that places documents on an exchange. The setting may be selected for an individual document, a document folder, or a group of documents. A document that is made available to be accessed by any application that is compatible with the document may be edited by another application and saved back to an exchange through the secure offline mobile application.

An exchange may verify changes to documents through indicators of modification, or "modification stamps", on the documents that have been marked as favorites by a user. Such indicators may indicate when changes have been made to items accessed through an exchange, so that a determination can be made whether any modification has occurred to a document, file, etc. between the time the user last connected to the exchange. Modification stamps may take the form of metadata stored in or associated with a document, file, etc., a tag, or similar facility for tracking status or state information. An exchange may verify the modification stamps on the documents that have been marked as favorites by a user when the user connects to an exchange and logs into the secure viewing application. A document may be deleted from the mobile device if its modification stamps indicate that the version of the document on the mobile device is not the current version. A document may be marked as being out-of-date when a user logs into the secure viewing application if it is not the most current version of the document. In embodiments the out-of-date document may be visible to the user. The out-of-date document may include an indicator to communicate to the user that the document is not the current version of the document. Access may be denied to an out-of-date document. The current version of the document may be downloaded. Download of the current version may happen automatically or upon user request or upon a confirmative response to an offer for the current version. The user may immediately download the current version at the time the user selects the document for viewing. The download may take place whether or not the user is logged into the secure viewing application. A visual indication may alert the user that a document is being downloaded. The user may not be able to access a document if the download of the most recent version of the document is not completed before the user disconnects from an exchange.

Figures 9L, 9M:
Figure 9O:
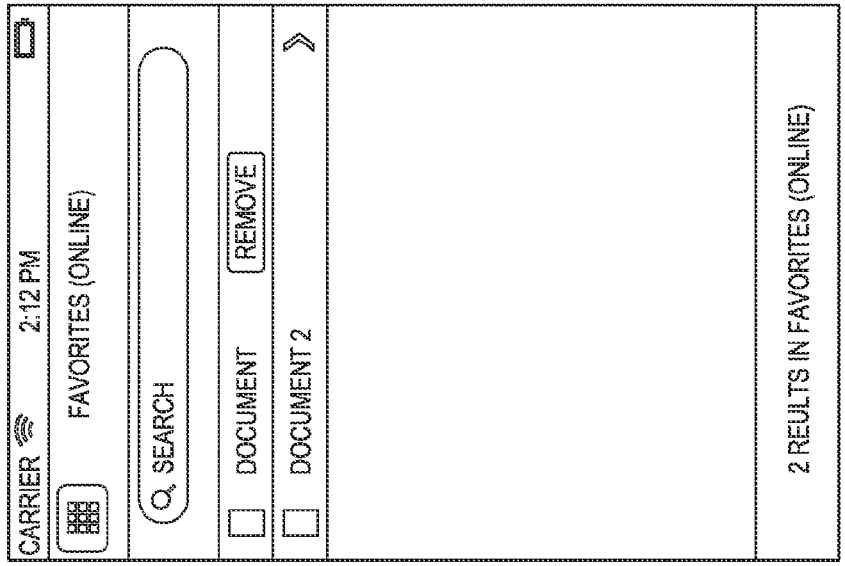
Figure 9N:
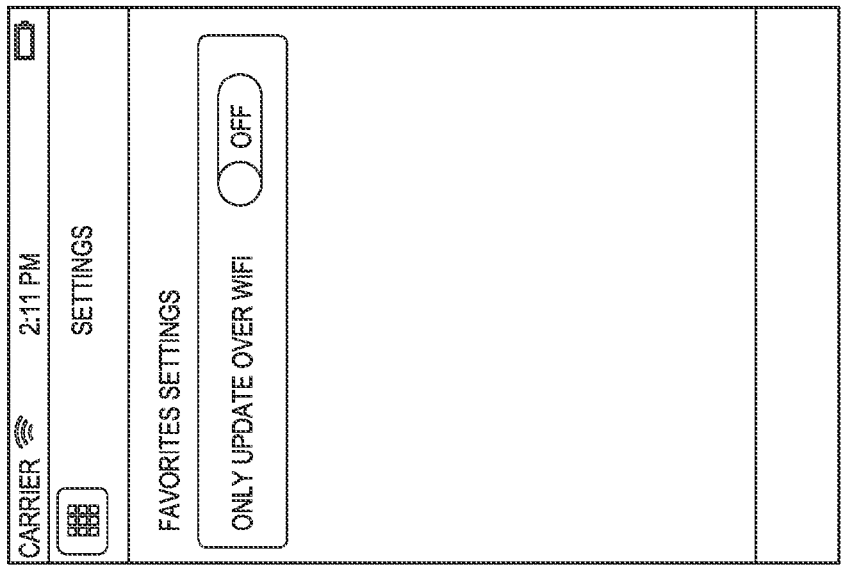

FIGS. 9L-9S depict screenshots from an embodiment of a secure viewing application. FIG. 9L shows a screen of the secure viewing application asking a user to setup a PIN. FIG. 9M shows a screen of the secure viewing application that prompts a user to enter a PIN. FIG. 9N shows a screen of the secure viewing application that is used by a user to select a setting. FIG. 9O shows a list of two documents that have been selected as favorites by a user that is connected to the exchange.

Figures 9Q, 9R:
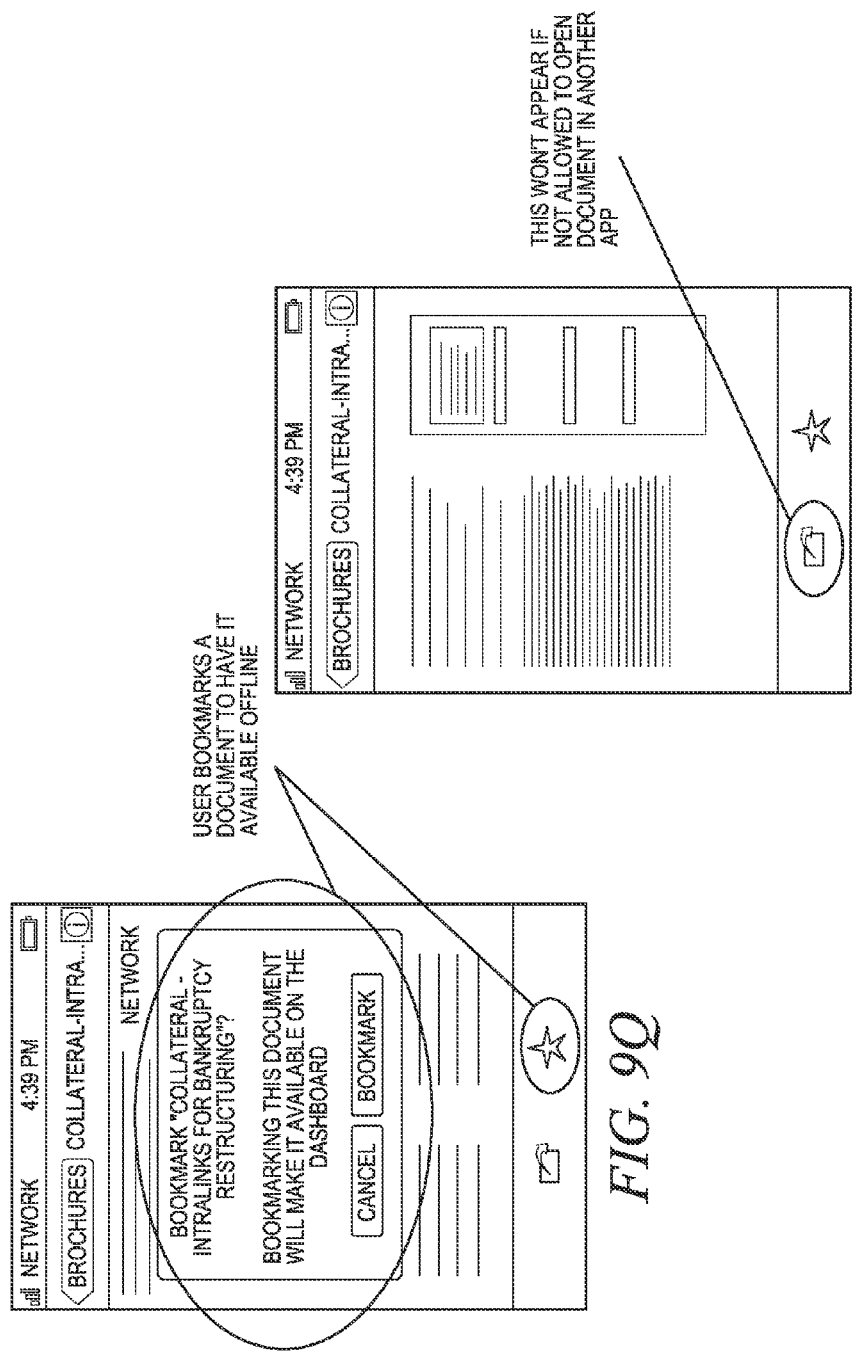
Figure 9S:
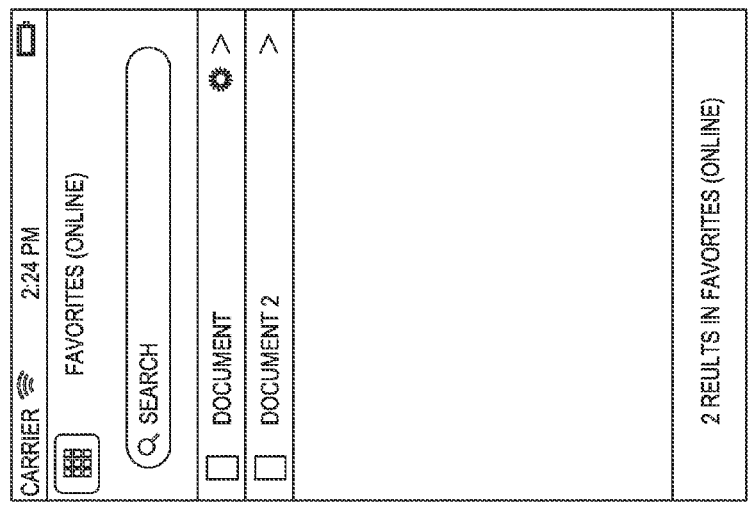

FIG. 9P shows a document that was selected by a user being loaded for viewing. FIG. 9Q shows a screen of the secure viewing application that allows a user to select a document as a favorite when the mobile device is connected to an exchange. FIG. 9R shows a screen of the secure viewing application with an indication that shows that a document made available through the secure viewing application is available to be opened in a different application. FIG. 9S shows documents that are available for a user to view when a mobile device is not connected to an exchange and the mobile device includes a secure viewing application.

The secure offline mobile viewing application may be employed when a user desires to access a document, especially one that is subject to frequent revision, when there is no connection between the mobile device and the exchange. The secure offline mobile viewing application may also be used in situations when a document is subject to a corporate policy which requires access to only the current version of a document. The secure offline mobile viewing application helps to ensure compliance with corporate policies that require prevention of access to superseded document versions and may be used as proof that the user accessed the current version of the document. The secure offline mobile viewing application also permits users to collaborate on documents with other users through an exchange, when the documents are not subject to any corporate compliance requirements with regard to version accessibility.

In embodiments, the present invention may provide for technology aspects related to architecture, structural components, facilities, data, communications, analytics, reporting, materials, inbound components, processes, algorithms, and the like. Architecture, structural components, and facility may include multi-language support, metadata association, document content processing, document content distribution, distributed geo-storage, and the like. Relationships among components may include CRM integration, sales force connector, HCM integration, ERP integration, ECM integration, e-Learning integration, and the like. Data, communications, analytics, and reporting may include user history reporting, activity reporting, permission reporting access reporting, audit and compliance reporting, configurable dashboards, self-service reporting (e.g. custom, scheduled, ad-hoc), IMAP folder management, exadata integration, and the like.

In embodiments, the present invention may provide for product aspects related to features, attributes, benefits, outputs, functional benefits, security, and the like. Products may include integration from a secure data room, public-private bifurcation in the loan market, secure mobile devices, and the like. Features, attributes, and benefits may include iPad protected documents, bounce-back reporting, branding, channels, alerts, task management, multi-task process management, automatic indexing, migration, automation (e.g. ILIA automation), specialization (e.g. custom fields, custom workflow), very large file support, document management (e.g. review and approve, check-in and out, version control), customizable user interface, unified inbox, and the like. Product features may include custom alerts, buyer utilities, bulk addition of files and folders, dynamically indexing information, advanced and federated search and filtering, custom fields and tags, integration with third-party document formats (e.g. Microsoft Office products), add and management of users and groups, multi-file uploads, commenting, compliant archiving, native-format file viewing, business intelligence based on activity reporting, question and answer components, link mapping, secure viewing without plug-ins, unified communication and collaboration (e.g. presence notification, IM-chat-discussion threads, forums and wilds), administration capability, e-forms, and the like. Security may include on-demand rights management, access and authentication (e.g. document and content level access, multi-factor authentication, single sign-on), data encryption, tracking and audit, intra-structure security (e.g. systems protection, security audits), personnel security, process security, encryption, watermarking, and the like.

In embodiments, the present invention may provide for market aspects related uses, applications, environments of deployment, use scenarios, ecosystems, value chains, system integration, and the like. Applications may include corporate repository, extended team collaboration, managed file transfer, secure extranet, project lifecycle management, board reporting, legal extranet, legal repository, legal collaboration, managed file transfer, regulatory audit and reporting, secure extranet, financial audit management, fundraising, investor communication, contract management, regulatory filings, board of directors' communication, Compliance feed integration, access gatekeeper, project capital finance, project collaboration, supply chain management, contract manufacturing, and the like. Markets may include finance, loan syndication, M&A (e.g. relationship management and marketing activities, client interactions, sending legal documents and contacts for comment, edit, and signature), alternative investments, commercial banking, investment banking, bankruptcy and restructuring, corporate development, construction, life sciences, pharmaceutical, biotechnology, energy and utilities, utility rate case management, insurance, telecommunications, project life cycle management, information technology, legal services, government, manufacturing, real estate, media and entertainment, and the like. Environments of deployment may include corporate development, corporate repository, corporate finance, corporate legal, engineering, human resources, marketing, general services, research and development, compliance and security, line of business, and the like. Use scenarios may include, bankruptcy & restructuring, board reporting, business development and licensing, clinical site activation, extended team collaboration, fundraising, initial public offerings (IPOs), investor portals, investor reporting, legal extranet, managed file transfer, mergers and acquisitions, private placements, project lifecycle management, regulatory audit and reporting, regulatory case management, safety document distribution, secure extranet, structured finances, syndicated lending, virtual data room, and the like.

Current methods for sharing computer files are not adequately secure in that a user may make errors in sending information, such as with a single, errant click, and send sensitive information into the wrong hands with no way to recover the sent materials. Alternately, sensitive information may be provided to a trusted associate that subsequently leaves a company or department, to a vendor where the user's company subsequently switches vendors, to someone outside the company that is subsequently identified as a risk to the spread of sensitive information, and the like, where the sender would like to revoke access to the shared content. The present invention may provide for methods and systems for securely sharing content (e.g., computer data content, such as documents, presentations, spreadsheets, emails, blog entries, texts, and the like) that allows for 'un-sharing' of content that has been previously shared. The facility to un-share content may be implemented through the content being associated with a secure protection feature, such as through digital rights management (DRM), encryption, permissions, and the like. In embodiments, each content item may shared with the protection feature, where the protection feature specifies a user or group of users that are authorized to access the content for viewing. Then when the content is shared with that user, access to the content may be revoked at any time (e.g. by changing the DRM, removing access to the key, changing permissions, and the like). Further, if the sender of the content controls the protection feature, then the sender has complete lifetime control of any content they distribute or provide access to.

The secure un-sharing facility may be used to securely share content beyond the secure protective facilities of their enterprise (e.g., allowing secure sharing beyond the firewall of the sender's enterprise), out to users in other companies, into the public space, to users not intended to get the content, and the like, where the sender maintains complete control to access of the content, no matter where or to who the content has been distributed. In this way, the secure sharing of content is made to be easy across corporate boundaries at the user level and at the individual content level (e.g., at the level of an individual document). Further, the process allows a user wishing to unshared a content to be discrete in its execution, allowing the sender to revoke access without having to contact or to track down the recipients, who may not have any indication sent to them that access has been revoked. With the unsharing facility, the content simple stops being accessible. And the revoking of access may be for not only the original content, but for all instances of the content, such as copies stored on various devices and computer environments (e.g., stored on desktop, tablet, mobile smart phone, in an application, through a web browser, and the like), copies sent to third parties, and the like. And since the protection feature may apply to all versions that have been modified (e.g., edited versions, redline versions, commented versions, signed versions, and the like), access to modified versions of the content may also be revoked when the access to the original content is revoked.

In embodiments, access to a shared content may require an access authentication to a secure facility, such as the secure exchange server. That is, even if content has been shared with a user, the user may only be able to view the content if their access is authenticated. Authentication may be a manual login to verify that the user attempting access to the document is a user that is listed to have access to the content. Alternately, a user that has access may establish a computer device that is tied to their personal authentication, such as through the secure facility. For instance, an authorized user may associate their personal authorization to their portable computing device (e.g., tablet, smart phone), such as where the portable computing device has a password to access the device, thus ensuring that the person requesting the access from the mobile device is the authorized user.

In embodiments, the security process that protects the content, such as a document to be uploaded and shared, may incorporate a plurality of protective steps. For example, when a document is uploaded a virus scan may be run, permissions may be established, a search index may be created, digital protection may be applied, the document may be converted (e.g. formatted), the document may be encrypted, and the like, where encryption may be applied individually to each new content, such as through a randomly generated encryption key. When a download of the document is requested, such as when an authorized user is downloading as part of the document being shared, a random key with a key ID may be generated for that particular document where the document is encrypted with the random key. A master key may be split between a database and a file system, where the encrypted random key and random key ID are stored in the database, and the random key may be encrypted with the master key, and the like. Permissions, virus scan, watermark, digital protection, and the like may then be applied before delivery of the document.

In embodiments, the un-sharing facility may enable the control of access down to the individual content level, such as with the creation of a new document, which may be part of or be the start of a collaborative social work stream, allowing users to share content, and then initiate and perpetuate conversations and interactions around those contents. Social work streams may support discussion threads, activity streams, and other common social interaction facilities, which may utilize the content as the organizing basis. The process of un-sharing a content may result from removal of the content from the work stream, retiring the work stream, removing the individual content entirely, and the like.

The present disclosure describes a secure content sharing and productivity solution for organizations to share confidential and non-confidential content between and amongst enterprises over a global communication network such as the Internet, including outside enterprise firewalls. The present disclosure may provide a secure content sharing and collaboration environment that goes beyond the enterprise firewall; establishing a seamless dual-use user workflow environment that accommodates both secure and personal exchange of content without the need for the user to adopt substantially new workflow process and applications; providing secure interfaces for viewing documents using mobile computing devices, such as touch-interface tablets (e.g. including the incorporation of personal user devices); and the like.

The need for beyond-the-firewall content sharing space has been created by the confluence of technology evolution (e.g. cloud computing and virtualization, portable form factor innovation, 'big data' BI tools), organizational shifts (e.g. rapidly growing cross-enterprise collaboration, global fragmentation of enterprise, cross-functional teams, demographics shifts), changes in the role of integration technology (e.g. cost and complexity reduction, pressure for measurable business value, 'computerization' of enterprise IT and 'bring your own device'), government and regulatory issues (e.g. increasing regulations, cyber security threats), and the like that collectively increase the importance of easy and secure collaboration of documents and content beyond the enterprise firewall. Other solutions have taken a variety of approaches to address fragments of these requirements, but important unmet needs remain for information technology directors, business leaders, and users remain, including in the areas of integration of security/control, ease of use, seamless operation across different ways of sharing, and the like.

In embodiments, the system may include methods and systems for providing a single fabric to enhance the most common forms of beyond-the-firewall content sharing, improving individual and team productivity across the extended enterprise while providing unified security and compliance for IT and business leaders; allow users to continue beyond-the-firewall sharing however they prefer with a single user interface enhancing the security and productivity of e-mail, sync-and-share folders, externalized enterprise content management, and enterprise social collaboration tools; integrate with consumer-focused sync-and-share services where possible to enable their secure and compliant use within the enterprise; enhance forms of collaboration to which users are already accustomed, and not require adoption of a new way of working or collaboration destination; target the unique collaboration and sharing requirements of the extended enterprise and complement other enterprise systems; and the like.

In embodiments, a need for a comprehensive sharing system may include an ease of use and intuitive user interface; with granular security permissions, to help ensure that unauthorized individuals can't open documents; ability to control content post-sharing (e.g. the ability to pull back a document), enabling a user to recover and destroy data remotely, such as in using a virtual data room; productivity tools integrated with content sharing, consolidating a plurality of user log-ins and passwords; the ability to integrate with existing infrastructure, to eliminate the need for a plurality of sharing tools; providing multiple channels for collaboration in order to integrate the methods and systems into as many productivity platforms as possible; and the like. For instance, with a single user action within the user interface, the user may be able to revoke access to a shared file or resource, regardless of where the file or resource is stored, thus providing an enterprise workforce the freedom to share, as well as the ability to un-share. In addition, reporting of actions may include audit trail facilities, such as at the gateway level, and governance, including policies embedded in workflows. Collaboration may be provided with significantly reduced risk through tools provided by enterprise information technology personnel, thus reducing the risk of employees sharing sensitive documents outside the firewall (e.g. through email, USB transfers, FTP, through third-party services, web/cloud file sharing, and the like). Security may provide additional protection, such as through IRM, encryption, and the like. The sharing facilities may include sync and share functionality, workflow tools, business intelligence, and the like, and provide greater secure connectivity and productivity, improving the workflow in association with customers, suppliers, partners, professional service organizations, business prospects, and the like. Thus, methods and systems disclosed herein may include client and server-side, as well as cloud-deployed components, for managing access to resources, including based on policies associated with such resources, as well as such components for tracking, reporting, and managing access to resources, such as to keep consistent, synchronized versions of such resources across multiple access devices.

Figure 10:
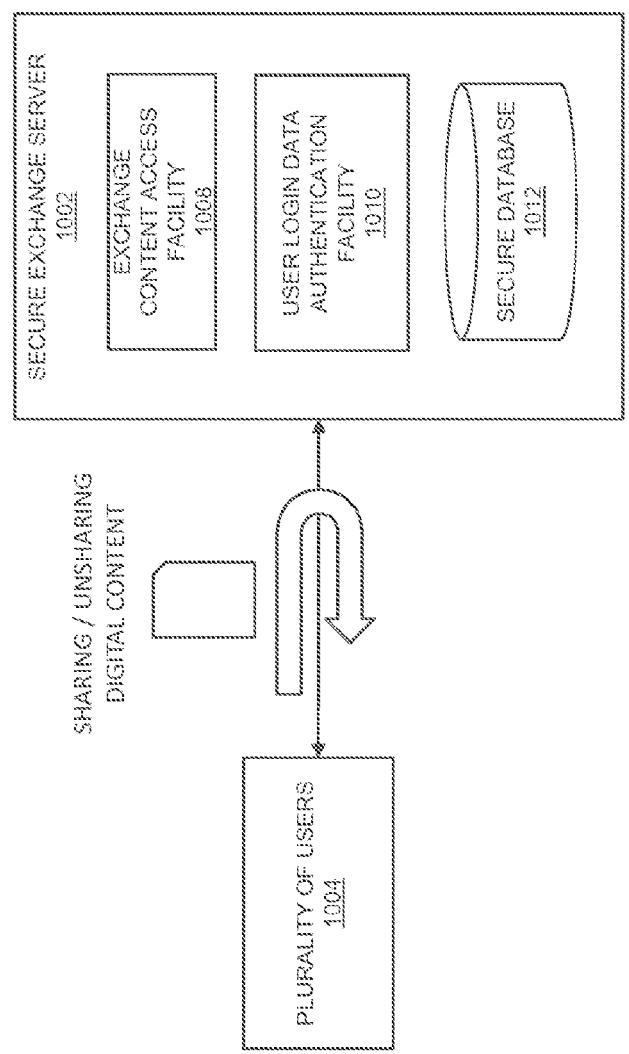
FIG. 10 depicts a functional block diagram for an un-sharing facility in an embodiment of the present invention.

Referring to FIG. 10, the present disclosure describes an exchange content access facility 1008 in association with the secure exchange server 1002 that improves the security with which a plurality of users 1004 collaborate freely, including through a plurality of different content sharing devices and facilities, while providing lifetime control of their content. For example, suppose a user sent quarterly sales data to an old accounting firm, employee records to someone outside of HR, the wrong contract to the wrong vendor. When a user 'un-shares', content access may be instantly revoked, including any content that may have been from copies of the original content. In embodiments, the user may have total lifetime control of each and every content item, such as documents, emails, communications, and the like. In embodiments, the content may be stored and tracked in a secure database 1012. Users may share and revoke access to content all the way down to the document level, providing a secure place to upload files and share them across devices. In this way, users may be provided a secure storage facility for company sensitive information, where users are able to work more securely, such as with their existing infrastructure (e.g. seamless integration with applications like Microsoft Outlook, SharePoint, and the like). The un-share facility may allow a user to create a new work stream, securely upload the documents, and work with teams that are enabled to securely collaborate. In addition, the un-sharing facility may provide for reports, audits, summaries, and the like through a dashboard facility, such as a summary view of all work streams, customized security settings, ability to add new participants, provide automated reporting, and the like. The exchange content access facility 1008 may utilize a user login data authentication facility 1010 to authenticate users' access to content, where there may be the option of having a single sign-on in association with other user logins. In embodiments, the login may utilize security hashing in a redirect URL, such as to secure the login against Phishing attacks. The single sign-in may extend to mobile devices, including personal mobile devices, were a lookup table may be used to verify that the user has single sign-on capabilities or not.

In embodiments, a method for managing a networked secure collaborative computer data exchange environment may be provided. The secure exchange server 1002, such as managed by an intermediate business entity, may establish a user login data authentication procedure that allows a user to access the secure exchange server, where the secure exchange server may store user login authentication data for each of the plurality of users, such as in a secure database. Users may access the secure exchange server through a plurality of different computer devices, applications, communications channels, and the like. The user may be one of a plurality of users 1004 that work for a plurality of other business entities (e.g., users may be employees of the same business entity or users may be working for different business entities), where the users of the other business entities communicate with the secure exchange server through a communications network, such as a wide area network (e.g., the Internet). To share a computer content item, a first of the plurality of users may request a sharing access from the secure exchange server to a content item to at least a second of the plurality of users. Management for access to the content may be through an exchange content access facility 1008 managed by the intermediate business entity. After the exchange server receives the content from the first of the plurality of users, it may grant sharing access to the content when the secure exchange server receives from the second of the plurality of users its client login authentication data (provided that the second of the plurality of users is one of the subset of the plurality of users to which sharing access is permitted). The second of the plurality of users may then request a copy of the content from the secure exchange server, wherein a copy of the content is made. Further, the second of the plurality of users may further copy the content onto a plurality of different computing devices, make changes, revisions, annotations, and the like to a new version of the content, send the content to other users, send the content to people and computing devices beyond the boundaries of the business entities, and the like. To un-share the content, the first of the plurality of users may then make a request to the secure exchange server to revoke sharing access to the content to the second of the plurality of users. As a result, the secure exchange server revokes access by the second user to the content, such as through encryption and DRM facilities described herein. Further, this revocation of the second user's access to the content may similarly be applied to all instances of the content within the plurality of users, wherein the revoking of sharing access to the content revokes access to all instances of the shared content and all copies of the content made by the plurality of users. In a similar fashion, any individual that does not have authority to access the content may not have the ability to access any instance of the content. In embodiments, copies of the content may be deleted from the secure data server, wherein the deleting access to the copy of the content is revocation of digital rights management of the content. The digital rights management of the content may be controlled in part by the first of the plurality of users, including revoking access to the content through changes in the digital rights management associated with the content. The content may be a secure encrypted content. Users may securely view the content through a secure viewing facility. Users may be connected to a public network that is outside of the firewall for the business entity that manages them. Users may access the content through a personal computing device that is not owned by the business entity that manages them, such as through a personal computer, personal mobile device, and the like. Users through a dashboard facility may interface the exchange content access facility, where the dashboard facility may provide reports showing activity related the sharing of content. The dashboard facility may be accessible through third-party environments. The dashboard facility may track the location and version of the shared content on computing devices accessible by the at least second of the plurality of users.

Figure 10A:
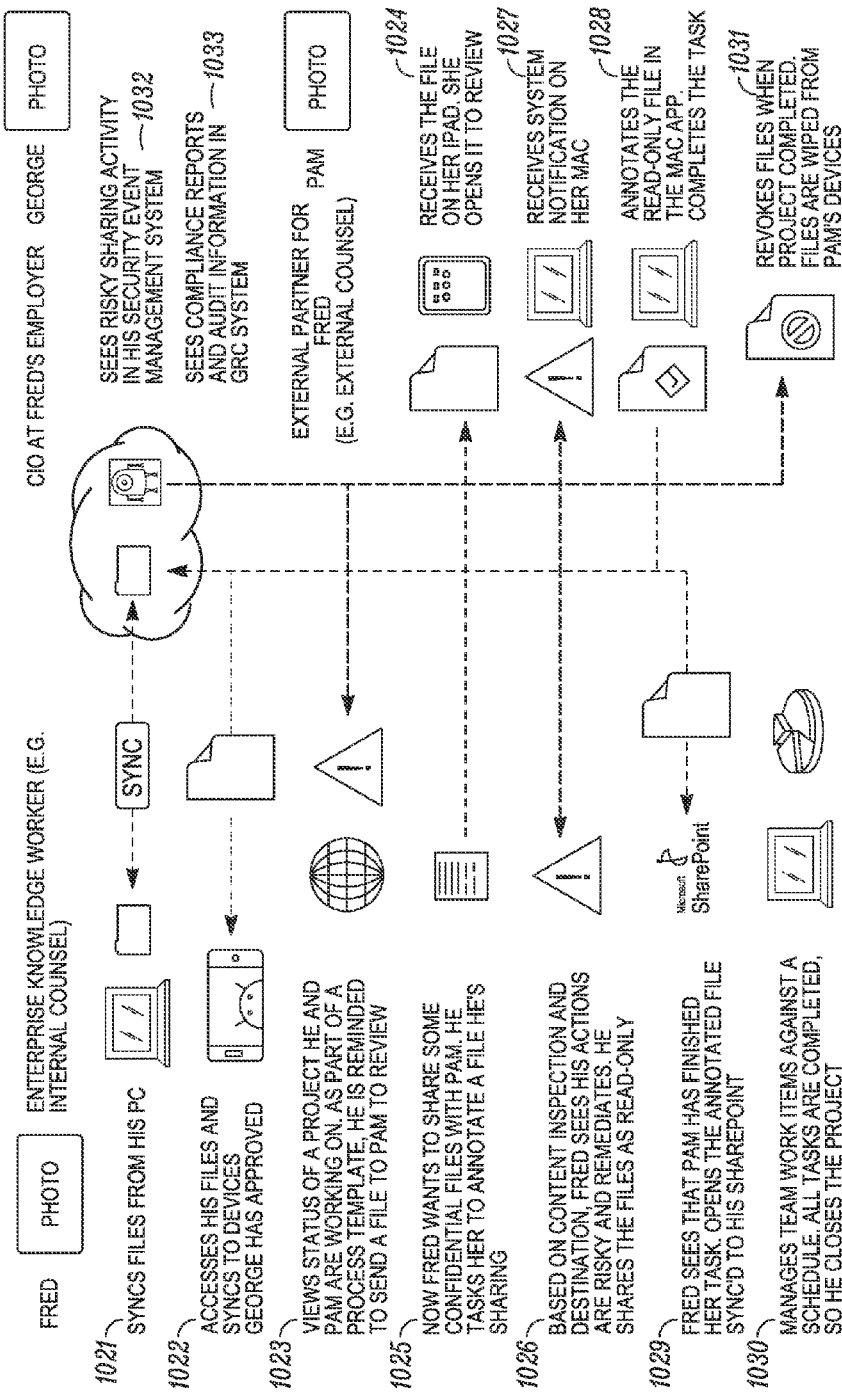
FIG. 10A depicts an illustrative process flow diagram that in part describes an interaction utilizing the un-sharing facility.

FIG. 10A provides a non-limiting example of how the present invention may provide an improved workflow between collaborating individuals. In this workflow scenario, an enterprise knowledge worker 'Fred' (e.g. internal counsel) is collaborating with a chief information officer 'George' who works at the same company as Fred, and an external partner 'Pam' (e.g. external counsel). As shown, in a first step 1021, Fred may sync files from his personal computer, such as with resources in the cloud. These resources may include syncing with virtual secure data room facilities, third-party computer sync facilities that are compatible with the present invention, and the like, and may be made available through the dashboard facility. In a second step 1022, Fred may also access his files and have the ability to sync to devices that George has approved, such as through a virtual secure data room, an enterprise or shared enterprise policy facility, and the like. In a step three 1023, Fred may view status of a project he and Pam are working on, such as through the dashboard facility. As part of a process template, he may be reminded to send a file to Pam for review. In a step four 1024, Pam may receive the file on her iPad, where she opens it to review, such as through the mobile device viewing facility. In a step five 1025, Fred may now want to share some confidential files with Pam, such as though a virtual secure data room facility, with the ability to 'pull-back' the document from Pam at anytime through the un-sharing facility. In addition, Fred may task Pam to annotate, review, markup, revise, and the like, the file he's sharing, such as through a content creation application (e.g., word processor, spreadsheet application, presentation application, media tool), the amendment voting facility, the e-signing facility, via the secure viewer facility, and the like. In a step six 1026, based on content inspection and destination, Fred may see his actions are risky and decides to remediate, such as by un-sharing the document from Pam's access, as implemented through the dashboard facility, and the like. He may then, for instance, choose to share the files as read-only. In a step seven 1027, Pam receives system notification on her Macintosh computer, such as through the dashboard facility. In a step eight 1028, Pam annotates the read-only file in the Mac application, and competes the task, such as through an application that Pam is familiar with and integrated for ease of use in the familiar workflow environment created by the present invention. In a step nine 1029, Fred sees that Pam has finished her task, such as though the dashboard facility, opens the annotated file and syncs (e.g. via SharePoint). In a step ten 1030, Fred manages teamwork items against a schedule, and with all tasks competed, closes the project. For instance, the project may have been a loan syndication project, and once complete, Fred may completely eliminate accessibility to documents and communications that were transmitted during the transaction, such as removing access to any documents that were transmitted during execution of the project. In a step eleven 1031, Pam may also revoke files when the project is completed, and files are wiped from her devices, such as the system pulling back the files as tracked by the system in a secure database created for the project (which in itself may be deleted once the project is complete). In a step twelve 1032, George may see risky sharing activity in his security event management system, and in a step thirteen 1033, see compliance reports and audit information in a governance, risk management, and compliance (GRC) system, such as through monitoring via the dashboard facility. In embodiments, a workflow thread may be initiated within an exchange amongst other business entities, with selected individuals in a micro-transaction, from an email thread, and the like. In embodiments, a user may be enabled to create a concept of a big project and use micro-transaction capabilities to break the big project down into smaller projects that can link back up to the big project. A user may be able to create tasks out of their email inbox, turn an email thread into a task, clear a task by converting the email into a work-stream, make an exchange an extension of an email, and the like.

In embodiments, the system may provide for the ability to remotely delete content from a device while the device is off-line or not connected to a network. This capability may be implemented by providing a lease to a desktop application when it starts up and has a successful logon, such as configured by a policy through an administer console. When a device is powered up and a lease period is expired without a successful logon during the lease period, the system may initiate a deletion of files, such as would be the case if the device had been lost or stolen. This application may be a separate desktop service running on the device in the background (e.g., sleep and awake in pre-defined time intervals). When a device is powered up, the application may record the values of a lease expiration date/time of a previous successful login. In another instance, the service may try to connect to a server, and if it detects connection failures continuously past the lease expiration date and time, it may assume that either the device no longer needs to run the application, or it could be lost or stolen. In the case of the device that is subsequently found or re-used, the content may be re-synced for the user once they login to the application successfully. There may be hard or soft leases implemented in the system. In the instance of a hard lease, files may be deleted permanently on the local machine when the lease is expired. In a soft lease, rather than deleting data, the system may move the data to a random location on the disk where a user cannot find it. For example, the system may modify the folder attribute for the data, such as to "+S+H". Setting those attributes will mark it as an important operating system file so that the operating system won't display the data even if settings allow the display of hidden files and folders. In embodiments, the system may provide for automatically deleting documents, whether the device is online or not, based on a date/time range. For instance, setting a range of dates for the life of documents to be between on date/time and another, at which time all related documents and folders are deleted. The system may also delete documents, folders, desktop, and the like, after a predetermined number of login failure attempts, where the system may provide access again upon restoration of access privileges.

In embodiments, the system may provide for remotely deleting documents through a limited local access facility, where the user may have access to a document, folder, and the like, only through an encrypted local application. In this way, files stay encrypted on a user machine and the only way to access them is to use the application that will decrypt the documents. The local application may also be embedded, as described herein, such as through a browser, where a user may only be able to access documents with credentials that tie to the encryption key. The local application may be a viewer application, where documents are distributed through a distribution engine, but where the user can only view the documents using the viewer that would decrypt the document for viewing.

In embodiments, the system may integrate the sharing capability with other third-party environments, such as including existing file sharing solutions (e.g. Drop Box, Google Drive, Skydrive, Box.com, MediaFire, SugarSync, TitanFile, YouSendIt, SparkleShare, Ubunto One) providing cloud storage, file synchronization, client software, and the like. In addition to sharing resources, the present invention may also provide a 'share' option within other third-party day-to-day workflow solutions, such as desktop tools (e.g. Microsoft Office, iWork, Google Docs, OpenOffice, and the like) and enterprise tools (enterprise DBs, CRM tools, analytical tools), and the like, where without departing the interface of the third-party tool or application, the present invention may allow content to be shared outside the enterprise with another party, but with the secure data room and secure viewing features as described herein (e.g. the ability to track access and viewing, ability to have 'read only' viewing and annotation, secure viewing on a mobile device, ability to pull back a document), and the like. Further, the present invention may be able to interface with templated secure sharing processes, such as by having input events and output actions consist with those (e.g., Outlook receives an email from a secure process and signals an action; LinkedIn lets a user view and approve a corporate voting item).

In embodiments, the system may enable an organization to maximize the value of content by balancing the freedom to share with the necessary control and monitoring provided by the system, which extends the way an organization works, such as by allowing them to share and access content wherever it is needed, controlling and monitoring content wherever it goes, coordinate work across people, organizations and devices as a natural extension of familiar tools and experiences. The system may provide for a full-service, global facility as a 'partner' wherever the user may go, providing visibility and control of work-centric content, freedom to collaborate, and the like. The system may provide a trusted standard for information security 'beyond the firewall', providing automation and monitoring of corporate information policy, extending a familiar user experience and existing infrastructure, and the like. Collectively, the methods and systems of the present invention may provide for an intent-based sharing 'fabric' for enabling comprehensive collaboration.

In embodiments, the system may provide for improved connectivity, security, productivity, and the like, as related to a shared collaborative work environment. Productivity may include the ability to assign and manage document-centric business actions (e.g. e-signature), project task management, and the like, such as to provide more structured document sharing platforms (e.g. more than just email, which may be an ad-hoc communication). Security may include role and file-based permissions, outside the firewall pullback of document permissions, automatic document content and security classification, and the like. Connectivity may include single secure connection to document sharing tools across devices, secure access to internal ECM platform for external parties, integration of enterprise-class security into existing sync-and-share tools, and the like, such as to enable access anywhere the client needs it and the ability to make updates to documents easily, regardless of where the user is located. The system may provide advanced analytical features to improve productivity, such as audit compliance, document versioning and tracking, document contextualization, historical performance analysis, predictive analytics, task productivity optimization, and the like. The system may also include social collaborative features to improve interactions within projects, such as improved communications within the workflow, secure project management, tablet-based collaboration, synchronous co-editing, social collaboration, a social layer around business applications, and the like.

In embodiments, the system may provide for synchronization and sharing for the individual business professional, including a plurality of channels (e.g. Windows desktop client, web browser, Microsoft Outlook for Windows, iOS support [such as a native app for the iPhone and iPad]), features (e.g. desktop file and folder synchronization; secure file sharing from desktop, browser, and iOS; push notifications, collaborative discussion threads and commenting; user self sign-up), for work with business intent (e.g. sending a copy for download, sharing access to a centrally located file for review), administration (e.g. canned activity audit reports, such as for compliance; canned accounting reports, such as for billing); centralized group policy, such as for security defaults), security (e.g. with strong, per-file encryption and permissions; browser-based, read-only file access; integrated file information rights management (IRM) and digital rights management (DRM); file access revocation; mobile device security; full compliance audit), and the like. The term 'work with business intent' may include the ability of users to share files 'with intent'. For instance, the intent may come in the form of document tasks that may be assigned to recipients, where the system may let users send files for review, send for signature, send for annotation, comment, and the like. For instance, the system may want to give users the ability to combine document tasks (verbs) into ad-hoc workflows and save as a template, which may also be referred to as a verb cluster. In an example, if a manager has to get slides ready for a board of directors (BOD) meeting, they may start up a "BOD" workflow that included several document tasks and individuals responsible. One employee may get a task to comment on the slide deck, another gets a task to review and approve the material, and the manager gets a task to sign the document for auditors after the first two tasks are completed.

In embodiments, the system may provide for document collaboration and intent-based 'work', including a plurality of channels (e.g. native Android, iPhone, and the like support; plugins for Microsoft0020Office apps; SharePoint Connector integration; Mac Client [such as file/folder sync]), features (e.g. desktop file and folder synchronization for Mac; file sharing with intent, such as for document-centric work assignment and task management; calendaring; in-document task completion; collaborative editing and annotation; 'in-app' publishing and collaboration, such as check in/out), for work with business intent (e.g. work items such as send for review and approval, send for feedback and annotation, request edits to a document, send for electronic signature, request form completion), administration (e.g. bulk user administration through active directory, UI customization and branding, report creation and scheduling), security (e.g. device registration, data loss prevention filters, such as reminders to users when they share files in a risky way; remote device wipe), and the like.

In embodiments, the system may provide for enterprise integration and business process management, including a plurality of channels (e.g. published integration API, third-party app integration, Outlook for Mac), features (e.g. work template creation, team collaboration spaces, milestone and project management, in-browser document editing), for work with business intent (e.g. work item customization, such as combining document tasks to create lightweight ad-hoc business processes), administration (e.g. user and administrator-authored business process), security (e.g. data loss prevention, such as blocking unsafe actions; security information manager (SIM) and security event manager (SEM) integration; customer managed encryption keys; governance, risk management, and compliance (GRC) system integration), and the like. For instance, disclosed features (e.g. an un-sharing feature to pull back documents as described herein) may be embedded into daily use tools, such as into communications software (e.g. Microsoft Outlook, Gmail), browsers (e.g. Windows Explorer, Firefox, Safari), Enterprise Resource Planning (ERP) applications, legal systems, collaboration systems, and the like, and to make it easily available and easy to use. All these systems have a need to distribute documents outside the enterprise firewall to users who are not logging into these systems on a daily basis, and by embedding these capabilities enables users for secure sharing, auditing, compliance, and the like for documents within user applications. In an example, suppose sales personnel are building a quote for a customer in a third-party application, such as Salesforce.com for instance. Typically, users would have the ability to email the quote directly, or to download the document and email it, where there is no audit or compliance within the third-party application for these quotes. With the use of an embedded capability, the document would be sent directly from the third-party application with the system's secure sharing audit and compliance capabilities, ability to pull back (un-sharing) documents, and would be available from within the third-party application. The embedded service may have the standard components to make this service possible, such as SSO authentication, file viewer, policy definition, auditing, device provisioning, user profiles and compliance, and the like, where these would be built like a service and may be integrated directly into the standard enterprise applications. Security rules may also be implemented in the embedded system, such as with a range of security (e.g., ranging from public to highly secure), screen capture and viewing protection, device control, auditing enforced, and the like.

In embodiments, a question and answer management facility 262 may be provided, where a collaborative group of users may exchange questions and answers, such as in a project, and where at least one user may manage exchange through the question and answer management facility. For instance, users may be buyers and sellers in a transaction, where buyers ask questions and sellers answer questions. In another instance, users may be customers and expert representatives of a product, service, deal, and the like, where customers are asking questions and the expert representatives are answering questions. Through the question and answer management facility, the at least one user may then manage the exchange (such as being identified as a question and answer coordinator). Alternately, each user in the exchange may use the question and answer management facility to manage the exchange, thus creating a dynamic collaborative question and answer environment. Management functions and features of the question and answer management facility may include the ability to trace questions and answer exchanges, archive the history of a question and answer exchange and resolution, provide the facility to import bulk questions into the exchange, remove a question from the exchange once the question is answered, match questions for answering to an individual or group of individuals based on a criteria or metadata extracted from the question, and the like. A question and answer exchange may be provided a question status, a delegation status, and urgency indicator, and the like, and marked as proposed, new, in-process, closed, FAQ, and the like. Questions and answers may be sorted, searched, organized, and the like based on a criterion, such as by submission date, status, category, a question ID, keyword, priority, and the like. A user or coordinator may assign a question one or more criteria, such as a level of priority (e.g. high, medium, low), which may aid experts to focus their attention on issues that are most important.

In an example, suppose a group of individuals is engaged in an acquisition transaction, where there are buyers and sellers, where there are a number of buyers and sellers on each side of the potential transaction, and where the buyers and sellers have different roles and expertise relative to the acquisition. A buyer may ask a question to the sellers. Through the question and answer management facility the question may be presented to the sellers, where one seller addresses the question, and after an exchange, the question is resolved. The question and answer management facility may track the exchange, archive the exchange, remove the question from further discussion, remove the question from a pending question queue as provided to buyers and or sellers (such as though a dashboard interface), and the like. Further, the question may be matched to a particular buyer and or seller for answering and resolution, such as based on a user expertise criteria associated with the user (e.g. the user is identified as being 'legal', 'finance', 'technical', and the like. The matching may also be determined through a facility of the question and answer management facility that uses characteristics or metadata associated with the question to match the question to an individual best suited to answer the question. For instance, the question may contain a word, string, phrase, and the like, that matches a criteria of being a financial question, and so the question is then directed to users on the other side of the exchange that represent finance. In embodiments, once the question and answer exchange is resolved, the question and answer management facility may mark the question as resolved, remove the question from the exchange, archive the exchange, and the like.

In embodiments, a user may import bulk questions and/or answers into the exchange through the question and answer management facility. For instance, a buyer and/or seller in an exchange may have a set of frequently asked questions and/or answers that are relevant to the exchange, and import them into the exchange. In an example, a buyer may have a standard set of questions for a seller, such as where the standard set of questions have been developed over time. To facilitate this import, the question and answer management facility may accept the bulk import in a plurality of formats and from a plurality of computer applications (e.g. imported to the system from a Microsoft Excel workbook).

In embodiments, the entrance of a user into an exchange may be as an authenticated access, an un-authenticated access, a semi-authenticated access, and the like, as described herein. For instance, management of an exchange may require the user be authenticated as having the privileges to manage the exchange, to view the exchange, and the like, but an unauthorized user may be able to insert a question into the exchange, and receive an answer from within the exchange group, but not have access to content within the exchange that requires authentication. In embodiments, a question and/or answer from an un-authenticated user may show an indication of such to other users in the exchange.

In embodiments, the question and/or answer in an exchange may include links to further information regarding the question and/or answer. For instance, the question may request data, and a link may be provided by the user answering the question to direct the user to the location of the data.

In embodiments, the question and answer management facility may provide the ability to retract, correct, or redact questions and/or answers as part of the exchange. For instance, an answer may be provided by a user, but later found to inaccurate. In this instance, the answer may be optionally retracted or corrected. In embodiments, users in the exchange may be informed when a retraction, correction, or redaction is executed.

In embodiments, the question and answer management facility may be provided through a user dashboard interface to manage the question and answer environment, such as to increase client usability, provide operations (e.g. delegate, close, withdraw, answer, change priority, and the like, in association with a question and answer exchange), provide for a facility for importing and exporting content associated with a question and answer exchange, manage priority (e.g. including management, voting, questioning, and the like, the priority of a question), provide filtering facilities for questions and answers, ability to re-open a closed question (e.g. for changing the answer, to reopen discussion, to solicit additional answers), alerts to questions and/or answers being changed, the ability for a respondent to save a draft answer prior to posting, and the like.

In embodiments, a single sign-on facility 264 may be provided, where users or organizations utilizing the system may be provided a private channel access to an exchange, such as through a single sign-on to the system with protected access. A Channel may provide a way to implement a private slice on the system, such as though a portal that allows users to view only those exchanges explicitly permissioned to the Channel. For instance, a Channel may be a list of allowable brands combined with an Identity Provider ("IdP"). When a user is authenticated by that IdP, that user may be considered to be in the associated Channel and his/her view of permissioned ILP data may be restricted to that of the Channel. In this instance a Channel is, essentially, a virtual private instance of the system. In customer deployments where the system user interface is hosted by a third-party, this system may better ensure that there is no data leakage between separately permissioned exchange domains. Private Channels may ensure that a client's information is only viewed by their SSO users. Private Channels may provide a means for ensuring that users do not see information from other organizations while using SSO, even if they are permissioned to other organizations' exchanges. In an example, if a user is logged into the system using Company A's SSO connection, they will see exchanges and data only for Company A, even though the user may have access to other organizations' exchanges through other access privilege. This facility may support organizations that want to authenticate external users through SSO. For instance, Life Sciences and Alternative Investments clients that maintain their own portal may want to authenticate their user community to using SSO. In another instance, a Johns Hopkins doctor may be in drug trials with two different pharmaceutical companies, and if the doctor accesses through the channel of the Company A's website, then they only see Company A's information. This functionality is especially useful anywhere that a client wants to have a private portal in a multi-tenant scenario.

In embodiments, the system may provide for context-based, automatic, on-demand provisioning. For instance, a client may create a web page where a user could enter credentials. When they create an account (e.g., new employee), the system may automatically provision an exchange for them, where the employee logs in by their structure. The SSO may verify that the person has permission, and automatically set up an account for that user, where everyone from that organization would be treated as signed-in to the organization. That is, once logged in, the user may go through the channel and access information without logging in again, such as based on the context provided through the user, the organization, and the like. In embodiments, the context may be provided through tagging the user to enable future sign-ins. For example, a company may want to provide an outside law firm to access certain data in an exchange, and through contextual-based provisioning, the law firm may be tagged to not only allow them to access again without logging in, but will be restricted to only the content the organization is provided through the private channel. Thus, a user's access to certain information is restricted to the context of where they sign-in.

In embodiments, an un-authenticated document exchange facility 268 may be provided, where exchange managers may be able to mark specific exchange participants who are permitted to skip the login process (e.g. skipping steps requiring the providing of their user name and password), when downloading documents, such as from alerts. For instance, when a permissioned user tries to access a document through a special document URL in an email alert, the document will start to download, without asking the user for further authentication. The special document URL may allow such access for each document for the specific exchange user for a period of time, such as a week, a month, and the like, from the moment that the alert was sent. The system may identify the users to whom the alert was sent, where access reports may indicate that the particular user has viewed the document, even though an authentication is not required. Each exchange participant that was marked to allow such access may have a visual indication in the user's list view, to make it clear that they have a different type of access rights. This type of access may be specific to a given exchange, and may not necessarily be transferable between exchanges. This functionality may be especially useful for clients that are distributing content to individuals and organizations that access services very infrequently, where these individuals constantly experience challenges logging in and using the service through lack of regular use, and often experience forgetting the login and password. For instance, an investment client may only send out content quarterly, and have a desire to allow a subset of their investors to gain access to their statements without authentication. Instead of sending these investors documents via email, the system could allow the fund administrators to send statements via this un-authenticated service, thus alleviating the need for the investors to remember a login and password. In embodiments, the user may be provided a link to access the content, where after optionally providing a confirmation of who the user is (e.g. an email address), the document can be downloaded. The use of this system may allow for targeting users to receive special document access (e.g. through alerts, email links, and the like) and tracking of their document access (e.g. for legal and security review), and the like. Users who are not required to log in may be identified by a special icon or identifier, such as when managers view a user list. Document access reports may also be updated whenever the link is activated (e.g., 'clicked'), and the access attributed to the user who was permissioned to use the document. Since access to content may be enabled and tracked through a URL link, the system may then limit distribution by de-permissioning a URL (which makes that URL inactive). Since the user doesn't know the URL, they can't obtain access if the URL is inactive.

The use of un-authenticated access to content may have many applications. For instance, an organization may want to provide publicly available information, where the system of un-authenticated access gives public users access to the document without 'permissions', but allows the organization providing the information with a means of tracking the access to the information. For example, an organization may want to make public a 'teaser', such as with respect to an investment opportunity. The organization now is able to track the access to the information.

In embodiments, the use of un-authenticated access may enable an organization to send out access to information without pre-populating a contacts list with secure-access users. The organization may only need to have a list of email addresses to send the URL link to, without the need for credentials from the user.

In embodiments, the system may utilize a semi-authentication process, such as requiring the user to provide a personal ID (PIN), such as determined by the user or the organization providing the URL link.

In embodiments, a synchronization facility 270 may be provided for metadata-based content synchronization, where the system may be utilized to provide synchronization and sharing of content, such as amongst the various computing devices of a single individual, a group of individuals, an enterprise, and the like, where synchronization may be selective, such as a user selecting what files to synchronize, what computing devices to synchronize, which individuals may share through synchronizing, and the like. The user may also set up rules by which synchronization is selected, such as rules associated with location of a computing device (e.g. not synchronizing when a computing device is not on a secure network, in a foreign country, and the like), a version number of the document (e.g. only synchronizing the most recent revision of a document), and the like, where the rule is based on metadata attached with the document. In embodiments, documents may be geo-tagged, and through that geo-tagging the synchronization process may determine whether to sync. A user may not only be able to identify a certain folder for synchronizing with a group of individuals, but also that only the latest version of a document should be synchronized. In this way, a user being added to the synchronization group would not have all the old versions of a document synchronized. This capability may help the user make decisions that can reduce workload during synchronization and free cycles for synchronizing more critical content.

In embodiments, a file sharing activity facility 272 may be provided to package up and archive the history of file sharing between individuals in an exchange. The archived file sharing may be stored in a similar process as that of emails, and placed in an archive for future searching (e.g. for litigation or e-discovery requests). With the file sharing archive stored in a similar format as that of emails, searching for sharing and searching for emails may be carried out together, where the email and file searching archives appear to be, or actually are, a single searchable archive. This archive may also be sharable with other individuals within the exchange, may be synchronized with other devices active with individuals in an exchange, and the like. The archiving of sharing activity may be at an exchange-level, a user-level, a document-level, and the like. For instance, a document-level archive may include the document itself plus the whole history of the document (e.g. viewing history, who edited the document, when the document was signed, and the like), so that when this new archived history is found, such as in a search, a single document may be retrieved describing both its content and its history.

In embodiments, a collaboration management facility 274 may be provided, where in the course of a collaborative exchange, users may have exchanged documents and communications, shared content, synchronized devices, and the like, where the collaboration management facility may be provided to manage the sharing of content and the retention, sharing, and persistence of shared content. For instance, a user may want to remove all trace of the exchange once the exchange is ended. The user may want to control the amount of time a recipient may have or view a document after delivery. The user may want to control the ability to print, forward, view, the document on various platforms, on various devices, with certain individuals and/or organizations, and the like. The collaboration management facility may include a document retention policy that determines the rules under which documents are retained. For example, documents may be tagged with a document retention tag that deletes the document in a set number of days, until a milestone event (e.g. such as tied to a Gantt chart), based on a criteria (e.g. when a document is signed, after the document has been viewed), and the like. In an example, a document offering a service or product may be tagged such that if the recipient of the offering declines the offer, the document is deleted. Alternatively, the document offering may be through a link, and the link is disabled after the recipient declines the offer. The document may be tagged with a duration-based permissioning, such that the document will be deleted, or a link disabled, at the end of a window of time has closed. The document may be tagged for temporary viewing, such as only viewable for a short duration of time when the document is viewed on a mobile device. For example, a recipient may have different viewing and retention permissions for the same document dependent upon the device they are viewing the document on, where they may have permission to view the document for a week on a computer, but only for a few minutes on a mobile smart phone. Alternately, it may be a link to the document that has a limited time for activation. This form of non-persistent sharing may allow the user to share documents in a time-sensitive manner, without the concern that the document will be retained beyond the desired duration. For example, a banker may distribute research to prospects. But the research is the property of the bank, and the banker needs to control access to the research. One option may be for the banker to distribute the research through a URL link, where the URL is tagged for access control through the retention policy. In embodiments, the retention policy may also dictate retention within a group distribution, providing different retention privileges to different recipients, and track the viewing actions and execute viewing-retention limitations for users within the distribution.

In embodiments, a geo-tagging facility 278 may be provided, where a document may be geo-tagged such as to indicate where a document has been created, sent from, received, edited, viewed, and the like. Geo-tagging a document may include information that is appended to and travels with the document through distribution, sharing, modification, and archiving. Geo-tagging information may include geographical location information (e.g. city, state, territory, country, region, zip code, latitude and longitude), a business location (e.g. company name, company address, business unit), a network location (e.g. secure network, an enterprise network, a public network, a wireless network), a storage location (e.g. archive location, thumb-dive storage, DVD), and the like. In an example, a document may be created by a user at Company 'A' in San Francisco, where the location information may include the company name and the city, as well as other information such as time and date and user's name. The document may then be distributed to two other users in two different counties working with two different companies, where this information may be appended to a geo-history of the document (e.g. as stored as metadata along with the document). Additional information may be appended to the document as it is edited, redistributed, and finally archived. The geo-location information may be searched on, such as during its life as an active document or while stored in archive. Geo-tagging of data may better enable the discovery of the document's history (and content therein), such as for legal or e-discovery searches.

In embodiments, an input file optimization facility may be provided, where rules and/or intelligence on document actions increase efficiency with which tasks, especially large tasks, are executed. For instance, when attempting to add a folder with a specific name, it may check and open the folders tag, check if a folder tag is already open, and if the current open folder is different to the new folder then close the existing folder and open the new folder tag.

In embodiments, an archive facility 270 may be provided, such as where there is a need for same-day/next-day delivery of archives, such as in a quick and efficient way to create HTML archives (snap shots) of exchanges without leaving any footprint on the exchange. In embodiments, an API archive facility, created through API calls, may allow automation of the system that decreases delivery time as well as improving other key considerations for archives, including reliability, efficiency, time to production, scalability, predictability, simplicity of process, support, market needs, audit compliance, security compliance, cost, and the like. The tool also may have logic built in that allows the splitting of a single exchange into multiple volumes and splitting at a folder level or documents level. As well as pulling down HTML archives, the tool may be modified from within the configuration file to only download meta-data. Doing this may allow the tool to provide full meta-data reports similar to back-end database reports on folders and documents.

Figure 11:
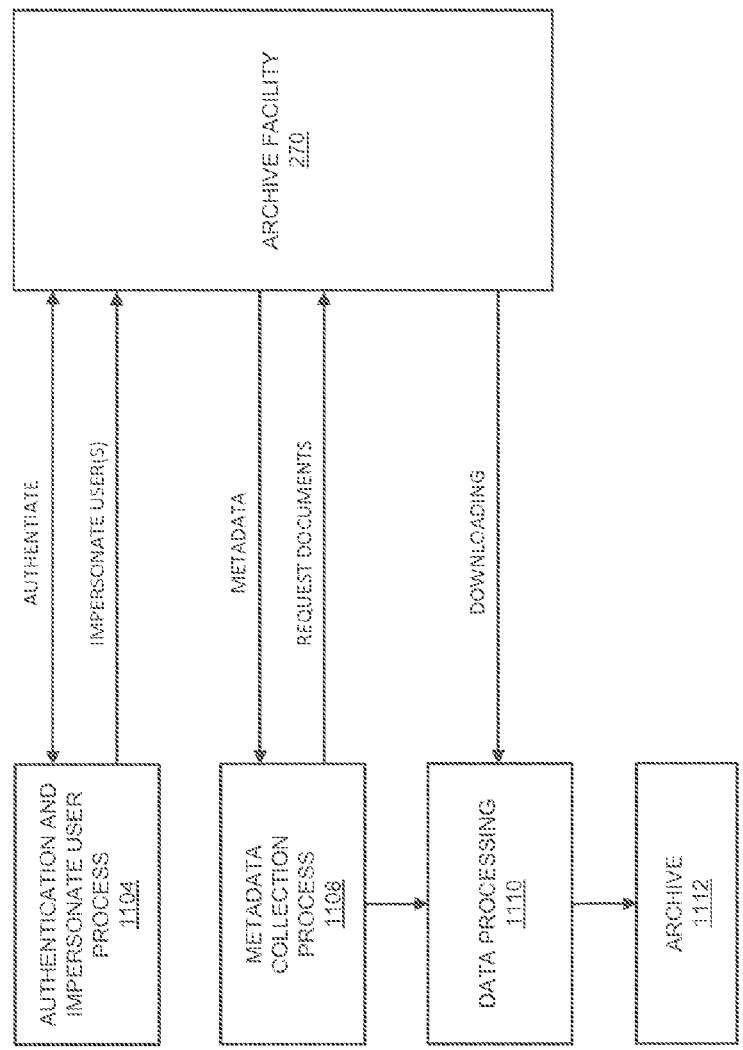
FIG. 11 depicts an illustrative process flow diagram for an archive facility.

Features of the archive facility may include automated confirmation letter creation (e.g. such as including e-signature), configurable viewpoint and naming structure, (e.g. by user ID, email address, exchange group, composite group), automated exchange freeze to create non-permissioned groups, archiving from frozen exchange to check a user's 'pre-freeze' role and impersonation against old (inactive) profile, freeze letter creation, and the like. FIG. 11 illustrates an example archive process, including authentication and impersonation of users 1114, metadata collection 1108 (e.g., including reports, such as permission reports, folder reports, document reports, viewpoint reports, and the like), download and data processing 1110, and creation of archive 1112.

The design of the archive facility may include a two-part routine that will firstly quickly and efficiently impersonate a user and download all the documents and folders to which they have visibility. The second path may be to create a HTML file that is a representation of the exchange that the end-user may navigate thorough to get to documents. Key functionality of the archive facility may include downloading user coverage for a selected user, ability to impersonate any user within an exchange if logged in with a role of manager or a hidden manager, minimal user interaction, automated download procedures (which may happen sequentially), ability to split archive volumes based on a defined size specified, process messaging relevant to a splitting process, support of UTF-8 encoding of document and folder names, debug mode for advanced logging and trouble shooting, audit files for tracking activity (e.g., user successful logins, exchange ID of where to download from, downloaded files, warnings, system errors), ability to split a large exchange over n number of volumes based on size of the volumes, splitting at a determined level (e.g. document level, folder lever), downloading of questions and attached documents, ability to freeze an exchange into several states (e.g. cold freeze [the phase of the exchange is placed into hold, and all users that are not reviewers are changed to reviewers], partial freeze [the phase of the exchange is placed into preparation, and all users that are not previewers or reviewers are changed to previewers], warm freeze [the phase of the exchange is placed into Open, and then all users that are not previewers or reviewers are changed to previewers.]), ability to un-freeze an exchange and revert it back to a previous state (e.g. in regard to exchange phase and user role), and the like.

The functional structure of the archive facility may include a model, a view, a controller, and the like. For instance, the role of the model may be to make calls to the controllers, which are the classes that hold all the controllers. The model may also provide a specific response that is parsed into the model object, which may keep the 'controller layer' response away from the view and 'controller local'. Within the view the user may be able to enter their login credentials (this may also be where files (e.g. excel files) are created and read in. There may be a status display that is updated with events. It also may be in the view that the user is able to see if the process has completed with any errors. There may be multiple controllers, such as one for handling local events and a second within the combined layer that creates a web request. The local application may take user inputs and handle button events, call the models within a combined layer, contain the business logic to process the response from the combined layer model, and the like. The combined layer may be able to execute commands, and when a response is given, it may be parsed into the models response objects.

The archive process may be designed to be run by a trained individual as opposed to a user in an exchange. The process may use a combination of public and private API calls. Actions relating to this tool may include login-logout, getting folders, getting documents, downloading documents, downloading Q&A attachments, get all categories, get all questions using smart folders, get all workspace settings, update workspace phase, get user coverage report, create group, get group, get all workspace groups and details, get all workspace users and details, add existing user to group, and the like.

In embodiments, a secure collaborative content facility 282 may be provided for the secure management of a plurality of secure documents, resources, communications, workflows, and the like, among a plurality of users, where secure documents, communications, and the like may contain or have associated therewith metadata content. In embodiments, a one or more workflows may be created, triggered, modified, or redirected based on the metadata. The workflows may include, without limitation, workflows that include steps that take place across multiple entities or enterprises, such as work flows involve in inter-enterprise negotiation, collaboration, or cooperation. Secure communications may include an email, FTP, USB transfer, a secure third-party document sharing facility, and the like. The secure management may be for an information technology environment that is inside or outside an enterprise firewall, for secure or public use, through consumer grade or enterprise grade, and the like. The trigger may be metadata content in association with a signature, request for information, request for collaboration, communication with a new contact, and the like. For example, an enterprise user, working inside the enterprise firewall, may receive a new contact from a prospective client, where metadata in or associated with the communication triggers a new workflow for a new project. In another example, a manager may provide a new project document to an associate, where the new project document includes metadata that triggers the generation of a new workflow. In this way, the secure collaborative content facility enables a more seamless process for generating or managing workflows from metadata content in an initiating exchange. Metadata may be stored, for example, as part of a document, file of the like, such as in one or more tags, fields or headers. A host system of the type described throughout this disclosure, in connection with creation and handling of secure information exchanges, may define metadata types and associate the metadata types with one or more actions, including actions that may be linked to workflows. Such a system may indicate locations for storing and retrieving metadata, as well as rules pursuant to which metadata may be processed in connection with workflows. A metadata definition might correspond to any of a range of states, features, attributes, events, activities, or actions that are typically stored or used in connection with an exchange, such as user attributes (e.g., linkage of users to enterprise, work group, or the like), enterprise attributes (department information, and the like), security attributes (policies, access rules), storage attributes, and the like. Thus, a metadata definition may indicate how a user may, via metadata stored in a file or other resource or stored in a separate location but linked to the file or other resource, ensure the handling of the same by the system. For example, a metadata definition may allow a resource to be designated as a particular type of resource with respect to which, upon creation (and inclusion of the metadata definition), a work flow is automatically initiated that sends the document to a defined type of user within the entity for review and comment, notifies another user of creation, notifies another user of a requirement to create another resource, notifies another user to hold in taking action, or the like. Thus, a single definition may set out or invoke stored rules by which a series of different actions, or even set of multiple work flows may be initiated, modified, or stopped.

In embodiments, a fair share queuing facility 284 may be provided, for the execution of processes described herein, exchanges, sharing, collaboration, and the like, when jobs are required to be queued for processing through the system. Traditionally, queuing is on a first come first serve basis, but with large jobs such as with some processes described herein, this may lower performance of the exchanges that are hosted. For example, suppose a client 1 posts a job with 20,000 tasks into a queue. On a first come first serve basis, the system would have to process all 20,000 tasks of this job before beginning the processing of a second job. This may be adequate if all jobs are large, but if a small job is queued behind the large one, undue degradation of system performance may result as related to a project for which the small job is associated. However, queuing may be adjusted so as to queue jobs in an equitable manner through a dynamic share queuing facility, allowing multiple clients to submit bulk requests to the same work queue to be processed in parallel. On such jobs only the first n messages out of N may be created, and after that, a bulk message containing (N-n) messages is added at the end. Once n first messages are processed only then another n tasks get processed, and another bulk message at the end with (N-n-n) tasks. In this example the system may take 5 tasks out of 20000 tasks and put them in a queue as separate messages and add a bulk message with 19995 tasks in it (20000-5). Once the first 5 tasks are processed and the bulk message is picked up from the queue may the processor take another 5 tasks and put them back in a queue and add a bulk message of 19990 tasks at the end of the queue. In this instance, if Client 2 comes in with a task, it will have to wait no more than the time to complete 5 tasks. If Client 2 comes in with 20000 tasks, tasks of Client 1 and Client 2 may be interspersed. This solution may work with multiple processors on the queue as well. Processing of bulk messages may be used to reorder execution (priorities) of tasks so every time bulk messages get processed the system may specify a rule as to how to determine what next n tasks should be converted into messages to be processed.

In embodiments, a dynamic share queuing facility may be provided, where multiple clients are able to submit bulk requests to the same work queue to be processed in parallel, such as with the following steps: (a) receiving a large job of N tasks, wherein the job is categorized as a large job when N is greater than n predetermined maximum number of tasks permitted to be queued for processing in a single job; (b) queuing the first n tasks out of the N tasks in the large job, wherein the remaining N-n tasks of the large job are stored in a holding queue; (c) queuing a subsequent job based on the following criteria: (i) if no subsequent job is received, queue the next n tasks of the large job as taken from the holding queue, (ii) if a subsequent job is received where the number of tasks in the second job is equal to or less than n, categorize the subsequent job as a small job and queue all the tasks in the subsequent job, (iii) if a subsequent job is received that is a second large job, queue the first n tasks out of the N tasks in the second large job, wherein the remaining N-n tasks of the second large job are stored in a second holding queue; and (d) continuing the steps in (c) for additional subsequent queuing, wherein queuing of jobs for processing alternates between new jobs being received and jobs having remaining tasks stored in holding queues.

In embodiments, a location-based security facility 290 may be provided for file (or other resource) access within a cloud-based or server-based file storage facility where permissions of the file determine access based on location, such as the location of the device requesting the file or resource. Enterprises often want to limit access to sensitive data based on whether someone is physically present at a facility or location. In the past this has been achieved using physical security, meaning the individual who needs access was required to be co-located within the same premises as the entity that provides access. There have been no solutions to the problem other than physical security or network based security (e.g. based on a person's Internet Protocol address) and restricting access to data using a networked personal computer or mobile device. Virtual Private Networks have helped in this regard but they are still very restrictive when allowing access to individuals who do not belong to the same company as the source of the file or data. With the proliferation of devices that can determine the geographical location of a person using the device, this job becomes much easier. The location-based security facility applies geographical location based security to files accessed from a cloud or server based storage or service. In this system, files may have attributes of geographical location, and rights to view the file or save portions thereof may require the file to be accessed from a device where the location of the device can be determined and determined to be within range of a geographic location, such as specified on or in relation to the file. Files may be stored in a cloud based or server based system from where they can be retrieved by a person who has rights to the said file. Within this system, file attributes may be defined, where these attributes may be part of the metadata associated with the file, and therefore searchable. To these existing attributes, spatial data (location where the file can be accessed from) may be added. The location may include geographical coordinates (latitude and longitude), a country, a region, a city, an enterprise location, and the like. The system may provide a way for an individual to add a file to the service with a desired location where the file can be accessed. The system may also provide a way for the individual to add a radius from the aforementioned location to the file attributes. Based on these two inputs (location and radius), the file attributes may now be updated. Once the file attributes are set, they may be searchable and indexed via a geographical positioning data store. When an individual who has access to the file (e.g. based on permissions in the service) tries to access the file from a device (e.g. any mobile computing device or a personal computer), the service determines the location of the device. If there is no mechanism to obtain the location, then the file access is not allowed. If there is a mechanism to obtain the location, then the service compares the location to the location information associated with the file on the service. Once the comparison is done, the determination of whether the file is accessible or not may be provided by the service using the stored location and radius attributes. If the individual can access the file, then the right level of access is provided (e.g. read, write, save, print). If not, the file is not provided. Multiple locations and radii may be defined per file, such as several addresses and radii from those addresses where the file can be accessed.

In embodiments, a multi-factor authentication facility 201 may be provided when access to the system includes multi-factor authentication, such as at login. Multi-factor authentication may set authentication requirements beyond user-name and password, to not only challenge questions, but to risk-based questioning and detection based on a user or device history, such as location, device type, pattern of use, and the like. This method may be used at login, when moving between exchanges within the system, on a per-exchange basis, and the like, where preferences and/or settings may set whether multi-factor authentication is used, and to what level of complexity. For example, some work environments may require a mid-risk level of complexity required for login, while others may require a greater complexity for access. The system may require a level of complexity that looks at a plurality of channels, such as different devices, mobility vs. desktop use, and the like.

In embodiments, a configurable password facility 203 may be provided for configurable passwords. For instance, at the exchange level or the customer level a user may be able to determine what a password policy would be, such as when it will expire, what complexity is required, and the like. A user may login and use their most stringent policy based on all the exchanges for which the user is a member. For example, in one exchange a user might need a very secure password, while others it would not, so the user may use a password that is compliant to the more stringent of the two. The user may be able to use the greatest common denominator in password usage across multiple exchanges, such as at the customer level, at an individual exchange level, and the like.

In embodiments, a client archiving facility 205 may be provided for archiving of content made to an internal archive storage facility within the system, to at least one of plurality of customer server(s), to a third-party storage center, and the like. In the instance where content is being stored on a customer server or to a third-party storage center, the system may have the capability to pull back data in part or in total, such as in a similar manner as that of a document sent to an individual may be pulled back. For instance, in the case of a multi-partner collaboration, where multiple partners have elected to store data in their system as archive, one partner may decide to drop out of the collaboration, and the system may then pull back all the data previously archived on the partner's server. In another instance, customers may want to take over an archive, such as when an exchange is going to be closed, where the content may be written from the system to the customer's server. In this instance, the system may relinquish access to the content. In another instance, there may be a hybrid archiving structure set up, such as having a different archiving configuration on a per unit, per organization, and the like, basis. The ability for a customer to archive content to their own servers may be enabled through an application, API, and the like. When archiving is transferred between entities, such as when an archiving configuration is changed, a chain of custody, a history of ownership, and the like may be maintained. Configurations may also be able to set a level of granularity for the archived content, such as to a lower level of granularity when the content is in a dormant cold storage, but in a higher level of granularity when the content is being actively accessed, such as when an exchange is active.

In embodiments, a client key hosting facility 207 may be provided to enable users to host their own keys in association with access to content. For instance, a client may want some form of extra protection, such as ability immediately close off access to content (a 'red button' of sorts) so secure content will be shredded. To implement this, the system may encrypt content with a key over which the client has control. The client may host the key, such as creating an application/web application that they host and completely control, where this application can expose the key back to the system for the application. The client can then pull out the application, so the system does not have the keys, eliminating access to the content. There may be a plurality of different options for handling the keys, such as the system having an application that the system provides to a client that deploys to a semi-public cloud, that the client hosts on their own, that the system host it for the client, have a 'red button' in the system's own application (e.g. the system holds the keys, but the keys are shred when the client 'hits the button'), the client has a master key for their exchange, the client is able to download the key and get the material back but otherwise can 'shred' the content, and the like.

In embodiments, a cross-enterprise collaboration facility 298 may include unified activity workspaces, such as content management, activity management, workflow management, enforcement, and the like, where these activities may plug into the system as modules. This extended environment may also extend beyond the enterprise firewall, allowing user access when outside the secure network of the enterprise.

Figure 12:
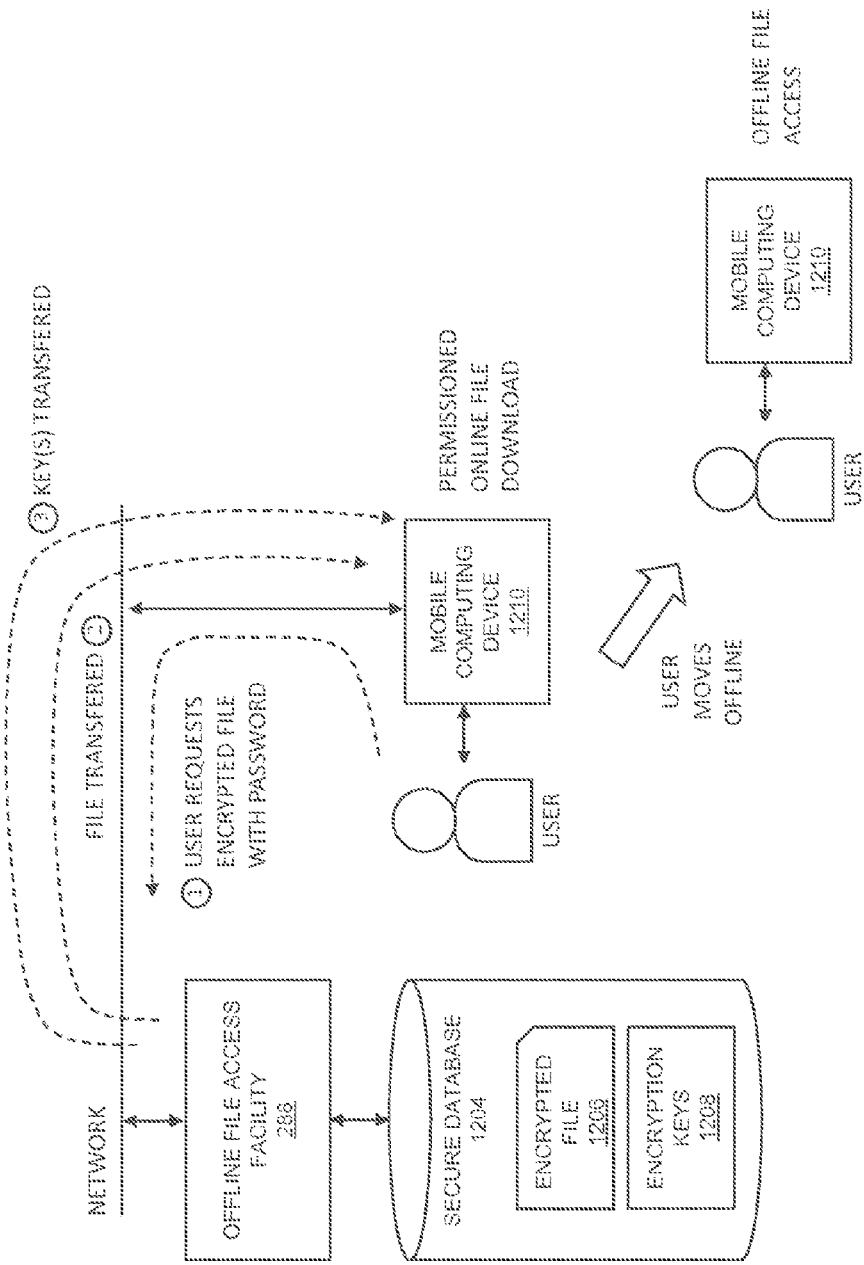
FIG. 12 depicts a functional block diagram for a file access facility in an embodiment of the present invention.

Referring to FIG. 12, in embodiments an offline file access facility 288 may provide offline file access to remotely stored files, such as protected by information rights management via an encrypted key lease (e.g., where a single key enables a single file access). Secure offline file access is a significant business problem. In the past, providing offline access to files increased the risk of data loss or theft of intellectual property that could prove disastrous to a company. However, providing convenient offline accessing of protected or secure files is also very important, as individuals accessing files are not always connected to a network that allows them to do further work on the files while offline. Existing solutions are very limited, such as only allowing for a date-based file access, where the date is set on the file or on a server. Existing solutions also do not provide for encrypted key stores, such as protected by a personal password, identification number, and the like.

In embodiments, files may be stored through the offline file access facility 288 in a cloud-based or server-based system from where they can be retrieved by a user who has rights to the file. Within this system, files may be protected by an information rights management mechanism. Retrieval of these files may be based on any of a plurality of public key exchange mechanisms available in the art (e.g., Diffie-Hellman). To view files, generated keys are sent from the file access facility 288 to the user wishing to view these files on a computing device. When a user who has access to the file (e.g., based on permissions in the file access facility) tries to access the file from a computing device (e.g. any mobile computing device or a personal computer), the offline file access facility 288 determines whether offline access is allowed for such a file. If offline access is allowed (e.g., access to the file on a user computer device while the computer device is not connected to the network), one or more generated keys may be sent to the computing device for future use, such as one key for each access. The number of times the files can be accessed at a later time without network connection, such as determined by the number of keys provided, may be set at the offline file access facility 288. This number may also be used in conjunction with an expiration date on the keys (e.g., which may also be set at the file access facility) to provide further constrained access to the file. Keys for file access may be handed out to the computing device when it is online to a user that has been authenticated and with permissions to download the encrypted file for offline access. Keys may be stored in an encrypted storage and a Personal Identification Number or a password selected, such as by the owner of the device, to protect the encrypted storage.

In a non-limiting example, and continuing to refer to FIG. 12, a user may be online with a mobile computing device 1210 and make a request to download an encrypted file 1206 from a secure database 1204 associated with the offline file access facility 288. The user may provide a password to the offline file access facility 288 in order to gain access to the file, which may then be authenticated by the offline file access facility. Once authenticated, permissions may be checked to determine if the user has permission to download the encrypted file for offline access. If so, then the offline file access may download the encrypted file 1206 along with at least one of a plurality of encryption keys 1208. Now, when the user moves offline from the network, the user is able access the encrypted file 1206 by using an encryption key that is stored on the mobile computing device 1210 along with the encrypted file. When the user moves back online with the network, the offline file access facility 288 may continue to synchronize keys and files, such as stored in the secure database 1204 and on the mobile computing device 1210, as based on the usage of encryption keys 1208 and access to the encrypted file 1206 by the user while the mobile computing device 1210 was offline.

Additionally, to access the encrypted file the user may need to provide a password to access the encrypted file to prevent unauthorized users from accessing the encrypted file with the encryption key. In the instance when one key provides a single access, if the user was downloaded multiple encryption keys, they may be able to access the file multiple times. Alternately, a single encryption key may provide for multiple accesses, such as determined by the offline file access facility at the time the encryption keys 1208 were downloaded to the mobile computing device.

In embodiments, a method may be provided for secure offline computer content access, comprising at a server-based file access facility connected to a network and to a secure database, storing a data file as an encrypted data file along with a plurality of encryption keys in the secure database, each of the plurality of encryption keys providing access to the encrypted data file, the encrypted data file accessible as downloaded to a mobile computing device that is not connected to the network only through use of at least one of the plurality of encryption keys and presentation of a user secure identifier from a user of the mobile computing device, wherein the at least one of the plurality of encryption keys allows the user of the mobile computing device to access the encrypted data file a limited number of times; receiving, at the file access facility, a request from the user of a mobile computing device for offline access to the data file when the mobile computing device is disconnected from the network, the access request using the user secure identifier; authenticating, at the file access facility, the user's permission for offline access to the data file while the mobile computing device is disconnected from the network; and downloading, upon authentication, to the mobile computing device, the encrypted data file along with the at least one of the plurality of encryption keys while the mobile computing device is connected to the file access facility through the network. In embodiments, the encrypted data file stored on the mobile computing device may be assessed through the use of the at least one encryption key and the presentation of the user secure identifier by the user on the mobile computing device while the mobile computing device is disconnected from the network. The encrypted data file may be access-controlled through digital rights management. The file access facility may be connected to the secure database across the network. The secure database may be a cloud-computing storage facility. The mobile computing device may be a laptop computer, a tablet computing device, a mobile phone enabled computing device, and the like. The secure identifier may be a password. Authenticating may be performed by utilizing the user secure identifier to check the user's permission profile for permission to access the data file offline. The permission profile may identify a number of offline accesses the user is permitted while disconnected from the network. The file access facility, upon authentication and identifying the number of offline accesses the user may be permitted when disconnected from the network, to download the encrypted file to the mobile computing facility along with at least one of a number of encryption keys equal to the number of accesses the user is permitted while disconnected from the network and an encryption key that can be used the number of times. A number N encryption keys may be downloaded to the mobile computing device, such as where one of the number N encryption keys enables one access to the encrypted data file, and after the one access, the one of the number N encryption keys cannot be used for a subsequent access to the encrypted data file. The limited number of times the user is allowed to access the encrypted data file with the at least one of the plurality of encryption keys may be limited to one time. The plurality of encryption keys may be only valid for a certain time period.

In embodiments, a server-based spreadsheet viewer facility 292 for rendering a spreadsheet document to a client computing device may be provided that enables the client computing device to view a spreadsheet document without the use of the spreadsheet's source application (e.g., Microsoft Excel). Rather than opening the spreadsheet document directly with the spreadsheet application, a client spreadsheet viewer on the client computing device may enable a user to view and interact with a 'viewable spreadsheet document' that has been rendered by the server-based spreadsheet viewer facility, where the original spreadsheet document is stored with the server-based spreadsheet viewer facility, such as transmitted to the spreadsheet viewer facility by a first user trying to share the spreadsheet document with a second user, by the second user who has been sent the spreadsheet document by the first user, and the like.

Figure 13:
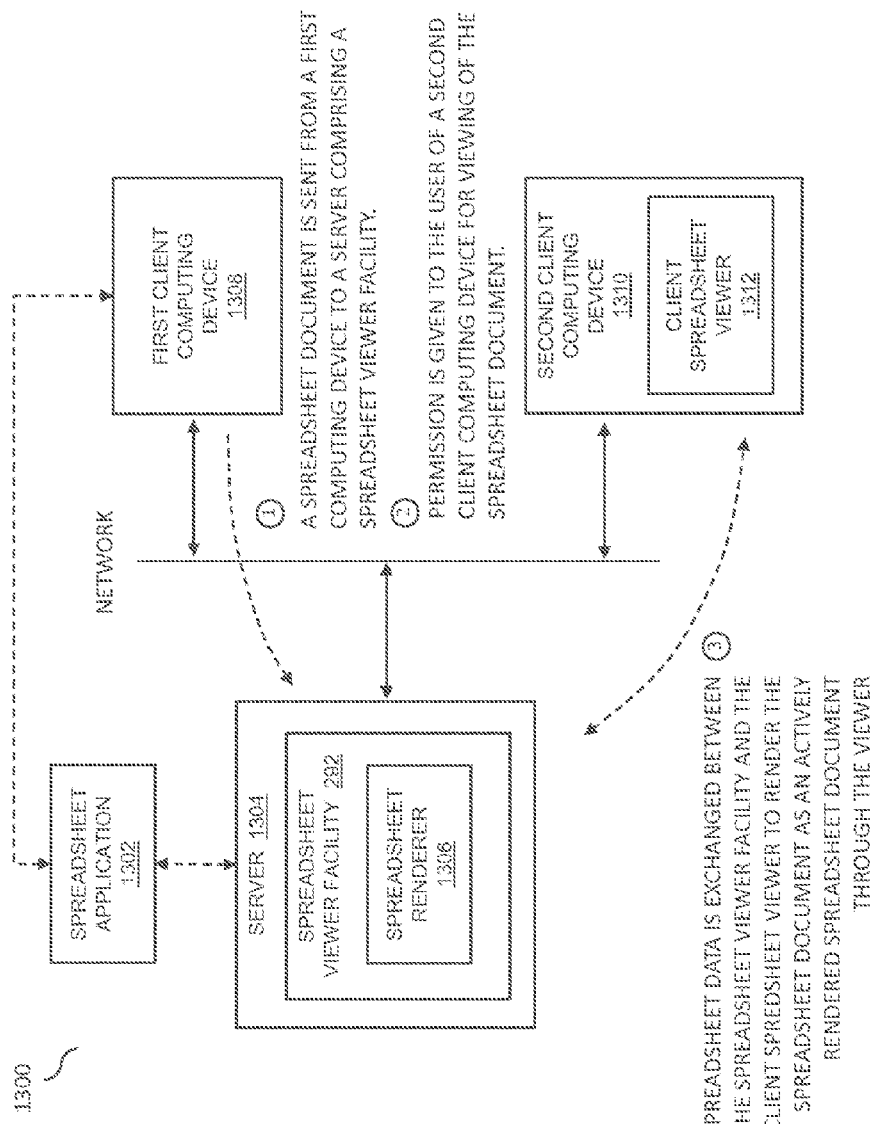
FIG. 13 depicts a functional block diagram for a spreadsheet viewer facility in an embodiment of the present invention.

In a non-limiting example, and referring to FIG. 13, the user of a first client computing device 1308 may send the spreadsheet document to the server 1304 (e.g., a secure server) hosting the spreadsheet viewer facility 292, along with a sharing invitation to the user of a second client computing device 1310 with permission to view the spreadsheet document. The second client computer 1310 may, upon the user's request, communicate with the spreadsheet viewer facility 292 to render the spreadsheet document with a spreadsheet renderer 1306 to a client spreadsheet viewer 1312 on the second client computer 1310. The spreadsheet renderer 1306 may then transmit spreadsheet document data to the client spreadsheet viewer 1312 for the initial rendering of the rendered spreadsheet document. The user of the second client computer 1310 may then interact with the rendered spreadsheet document, where the client spreadsheet viewer 1312 transmits user actions (e.g., keyboard and mouse actions) to the spreadsheet viewer facility 292 for interpretation and updating of the rendered spreadsheet.

In this way the rendering is an active rendering of the spreadsheet document, where the spreadsheet renderer 1306 keeps updating the rendered spreadsheet document as presented to the user of the second client computing device 1310 through the client spreadsheet viewer 1312. In embodiments, the spreadsheet viewer facility 292 may utilize a spreadsheet application 1302, such as located on the server 1304 or interfaced with remotely, such as a software-as-a-service type remote interface. The spreadsheet viewer facility 292 may then utilize the spreadsheet application 1302, the spreadsheet document, and the transmitted user actions to generate the rendered spreadsheet document data for transmission to the second client computing device 1310. The client spreadsheet viewer may then transform the spreadsheet data to a viewable spreadsheet format, and provide viewing capabilities to the viewable spreadsheet document on the second client computing device 1310, where viewing may include viewing spreadsheet cells, associated cell formulas, and the like, and where the user may be able to also extract data as well as view the data.

In embodiments, the client spreadsheet viewer 1312 may enable the user to take photos or screen-shots of the viewed document, such as part of an audit trail, signature verification, and the like. Because the client spreadsheet viewer 1312 is able to view content without the actual application present, the client spreadsheet viewer 1312 may be able to provide these functions without a license to the spreadsheet application use. In embodiments, the client spreadsheet viewer 1312 may be implemented through a browser interface on the second client computing device 1310. In such embodiments, server-side processing and execution may run the application, taking mouse clicks, touches, keyboard inputs and the like from the client computing device interface, performing functions, and rendering views back to the client spreadsheet viewer 1312. Thus, a user of the second client computing device 1310 may see calculations, view formulas (such as by mousing over a cell), and manipulate data, but the execution of such interaction takes place on a version of the spreadsheet application 1302 that is associated with the server 1304, such as behind a firewall in a secure data location. Among other things, this capability allows users to temporarily access spreadsheet content, while assuring the security of such content, including making it more convenient to revoke access to content without leaving versions of an important spreadsheet.

Figure 13A:
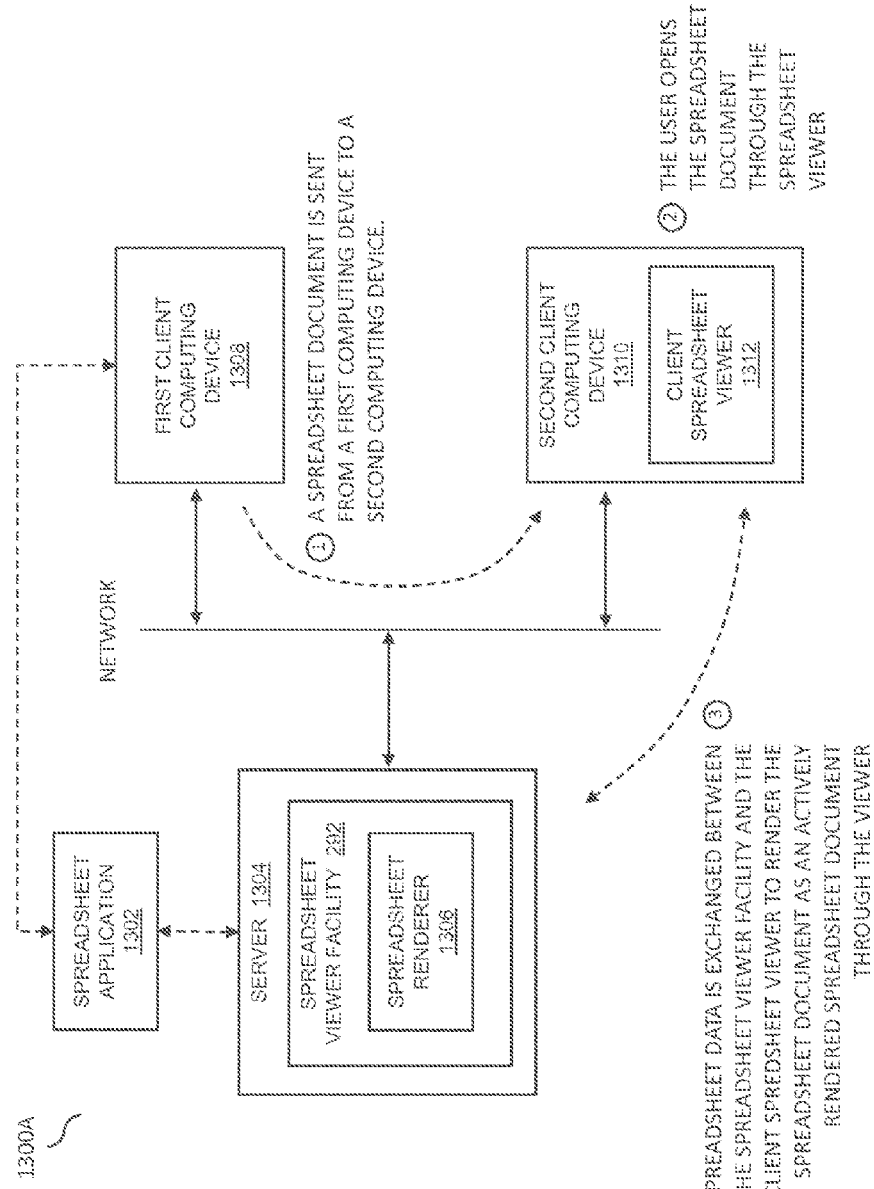
FIG. 13A depicts a functional block diagram for a spreadsheet viewer facility in an alternate embodiment of the present invention.

Referring to FIG. 13A, in embodiments the first client computing device 1308 may send the original spreadsheet document directly to the second client computing device 1302. In this instance, the second client computing device 1310 may transmit the spreadsheet document to the spreadsheet viewer facility 292 for rendering as described herein.

In embodiments, a method for rending a spreadsheet document may be provided, comprising providing, on a server-based computing device, a spreadsheet viewer facility configured to render a spreadsheet document created by a spreadsheet application as an actively rendered spreadsheet document in a client spreadsheet viewer running on a client computing device without the use of the spreadsheet application running on the client computing device; rendering the spreadsheet document as an actively rendered spreadsheet document from the spreadsheet viewer facility to the client spreadsheet viewer; transmitting at least one keyboard and mouse action on the client computing device to the spreadsheet viewer facility, wherein the at least one keyboard and mouse action is associated with a selection of a cell in the actively rendered spreadsheet document subsequent to the rendering of the spreadsheet document; and transmitting a spreadsheet data content for the selection of the cell of the actively rendered spreadsheet document from the spreadsheet viewer facility to the client spreadsheet viewer. In embodiments, the spreadsheet document may be received at the client computing device from a second client computing device, where the second client computing device sends the spreadsheet document to the spreadsheet viewer facility for rendering. The spreadsheet document may be received at the server-based computing device for rendering to the client-computing device. The spreadsheet document may be disabled from being opened by the spreadsheet application running on the computing device. The spreadsheet viewer facility may provide permission for access to the spreadsheet document as an actively rendered spreadsheet document. The spreadsheet document may be disabled from being opened by the spreadsheet application of a software-as-a-service application. The spreadsheet viewer facility may provide permission for access to the spreadsheet document as an actively rendered spreadsheet document. The spreadsheet application may be run directly on the server-based computing device, run remotely as a software-as-a-service from a remote networked location, and the like. The spreadsheet data content may be numeric data from the cell, text data from the cell, a formula associated with the cell, and the like. The rendering of the spreadsheet document may transform a plurality of spreadsheet data comprising with the spreadsheet document into the actively rendered spreadsheet document. The transformation may be on a cell-by-cell basis and dependencies among cells are maintained in the transformation. The client spreadsheet viewer may be adapted to provide permission to copy the spreadsheet data content. The client spreadsheet viewer may be adapted to provide manipulation of the spreadsheet data content in the cell. The client spreadsheet viewer may be adapted to provide permission to take screenshots of the actively rendered spreadsheet document. The client spreadsheet viewer may run through a browser running on the client computer device.

In embodiments, a virtual container digital rights management (DRM) facility 209 may be provided that utilizes a virtual container environment (e.g., virtual machine, drive 'x' partitioning) to provide DRM control over content, such as to provide a facility for editing, but still blocking the ability to print, save, print screen, and the like. Special plug-ins to an application may be used for such purposes, but although this configuration may still enable a user to read the content, they may not be able to make updates, or send it back to the originator. However, through the use of a virtual container environment, a proxy to the application system may be created that would mount an encrypted file, such as a protected 'drive X' item, enabling the control and/or prevention of operating system calls (e.g., in the Windows O/S the Win32 calls to save files, access the network, and print screen), but allow applications to work with the content. For instance, while the file is protected as a drive X item, the application may work with the content while protecting the document. Formatting, updating documents, and the like may thus be allowed, enabling the system to save it back, encrypt it, and the like, enabling the document to be sent to the creator of the protected package, allowing someone to edit a file, even when they can't copy, print, and the like.

In this way, the virtual container environment may control further dissemination of the document that a user is sharing by blocking the various operating system commands (e.g., print, print screen, save, send, and the like) that are the normal mechanisms by which a recipient of a sensitive document would save or disseminate a copy, even though the recipient may only supposed to have temporary, limited access. A plug-in to an application that is being used to interact with the content can accomplish blocking the operating system calls, but may do so mainly by creating 'read only' versions. Often, the original sender of the document wants feedback from the user, such as edits or annotations, which could be embodied in the document if the user were able to edit. The virtual container may be used to create a virtual drive, encrypted version of the content (e.g., document). The virtual container may allow applications (e.g., office applications and editing applications) to edit the content, annotate the content, and the like, but where it can only be saved back to an encrypted form on the virtual container, so that when a virtual container permission expires, only the original sender has access to the edited version.

Figure 15:
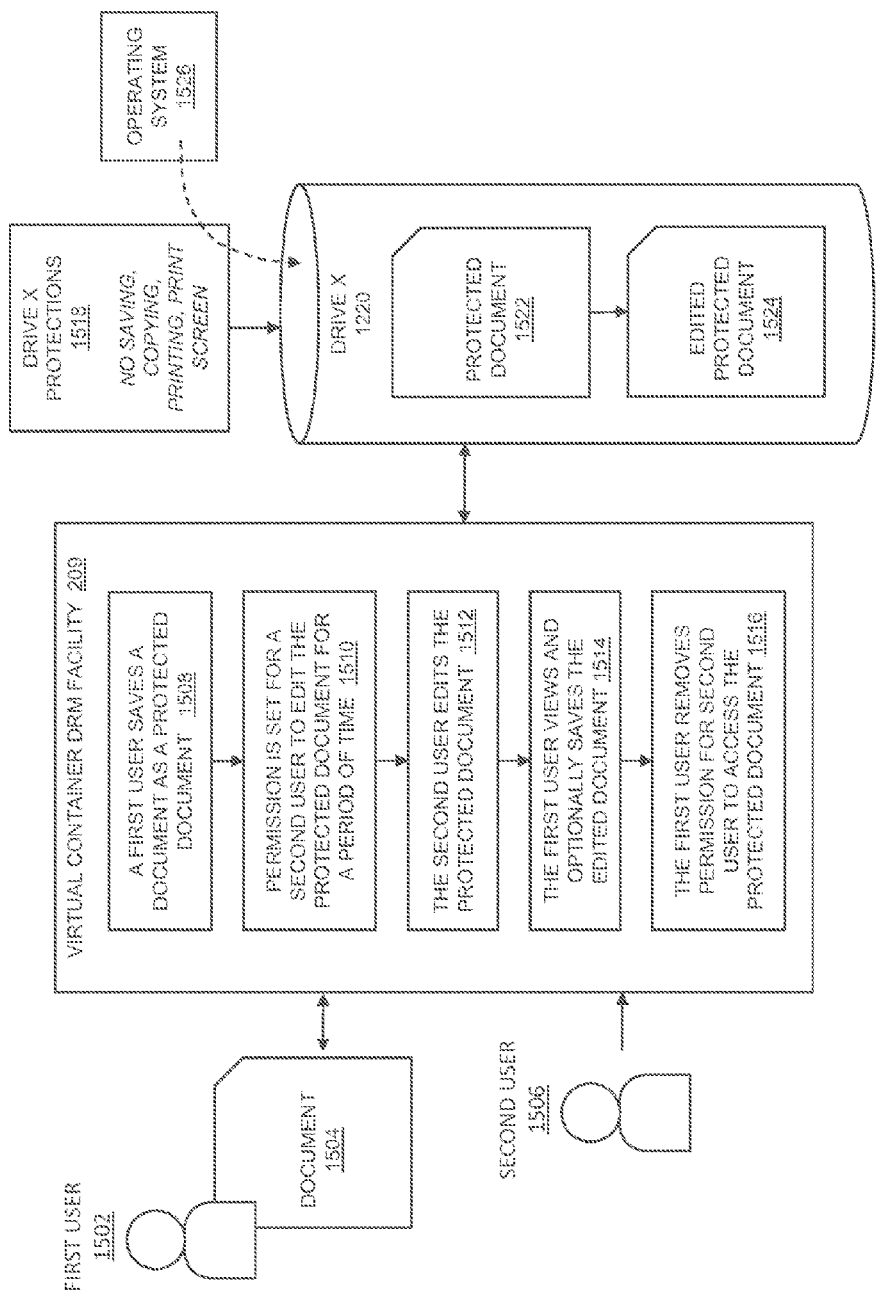
FIG. 15 depicts a functional block diagram for a virtual container DRM facility in an embodiment of the present invention.

Referring to FIG. 15, a non-limiting example functional flow diagram depicts an embodiment process flow for a document 1504 being edited through the protective virtual container DRM facility 209. In this instance, a first user 1502 utilizes the virtual container DRM facility 209 to permit a second user 1506 to edit a protected document 1522 version of the document 1504 while protecting the document 1504 from saving, copying, printing, print screen, and the like functions as applied to the protected document 1522. As depicted in this instance, in a first step 1508 the first user 1502 may save the document 1504 as a protected document 1522, where the document is protected by being configured as or as part of a drive X 1220 storage location. The drive x 1220 may have drive x protections 1518, such as disallowing commands from an operating system 1526 from the second user 1506 saving the protected document to a location other than the drive X 1220, copying the protected document, printing the protected document, print screening while the protected document is being accessed, and the like. In a second step 1510, permission may be set for the second user to edit the protected document 1522, such as for a period of time (e.g., one day, a week). Alternately, permissions may be restricted to a number of accesses the second user 1506 is permitted, such as limited to one access, three accesses, and like, where the second user 1506 then has that many accesses to edit the protected document 1522, such as representing the number of editing cycles the first and second users have in editing the protected document 1522. In a third step 1512, the second user 1506 may edit the protected document 1522 to create an edited protected document 1524, where the second user is restricted from anything but editing the protected document 1522 by way of the drive X protections 1518. In a forth step 1514, the first user 1502 may view and optionally save the edited document 1524, where the first user 1502 may maintain all of the functions of saving, copying, printing, print screen, and the like, that the second user is blocked through the drive X protections 1518. In a fifth step 1516, the first user 1502 may remove permission for the second user 1506 to access the protected document 1522 or edited protected document 1524, thus eliminating all access to any version of the document 1504 that the second user may have been previously granted.

In embodiments, a method for securely sharing documents among users within separate business entities may comprise providing a virtual container control facility, on a computing device with an operating system, and at least one virtual container where commands from the operating system for saving, copying, and printing of computer files are restricted for users other than unrestricted users; storing by a first unrestricted user of a first business entity a computer file in the virtual container; granting access permission by the first unrestricted user to view and edit the computer file by a restricted user of a second business entity; and receiving editing of the computer file by the restricted user, the editing creating an edited computer file within the virtual container that is accessible by the unrestricted user. In embodiments, the first unrestricted user may save, copy, print, print screen, and the like, the edited computer file by the first unrestricted user, including any portion of the edited computer file. Access permission may be removed for the first unrestricted user to the computer file and the edited computer file. The data file may be encrypted with digital rights management protection. The virtual container may be a file location within a virtual machine configured to restrict the commands from the operating system. The virtual container may be a file location within a computer drive configured to restrict the commands from the operating system. Editing the computer file may be through a source application for the computer file, where the source application is permitted to edit the computer file. The granted access permission may be for a limited time period. The granted access permission may be for a limited number of accesses to the data file. The granted access permission may be based on a role of the restricted user within a transaction process involving the first and second business entities.

In embodiments, a method for securely sharing documents among users may comprise providing a virtual container control facility, on a computing device with an operating system, and at least one virtual container where commands from the operating system for saving, copying, and printing of computer files are restricted for users other than unrestricted users; storing by a first unrestricted user a computer file in the virtual container; granting access permission by the first unrestricted user to view and edit the computer file by a restricted user; and receiving editing of the computer file by the restricted user, the editing creating an edited computer file within the virtual container that is accessible by the unrestricted user. In embodiments, the first unrestricted user may save, copy, print, print screen, and the like, the edited computer file by the first unrestricted user, including any portion of the edited computer file. Access permission may be removed for the first unrestricted user to the computer file and the edited computer file. The data file may be encrypted with digital rights management protection. The virtual container may be a file location within a virtual machine configured to restrict the commands from the operating system. The virtual container may be a file location within a computer drive configured to restrict the commands from the operating system. Editing the computer file may be through a source application for the computer file, where the source application is permitted to edit the computer file. The granted access permission may be for a limited time period. The granted access permission may be for a limited number of accesses to the data file. The granted access permission may be based on a role of the restricted user within a transaction process.

In embodiments, the offline file access facility 288, the spreadsheet viewer facility 292, and the virtual container DRM facility 209 may be combined to provide a comprehensive method for secure viewing or editing of a document, such as a spreadsheet, where the spreadsheet viewer facility 292 provides secure viewing, and in some embodiments editing, of a document when a client computing device is online, and the offline file access facility 288 and virtual container DRM facility 209 provide secure viewing, and in some embodiments editing, of the document when the client computing device is offline. For example, in order to provide secure access to a document, the display of the document may be rendered from a secure server to the client computing device rather than downloading the document to the client computing device. Remote screen rendering may be enabled by protocols known to those of ordinary skill in the art, such as the remote desktop protocol of the Windows® operating system, similar protocols in Linux operating systems, or various server- or software-as-a-service-based protocols for such rendering. Such protocols may allow not only viewing, but editing of the document from the client computing device, without having the document itself reside on the client computing device. In this way, access to the underlying document and its file, apart from the view currently being displayed (e.g., a particular page or screen view of the document), is controlled by the secure server. In embodiments, the spreadsheet viewer facility 292 may be used to render a plurality of different types of documents (e.g., spreadsheets, word processor documents, presentation documents) to a document viewer on the client computing device, such as in conjunction with a web browser on the client computing device. However, the rendering process described for such online access does not result in updating the rendered document on the client computing device when the client computing device is offline. For the offline case, the secure server, upon notification by a user of a connected client computing device that the user wants access to the document while offline, may provide an encrypted version of the document along with a limited use encryption key. In that case, the offline file access facility 288 enables the client computing device to download the encrypted version of the document along with at least one limited-use key. In this case, the client computing device will have access to the underlying document file, at least one a limited, one-time basis, so that the file can be edited within the viewer. The viewer may thus include appropriate editing functions, as well as viewing functions. The party wishing to share a document may wish to have the recipient user of the client computing device view, and perhaps even edit, a document, but often it is desired to prevent further sharing of the document by the recipient. In order to prevent the user of the client computing device from printing, saving, sending or copying the document while it is stored on the client computing device, the secure server may utilize the virtual container DRM facility 209 to store the document in a virtual container on the client computing device, the virtual container being adapted such that the document can only be edited or viewed within the viewer. The document is now secured whether the client computing device is connected or not to the secure server, where user permissions may be separately controlled for online rendering of a document and for offline access to the document.

In embodiments, a method for secure viewing of a document may comprising rendering, from a networked server-based computing device to a client computing device when the client computing device maintains an online connection to the networked server-based computing device, a document created by an application as an actively rendered document in a client document viewer running on the client computing device without the use of the application running on the client computing device; and upon a request from the client computing device for offline viewing of the document, storing, on the networked server-based computing device, the document as an encrypted document along with a plurality of limited-use encryption keys, each of the plurality of limited-use encryption keys providing access to the encrypted document a limited number of times, the encrypted document accessible as downloaded to the client computing device that is not connected to the network only through use of at least one of the plurality of encryption keys within the limited number of permitted uses, wherein when the encrypted document is downloaded to the client computing device, the encrypted document is stored in a virtual container where commands from an operating system of the client computing device for saving, copying, and printing of computer files are restricted. Further, a user of the client computing device may access the encrypted document stored in the virtual container through the use of the at least one of the plurality of encryption keys, while the client computing device is disconnected from the network.

Email can be a convenient method for inviting an individual to view a resource, such as a file, on a secure data exchange. For instance, an email may contain an embedded link, or similar element, allowing the recipient of the email to access a resource by clicking on the link and logging into the secure exchange environment. However, emails may be stored for time periods that exceed the desired time for which access is intended to be permitted. This is particularly true across separate business entities, where a transaction or other collaborative project may call for temporary sharing of information, but once the need ceases, access is no longer intended. For example, in mergers and acquisitions transactions, temporary access may be allowed to designated individuals of a prospective buyer to confidential resources that reflect the condition of a target seller in a "due diligence" process. This access needs to be revoked when the due diligence process ceases. In methods and systems disclosed herein, an effective period may be specified for an email, so that once the effective period ceases (either based on expiration of time, or based on triggering of a condition that ceases the effective period), the email is no longer effective to access the resource on the secure data exchange.

Further complicating exchange of information across business entities over time is the presence of multiple email addresses for a single individual. An individual may have different roles, reflected in different addresses (e.g., personal and business), or may have different email addresses associated with a single role (e.g., bill@companyx.com and William@companyx.com). In embodiments, an email effectivity facility may be provided in connection with the secure exchange environment disclosed herein, where email addresses are linked to the identity of a user, such as a designated individual who will receive email, and the relationship of the email addresses to the user are tracked over time to provide a current association of email address to a designated individual. In embodiments, once email addresses are linked to a person (such as by a business entity associated with the person), then the person may be allowed access to a resource from any current email address, not just the email address to which a link or other access capability was initially sent. Similarly, all email addresses of a user may be "de-commissioned," and all email-based links rendered ineffective, if the role of the individual changes, such as if the individual leaves the business entity that is the intended recipient of access rights.

Thus, in embodiments, access to data by a designated individual may be permitted based on the union of (a) emails or email accounts that are currently effective (that is, within their applicable effective period) and (b) the set of resources for which any valid email address of that designated individual has been granted access. In such embodiments, a user may readily access data relevant to multiple projects and resources, without needing to track down the particular email that allowed the user access to a particular resource, yet the individual is not allowed to access resources that have expired, or to access resources in cases when the role of the individual has shifted (resulting in a change in the identity of the user and the access permissions allowed for all emails associated with that user).

Once an identity has been established for a user, that identity may be tracked over time as the individual moves from company to company, eventually allowing a host to establish a comprehensive, authoritative collection of identities and associated email addresses for a large number of individuals.

In embodiments, the same email address may be used at different times for two different individuals, in which case the methods and systems may include further information, such as metadata, for tracking the real individual that is associated with a particular address at a particular time. Different effective periods may be used to confirm which individual is allowed access to particular resources. A person may have multiple effectivity periods if they work at a company over two different periods of time, e.g., hired January 2000, quit June 2005, then hired again in February 2008 and quit again in December 2012.

In embodiments, the email effectivity facility may track identity and conditional access permissions over time for the different email addresses for the individual as they change roles, as well as tracking the effective dates for those email addresses. The system may track the effective date that a particular email account was active, and/or inactive, the effective date the email account was linked into the email effectivity facility, and the like. The email effectivity facility may extend control of access beyond a user's current association with a business entity, such as an individual having had different email addresses for the different companies the individual has worked for, along with personal emails, each with effectivity conditions. The email effectivity facility may provide an authoritative source of workspace identity, tracking the plurality of email accounts and associated access conditions, and keeping them associated with this one person, and controlling access that this person has over time in association with each email.

The email effectivity facility may aid a user in managing a user's email identities over time, where the user's identity shifts over time, where an individual shifts between roles (e.g., with respect to personal email and work email, for example, or shifting from one company to another). The system may associate a user's permissions for access, editing, and other features based on a correct interpretation of the current role. For instance, an email sent to an individual with a link to content in a data room may have an effectivity date (e.g., the individual's access is between time 1 and time 2). That email and link may also be associated with a catalog of email addresses, so that if the user leaves that role, the link is no longer effective, even if the user attempts to activate it within the originally permissioned time range. For instance, the user leaving a role may be indicated in a catalog by de-permissioning that email address by the user's employer (or other sender of the email) and perhaps also triggered by the appearance of a new email address with a different company domain that is for the same person. In embodiments, the companies that granted the email account may validate the user's workspace identity, and provide a historical access to the workspace identity.

In embodiments, effectivity conditions may be managed by a host, such as an intermediate business entity, in response to inputs from multiple distinct business entities. A past employer may allow the individual to receive emails, but not to access any company data, while a current employer may limit email access to time periods associated with specific roles or tasks delegated to an individual. Further, a non-employer, such as a third party involved in a transaction with the company that employs the individual, may set effectivity conditions on specific emails directed to the individual, such as allowing temporary access to the third party's data in a secure exchange environment, such as to enable collaboration or sharing between the third party and the individual's employer. Thus, effectivity conditions for emails directed to an individual may be managed on a per account, per sender, per project, or per employer basis, among other factors, by allowing employers, the individual using the account, email senders (including third parties in different entities) and an intermediate host of an exchange environment to set and manage such effectivity conditions.

Figure 14:
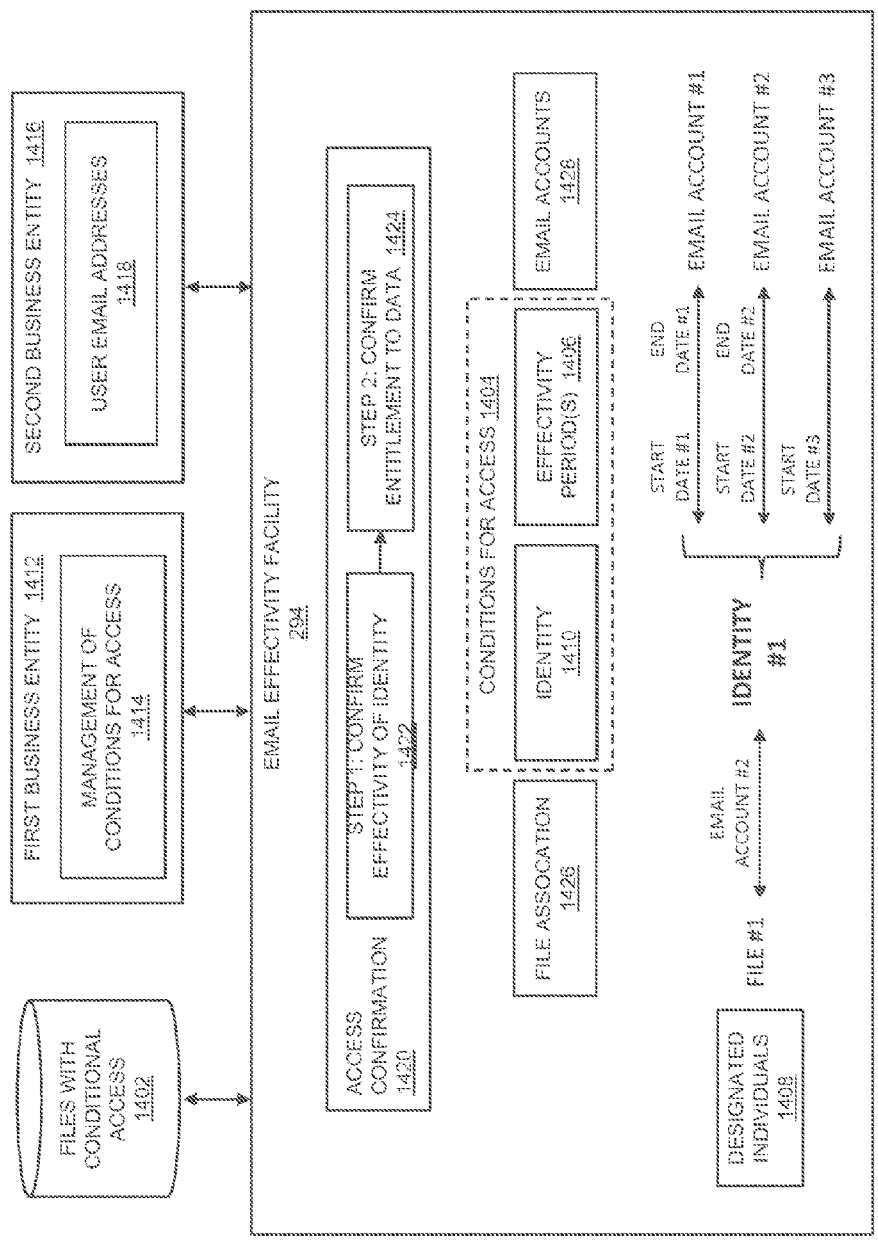
FIG. 14 depicts a functional block diagram for an email effectivity facility in an embodiment of the present invention.

Referring to FIG. 14, in embodiments an email effectivity facility 294 may be provided for managing access conditions 1404 to resources in a secure exchange environment, where access to the resources is provided through email. In embodiments, methods and systems may use the email effectivity facility 294 to allow a user of a first business entity 1412 to manage access 1414 by specifying conditions for email-based access to at least one resource in a collection of files 1402, wherein the condition expresses (a) one or more effective periods 1406 for using an email providing access to the resource and (b) a condition of email access to the resource by a designated individual 1408 of a second business entity 1416, where the access permission may be assigned using a specific email address 1418 of the designated individual and access may be provided by sending an email to that email address with a link, a log-in credential, or the like that enables access to the resource. Access confirmation for access to the resource, e.g., the file 1420, may include confirmation steps, such as in a first step 1422 where the effectiveness of the identity of the designated individual is confirmed (including based on linking various email addresses to that particular individual) and a second step 1424 where entitlement to access a resource, such as the data file 1420, is confirmed (including checking the effectivity periods that were set for access to each of the resources by the user of the first business entity).

In an example, there may be an association 1426 between the identity 1410 of a designated individual and each of multiple email addresses or accounts 1428, each with effectivity periods 1406. Email accounts, or particular emails bearing access credentials, may have a start date and an end date as their effectivity date range, such as when email accounts are no longer effective, have a future date range, and the like. An email account may also only have a start date, such as when an effectivity period is still current, or has not yet begun. FIG. 14 shows an instance where an identity #1 has a file association with a file #1 through email account #2. In this instance, the confirmation of identity would be passed for access confirmation, but the step of confirming entitlement to the data may fail, such as if it is currently outside the effectivity period between start date #2 and end date #2. However, if the current time is within this date range, the designated individual would have access to the file #1. The association of multiple email accounts with a single identity through the email effectivity facility 294, enables a comprehensive management of a plurality of email accounts, especially important when the email accounts are conditionally associated with emails linked to files.

Figure 14A:
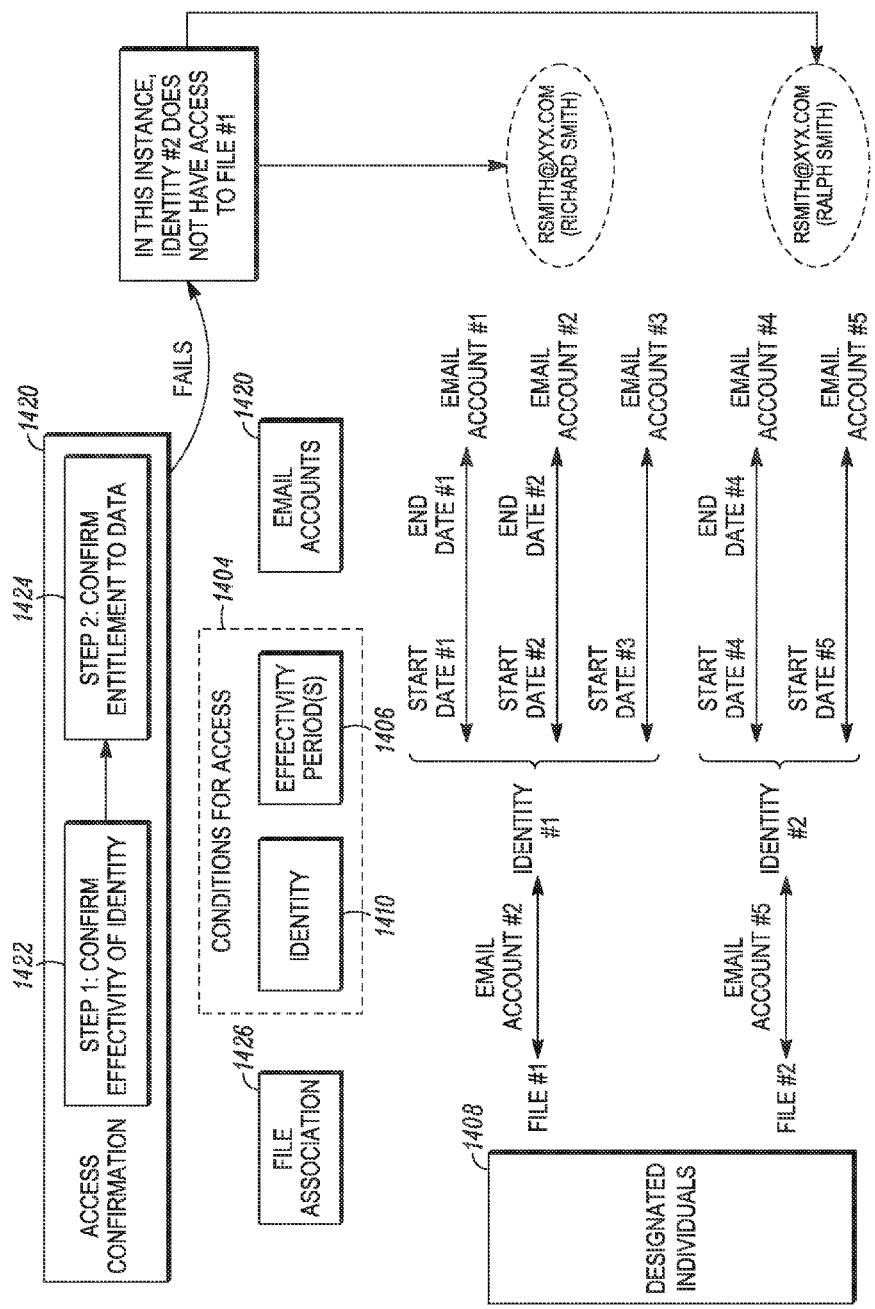
FIG. 14A depicts a functional block diagram for an email effectivity facility in an embodiment of the present invention, showing a case where an identical email address does not have entitlement to a data file.

FIG. 14A shows a specific instance when a single business entity has re-assigned a previously used email account name to a second user, such as where a previous employee has a related name, such as rsmith.xyz.com being used for a former employee Richard Smith and a current employee Ralph Smith. In this instance, the access confirmation would fail if Identity #2 tried to access File #1, where the email account name would pass, but the effectivity date range (e.g., equating to their time range for employment with the business entity) would not match, and so failing the confirmation of entitlement to the file.

In embodiments, a method for managing access to a secure exchange environment managed by an intermediate business entity through a user email identity may comprise establishing a secure exchange server hosted by an intermediate business entity, wherein communications and access to a collection of files established by a first business entity are managed for a second business entity; and establishing an email effectivity facility that allows a user of the first business entity to specify a condition for email-based access to at least one resource in the collection of files, wherein the condition expresses (a) an effective period for using an email providing access to the resource and (b) a condition of email access to the resource by a designated individual of the second business entity, wherein the access permission was assigned using a specific email address of the designated individual. In embodiments, multiple email addresses may be associated with the identity of the designated individual of the second business entity. The designated individual may be permitted access to the resource during the effective period of the email that provided access from any current email account that is associated with the identity of the designated individual. Separate access conditions may be managed for each of the multiple email addresses of the designated individual. The first and second business entities may validate the designated individual's permissions associated with the multiple email addresses. Permission to access information on the secure exchange server may be identified by an embedded link in an email from the user of the first business entity to an email address of the designated individual. The first business entity may provide updates to the access conditions as an association of the user of the second business entity with the first business entity changes. The effective period may be a period of employment, a stage of a transaction, and the like. The email effectivity facility may utilize a graphical user interface to manage the access conditions, such as where the graphical user interface indicates the status of the access conditions, where the graphical user interface is integrated into a third-party application as an application program interface (API), and the like. The effectivity condition may be a status of an email account of the second business entity, and the status of the email account is still monitored when the designated individual is no longer employed by the second business entity.

While the invention has been described in connection with certain preferred embodiments, other embodiments would be understood by one of ordinary skill in the art and are encompassed herein.

The methods and systems described herein may be deployed in part or in whole through a machine that executes computer software, program codes, and/or instructions on a processor. The present invention may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, facilities and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software facilities, or as facilities that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A method for managing access to a secure exchange environment managed by an intermediate business entity, the method comprising:
   establishing a secure exchange server hosted by an intermediate business entity, wherein communications and access to a collection of files established by a first business entity are managed to allow conditional secure access to resources of the collection of files by individuals of a second business entity different than the first business entity; and establishing an email effectivity facility, managed by the secure exchange server, that allows a user of the first business entity to specify conditions for email-based access by a designated individual of the second business entity to at least one resource in the collection of files of the first business entity through an embedded link in an email message provided by the email effectivity facility to the designated individual of the second business entity, wherein the conditions include (a) an effective period for using the embedded link to provide access to the at least one resource and (b) an event condition of email access to the resource by the designated individual of the second business entity, wherein an access permission is assigned using at least one individual user email identity including at least one specific email account of the designated individual of the second business entity, and wherein the email effectivity facility provides access confirmation to allow access to the at least one resource if the conditions are met.

2. The method of claim 1, further comprising associating multiple specific email accounts with the at least one individual user email identity of the designated individual of the second business entity.

3. The method of claim 2, wherein the designated individual is permitted access to the resource during the effective period for using the email message to provide access to the at least one resource from any current email account that is associated with the identity of the designated individual of the second business entity.

4. The method of claim 2, further comprising managing separate access conditions for each of the multiple email accounts of the designated individual of the second business entity.

5. The method of claim 2, wherein the first and second business entities validate the designated individual's access permission associated with the multiple email accounts.

6. The method of claim 1, wherein the first business entity provides updates to the conditions for email-based access as an association of the designated individual of the second business entity with the first business entity changes.

7. The method of claim 1, wherein the effective time period is a period of employment.

8. The method of claim 1, wherein the effective time period is a stage of a transaction.

9. The method of claim 1, wherein the email effectivity facility utilizes a graphical user interface to allow the user of the first business entity to specify the conditions for email-based access.

10. The method of claim 9, wherein the graphical user interface indicates the status of the conditions for email-based access.

11. The method of claim 10, wherein the graphical user interface is integrated into a third-party application as an application program interface (API).

12. The method of claim 1, wherein the conditions of email access further include a status of an email account of the designated individual of the second business entity, and the status of the email account continues to be monitored when the designated individual of the second entity is no longer employed by the second business entity.

13. The method of claim 1, further comprising triggering the de-permissioning of the specific email account of the designated individual when the condition that an appearance of a new email account with a different company domain for the designated individual is detected.

14. The method of claim 1, wherein the event condition is related to a change to a business association between the first business entity and the designated individual of the second business entity.

15. The method of claim 14, wherein the business association is a joint business transaction associated with a due diligence, wherein the event condition is the termination of the due diligence activity between the first business entity and the second business entity.

16. The method of claim 1, wherein the event condition is related to a change to a business association between the second business entity and the designated individual of the second business entity.

17. The method of claim 16, wherein the business association between the second business entity and the designated individual of the second business entity is associated with employment of the designated individual.

18. The method of claim 1, wherein the event condition is related to a change of email identity of the designated individual of the second business entity.

* * * * *